US012294884B2

(12) United States Patent
Zhu et al.

(10) Patent No.: US 12,294,884 B2
(45) Date of Patent: May 6, 2025

(54) METHOD AND APPARATUS FOR INTER-CELL DOWNLINK AND UPLINK BEAM INDICATION, MEASUREMENT AND REPORTING

(71) Applicant: Samsung Electronics Co., Ltd., Suwon-si (KR)

(72) Inventors: Dalin Zhu, Allen, TX (US); Md. Saifur Rahman, Plano, TX (US); Emad N. Farag, Flanders, NJ (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 18/460,505

(22) Filed: Sep. 1, 2023

(65) Prior Publication Data
US 2024/0031855 A1 Jan. 25, 2024

Related U.S. Application Data

(63) Continuation of application No. 17/444,470, filed on Aug. 4, 2021, now Pat. No. 11,751,085.
(Continued)

(51) Int. Cl.
*H04L 12/26* (2006.01)
*H04L 43/0823* (2022.01)
(Continued)

(52) U.S. Cl.
CPC ......... *H04W 24/10* (2013.01); *H04L 43/0823* (2013.01); *H04W 72/046* (2013.01)

(58) Field of Classification Search
CPC ... H04W 24/10; H04W 72/046; H04W 24/08; H04W 72/231; H04L 43/0823;
(Continued)

(56) References Cited

U.S. PATENT DOCUMENTS

2019/0363810 A1* 11/2019 Luo .................. H04B 17/345
2022/0046458 A1    2/2022 Zhu
(Continued)

FOREIGN PATENT DOCUMENTS

EP         3993517 A1     5/2022
WO      2019193581 A2    10/2019
(Continued)

OTHER PUBLICATIONS

Extended European Search Report issued Jan. 4, 2024 regarding Application No. 21854494.8 , 8 pages.
(Continued)

*Primary Examiner* — Thai Dinh Hoang

(57) ABSTRACT

A method of operating a user equipment (UE) includes receiving first information for a physical cell identifier (PCI) different from a serving cell PCI; receiving second information for source or measurement reference signals (RSs) for the PCI; determining, based on one or more transmission configuration indicator (TCI) states, the first information, and the second information, a reception spatial domain filter for reception of at least one of downlink (DL) RSs and channels from the PCI; and measuring, based on the first information and the second information, the measurement RS. The method further includes determining, based on the measured measurement RSs, the first information, and the second information, a beam report and transmitting the beam report for the PCI on an uplink (UL) channel. A beam refers to a spatial property used to receive or transmit a source RS or a channel.

20 Claims, 22 Drawing Sheets

Related U.S. Application Data

(60) Provisional application No. 63/226,418, filed on Jul. 28, 2021, provisional application No. 63/193,986, filed on May 27, 2021, provisional application No. 63/141,791, filed on Jan. 26, 2021, provisional application No. 63/122,563, filed on Dec. 8, 2020, provisional application No. 63/119,249, filed on Nov. 30, 2020, provisional application No. 63/062,817, filed on Aug. 7, 2020.

(51) Int. Cl.
*H04W 24/10* (2009.01)
*H04W 72/044* (2023.01)

(58) Field of Classification Search
CPC ..... H04L 5/0023; H04L 5/0048; H04B 7/063; H04B 7/06968; H04B 7/022; H04B 7/0626; H04B 7/0695; H04B 7/088
See application file for complete search history.

(56) References Cited

U.S. PATENT DOCUMENTS

| | | | |
|---|---|---|---|
| 2023/0319591 A1* | 10/2023 | Zhou | H04W 16/28 370/329 |
| 2024/0057167 A1* | 2/2024 | Zhou | H04W 74/0833 |
| 2024/0179602 A1* | 5/2024 | Damnjanovic | H04W 36/362 |
| 2024/0250797 A1* | 7/2024 | Yang | H04L 5/0094 |
| 2024/0334401 A1* | 10/2024 | Khoshnevisan | H04L 5/16 |

FOREIGN PATENT DOCUMENTS

| | | | | |
|---|---|---|---|---|
| WO | 2020144637 A1 | 7/2020 | | |
| WO | WO-2020219283 A1 * | 10/2020 | ........... | G01S 5/0236 |
| WO | WO-2021207567 A1 * | 10/2021 | ........... | H04B 17/102 |
| WO | WO-2021226610 A2 * | 11/2021 | ............. | H04L 5/001 |
| WO | WO-2022020694 A1 * | 1/2022 | ........... | H04B 7/0695 |
| WO | WO-2022113042 A1 * | 6/2022 | ............. | H04B 7/022 |
| WO | WO-2022133009 A2 * | 6/2022 | ........... | H04L 5/0048 |
| WO | WO-2023013320 A1 * | 2/2023 | ........... | H04B 7/06962 |
| WO | WO-2023015031 A1 * | 2/2023 | ........... | H04L 1/1812 |
| WO | WO-2023052234 A1 * | 4/2023 | ........... | H04L 5/0048 |
| WO | WO-2023056128 A1 * | 4/2023 | ........... | H04B 7/0628 |
| WO | WO-2023061649 A1 * | 4/2023 | ........... | H04B 7/0408 |
| WO | WO-2023154331 A1 * | 8/2023 | ......... | H04B 7/06968 |

OTHER PUBLICATIONS

Ericsson, "Lower-layer mobility enhancements", 3GPP TSG-RAN WG1 Meeting #98bis, R1-1911226, Oct. 2019, 10 pages.
ZTE, "Preliminary views on further enhancement for NR MIMO", 3GPP TSG RAN WG1 Meeting #101-e, R1-2003483, May 2020, 18 pages.
Ericsson, "Remaining issues for mTRP", 3GPP TSG RAN WG1 #98bis, R1-1910865, Oct. 2019, 15 pages.
"3rd Generation Partnership Project; Technical Specification Group Radio Access Network; NR; Physical channels and modulation (Release 16)", 3GPP TS 38.211 V16.6.0, Jun. 2021, 134 pages.
"3rd Generation Partnership Project; Technical Specification Group Radio Access Network; NR; Multiplexing and channel coding (Release 16)", 3GPP TS 38.212 V16.6 0, Jun. 2021, 153 pages.
"3rd Generation Partnership Project; Technical Specification Group Radio Access Network; NR; Physical layer procedures for control (Release 16)", 3GPP TS 38.213 V16.6.0, Jun. 2021, 187 pages.
"3rd Generation Partnership Project; Technical Specification Group Radio Access Network; NR; Physical layer procedures for data (Release 16)", 3GPP TS 38.214 V16.6.0, Jun. 2021, 172 pages.
"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.
"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.
"3rd Generation Partnership Project; Technical Specification Group Radio Access Network; Evolved Universal Terrestrial Radio Access (E-UTRA); Physical layer procedures (Release 16)", 3GPP TS 36.213 V16.6.0, Jun. 2021, 577 pages.
International Search Report and Written Opinion of the International Searching Authority in connection with International Application No. PCT/KR2021/010482 dated Nov. 16, 2021, 10 pages.
Huawei et al., "Feature Summary of Enhancements on Multi-TRP/Panel Transmission", R1-1911425, 3GPP TSG RAN WG1 Meeting #98bis, Chongqing, China, Oct. 14-20, 2019, 100 pages.
Samsung, "On Rei.17 FeMIMO WI", R1-2003918, 3GPP TSG RAN WG1 #101, e-Meeting, May 25-Jun. 5, 2020, 12 pages.
Ericsson, "High Level Views on Rel-17 feMIMO", R1-2004633, 3GPP TSG RAN WG1 Meeting #101-e, eMeeting, May 25-Jun. 5, 2020, 12 pages.

* cited by examiner

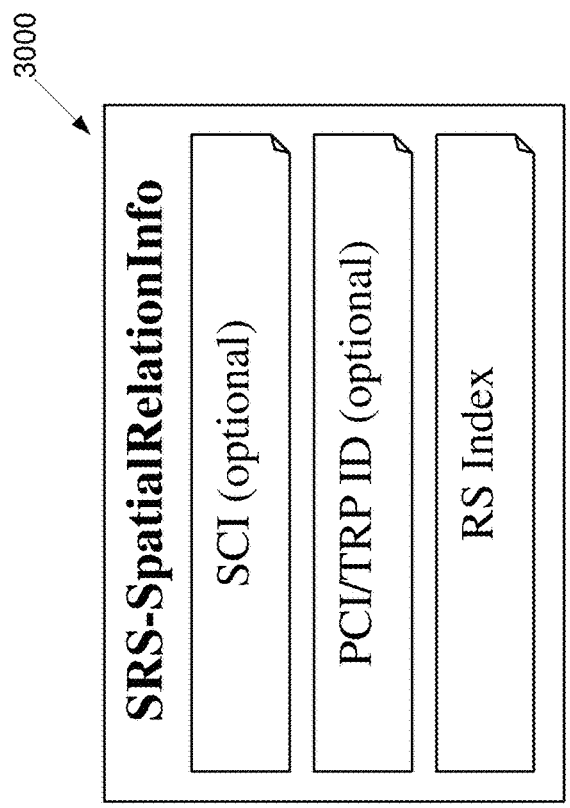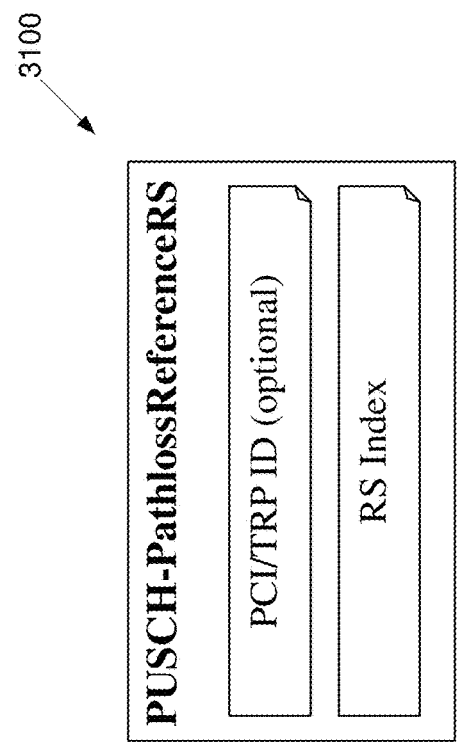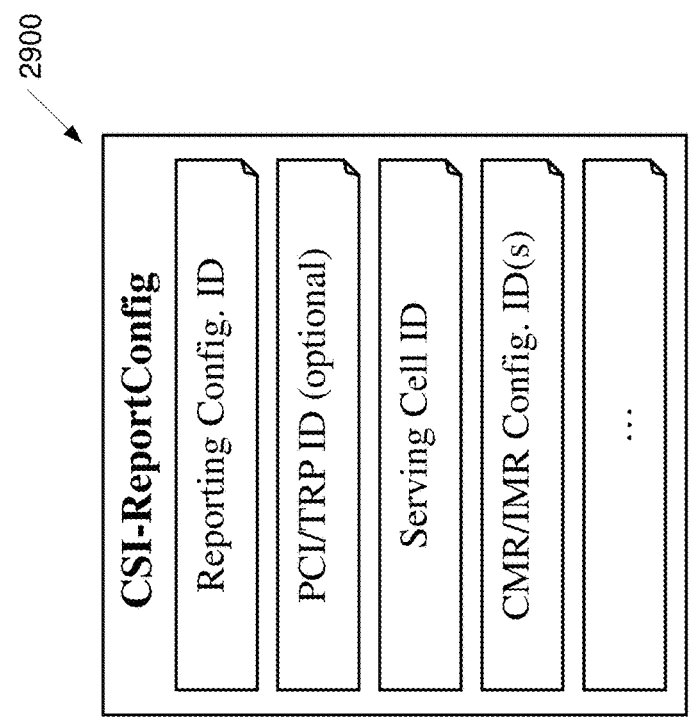

METHOD AND APPARATUS FOR INTER-CELL DOWNLINK AND UPLINK BEAM INDICATION, MEASUREMENT AND REPORTING

CROSS-REFERENCE TO RELATED APPLICATIONS AND CLAIM OF PRIORITY

This application is a continuation of U.S. patent application Ser. No. 17/444,470, filed on Aug. 4, 2023, which claims priority to: U.S. Provisional Patent Application No. 63/062,817, filed on Aug. 7, 2020; U.S. Provisional Patent Application No. 63/119,249, filed on Nov. 30, 2020; U.S. Provisional Patent Application No. 63/122,563, filed on Dec. 8, 2020; U.S. Provisional Patent Application No. 63/141,791, filed on Jan. 26, 2021; U.S. Provisional Patent Application No. 63/193,986, filed on May 27, 2021; and U.S. Provisional Patent Application No. 63/226,418, filed on Jul. 28, 2021. The content of the above-identified patent document is incorporated herein by reference.

TECHNICAL FIELD

The present disclosure relates generally to wireless communication systems and, more specifically, the present disclosure relates to transmission configuration indicator (TCI) state/beam indication, beam measurement and reporting, and uplink reference signal (RS)/channel configurations in an inter-cell system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to TCI state/beam indication, beam measurement and reporting, and uplink RS/channel configurations in an inter-cell system.

In one embodiment, a user equipment (UE) is provided. The UE includes a transceiver configured to receive first information for a physical cell identifier (PCI) different from a serving cell PCI and receive second information for source or measurement reference signals (RSs) for the PCI. The UE includes a processor operably connected to the transceiver, the processor configured to determine, based on one or more transmission configuration indicator (TCI) states, the first information, and the second information, a reception spatial domain filter for reception of at least one of downlink (DL) RSs and channels from the PCI; measure, based on the first information and the second information, the measurement RSs. Resources of the measurement RSs from the PCI are configured in one or more channel state information (CSI) resource settings or in one or more CSI-RS resource sets.

The processor is further configured to determine, based on the measured measurement RSs, the first information, and the second information, a beam report. The beam report for the PCI is configured in one or more CSI reporting settings. The transceiver is configured to transmit the beam report for the PCI on an uplink (UL) channel. A beam refers to a spatial property used to receive or transmit a source RS or a channel.

In another embodiment, a base station (BS) is provided. The BS includes a transceiver configured to transmit first information for a PCI different from a serving cell PCI and transmit second information for source or measurement RSs for the PCI. A processor operably connected to the transceiver. The processor configured to generate one or more TCI states indicating resources of the source RSs for the PCI, generate one or more CSI resource settings or one or more CSI-RS resource sets configuring resources of the measurement RSs for the PCI, and generate one or more CSI reporting settings configuring a beam report for the PCI. The transceiver is configured to receive the beam report for the PCI. A beam refers to a spatial property used to receive or transmit a source RS or a channel.

In yet another embodiment, a method for operating a UE is provided. The method receiving first information for a PCI different from a serving cell PCI; receiving second information for source or measurement RSs for the PCI; determining, based on one or more TCI states, the first information, and the second information, a reception spatial domain filter for reception of at least one of (DL RSs and channels from the PCI; and measuring, based on the first information and the second information, the measurement RS. Resources of the measurement RSs from the PCI are configured in one or more CSI resource settings or in one or more CSI-RS resource sets. The method further includes determining, based on the measured measurement RSs, the first information, and the second information, a beam report, wherein the beam report for the PCI is configured in one or more CSI reporting settings and transmitting the beam report for the PCI on an UL channel. A beam refers to a spatial property used to receive or transmit a source RS or a channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 29 illustrates an example CSI reporting configuration according to embodiments of the present disclosure;

FIG. 30 illustrates an example SRS spatial relation information according to embodiments of the present disclosure; and FIG. 31 illustrates an example PUSCH pathloss reference RS according to embodiments of the present disclosure.

DETAILED DESCRIPTION

FIG. 1 through FIG. 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v.16.6.0, "NR; Physical channels and modulation"; 3GPP TS 38.212 v16.6.0, "NR; Multiplexing and Channel coding"; 3GPP TS 38.213 v16.6.0, "NR; Physical Layer Procedures for Control"; 3GPP TS 38.214: v.16.6.0, "Physical Layer Procedures for Data"; 3GPP TS 38.321 v16.5.0, "NR; Medium Access Control (MAC) protocol specification"; 3GPP TS 38.331 v.16.5.0. "NR; Radio Resource Control (RRC) protocol specification"; and 3GPP TS 36.213 v16.6.0, "Evolved Universal Terrestrial Radio Access (E-UTRA); Physical layer procedures."

Figure 1:
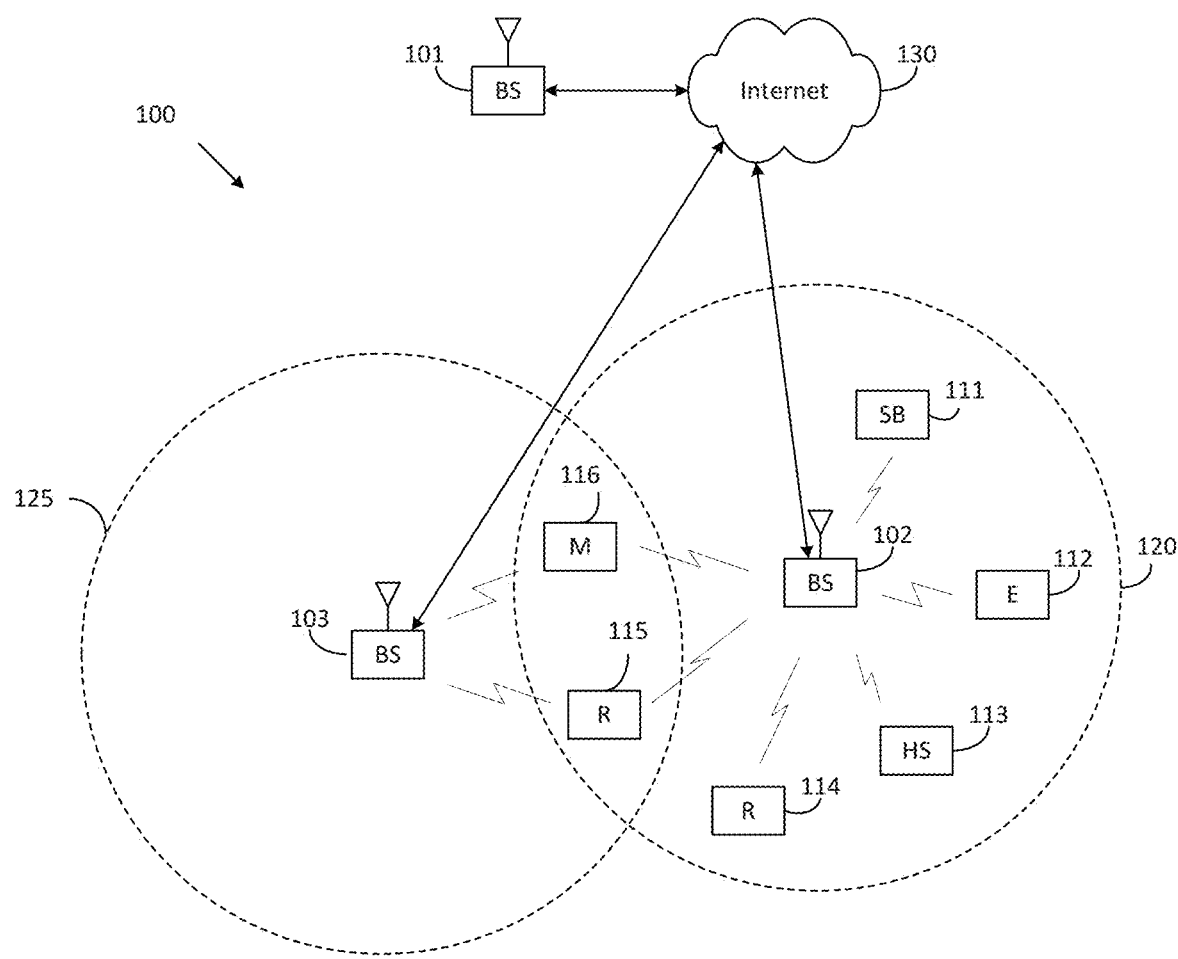
FIG. 1 illustrates an example wireless network according to embodiments of the present disclosure.
Figure 2:
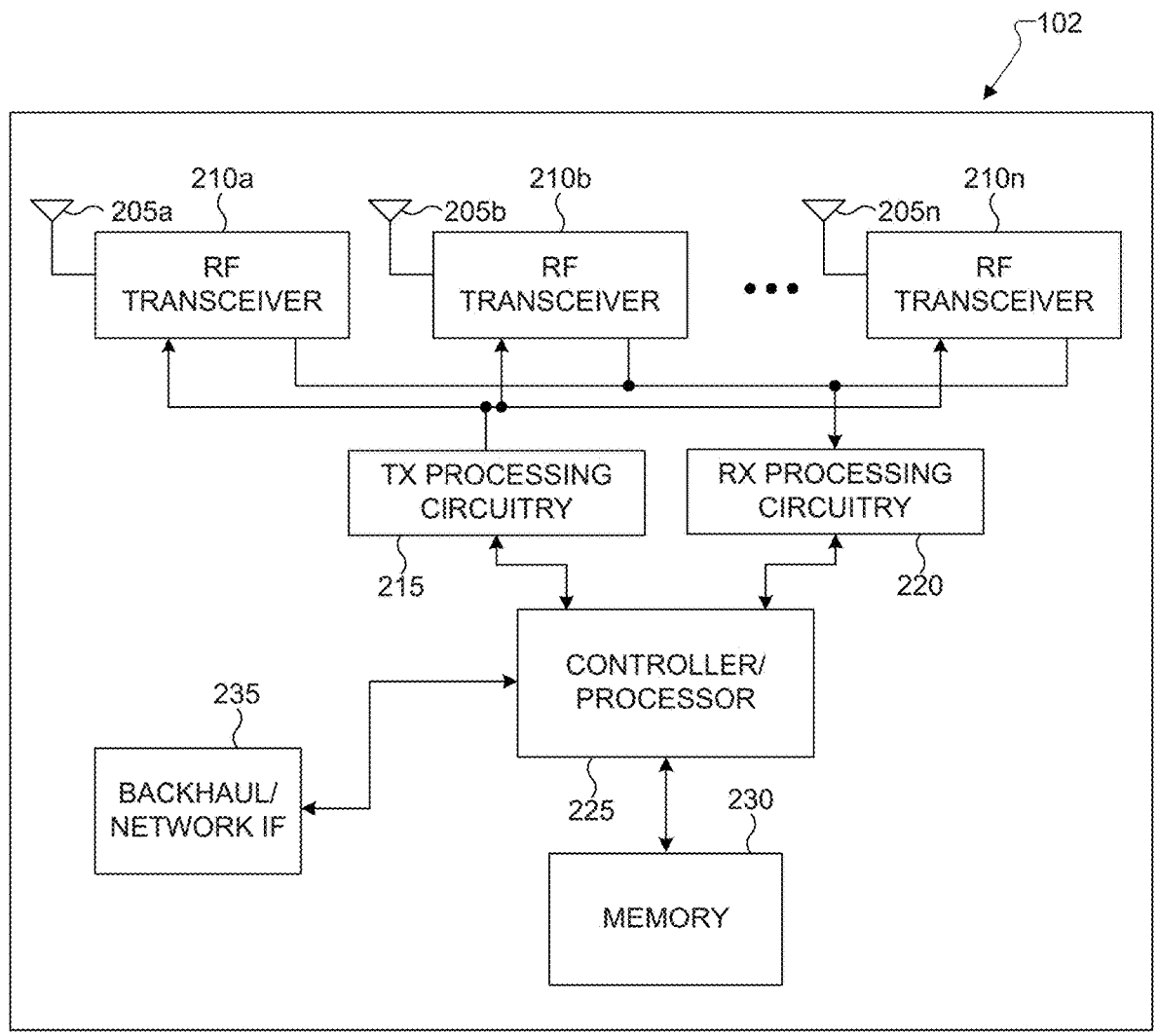
FIG. 2 illustrates an example gNB according to embodiments of the present disclosure.
Figure 3:
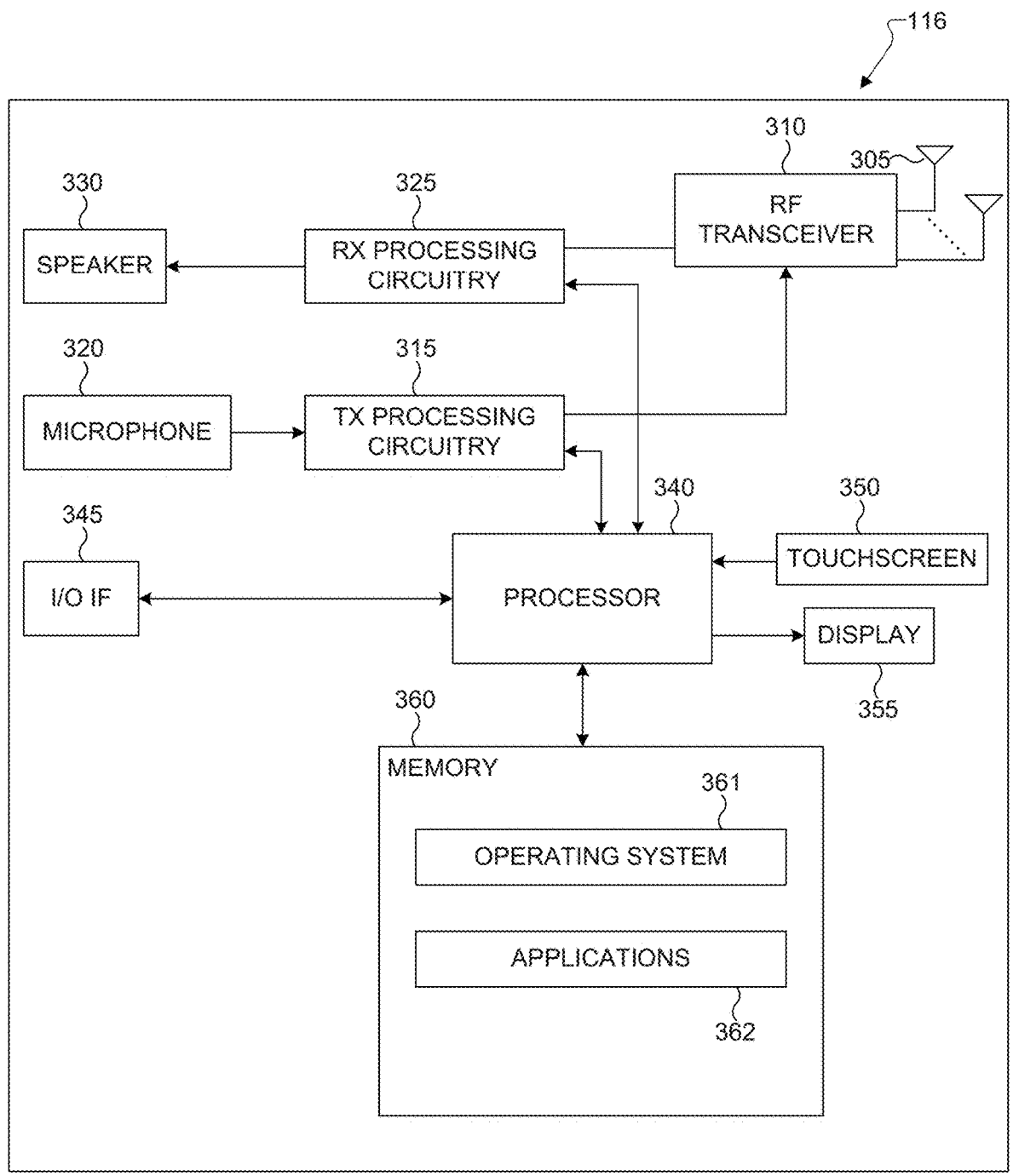
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), TRP, an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for enhanced QCL indication in a multi-RP system. In certain embodiments, and one or more of the gNBs 101-103 includes circuitry, programing, or a combination thereof, for enhanced QCL indication in a multi-RP system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support the enhanced QCL indication in a multi-RP system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for enhanced QCL indication in a multi-RP system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
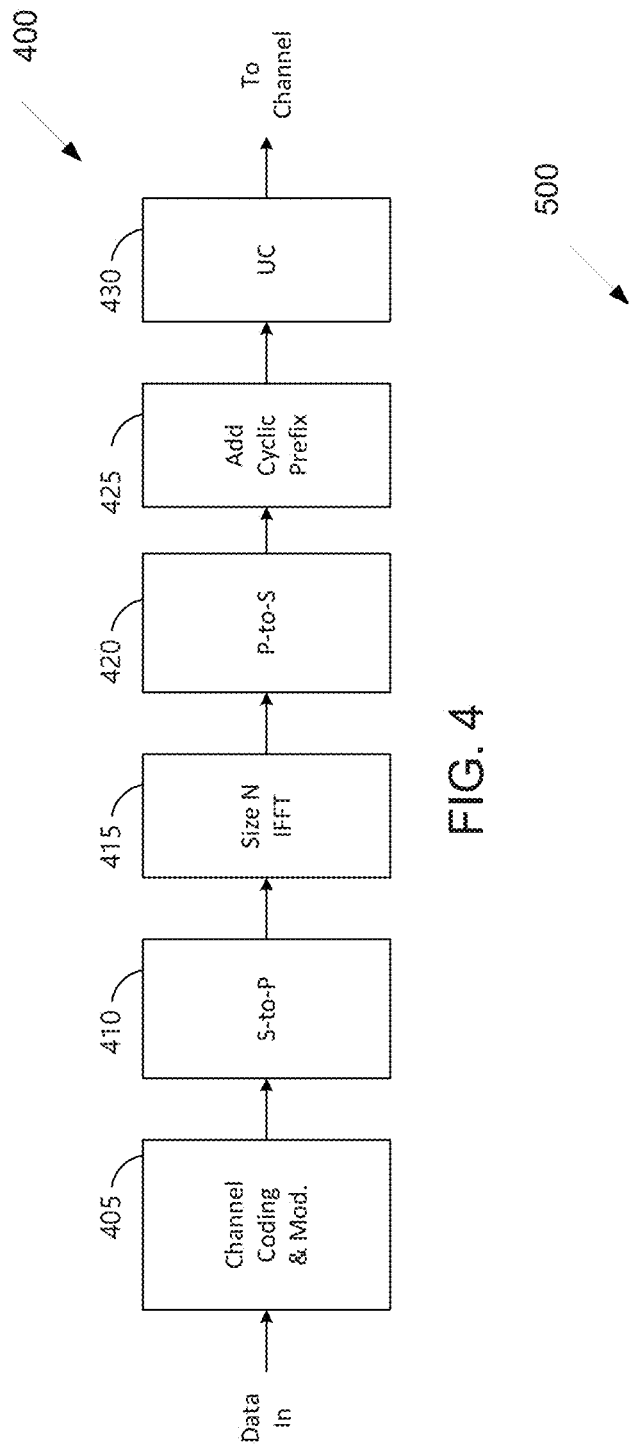
FIGS. 4 and 5 illustrate example wireless transmit and receive paths according to this disclosure.
Figure 5:
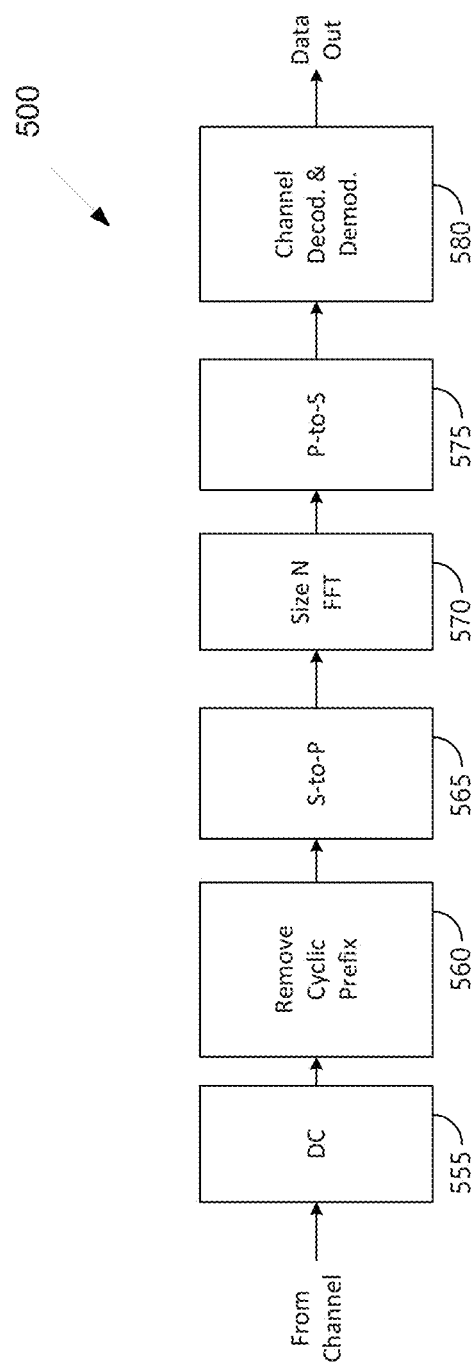

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support sidelink measurements in vehicle-to-everything (V2X) communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In a wireless communications system, a base station or a TRP can use multiple antennas to form one or more beams to communicate with a UE. The use of multiple antennas is based on the use of one or more antenna ports. A first set of antenna ports can be quasi co-located with a second set of antenna ports such that parameters of a transmission (e.g., Doppler shift, Doppler spread, average delay, delay spread, spatial domain parameters, etc.) from the first set of antenna ports can be inferred from parameters of a transmission (e.g., Doppler shift, Doppler spread, average delay, delay spread, spatial domain parameters, etc.) from the second set of antenna ports. The UE can receive from the base station the QCL information between an indicated reference signal (RS) (QCL source RS) and another (target) RS, or between an indicated RS (QCL source RS) and a (target) downlink channel transmission. The indicated RS in the QCL information (QCL source RS) can correspond to a synchronization signal block (SSB) or a channel state information reference signal (CSI-RS), e.g., a tracking reference signal (TRS). In addition, the QCL information also includes one or more QCL types.

In the 3GPP 5G NR, four QCL types are defined: (1) QCL-TypeA: {Doppler shift, Doppler spread, average delay, delay spread}; (2) QCL-TypeB: {Doppler shift, Doppler spread}; (3) QCL-TypeC: {Doppler shift, average delay}; and (4) QCL-TypeD: {Spatial receive parameters}.

Upon receiving the QCL information from the base station/network, the UE can assume that one or more antenna ports for a downlink RS/channel is QCL related (or in short QCL'ed) with the RS indicated in the QCL information following the indicated QCL type. For instance, if a TRS is QCL'ed with a SSB indicated in the QCL information, and the indicated QCL type is QCL-TypeC, the UE can process the TRS with the same Doppler shift and average delay parameters used for receiving the SSB indicated in the QCL. For another example, if a PDSCH DMRS is QCL'ed with a TRS indicated in the QCL information, and the indicated QCL type is QCL-TypeD, the UE can use the same spatial domain receive filter used for receiving the indicated TRS to receive the PDSCH. In various deployment scenarios, by leveraging the previous measurements of the QCL source RS(s), the processing of the current RS(s)/channel(s) can be facilitated.

The UE could be configured by the network one or more transmission configuration indicator (TCI) states, which indicate the QCL information/assumptions for one or more RSs/channels. For instance, for data transmissions on the shared channel (such as the physical downlink shared channel in NR, i.e., PDSCH), a UE can be first higher layer configured by the network (e.g., via high layer RRC signaling) a set/pool of TCI states. The UE could then receive from the network a MAC CE command activating one or more TCI states from the set/pool of RRC configured TCI states. The UE could be indicated by the network via dynamic DCI signaling that one or more of the MAC CE activated TCI states are active for the reception of the PDSCH(s). For example, an N bit field configured in DCI format 1_1 can indicate a MAC CE codepoint index.

In TABLE 1, snippets of higher layer parameters TCI-State (TCI state) and QCL-Info (QCL information) are presented. As can be seen from TABLE 1, in the higher layer parameter TCI-State, a TCI state ID that indicates/identifies a TCI state and one or two QCL-Info fields are included. Note that the second QCL-Info is optional and may not be configured. Furthermore, as shown in TABLE 1, a QCL-Info includes a referenceSignal field along with a qcl-Type field, indicating a QCL source/reference RS and the corresponding QCL type (QCL-TypeA, B, C and/or D), respectively.

TABLE 1

Higher layer parameters TCI-state and QCL-info

```
TCI-State ::= SEQUENCE {
    tci-StateId TCI-StateId,
    qcl-Type1 QCL-Info,
    qcl-Type2 QCL-Info OPTIONAL, -- Need R
    ...
}
QCL-Info ::= SEQUENCE {
    cell ServCellIndex OPTIONAL, -- Need R
    bwp-Id BWP-Id OPTIONAL, -- Cond CSI-RS-Indicated
    referenceSignal CHOICE {
        csi-rs NZP-CSI-RS-ResourceId,
        ssb SSB-Index
    },
    qcl-Type ENUMERATED {typeA, typeB, typeC, typeD},
    ...
}
```

The QCL-Info further comprises of a ServCellIndex used to identify a serving cell such as a primary cell (PCell) or a secondary cell (SCell) in a carrier aggregation (CA) setting. The QCL-Info also includes a bandwidth part (BWP) ID that indicates the BWP for which the QCL source RS applies. Note that both serving cell ID and BWP ID are optional, which may not be configured in QCL-Info under certain settings.

The 3GPP Rel. 15/16 TCI framework, may not be suited well for inter-cell operation wherein different cells/TRPs could broadcast different PCIs and/or one or more cells/TRPs could broadcast different PCIs from that of the serving cell/TRP and/or one or more cells/TRPs are not associated with valid ServCellIndex. In such an inter-cell system, as the QCL source RS indicated in the QCL-Info is only associated with the serving cell (indicated by the ServCellIndex, representing either a PCell or an SCell), the RS(s) such as SSB(s) and/or CSI-RS(s) transmitted from other non-serving (or neighboring) cells/TRPs broadcasting/associated with different PCIs from that of the serving cell cannot be used/configured as the QCL source/reference RS(s).

Figure 6:
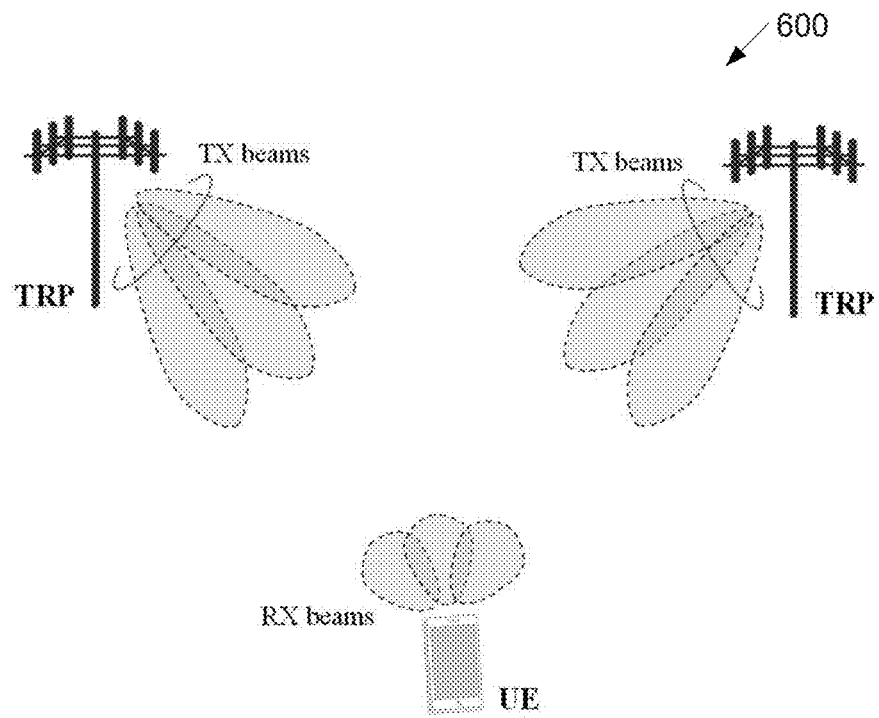
FIG. 6 illustrates an example multi-TRP operation according to embodiments of the present disclosure.

FIG. 6 illustrates an example multi-TRP operation 600 according to embodiments of the present disclosure. An embodiment of the multi-TRP operation 600 shown in FIG. 6 is for illustration only.

In FIG. 6, an example of multi-TRP operation is illustrated assuming that a UE is communicating with two TRPs through one or more TX-RX beam pairs, or communication links.

In this disclosure, a TRP can represent a collection of measurement antenna ports, measurement RS resources and/or control resource sets (CORESETs). For example, a TRP could be associated with one or more of: (1) a plurality of CSI-RS resources; (2) a plurality of CRIs (CSI-RS resource indices/indicators); (3) a measurement RS resource set, for example, a CSI-RS resource set along with an indicator; (4) a plurality of CORESETs associated with a CORESETPoolIndex; or (5) a plurality of CORESETs associated with a TRP-specific index/indicator/identity.

In a multi-TRP system, different TRPs could be placed at different physical locations and connected through ideal/non-ideal backhauls. Each TRP can include at least one antenna panel comprising of multiple antenna elements. The multiple communication links established between the TRPs and the UE can increase the system throughput and/or improve the system diversity gain. To improve the system throughput, multiple data streams can be transmitted through multiple communication links between the TRPs and the UE such that the total number of layers scheduled for the UE can be increased in contrast to single-TRP operation. To improve the system reliability, the same data can be repeatedly transmitted to the UE across different coordinating TRPs.

As aforementioned above, in the 3GPP Rel.15/16 TCI framework, only the RS(s) transmitted from the serving cell/TRP (e.g., configured with a valid ServCellIndex in the QCL-Info) can be QCL'ed. The RS(s) transmitted from a non-serving (or neighboring) cell or a non-serving (or neighboring) cell TRP cannot be configured as the QCL source RS(s) because the non-serving (or neighboring) cell(s) or the non-serving (or neighboring) cell TRP(s) could broadcast different PCI(s) from that of the serving cell and/or may not be associated with valid ServCellIndex. One solution could be to enforce all downlink RSs/channels transmitted from all cells/TRPs only QCL'ed with the RSs transmitted from the serving cell or the serving cell TRP. This solution, however, may not work because the downlink channels between different TRPs could be very different (different TRPs could be typically geographically non-co-located and loosely time and frequency synchronized). Hence, enforcing the UE to process the RS/channel from one TRP using the same parameters such as spatial domain receive filter, Doppler shift and etc. used for processing the QCL source RS indicated in the QCL-Info from a different TRP could result in significant performance degradation.

Figure 7:
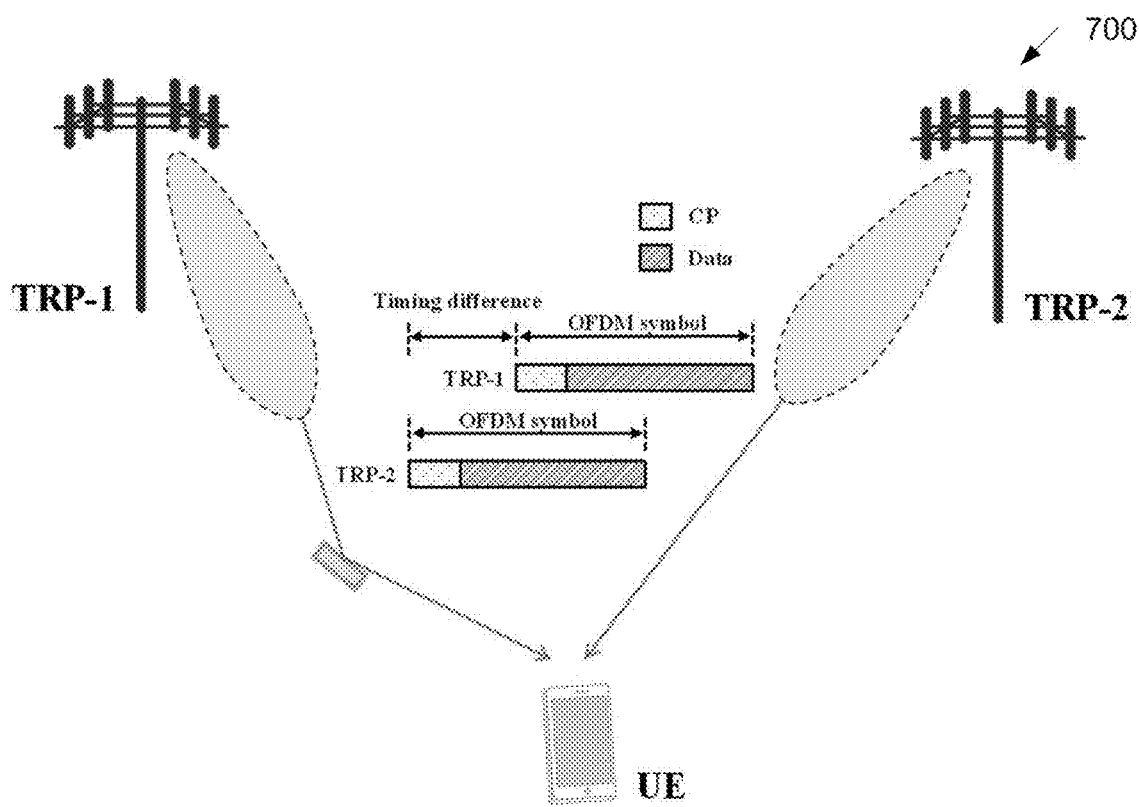
FIG. 7 illustrates an example loosely time synchronized multi-TRP system according to embodiments of the present disclosure.

FIG. 7 illustrates an example loosely time synchronized multi-TRP system 700 according to embodiments of the present disclosure. An embodiment of the loosely time synchronized multi-TRP system 700 shown in FIG. 7 is for illustration only.

It is evident from FIG. 7 that the time difference between receiving the downlink transmissions from the two coordinating TRPs, i.e., TRP-1 and TRP-2, could be large, e.g., much larger than the cyclic prefix (CP) length, especially at FR2 with very short symbol duration and sharp beams. In this case, if the UE is indicated by the network to use the RS(s) transmitted from TRP-1 as the QCL-TypeC source RS(s) to process the RS(s)/channel(s) transmitted from TRP-2, e.g., using a common FFT window derived from TRP-1 to process the RS(s)/channel(s) transmitted from TRP-2, significant inter-symbol interference could be resulted.

Figure 8:
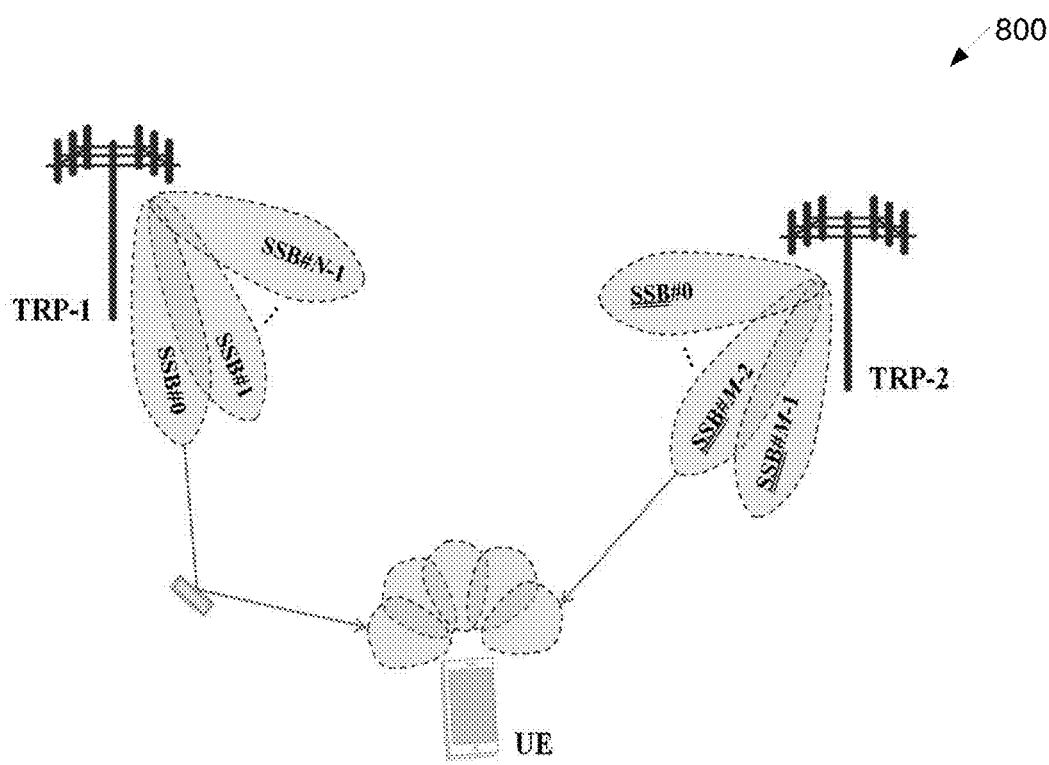
FIG. 8 illustrates an example spatial QCL source RS configuration in a multi-TRP system according to embodiments of the present disclosure.

FIG. 8 illustrates an example spatial QCL source RS configuration in a multi-TRP system 800 according to embodiments of the present disclosure. An embodiment of the spatial QCL source RS configuration in a multi-TRP system 800 shown in FIG. 8 is for illustration only.

In FIG. 8, an example of spatial QCL source RS configuration in a multi-TRP system is depicted. As illustrated in this example, SSBs or SSB beams {SSB #0, SSB #1, . . . , SSB #N−1} are transmitted from TRP-1, and SSBs or SSB beams {SSB #0, SSB #1, . . . , SSB #M−1} are transmitted from TRP-2. If, e.g., SSB #M−2 from TRP-2 is configured as the spatial QCL source RS for the downlink transmissions from TRP-2, the UE can apply the same spatial domain receive filter used for receiving SSB #M−2 to receive the downlink transmissions from TRP-2. If, however, TRP-2 is not associated with a valid serving cell ID and/or it broadcasts a different PCI from that of the serving cell/TRP (TRP-1 in this example), the SSBs {SSB #0, SSB #1, . . . , SSB #M−1} cannot be configured as QCL source RSs under the 3GPP Rel. 15/16 TCI framework. Instead, the UE could follow the QCL assumption of the RS transmitted from TRP-1, e.g., SSB #0 from TRP-1 (assuming that TRP-1 is associated with the serving cell), to receive the downlink transmissions from TRP-2. In this case, significant performance loss could be resulted because TRP-1 and TRP-2 are not geographically co-located.

This disclosure considers various design aspects and enhancements for TCI state/beam indication, beam measurement and reporting, and uplink RS/channel configurations in an inter-cell system wherein different cells/TRPs could broadcast different PCIs and/or one or more cells/TRPs could broadcast different PCIs from that of the serving cell/TRP. The associated indication/configuration methods are also specified. Throughout the present disclosure, a non-serving cell/TRP is equivalent to a neighboring cell/TRP in an inter-cell system, and they are used interchangeably. A non-serving cell/TRP or a neighboring cell/TRP is associated with a PCI different from that of the serving cell (i.e., the serving cell PCI).

In one embodiment, a configuration/indication of QCL rule(s)/relationship(s) for inter-cell operation is provided.

A UE could be indicated by the network one or more QCL relationship rules for the inter-cell operation; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. An indicated QCL relationship rule could be for a given QCL type and could include at least one of the following: (1) a first set of SSBs from the serving cell TRP that can be configured as the QCL source RSs for the downlink RS(s)/channel(s) transmitted from one or more non-serving (or neighboring) cells/TRPs in the inter-cell system, (2) a second set of SSBs from the serving cell TRP that cannot be configured as the QCL source RSs for the downlink RS(s)/channel(s) transmitted from one or more non-serving (or neighboring) cells/TRPs in the inter-cell system, (3) a third set of SSBs from one or more non-serving (or neighboring) cells/TRPs in the inter-cell system that are semi-QCL'ed with the first set of SSBs from the serving cell TRP, (4) a fourth set of SSBs from one or more non-serving (or neighboring) cells/TRPs in the inter-cell system that can be configured as the QCL source RSs for the downlink RS(s)/channel(s) transmitted from one or more non-serving (or neighboring) cells/TRPs in the inter-cell system, and (5) a fifth set of SSBs from one or more non-serving (or neighboring) cells/TRPs in the inter-cell system that can be configured as the QCL source RSs for one or more downlink RSs/channels transmitted from the serving cell/TRP in the inter-cell system.

The first set of SSBs or the second set of SSBs could include all SSBs transmitted from/associated with/configured for the serving cell or the serving cell TRP. The third set of SSBs or the fourth set of SSBs or the fifth set of SSBs could include all SSBs transmitted from/associated with/configured for the non-serving (or neighboring) cell(s)/TRP(s) in the inter-cell system broadcasting different PCI(s) from that of the serving cell. Furthermore, different QCL relationship rules could correspond to different QCL types. For instance, the UE could be higher layer configured by the network two QCL relationship rules, denoted by a first QCL relationship rule and a second QCL relationship rule; the first QCL relationship rule could correspond to QCL-TypeC while the second QCL relationship rule could correspond to QCL-TypeD.

Examples of the QCL relationship rule(s) are presented as follows.

In one example, the SSBs transmitted from/associated with/configured for the serving cell or the serving cell TRP (e.g., the first set of SSBs) could be configured as QCL-TypeA or/and QCL-TypeB or/and QCL-TypeC or/and QCL-TypeD source RSs for the CSI-RSs such as TRSs transmitted from/associated with/configured for a non-serving (or neighboring) cell or a non-serving (or neighboring) cell TRP broadcasting a different PCI from that of the serving cell/TRP.

In another example, the SSBs transmitted from/associated with/configured for the serving cell or the serving cell TRP (e.g., the first set of SSBs) could be configured as QCL-TypeA or/and QCL-TypeB or/and QCL-TypeC or/and QCL-TypeD source RSs for the PDCCH(s)/PDSCH(s) DMRS(s) transmitted from/associated with/configured for a non-serving (or neighboring) cell or a non-serving (or neighboring) cell TRP broadcasting a different PCI from that of the serving cell/TRP.

In yet another example, the CSI-RSs such as TRSs transmitted from/associated with/configured for the serving cell or the serving cell TRP could be configured as QCL-TypeA or/and QCL-TypeB or/and QCL-TypeC or/and QCL-TypeD source RSs for the PDCCH(s)/PDSCH(s) DMRS(s) transmitted from/associated with/configured for a non-serving (or neighboring) cell or a non-serving (or neighboring) cell TRP broadcasting a different PCI from that of the serving cell/TRP.

In yet another example, the SSBs transmitted from/associated with/configured for a non-serving (or neighboring) cell or a non-serving (or neighboring) cell TRP (e.g., the fourth set of SSBs) broadcasting a different PCI from that of the serving cell/TRP could be configured as QCL-TypeA or/and QCL-TypeB or/and QCL-TypeC or/and QCL-TypeD source RSs for the CSI-RSs such as TRSs transmitted from/associated with/configured for a non-serving (or neighboring) cell or a non-serving (or neighboring) cell TRP broadcasting a different PCI from that of the serving cell/TRP.

In yet another example, the SSBs transmitted from/associated with/configured for a non-serving (or neighboring) cell or a non-serving (or neighboring) cell TRP (e.g., the fourth set of SSBs) broadcasting a different PCI from that of the serving cell/TRP could be configured as QCL-TypeA or/and QCL-TypeB or/and QCL-TypeC or/and QCL-TypeD source RSs for the PDCCH(s)/PDSCH(s) DMRS(s) transmitted from/associated with/configured for a non-serving (or neighboring) cell or a non-serving (or neighboring) cell TRP broadcasting a different PCI from that of the serving cell/TRP.

In yet another example, the SSBs transmitted from/associated with/configured for a non-serving (or neighboring) cell or a non-serving (or neighboring) cell TRP (e.g., the fifth set of SSBs) broadcasting a different PCI from that of the serving cell/TRP could be configured as QCL-TypeA or/and QCL-TypeB or/and QCL-TypeC or/and QCL-TypeD source RSs for the CSI-RSs such as TRSs transmitted from/associated with/configured for the serving cell or the serving cell TRP.

In yet another example, the SSBs transmitted from/associated with/configured for a non-serving (or neighboring) cell or a non-serving (or neighboring) cell TRP (e.g., the fifth set of SSBs) broadcasting a different PCI from that of the serving cell/TRP could be configured as QCL-TypeA or/and QCL-TypeB or/and QCL-TypeC or/and QCL-TypeD source RSs for the PDCCH(s)/PDSCH(s) DMRS(s) transmitted from/associated with/configured for the serving cell or the serving cell TRP.

Figure 9:
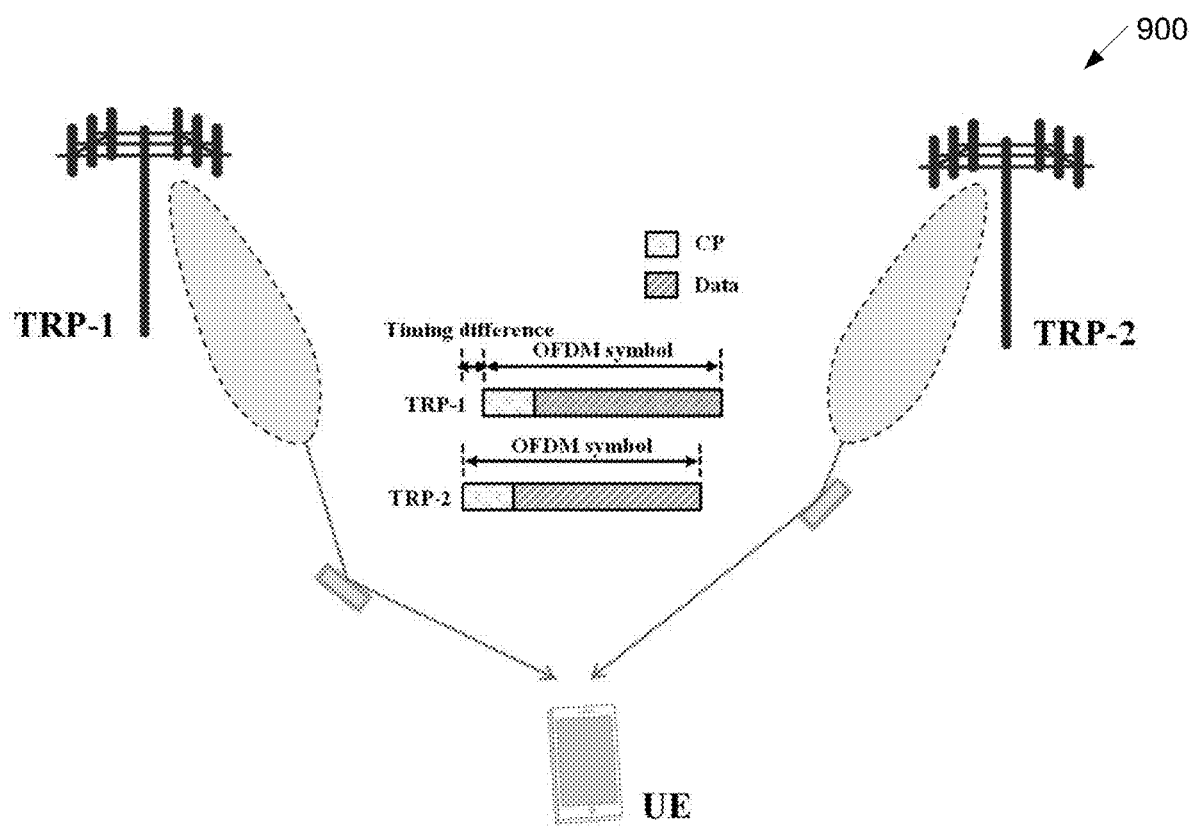
FIG. 9 illustrates an example QCL relationship rule configuration in a well time synchronized multi-TRP system according to embodiments of the present disclosure.

FIG. 9 illustrates an example QCL relationship rule configuration in a well time synchronized multi-TRP system 900 according to embodiments of the present disclosure. An embodiment of the QCL relationship rule configuration in a well time synchronized multi-TRP system 900 shown in FIG. 9 is for illustration only.

In FIG. 9, an example of QCL relationship rule configuration in a well time synchronized multi-TRP system is provided. As illustrated in FIG. 9, the timing difference between receiving the downlink transmissions from the two TRPs (TRP-1 and TRP-2) could be smaller than the CP length. In this case, certain RX parameters used by the UE to receive one or more downlink RSs transmitted from TRP-1 can be used for receiving one or more downlink RSs/channels transmitted from TRP-2. For instance, assume that one or more SSBs from the serving cell TRP-1 are configured as the QCL-TypeC source RSs for one or more downlink RSs/channels transmitted from the non-serving (or neighboring) cell TRP-2 (broadcasting a different PCI from that of TRP-1). The UE can then apply a common FFT window used for receiving the RS(s) indicated in the corresponding QCL-Info/TCI-State (transmitted from/associated with the serving cell TRP-1) to receive the downlink RS(s)/channel(s) transmitted from the non-serving (or neighboring) cell TRP-2.

Figure 10:
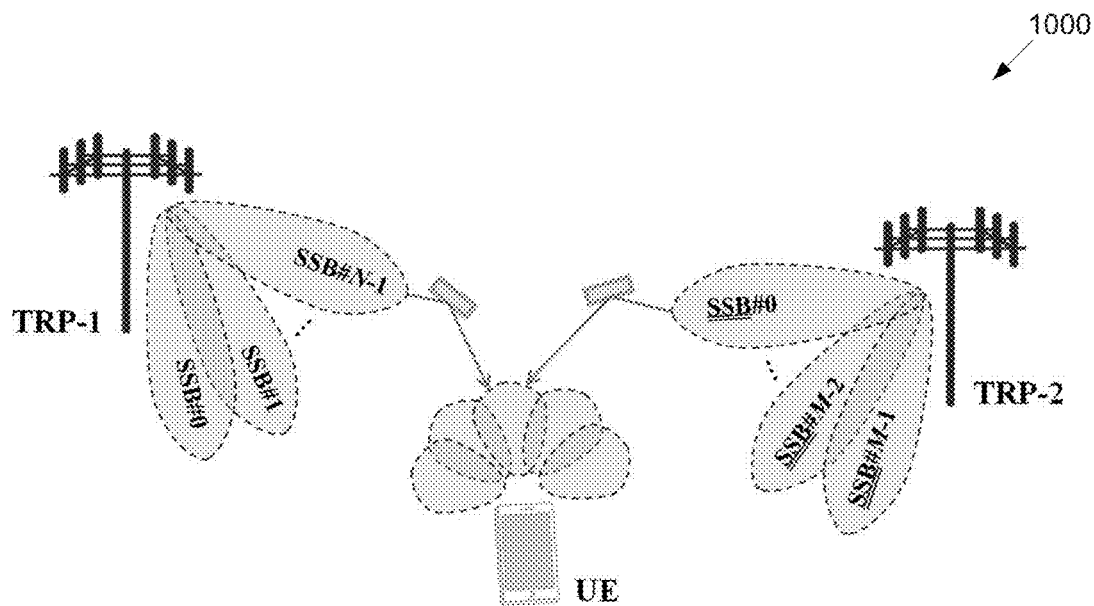
FIG. 10 illustrates an example spatial QCL relationship rule configuration in a multi-TRP system according to embodiments of the present disclosure.

FIG. 10 illustrates an example spatial QCL relationship rule configuration in a multi-TRP system 1000 according to embodiments of the present disclosure. An embodiment of the spatial QCL relationship rule configuration in a multi-TRP system 1000 shown in FIG. 10 is for illustration only.

In FIG. 10, an example of spatial QCL relationship rule configuration in a multi-TRP system comprising of TRP-1 and TRP-2 is depicted. It is shown in FIG. 10 that under certain settings, the UE can use the same spatial domain receive filter to receive two different SSB beams transmitted from the two coordinating TRPs (SSB #N−1 from TRP-1 and SSB #0 from TRP-2 in this example).

If TRP-1 broadcasts the serving cell PCI while TRP-2 broadcasts a non-serving (or neighboring) cell PCI different from the serving cell PCI: (1) SSB #N−1 from the serving cell TRP-1 can be configured as a spatial QCL (QCL-TypeD) source RS for one or more downlink RSs/channels transmitted from the non-serving (or neighboring) cell TRP-2; and/or SSB #0 from the non-serving (or neighboring) cell TRP-2 is semi-QCL'ed with SSB #N−1 from the serving cell TRP-1. That is, SSB #0 from the non-serving (or neighboring) cell TRP-2 belongs to the third set of SSBs, which may not be indicated as a QCL source RS for any downlink RS(s)/channel(s) transmitted from either the serving cell TRP-1 or the non-serving (or neighboring) cell TRP-2.

As discussed above, a QCL relationship rule for the inter-cell operation could include the first set of SSBs from the serving cell/TRP or/and the second set of SSBs from the serving cell/TRP or/and the third set of SSBs from the non-serving (or neighboring) cell(s)/TRP(s) or/and the fourth set of SSBs from the non-serving (or neighboring) cell(s)/TRP(s) or/and the fifth set of SSBs from the non-serving (or neighboring) cell(s)/TRP(s).

For the indication of the first (second) set of SSBs from the serving cell/TRP: (1) in one example, the UE could be indicated by the network, e.g., via higher layer RRC signaling and/or dynamic DCI signaling, the SSB resource indices for the SSBs in the first (second) set of SSBs from the serving cell/TRP; (2) in another example, the UE could be first higher layer configured by the network (e.g., via higher layer RRC signaling) a list/pool of SSBs/SSB resource indices from the serving cell/TRP. The UE could then receive from the network a MAC CE command activating one or more SSBs/SSB resource indices from the RRC configured list/pool of SSBs/SSB resource indices for the first (second) set of SSBs from the serving cell/TRP; and/or (3) in yet another example, the UE could receive from the network a bitmap with each entry/bit in the bitmap corresponding to an SSB/SSB resource index from the serving cell/TRP. If an entry/bit in the bitmap is set to "1," the corresponding/associated SSB/SSB resource index from the serving cell/TRP belongs to the first (second) set of SSBs from the serving cell/TRP.

For the indication of the third (fourth/fifth) set of SSBs from the non-serving (or neighboring) cell(s)/TRP(s): (1) in one example, the UE could be indicated by the network, e.g., via higher layer RRC signaling and/or dynamic DCI signaling, the SSB resource indices for the SSBs in the third (fourth/fifth) set of SSBs from the non-serving (or neighboring) cell(s)/TRP(s); (2) in another example, the UE could be first higher layer configured by the network (e.g., via higher layer RRC signaling) a list/pool of SSBs/SSB resource indices from the non-serving (or neighboring) cell(s)/TRP(s). The UE could then receive from the network a MAC CE command activating one or more SSBs/SSB resource indices from the RRC configured list/pool of SSBs/SSB resource indices for the third (fourth/fifth) set of SSBs from the non-serving (or neighboring) cell(s)/TRP(s); and/or (3) in yet another example, the UE could receive from the network a bitmap with each entry/bit in the bitmap corresponding to an SSB/SSB resource index from the non-serving (or neighboring) cell(s)/TRP(s). If an entry/bit in the bitmap is set to "1," the corresponding/associated SSB/SSB resource index from the non-serving (or neighboring) cell(s)/TRP(s) belongs to the third (fourth/fifth) set of SSBs from the non-serving (or neighboring) cell(s)/TRP(s).

Figure 11:
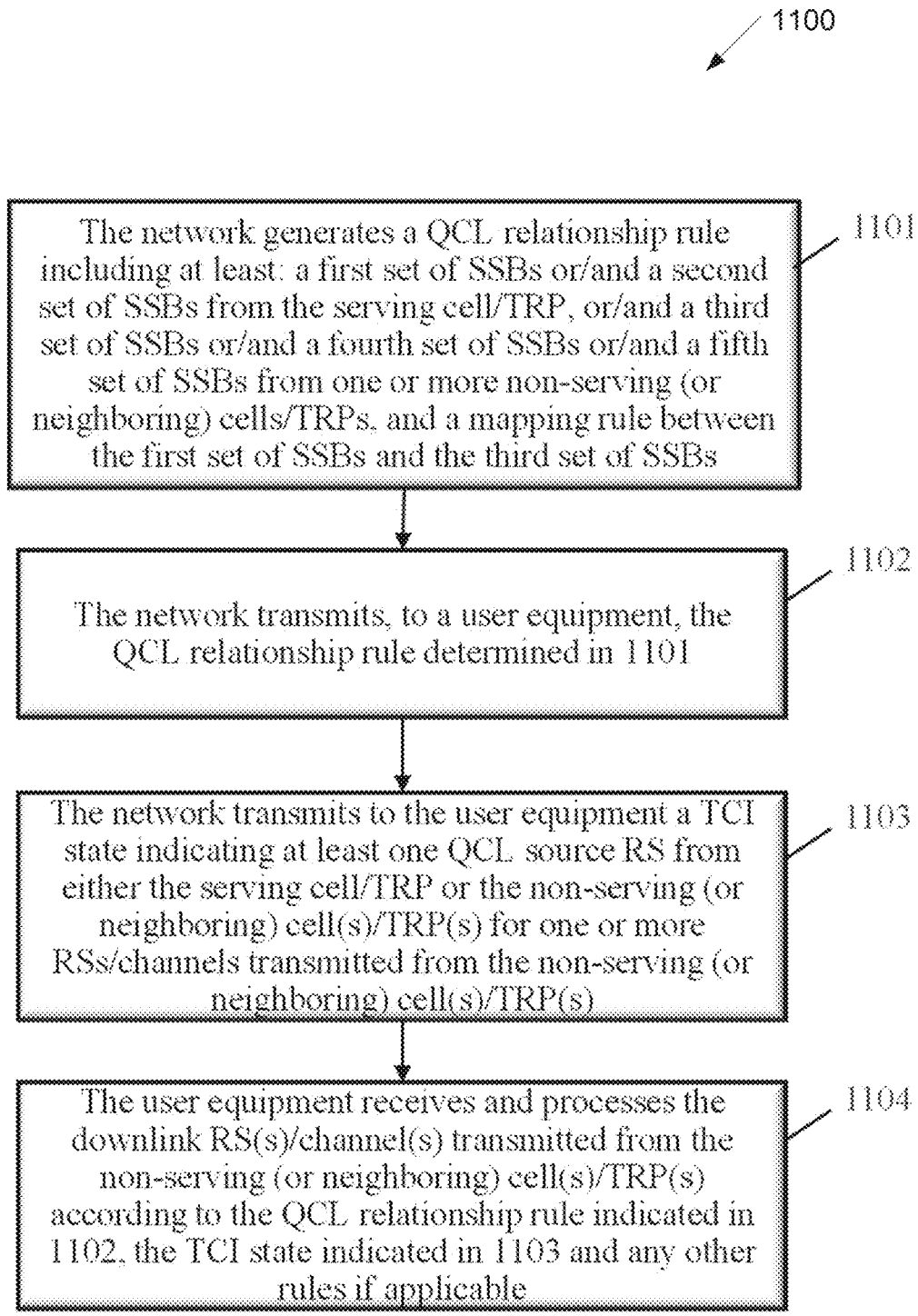
FIG. 11 illustrates a flowchart of a method for configuration and indication of a QCL relationship rule for the inter-cell operation according to embodiments of the present disclosure.

FIG. 11 illustrates a flowchart of a method 1100 for configuration and indication of a QCL relationship rule for the inter-cell operation according to embodiments of the present disclosure. The method 1100 as may be performed by a UE (e.g., 111-116 as illustrated in FIG. 1) and a network entity including a base station (e.g., 101-103 as illustrated in FIG. 1). An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

In FIG. 11, an algorithm flowchart depicting the configuration and indication of a QCL relationship rule for the inter-cell operation is presented.

As illustrated in FIG. 11, in step 1101, the network generates a QCL relationship rule for the inter-cell operation, which includes at least: the first set of SSBs or/and the second set of SSBs from the serving cell/TRP, or/and the third set of SSBs or/and the fourth set of SSBs or/and the fifth set of SSBs from one or more non-serving (or neighboring) cells/TRPs in the inter-cell system. The network could also generate a mapping rule between the first set of SSBs and the third set of SSBs. The first set of SSBs could contain one or more SSBs from the serving cell/TRP, and the first set of SSBs can be configured as the QCL source RSs for one or more RSs/channels transmitted from the non-serving (or neighboring) cell(s)/TRP(s).

The second set of SSBs could contain one or more SSBs from the serving cell/TRP excluding those in the first set of SSBs. The fourth set of SSBs could contain one or more SSBs from the non-serving (or neighboring) cell(s)/TRP(s), which may be configured as the QCL source RSs for one or more RSs/channels transmitted from the non-serving (or neighboring) cell(s)/TRP(s). The third set of SSBs could contain one or more SSBs from the non-serving (or neighboring) cell(s)/TRP(s) excluding those in the fourth set of SSBs. The SSBs in the third set of SSBs could be semi-QCL'ed with those in the first set of SSBs, and the corresponding mapping rule between the third set of SSBs and the first set of SSBs may need to be indicated to the UE. The fifth set of SSBs could contain one or more SSBs from the non-serving (or neighboring) cell(s)/TRP(s), which could be configured as the QCL source RSs for one or more RSs/channels transmitted from the serving cell/TRP.

Figure 12:
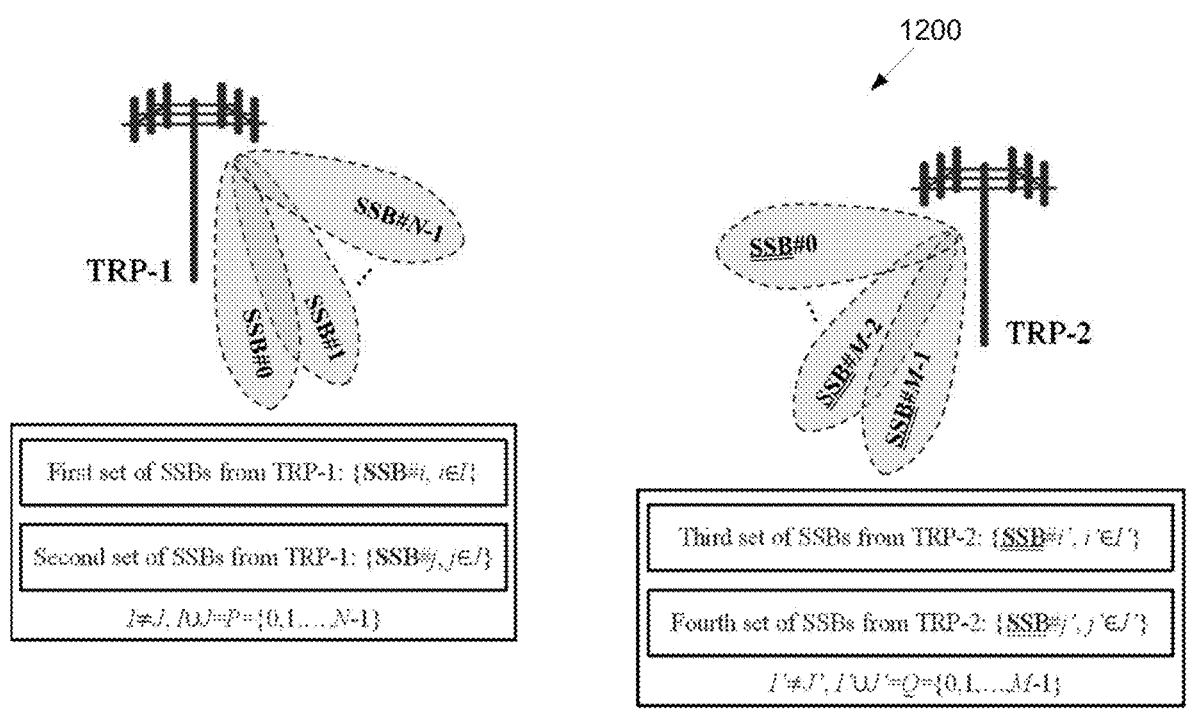
FIG. 12 illustrates an example first/second set of SSBs from the serving cell TRP-1 and the third/fourth set of SSBs from the non-serving (or neighboring) cell TRP-2 according to embodiments of the present disclosure.

FIG. 12 illustrates an example first/second set of SSBs 1200 from the serving cell TRP-1 and the third/fourth set of SSBs from the non-serving (or neighboring) cell TRP-2 according to embodiments of the present disclosure. An embodiment of the first/second set of SSBs 1200 shown in FIG. 12 is for illustration only.

In FIG. 12, examples of the first/second set of SSBs from the serving cell TRP-1 and the third/fourth set of SSBs from the non-serving (or neighboring) cell TRP-2 are presented. In this example, the SSBs {SSB #i, i∈I} from TRP-1 are selected as the first set of SSBs, and I denotes the set of the corresponding SSB resource indices; the SSBs {SSB #j, j∈J} from TRP-2 are determined as the second set of SSBs, and J denotes the set of the corresponding SSB resource indices; further, I≠J and I∪J=P, where P={0, 1, . . . , N−1}. If no SSBs from the serving cell TRP-1 are configured as the QCL source RSs for the DL RS(s)/channel(s) transmitted from the non-serving (or neighboring) cell TRP-2, I would become an empty set, and J=P. That is, the second set of SSBs would correspond to all (active) SSBs from the serving cell TRP-1.

For the example shown in FIG. 10, SSB #N−1 from TRP-1 could be configured as a QCL-TypeD source RS for one or more RSs/channels transmitted from TRP-2. Hence, the indices set I may include #N−1. Similarly, for TRP-2, the SSBs {SSB #i', i'∈I'} are determined as the third set of SSBs, and I' denotes the set of the corresponding SSB resource indices; {SSB #j', j'∈I'} are determined as the fourth set of SSBs, and J' denotes the set of the corresponding SSB resource indices; further, I'≠J' and I'∪J'=Q, where Q={0, 1, . . . , M−1}. If J'=Q, the fourth set of SSBs correspond to all (active) SSBs from TRP-2, and the fourth set of SSBs may be configured as the QCL source RSs for one or more RSs/channels transmitted from TRP-2.

TABLE 2

An example of mapping relationship between the first set of SSBs from TRP-1 and the third set of SSBs from TRP-2

| First set of SSBs from TRP-1 | SSB#0 | SSB#12 | SSB#16 | SSR#20 | SSB#32 |
|---|---|---|---|---|---|
| Third set of SSBs from TRP-2 | SSB#2 | SSB#40 | SSB#30 | SSB#26 | SSB#11 |
| QCL type | | | QCL-TypeD | | |

The QCL relationship rule can also include a table characterizing a mapping relationship between the first set of SSBs from the serving cell TRP-1 and the third set of SSBs from the non-serving (or neighboring) cell TRP-2. In TABLE 2, an example of the mapping table is given. As shown in TABLE 2, the first set of SSBs {SSB #0, SSB #12, SSB #16, SSB #20, SSB #32} from TRP-1 have one-to-one correspondence to the third set of SSBs {SSB #2, SSB #40, SSB #30, SSB #26, SSB #11} from TRP-2. For instance, SSB #0 from TRP-1 and SSB #2 from TRP-2 are paired, and the SSB #0 from TRP-1 and the SSB #2 from TRP-2 are semi-QCL'ed with Type-D. That is, the UE can apply similar or even the same spatial domain receive filter to receive SSB #0 and SSB #2, though the SSB #0 and the SSB #2 are transmitted from two geographically non-co-located TRPs.

For instance, if TRP-2 transmits certain downlink RS(s)/channel(s) to the UE using the SSB #2 beam, the network can indicate SSB #0 as the QCL source RS in the corresponding TCI-State/QCL-Info, and the UE can apply the spatial domain receive filter used for receiving SSB #0 beam to receive the downlink RS(s)/channel(s) transmitted from TRP-2. Other mapping relationships between the first set of SSBs and the third set of SSBs are also possible. Under certain settings, the first set of SSBs and the third set of SSBs may not exhibit any correspondence.

The first set of SSBs could include at least a first subset of SSBs or/and a second subset of SSBs. The first subset of SSBs or the second subset of SSBs could include all SSBs in the first set of SSBs. The SSBs in the first subset could be configured as the QCL source RSs for one or more CSI-RSs such as TRSs transmitted from/associated with/configured for one or more non-serving (or neighboring) cell(s)/TRP(s). The SSBs in the second subset could be configured as the QCL source RSs for one or more PDCCH(s)/PDSCH(s) DMRS(s) transmitted from/associated with/configured for one or more non-serving (or neighboring) cell(s)/TRP(s). The UE could be indicated by the network the first/second subset of SSBs; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, the UE could be indicated by the network, e.g., via higher layer RRC signaling and/or dynamic DCI signaling, the SSB resource indices for the SSBs in the first (second) subset of SSBs.

In another example, the UE could receive from the network a MAC CE command activating one or more SSBs/SSB resource indices from the first set of SSBs as the first (second) subset of SSBs; the remaining SSBs/SSB resource indices in the first set of SSBs not activated by the MAC CE command are configured as the second (first) subset of SSBs.

In yet another example, the UE could receive from the network a bitmap with each entry/bit in the bitmap corresponding to an SSB/SSB resource index in the first set of SSBs. If an entry/bit in the bitmap is set to "1," the corresponding/associated SSB/SSB resource index in the first set of SSBs belongs to the first (second) subset of SSBs; the remaining SSBs/SSB resource indices in the first set of SSBs with their corresponding/associated entries/bits in the bitmap set to "0s" belong to the second (first) subset of SSBs.

In yet another example, the UE could receive from the network two bitmaps, denoted by the first bitmap and the second bitmap. Each entry/bit in the first/second bitmap corresponds to an SSB/SSB resource index in the first set of SSBs. If an entry/bit in the first bitmap is set to "1," the corresponding/associated SSB/SSB resource index in the first set of SSBs belongs to the first subset of SSBs. If an entry/bit in the second bitmap is set to "1," the corresponding/associated SSB/SSB resource index in the first set of SSBs belongs to the second subset of SSBs.

The fourth set of SSBs could include at least a third subset of SSBs or/and a fourth subset of SSBs. The third subset of SSBs or the fourth subset of SSBs could include all SSBs in the fourth set of SSBs. The SSBs in the third subset could be configured as the QCL source RSs for one or more CSI-RSs such as TRSs transmitted from/associated with one or more non-serving (or neighboring) cell(s)/TRP(s). The SSBs in the fourth subset could be configured as the QCL source RSs for one or more PDCCH(s)/PDSCH(s) DMRS(s) transmitted from/associated with one or more non-serving (or neighboring) cell(s)/TRP(s). The UE could be indicated by the network the third/fourth subset of SSBs; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, the UE could be indicated by the network, e.g., via higher layer RRC signaling and/or dynamic DCI signaling, the SSB resource indices for the SSBs in the third (fourth) subset of SSBs.

In another example, the UE could receive from the network a MAC CE command activating one or more SSBs/SSB resource indices from the fourth set of SSBs as the third (fourth) subset of SSBs; the remaining SSBs/SSB resource indices in the fourth set of SSBs not activated by the MAC CE command are configured as the fourth (third) subset of SSBs.

In yet another example, the UE could receive from the network a bitmap with each entry/bit in the bitmap corresponding to an SSB/SSB resource index in the fourth set of SSBs. If an entry/bit in the bitmap is set to "1," the corresponding/associated SSB/SSB resource index in the fourth set of SSBs belongs to the third (fourth) subset of SSBs; the remaining SSBs/SSB resource indices in the fourth set of SSBs with their corresponding/associated entries/bits in the bitmap set to "0s" belong to the fourth (third) subset of SSBs.

In yet another example, the UE could receive from the network two bitmaps, denoted by the third bitmap and the fourth bitmap. Each entry/bit in the third/fourth bitmap corresponds to an SSB/SSB resource index in the fourth set of SSBs. If an entry/bit in the third bitmap is set to "1," the corresponding/associated SSB/SSB resource index in the fourth set of SSBs belongs to the third subset of SSBs. If an entry/bit in the fourth bitmap is set to "1," the corresponding/associated SSB/SSB resource index in the fourth set of SSBs belongs to the fourth subset of SSBs.

As illustrated in FIG. 11, in step 1102, the UE receives, from the network, the QCL relationship rule via higher layer signaling such as RRC signaling. If the QCL relationship rule is not configured via the higher layer signaling, the UE is expected to follow the QCL rule defined under the 3GPP Rel. 15/16 TCI framework. The configuration/indication of the QCL relationship rule specified in this disclosure could also indicate to the UE that the inter-cell operation such as the inter-cell multi-TRP operation is enabled for the UE.

As illustrated in FIG. 11, in step 1103, the network transmits to the UE a TCI state indicating one or more QCL source RSs. The QCL source RS could be transmitted from/associated with/configured for the serving cell/TRP, e.g., the first set of SSBs, or transmitted from/associated with/configured for one or more non-serving (or neighboring) cell(s)/TRP(s), e.g., the fourth set of SSBs. The target RS of the indicated QCL source RS could be a CSI-RS such as a TRS transmitted from/associated with/configured for a non-serving (or neighboring) cell/TRP. The target channel of the indicated QCL source RS could be a PDCCH/PDSCH transmitted from/associated with/configured for a non-serving (or neighboring) cell/TRP.

As illustrated in FIG. 11, in step 1104, the UE could apply the receive parameter(s) determined according to the QCL information/assumptions indicated in 1103 and/or the QCL relationship rule (if indicated/configured in 1102).

For the example shown in FIG. 12, assume that SSB #0 from the serving cell TRP-1 is configured as a QCL-TypeD source RS in the TCI-State/QCL-Info indicated to the UE, and it belongs to the first set of SSBs as indicated in the QCL relationship rule. The UE can then apply the same spatial domain receive filter used for receiving SSB #0 from the serving cell TRP-1 to receive the downlink RS(s)/channel(s) transmitted from the non-serving (or neighboring) cell TRP-2. For another example, assume that SSB #1 from the non-serving (or neighboring) cell TRP-2 (shown in FIG. 12) is configured as a QCL-TypeD source RS in the TCI-State/QCL-Info indicated to the UE, and it belongs to the fourth set of SSBs as indicated in the QCL relationship rule. The UE can then apply the same spatial domain receive filter used for receiving SSB #1 from the non-serving (or neighboring) cell TRP-1 to receive the downlink RS(s)/channel(s) transmitted from the non-serving (or neighboring) cell TRP-2.

Figure 13:
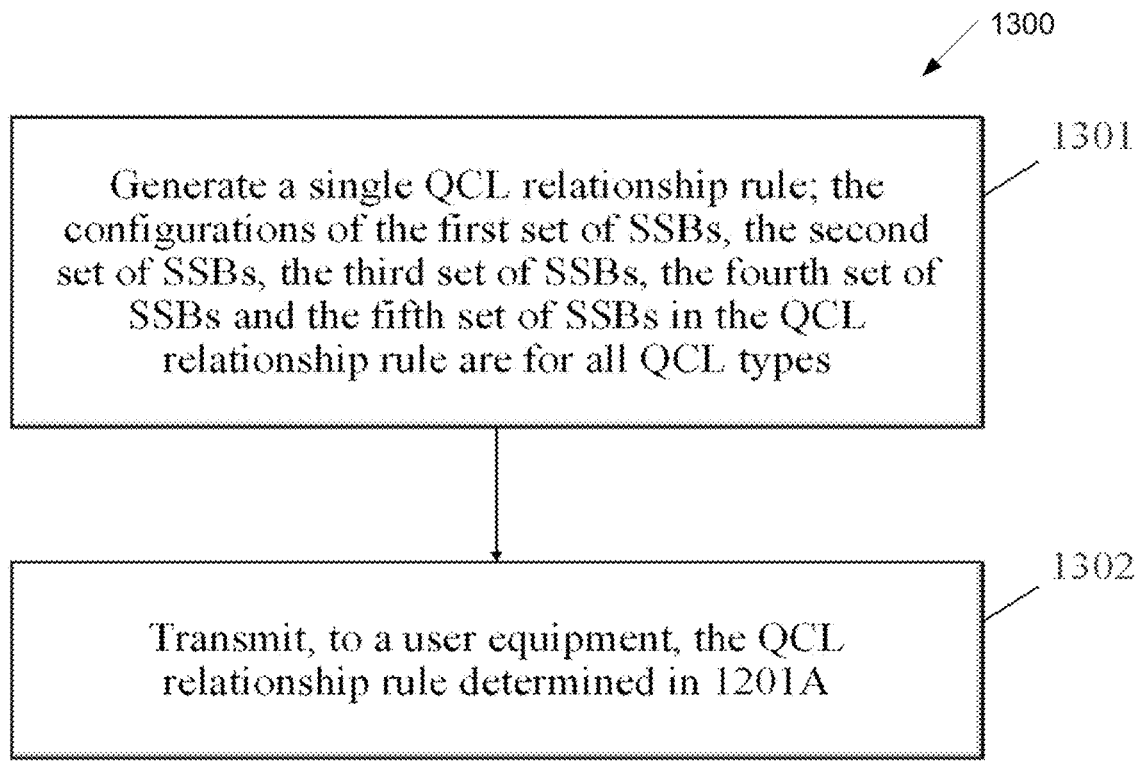
FIG. 13 illustrates a flowchart of a method for QCL relationship rule determination according to embodiments of the present disclosure.

FIG. 13 illustrates a flowchart of a method 1300 for QCL relationship rule determination according to embodiments of the present disclosure. The method 1300 as may be performed by a network entity including a base station (e.g., 101-103 as illustrated in FIG. 1). An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

The network could generate more than one QCL relationship rules. Each QCL relationship rule could correspond to a different QCL type. To reduce the signaling overhead, the network could only generate a single QCL relationship rule characterizing all possible QCL types. For example, only the SSBs from the serving cell/TRP that can be configured as the QCL source RSs for the downlink RS(s)/channel(s) transmitted from the non-serving (or neighboring) cell(s)/TRP(s) for all necessary QCL types could be included in the first set of SSBs. Similar design principle could apply to the second set of SSBs, the third set of SSBs, the fourth set of SSBs and the fifth set of SSBs.

The above described procedures are presented in 1301 and 1302 in the flowchart shown in FIG. 13.

In one embodiment, means of associating non-serving (or neighboring) cell information with TCI state/QCL information are provided.

Five different sets of SSBs are defined: (1) a first set of SSBs from the serving cell TRP that can be configured as the QCL source RSs for the downlink RS(s)/channel(s) transmitted from one or more non-serving (or neighboring) cells/TRPs in the inter-cell system, (2) a second set of SSBs from the serving cell TRP that cannot be configured as the QCL source RSs for the downlink RS(s)/channel(s) transmitted from one or more non-serving (or neighboring) cells/TRPs in the inter-cell system, (3) a third set of SSBs from one or more non-serving (or neighboring) cells/TRPs in the inter-cell system that are semi-QCL'ed with the first set of SSBs from the serving cell TRP, (4) a fourth set of SSBs from one or more non-serving (or neighboring) cells/TRPs in the inter-cell system that can be configured as the QCL source RSs for the downlink RS(s)/channel(s) transmitted from one or more non-serving (or neighboring) cells/TRPs in the inter-cell system, and (5) a fifth set of SSBs from one or more non-serving (or neighboring) cells/TRPs in the inter-cell system that can be configured as the QCL source RSs for one or more downlink RSs/channels transmitted from the serving cell/TRP in the inter-cell system.

The first set of SSBs or the second set of SSBs could include all SSBs transmitted from/associated with/configured for the serving cell or the serving cell TRP. The third set of SSBs or the fourth set of SSBs or the fifth set of SSBs could include all SSBs transmitted from/associated with/configured for the non-serving (or neighboring) cell(s)/TRP(s) in the inter-cell system broadcasting different PCI(s) from that of the serving cell.

As descried above, one or more RSs (such as SSBs) from one or more non-serving (or neighboring) cells/TRPs in the inter-cell system could be configured as QCL source RSs (e.g., the fourth set of SSBs described above) for one or more RSs/channels transmitted from the non-serving (or neighboring) cells/TRPs. The 3GPP Rel. 15/16 TCI framework needs to be enhanced to support configuring the non-serving (or neighboring) cell RS(s) as the QCL source RS(s).

Figure 14:
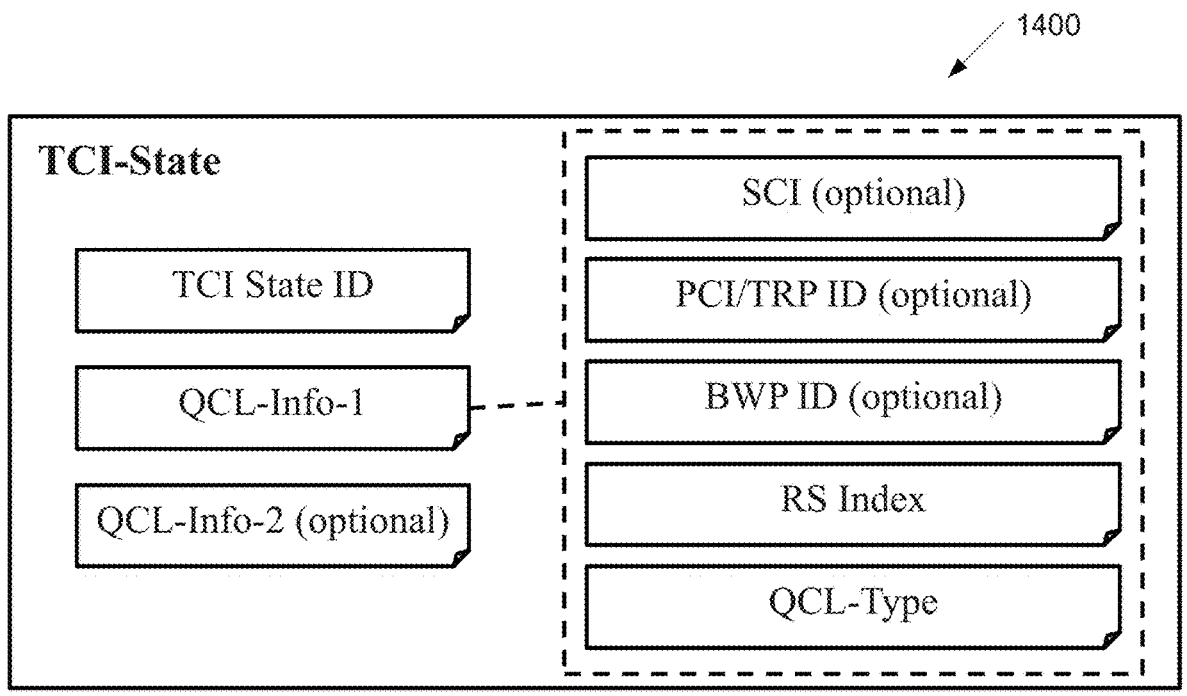
FIG. 14 illustrates an example PCI/TRP ID field in TCI-State/QCL-Info according to embodiments of the present disclosure.

FIG. 14 illustrates an example PCI/TRP ID field in TCI-State/QCL-Info 1400 according to embodiments of the present disclosure. An embodiment of the PCI/TRP ID field in TCI-State/QCL-Info 1400 shown in FIG. 14 is for illustration only. TABLE 3 shows the QCL-Info including/indicating PCI (e.g., via the parameter physCellId),

TABLE 3

QCL-Info including/indicating PCI

QCL-Info ::= SEQUENCE {
  cell ServCellIndex OPTIONAL, -- Need R
  physCellId PhysCellId OPTIONAL, -- Need S
  bwp-Id BWP-Id OPTIONAL, -- Cond CSI-RS-Indicated
  referenceSignal CHOICE {
  csi-rs NZP-CSI-RS-ResourceId,
  ssb SSB-Index
  },
  qcl-Type ENUMERATED {typeA, typeB, typeC, typeD},
  ...
}

In one embodiment, an explicit non-serving (or neighboring) cell RS indication in TCI state/QCL information is provided.

In one embodiment, to indicate one or more non-serving (or neighboring) cell RSs as the QCL source RSs, the non-serving (or neighboring) cell information including at least the PCI may be associated with the TCI state, e.g., the higher layer parameter TCI-State, indicating at least one non-serving (or neighboring) cell RS (e.g., one non-serving (or neighboring) cell SSB) as the QCL source RS. For example, certain values of ServCellIndex in the higher layer parameter QCL-Info could be reserved/used to indicate the non-serving (or neighboring) cell information such as the PCI value(s), TRP ID/index values, CORESETPoolIndex values and/or other TRP-specific higher layer signaling index values. The UE could be indicated by the network whether ServCellIndex in QCL-Info is configured to identify a serving PCell/SCell or a non-serving (or neighboring) cell/TRP; this indication could be via higher layer (e.g., RRC) or/and MAC CE or/and DCI based signaling or/and any combination of at least two of RRC, MAC CE and DCI based signaling; this indication could be via a separate (dedicated) parameter or joint with another parameter.

For another example, the non-serving (or neighboring) cell information such as the PCI value, TRP ID/index value, CORESETPoolIndex value and/or other TRP-specific higher layer signaling index values could be indicated in the higher layer parameter QCL-Info/TCI-State. In FIG. 14 and TABLE 3, an illustrative example of incorporating/indicating the non-serving (or neighboring) cell PCI/TRP ID value in the higher layer parameter QCL-Info is provided. If the field PCI/TRP ID in QCL-Info is configured and set to a valid value, the RS Index in the higher layer parameter QCL-Info indicates the RS resource index (SSB or CSI-RS resource index) associated with the indicated PCI/TRP ID value, and therefore, the corresponding serving/non-serving (or neighboring) cell/TRP associated with the indicated PCI/TRP ID value.

If the field PCI/TRP ID in QCL-Info is not configured but the field ServCellIndex is configured and set to a valid value, the RS Index in the higher layer parameter QCL-Info indicates the RS resource index (SSB or CSI-RS resource index) associated with the indicated ServCellIndex value, and therefore, the corresponding serving/non-serving (or neighboring) cell/TRP associated with the indicated ServCellIndex value. Both ServCellIndex and PCI/TRP ID fields in QCL-Info can be configured and set to valid values at the same time.

Figure 15:
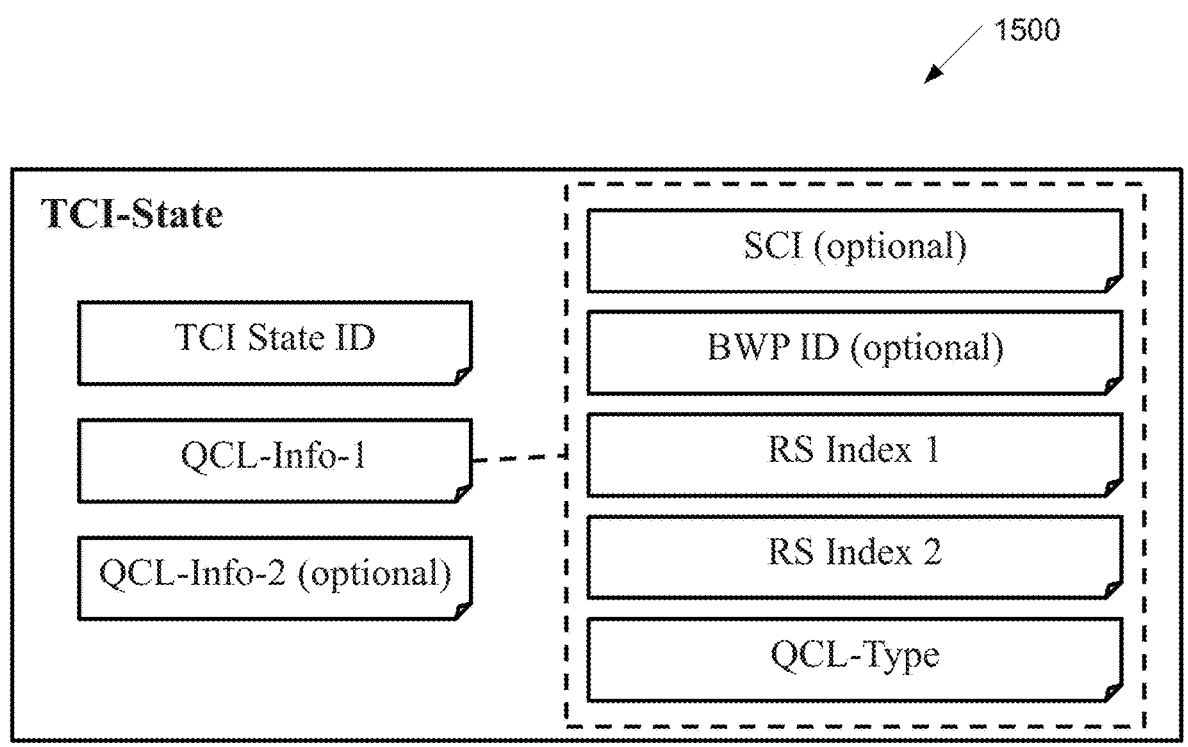
FIG. 15 illustrates an example a second QCL source RS field in TCI-State/QCL-Info according to embodiments of the present disclosure.

FIG. 15 illustrates an example a second QCL source RS field configured/indicated in TCI-State/QCL-Info 1500 according to embodiments of the present disclosure. An embodiment of the second QCL source RS field configured/indicated in TCI-State/QCL-Info 1500 shown in FIG. 15 is for illustration only.

In another embodiment, two RS Index fields could be configured in the higher layer parameter QCL-Info/TCI-State. At least one of the two configured RS Index fields could be used to indicate a non-serving (or neighboring) cell RS (such as SSB or CSI-RS) as a QCL source RS. In FIG. 15 (TABLE 4A), two RS Index fields, RS Index 1 (referenceSignal-1) and RS Index 2 (referenceSignal-2), are configured in the QCL information. In this example, RS Index 1 could be used to indicate a serving cell RS (such as SSB or CSI-RS) as a QCL source RS while RS Index 2 could be used to indicate a non-serving (or neighboring) cell RS (such as SSB or CSI-RS) as a QCL source RS. Both PCI/TRP ID field shown in FIG. 14 and RS Index 2 field depicted in FIG. 15 could be configured in the higher layer parameter QCL-Info to indicate one or more non-serving (or neighboring) cell RSs (TABLE 4B).

TABLE 4A

QCL-Info ::= SEQUENCE {
  cell ServCellIndex OPTIONAL, -- Need R
  bwp-Id BWP-Id OPTIONAL, -- Cond CSI-RS-Indicated
  referenceSignal-1 CHOICE {
  csi-rs NZP-CSI-RS-ResourceId,
  ssb SSB-Index
  },
  referenceSignal-2 CHOICE {
  csi-rs NZP-CSI-RS-ResourceId,
  ssb SSB-Index
  },
  qcl-Type ENUMERATED {typeA, typeB, typeC, typeD},
  ...
}

TABLE 4B

QCL-Info ::= SEQUENCE {
  cell ServCellIndex OPTIONAL, -- Need R
  physCellId PhysCellId OPTIONAL, -- Need S TABLE 4B-continued

```
bwp-Id BWP-Id OPTIONAL, -- Cond CSI-RS-Indicated
referenceSignal-1 CHOICE {
csi-rs NZP-CSI-RS-ResourceId,
ssb SSB-Index
},
  referenceSignal-2 CHOICE {
    physCellId PhysCellId OPTIONAL, -- Need S
csi-rs NZP-CSI-RS-ResourceId,
ssb SSB-Index
},
qcl-Type ENUMERATED {typeA, typeB, typeC, typeD},
...
}
```

The UE could be higher layer configured by the network (e.g., via higher layer RRC signaling) a pool of TCI states.

In one example, one or more TCI states in the TCI state pool indicating the same TRP-specific index/ID value such as PCI value, TRP ID value, CORES ETPoolIndex value or other TRP-specific higher layer signaling index values could form a TCI state group. A TCI state group ID could be indicated/incorporated in a TCI state (e.g., in the higher layer parameter TCI-State/QCL-Info).

In another example, one or more TCI states in the TCI state pool indicating the TRP-specific index/ID values such as PCI values, TRP ID values, CORES ETPoolIndex values or other TRP-specific higher layer signaling index values different from that of the serving cell/TRP could form a TCI state group. A TCI state group ID could be indicated/incorporated in a TCI state (e.g., in the higher layer parameter TCI-State/QCL-Info).

In one embodiment, an implicit non-serving (or neighboring) cell RS (re-)indexing in TCI state/QCL information is provided.

In one embodiment, in the higher layer parameter QCL-Info/TCI-State, the non-serving (or neighboring) cell RS(s) (such as SSB and/or CSI-RS) that can be configured as QCL source RS(s) could be indexed differently from the serving cell RS(s) (such as SSB and/or CSI-RS) that can be configured as QCL source RS(s). That is, the bit-width for the RS indices in the higher layer parameter QCL-Info/TCI-State could be determined with respect to all the RS(s) from both the serving cell/TRP and the non-serving (or neighboring) cell(s)/TRP(s) in the inter-cell system that can be configured as QCL source RS(s). For instance, the fourth set of SSBs from the non-serving (or neighboring) cell(s)/TRP(s) may be indexed differently from the first set of SSBs or/and the second set of SSBs from the serving cell/TRP in the higher layer parameter QCL-Info/TCI-State.

In TABLE 5, an example of indexing the fourth set of SSBs from a non-serving (or neighboring) cell TRP-2 in the higher layer parameter QCL-Info is given. As shown in TABLE 5, the fourth set of SSBs with the resource indices #10, #20, #33 and #42 from the non-serving (or neighboring) cell TRP-2 are (re-)indexed as #0, #1, #2 and #3 in the higher layer parameter QCL-Info. The UE could be indicated by the network the non-serving (or neighboring) cell RS (such as SSB) (re-)indexing rule(s) for indicating the non-serving (or neighboring) cell RS in the higher layer parameter QCL-Info/TCI-State; this indication could be via higher layer (e.g., RRC) or/and MAC CE or/and DCI based signaling or/and any combination of at least two of RRC, MAC CE and DCI based signaling; this indication could be via a separate (dedicated) parameter or joint with another parameter.

For example, the RS (re-)indexing rule could include the mapping relationship/association rule between the actual RS resource indices configured for a serving/non-serving (or neighboring) cell/TRP and the RS indices in the higher layer parameter QCL-Info/TCI-State. From the SSB (re-)indexing rule exhibited in TABLE 5, for instance, the UE would identify from the SSB index #1 indicated in QCL-Info that SSB #20 from the non-serving (or neighboring) cell TRP-2 is the actual QCL source RS. The UE could then apply the parameters used for receiving SSB #20 from TRP-2 to receive one or more downlink RSs/channels from TRP-2.

TABLE 5

An example of SSB (re-)indexing rule

| | | | | |
|---|---|---|---|---|
| SSB resource indices of the fourth set of SSBs from TRP-2 | #10 | #20 | #33 | #42 |
| SSB indices in the QCL-Info | #0 | #1 | #2 | #3 |

Figure 16:
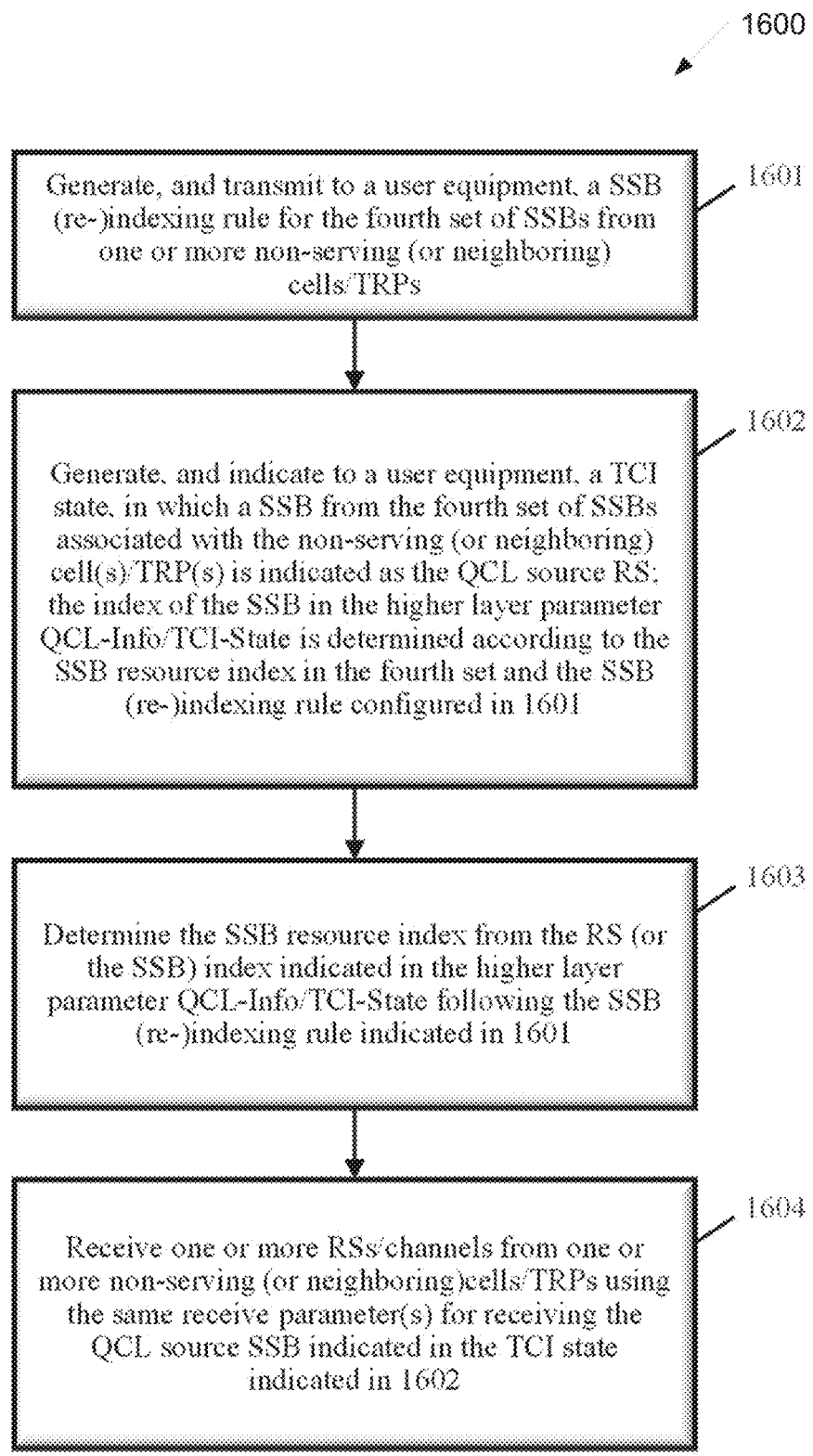
FIG. 16 illustrates a flowchart of a method for indication of the RS (re-)indexing rule according to embodiments of the present disclosure.

FIG. 16 illustrates a flowchart of a method 1600 for indication of the RS (re-)indexing rule according to embodiments of the present disclosure. The method 1600 as may be performed by a network entity including a base station (e.g., 101-103 as illustrated in FIG. 1). An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

In FIG. 16, an algorithm flowchart illustrating the indication of the RS (re-)indexing rule for the non-serving (or neighboring) cell RS(s) configured as QCL source RS(s) in QCL-Info/TCI-State and the corresponding UE's behaviors in applying the RS (re-)indexing rule is presented.

As illustrated in FIG. 16, in step 1601, the network could generate a SSB (re-)indexing rule for the fourth set of SSBs transmitted from/associated with/configured for one or more non-serving (or neighboring) cells/TRPs in the inter-cell system. For instance, when the fourth set of SSBs transmitted from/associated with/configured for the non-serving (or neighboring) cell(s)/TRP(s) are indicated in the higher layer parameter QCL-Info/TCI-State as the QCL source RSs, the fourth set of SSBs could be (re-)indexed from #0 to #K−1 in QCL-Info/TCI-State according to their actual SSB resource indices sorted in an ascending order, assuming that the total number of the fourth set of SSBs is K. Other rules to index the fourth set of SSBs in QCL-Info/TCI-State are also possible. The network could indicate to the UE the SSB (re-)indexing rule for indicating the fourth set of SSBs in the higher layer parameter QCL-Info/TCI-State. For a given SSB in the fourth set of SSBs, a resource index and index indicated in QCL-Info/TCI-State could be identical.

In step 1602, the network generates and indicates to the UE a TCI state. In the TCI state, a SSB from the fourth set of SSBs transmitted from/associated with/configured for a non-serving (or neighboring) cell or a non-serving (or neighboring) cell TRP is indicated as the QCL source RS. The index of the SSB indicated in QCL-Info/TCI-State is determined following the SSB (re-)indexing rule in step 1601.

In step 1603, upon receiving the TCI state indicated in step 1602 and the SSB (re-)indexing rule indicated in step 1601, the UE could determine the actual SSB resource index from the SSB index indicated in the higher layer parameter QCL-Info/TCI-State following the SSB (re-)indexing rule.

In step 1604, the UE applies the same receive parameter(s) for receiving the QCL source SSB indicated in the higher layer parameter QCL-Info/TCI-State (indicated in step 1602) to receive one or more downlink RSs/channels transmitted from one or more non-serving (or neighboring) cells/TRPs.

Other non-serving (or neighboring) cell RS (re-)indexing rules/configurations to index the non-serving (or neighboring) cell RS(s) configured as the QCL source RS(s) in the higher layer parameter QCL-Info/TCI-State are also possible. For instance, the indexing of the fourth set of SSBs from the non-serving (or neighboring) cell(s)/TRP(s) in the higher layer parameter QCL-Info/TCI-State could depend on the total number of SSBs associated with/configured for the serving cell/TRP, the total number of SSBs in the first set of SSBs, the highest SSB resource index of the active SSBs associated with/configured for the serving cell/TRP and etc.

Figure 17A:
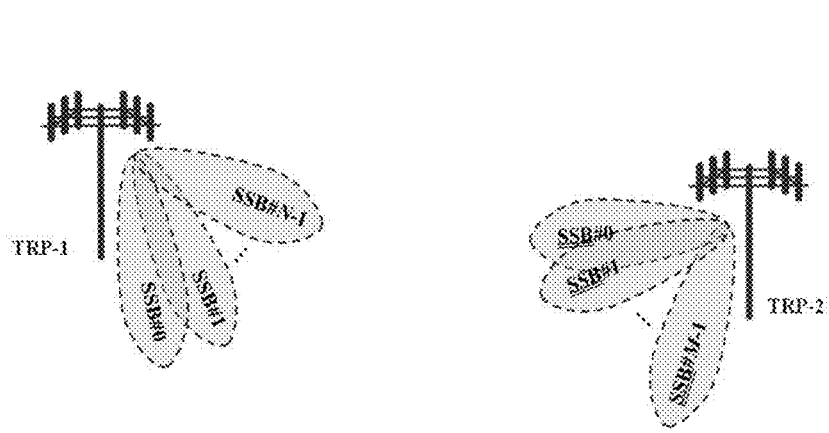
FIG. 17A illustrates an example SSB (re-)indexing configuration according to embodiments of the present disclosure.

FIG. 17A illustrates an example SSB (re-)indexing configuration 1700 according to embodiments of the present disclosure. An embodiment of the SSB (re-)indexing configuration 1700 shown in FIG. 17A is for illustration only.

AS illustrated in FIG. 17A, one design example of the SSB (re-)indexing configuration is presented for an inter-cell multi-TRP system comprising of the serving cell TRP-1 and the non-serving (or neighboring) cell TRP-2. In this example, the SSB (re-)indexing for the fourth set of SSBs from the non-serving (or neighboring) cell TRP-2 is based on the total number of SSBs associated with/configured for the serving cell TRP-1. As the total number of SSBs associated with the serving cell TRP-1 is N, that is, the highest SSB resource index of the total active SSBs from the serving cell TRP-1 is #N−1, the starting SSB index for indicating the fourth set of SSBs from the non-serving (or neighboring) cell TRP-2 in the higher layer parameter QCL-Info/TCI-State is set to #N. In this example, the fourth set of SSBs contains three SSBs with their resource indices configured as #0, #1 and #M−1.

After applying the SSB (re-)indexing, their corresponding indices in the higher layer parameter QCL-Info/TCI-State are set to #N, #N+1 and #N+2. That is, the bit-width for the SSB indices in the higher layer parameter QCL-Info/TCI-State is determined with respect to all N SSBs from the serving cell TRP-1 and the three SSBs in the fourth set of SSBs from the non-serving (or neighboring) cell TRP-2. For instance, if SSB #M−1 from the non-serving (or neighboring) cell TRP-2 is indicated in the QCL-Info as the QCL source RS, instead of indicating a resource index #M−1 in the QCL-Info, the SSB index #N+2 (obtained after applying the SSB (re-)indexing strategy) is indicated in the QCL-Info. Here, the SSBs from the serving cell TRP-1 are configured as the "root" SSBs, where a "root" SSB has identical resource index and RS index in the higher layer parameter QCL-Info/TCI-State. One or more SSBs from the non-serving (or neighboring) cell(s)/TRP(s) can be configured as "root" SSBs as well. In this example, the UE could be higher layer configured/indicated by the network the SSB (re-)indexing rule/configuration depicted in FIG. 17A.

Figure 17B:
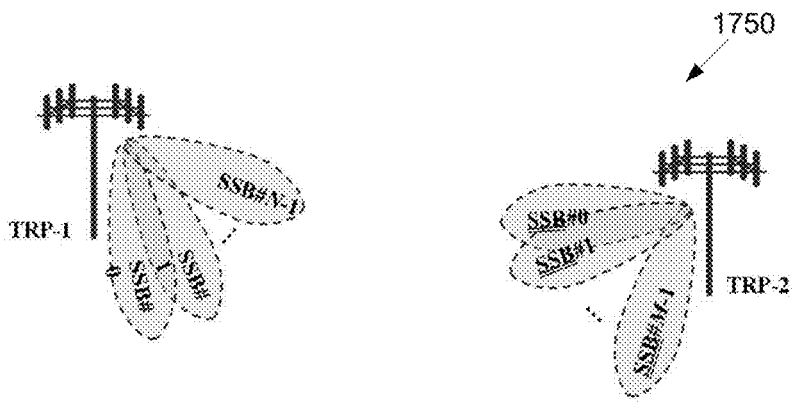
FIG. 17B illustrates another example SSB (re-)indexing configuration according to embodiments of the present disclosure.

FIG. 17B illustrates another example SSB (re-)indexing configuration 1750 according to embodiments of the present disclosure. An embodiment of the SSB (re-)indexing configuration 1750 shown in FIG. 17B is for illustration only.

As illustrated in FIG. 17B, another design example of the SSB (re-)indexing configuration is presented for an inter-cell multi-TRP system comprising of two TRPs, i.e., the serving cell TRP-1 and the non-serving (or neighboring) cell TRP-2. In this example, all SSBs or all SSB resources associated with/configured for the non-serving (or neighboring) cell TRP-2 SSB #0, SSB #1, . . . , SSB #M−1 are (re-)indexed as #N, #N+2, . . . , #M+N−1 in the higher layer parameter QCL-Info/TCI-State when all SSBs or all SSB are indicated in the QCL-Info as the QCL source RSs. That is, the bit-width for the SSB indices in the higher layer parameter QCL-Info/TCI-State is determined with respect to all N SSBs from the serving cell TRP-1 and all M SSBs from the non-serving (or neighboring) cell TRP-2. In this case, J'=Q in FIG. 12, implying that the fourth set of SSBs from the non-serving (or neighboring) cell TRP-2 correspond to all SSBs from the non-serving (or neighboring) cell TRP-2. In this example, the UE could be higher layer configured/indicated by the network the SSB (re-)indexing rule/configuration depicted in FIG. 17B.

Figure 18:
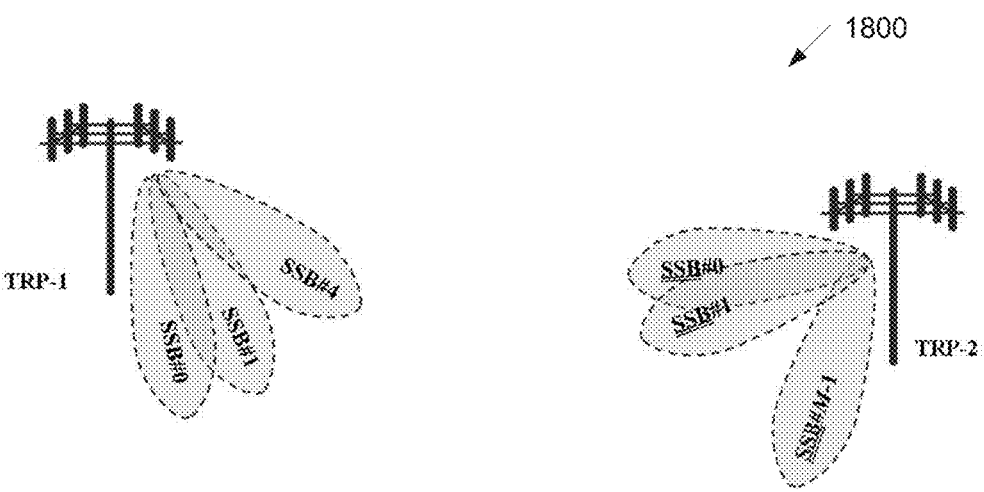
FIG. 18 illustrates yet another example SSB (re-)indexing configuration according to embodiments of the present disclosure.

FIG. 18 illustrates yet another example SSB (re-)indexing configuration 1800 according to embodiments of the present disclosure. An embodiment of the SSB (re-)indexing configuration 1800 shown in FIG. 18 is for illustration only.

As illustrated in FIG. 18, yet another design example of the SSB (re-)indexing configuration is provided for an inter-cell multi-TRP system comprising of the serving cell TRP-1 and the non-serving (or neighboring) cell TRP-2. In this example, when one or more SSBs (e.g., the fourth set of SSBs) from the non-serving (or neighboring) cell TRP-2 are configured as the QCL source RSs, their corresponding indices in the higher layer parameter QCL-Info/TCI-State are determined based on the highest SSB resource index of the SSBs from the serving cell TRP-1 and/or the highest RS index in the higher layer parameter QCL-Info/TCI-State reserved for the serving cell TRP-1.

As illustrated in FIG. 18, the SSBs from the serving cell TRP-1 are "root" SSBs; i.e., when a "root" SSB is indicated in a TCI state as a QCL source RS, an index in the higher layer parameter QCL-Info is identical to an actual SSB resource index. As shown in FIG. 18, as the highest SSB resource index of the SSBs from the serving cell TRP-1 is #4, the starting SSB index for indicating one or more SSBs from the non-serving (or neighboring) cell TRP-2 in the higher layer parameter QCL-Info/TCI-State could therefore be set to #5. In this case, the UE could be indicated by the network the highest SSB resource index of the SSBs from the serving cell and/or the highest RS index in QCL-Info/TCI-State reserved for the serving cell. In this example, the UE could be higher layer configured/indicated by the network the SSB (re-)indexing rule/configuration depicted in FIG. 18.

Figure 19:
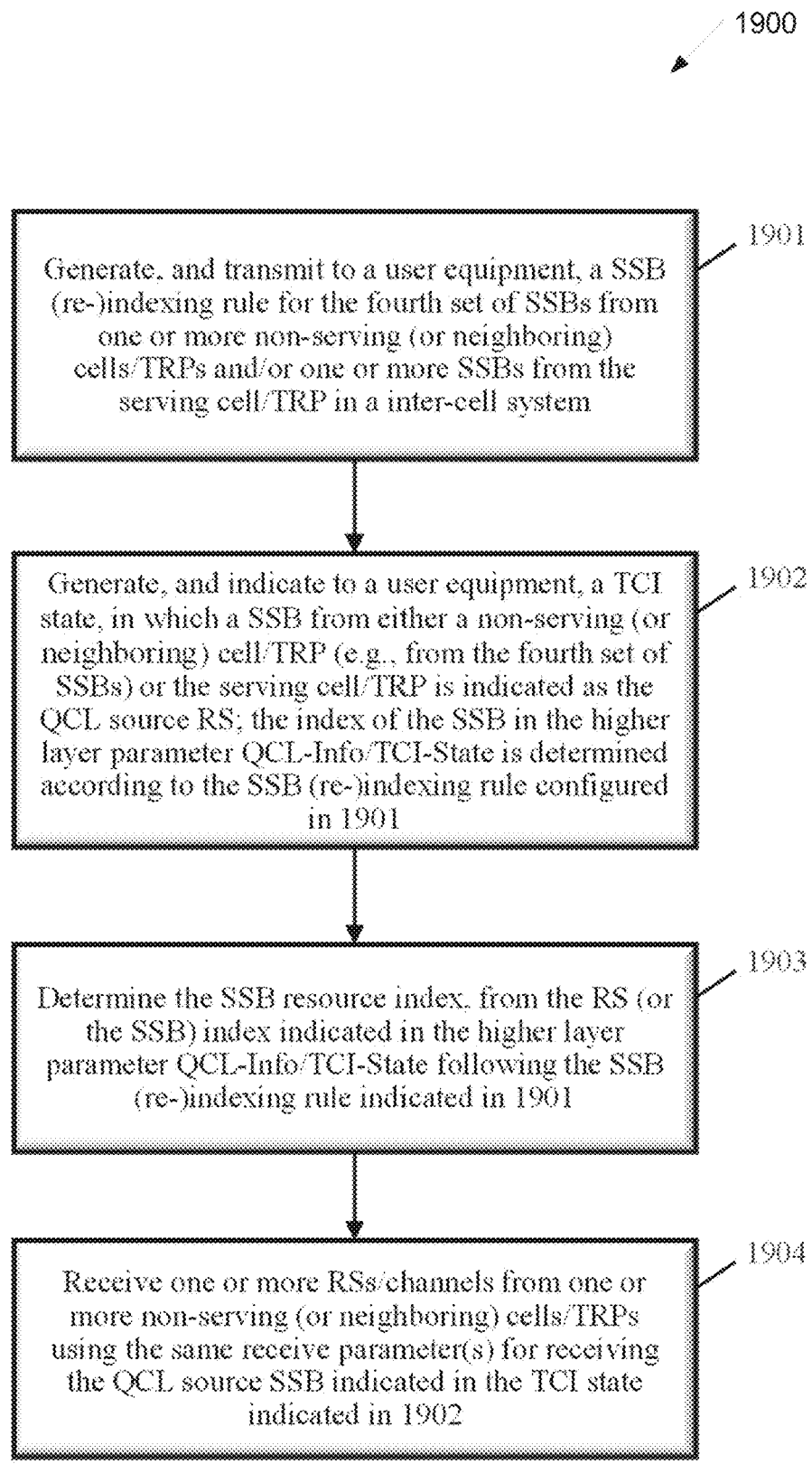
FIG. 19 illustrates a flowchart of a method for indication of the RS (re-)indexing rule according to embodiments of the present disclosure.

FIG. 19 illustrates a flowchart of a method 1900 for indication of the RS (re-)indexing rule according to embodiments of the present disclosure. The method 1900 as may be performed by a network entity including a base station (e.g., 101-103 as illustrated in FIG. 1). An embodiment of the method 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions.

In FIG. 19, an algorithm flowchart illustrating the indication of the RS (re-)indexing rule for the serving cell RS(s) and/or the non-serving (or neighboring) cell RS(s) configured as QCL source RS(s) in the higher layer parameter QCL-Info/TCI-State and the corresponding UE's behaviors in applying the RS (re-)indexing rule is presented.

In step 1901, the network could generate a SSB (re-)indexing rule for the fourth set of SSBs transmitted from/associated with/configured for one or more non-serving (or neighboring) cells/TRPs and/or one or more SSBs transmitted from/associated with/configured for the serving cell/TRP in the inter-cell system. As illustrated in the examples shown in FIG. 17A, FIG. 17B, and FIG. 18, the SSB (re-)indexing configuration/rule could depend on the total number of SSBs from the serving cell/TRP and/or the highest SSB resource index of the SSBs from the serving cell/TRP assuming that the SSBs from the serving cell/TRP are "root" SSBs.

For instance, when the fourth set of SSBs transmitted from/associated with/configured for the non-serving (or neighboring) cell(s)/TRP(s) are indicated in the higher layer parameter QCL-Info/TCI-State as the QCL source RSs, the fourth set of SSBs could be (re-)indexed from #N to #M+N−1 in QCL-Info/TCI-State according to their actual SSB resource indices sorted in an ascending order, assuming that (1) the total number of the fourth set of SSBs is M and (2) the total number of SSBs from the serving cell/TRP is N and/or the highest SSB resource index of the SSBs from the serving cell/TRP is #N−1. That is, the bit-width for the SSB indices in the higher layer parameter QCL-Info/TCI-State is determined with respect to all N SSBs from the serving cell TRP-1 and all M SSBs in the fourth set of SSBs from the non-serving (or neighboring) cell TRP-2.

Other rules to index the fourth set of SSBs from the non-serving (or neighboring) cell(s)/TRP(s) and/or the SSB(s) from the serving cell/TRP in QCL-Info/TCI-State are also possible. The network could indicate to the UE the SSB (re-)indexing rule for indicating the serving cell RS(s) and/or the non-serving (or neighboring) cell RS(s) in the higher layer parameter QCL-Info/TCI-State. For a given SSB in the fourth set of SSBs, a resource index and an index indicated in the higher layer parameter QCL-Info/TCI-State could be identical.

In step 1902, the network generates and indicates to the UE a TCI state. In the TCI state, a SSB from the fourth set of SSBs transmitted from/associated with/configured for a non-serving (or neighboring) cell/TRP or a SSB transmitted from/associated/configured for the serving cell/TRP is indicated as the QCL source RS. The index of the SSB indicated in the higher layer parameter QCL-Info/TCI-State is determined following the SSB (re-)indexing rule in step 1901.

In step 1903, upon receiving the TCI state indicated in step 1902 and the SSB (re-)indexing rule indicated in step 1901, the UE could determine the actual SSB resource index from the SSB index indicated in the higher layer parameter QCL-Info/TCI-State following the SSB (re-)indexing rule.

In step 1904, the UE applies the same receive parameter(s) for receiving the QCL source SSB indicated in the higher layer parameter QCL-Info/TCI-State (indicated in step 1902) to receive one or more downlink RSs/channels transmitted from one or more non-serving (or neighboring) cells/TRPs. The indicated QCL source SSB could be transmitted from/associated with either the serving cell/TRP or a non-serving (or neighboring) cell/TRP.

Figure 20:
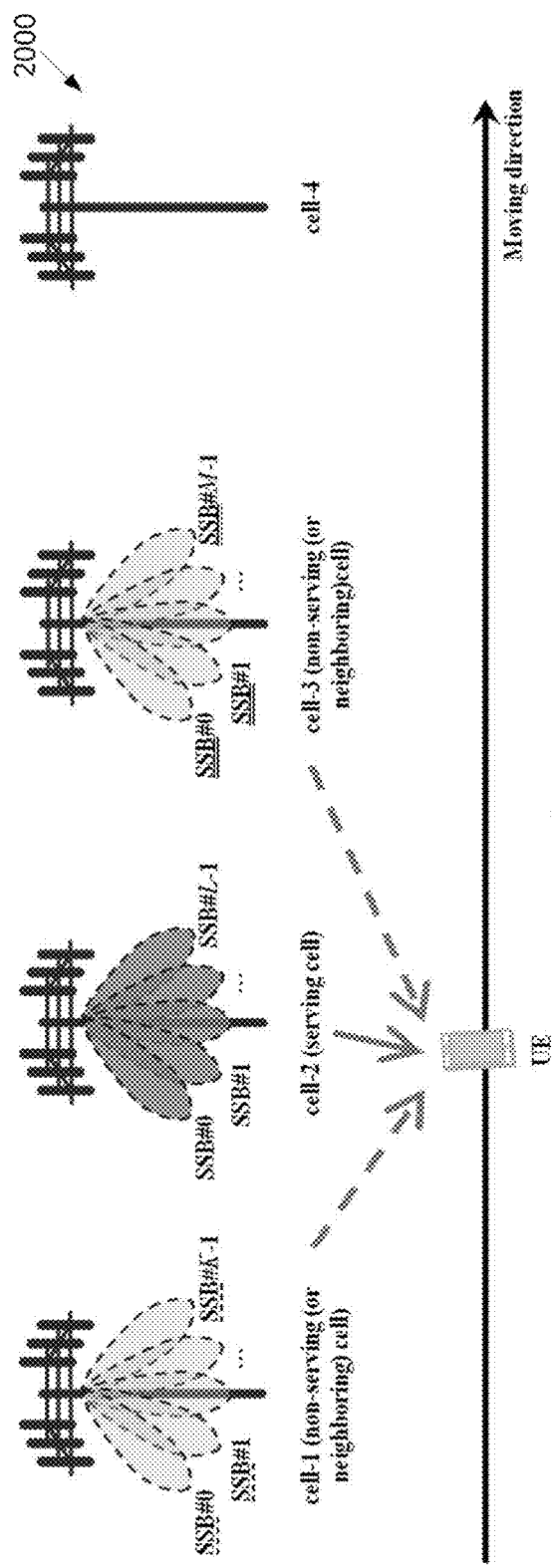
FIG. 20 illustrates an example inter-cell operation with more than one (two in these examples) non-serving (or neighboring) cells/TRPs according to embodiments of the present disclosure.

FIG. 20 illustrates an example inter-cell operation 2000 with more than one (two in these examples) non-serving (or neighboring) cells/TRPs according to embodiments of the present disclosure. An embodiment of the inter-cell operation 2000 shown in FIG. 20 is for illustration only.

Figure 21:
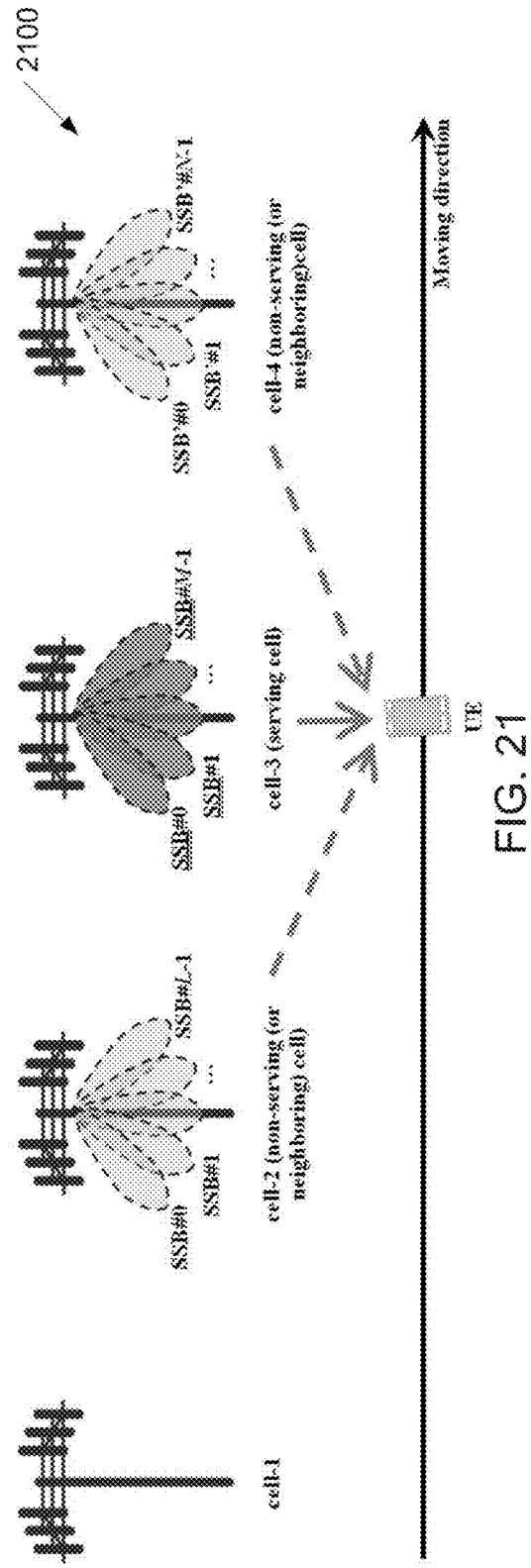
FIG. 21 illustrates another example inter-cell operation with more than one (two in these examples) non-serving (or neighboring) cells/TRPs according to embodiments of the present disclosure.

FIG. 21 illustrates another example inter-cell operation 2100 with more than one (two in these examples) non-serving (or neighboring) cells/TRPs according to embodiments of the present disclosure. An embodiment of the inter-cell operation 2100 shown in FIG. 21 is for illustration only.

The RS(s) (re-)indexing in QCL-Info/TCI-State can support more than one non-serving (or neighboring) cells/TRPs in an inter-cell system. In FIG. 20 and FIG. 21, two examples illustrating an inter-cell operation with more than one (two in these examples) non-serving (or neighboring) cells/TRPs are presented. As can be seen from FIG. 20 and FIG. 21, the UE moves along a given trajectory towards a given direction. A total of 4 cells are deployed along the trajectory, which are denoted by cell-1, cell-2, cell-3 and cell-4. For instance, for the given UE's position shown in FIG. 20, cell-2 is the serving cell while cell-1 and cell-3 are the two non-serving (or neighboring) cells. Their corresponding SSBs (or SSB resource indices) are denoted by {SSB #0, SSB #1, . . . SSB #K−1} {SSB #0, SS #1, . . . , SSB #L−1} and {SSB #0, SSB #1, . . . , SSB #M−1} for cell-1, cell-2 and cell-3, respectively.

For the given UE's position shown in FIG. 21, cell-3 becomes the serving cell while cell-2 and cell-4 are the two non-serving (or neighboring) cells. The SSBs (or SSB resource indices) associated with cell-4 are {SSB' #0, SSB' #1, . . . , SSB' #N−1}.

The UE could be configured/indicated by the network multiple SSB (re-)indexing configurations/rules; each SSB (re-)indexing configuration/rule could include the mapping relationship/association rule between the actual resource indices of the SSBs associated with the serving cell/TRP and/or one or more non-serving (or neighboring) cells/TRPs in the inter-cell system that can be configured as QCL source RSs and the SSB indices in the higher layer parameter QCL-Info/TCI-State. The SSB indices in the higher layer parameter QCL-Info/TCI-State for the SSBs associated with the serving cell/TRP and/or one or more non-serving (or neighboring) cells/TRPs that can be configured as QCL source RSs may be different.

One design example of a SSB (re-)indexing configuration for FIG. 20 is presented in TABLE 6. In this SSB (re-)indexing design example, the SSBs (or the actual SSB resource indices) of the serving cell cell-2 {SSB #0, SSB #1, . . . , SSB #L−1} are indexed as/mapped to {#0, #1, . . . , #L−1} in the higher layer parameter QCL-Info/TCI-State when/if the SSBs are configured as QCL source RSs, the SSBs (or the actual SSB resource indices) of the non-serving (or neighboring) cell cell-1 {SSB #0, SSB #1, . . . , SSB #K−1} are indexed as/mapped to {#L, #L+1, . . . , #L+K−1} in the higher layer parameter QCL-Info/TCI-State when/if the SSBs are configured as QCL source RSs, and the SSBs (or the actual SSB resource indices) of the non-serving (or neighboring) cell cell-3 {SSB #0, SSB #1, . . . , SSB #M−1} are indexed as/mapped to {#L+K, #L+K+1, . . . , #L+K+M−1} in the higher layer parameter QCL-Info/TCI-State when/if the SSBs are configured as QCL source RSs.

In this example, the UE could be higher layer configured/indicated by the network the SSB (re-)indexing rule/configuration depicted in TABLE 6. In TABLE 7, another design example of SSB (re-)indexing configuration/rule for the serving cell cell-2, non-serving (or neighboring) cell cell-1 and non-serving (or neighboring) cell cell-3 depicted in FIG. 20 is provided. The main difference between the design examples shown in TABLE 6 and TABLE 7 is the exact format of the RS index in the QCL-Info after applying the SSB (re-)indexing configuration to the SSBs or the actual SSB resource indices associated with the serving/non-serving (or neighboring) cells. The UE could be higher layer configured/indicated by the network the SSB (re-)indexing rule/configuration depicted in TABLE 7.

TABLE 6

A design example of SSB (re-)indexing configuration/rule in an inter-cell system

| | All SSBs from serving cell cell-2 | | | | All SSBs from non-serving (or neighboring) cell cell-1 | | | | All SSBs from non-serving, (or neighboring) cell cell-3 | | | |
|---|---|---|---|---|---|---|---|---|---|---|---|---|
| SSB resource indices | SSB #0 | SSB #1 | ... | SSB# L − 1 | SSB #0 | SSB #1 | ... | SSB# K − 1 | SSB #0 | SSB# 1 | ... | SSB#M − 1 |
| SSB indices in QCL-Info/TCI-State after applying SSB (re-)indexing | #0 | #1 | ... | #L − 1 | #L | #L + 1 | ... | #L + K − 1 | #L + K | #L + K + 1 | ... | #L + K + M − 1 |

TABLE 7

Another design example of SSB (re-)indexing configuration/rule in an inter-cell system

| | All SSBs from serving cell cell-2 | | | | All SSBs from non-serving (or neighboring) cell cell-1 | | | | All SSBs from non-serving, (or neighboring) cell cell-3 | | | |
|---|---|---|---|---|---|---|---|---|---|---|---|---|
| SSB resource indices | SSB# 0 | SSB# 1 | ... | SSB# L − 1 | SSB# 0 | SSB# 1 | ... | SSB# K − 1 | SSB# 0 | SSB# 1 | ... | SSB# M − 1 |
| SSB indices in QCL-Info/TCI-State after applying SSB (re-)indexing | #2 − 0 | #2 − 1 | ... | #2 − (L − 1) | #1 − 0 | #1 − 1 | ... | #1 − (K − 1) | #3 − 0 | #3 − 1 | ... | #3 − (M − 1) |

For the deployment scenario depicted in FIG. 21, two SSB (re-)indexing design examples are presented in TABLE 8 and TABLE 9.

TABLE 8

Yet another design example of SSB (re-)indexing configuration/rule in an inter-cell system

| | All SSBs from serving cell cell-2 | | | | All SSBs from non-serving (or neighboring) cell cell-1 | | | | All SSBs from non-serving, (or neighboring) cell cell-3 | | | |
|---|---|---|---|---|---|---|---|---|---|---|---|---|
| SSB resource indices | SSB #0 | SSB #1 | ... | SSB# M − 1 | SSB #0 | SSB #1 | ... | SSB# L − 1 | SSB' #0 | SSB'# 1 | ... | SSB'# N − 1 |
| SSB indices in QCL-Info/TCI-State after applying SSB (re-)indexing | #0 | #1 | ... | #M − 1 | #M | #M + 1 | ... | #M + L − 1 | #M + L | #M + L + 1 | ... | #M + L + N − 1 |

TABLE 9

Yet another design example of SSB (re-)indexing configuration/rule in an inter-cell system

|  | All SSBs from serving cell cell-2 | | | All SSBs from non-serving (or neighboring) cell cell-1 | | | All SSBs from non-serving, (or neighboring) cell cell-3 | | | |
|---|---|---|---|---|---|---|---|---|---|---|
| SSB resource indices | SSB #0 | SSB #1 | ... | SSB# M − 1 | SSB #0 | SSB #1 | ... | SSB# L − 1 | SSB' #0 | SSB' #1 | ... | SSB'# N − 1 |
| SSB indices in QCL-Info/TCI-State after applying SSB (re-)indexing | #3 − 0 | #3 − 1 | ... | #3 − (M − 1) | #2 − 0 | #2 − 1 | ... | #2 − (L − 1) | #4 − 0 | #4 − 1 | ... | #4 − (N − 1) |

The SSB (re-)indexing configurations/rules shown in TABLES 6-9 can be extended/applied to an inter-cell system with more than two non-serving (or neighboring) cells/TRPs.

As discussed above, there are various methods to configure and indicate a RS (such as SSB) (re-)indexing rule/configuration.

In one example, the RS (re-)indexing rule/configuration could explicit include the mapping relationship/association rule/correspondence between one or more RS resource indices (such as the SSB resource indices) configured for one or more cells/TRPs and one or more RS indices in the higher layer parameter QCL-Info/TCI-State. The QCL source RSs could be transmitted from/associated with/configured for either the serving cell/TRP or one or more non-serving (or neighboring) cells/TRPs in an inter-cell system. Design examples of such explicit RS (re-)indexing rule/configuration are presented in TABLE 5, FIG. 17A, FIG. 17B, FIG. 18, TABLE 6, TABLE 7, TABLE 8, and TABLE 9, wherein the SSBs from either the serving cell/TRP or the non-serving (or neighboring) cell(s)/TRP(s) can be configured as the QCL source RSs.

In another example, the UE could be first higher layer configured by the network a list of TRP-specific index/ID values such as PCI values, TRP ID values, CORESET-PoolIndex values or other TRP-specific higher layer signaling index values. The UE could then be indicated by the network the mapping relationship/association rule/correspondence between the TRP-specific index/ID values and the RS indices in the higher layer parameter QCL-Info/TCI-State. The RS resource indices such as the SSB resource indices associated with a TRP-specific index/ID value such as a PCI value could be mapped to the RS indices in the higher layer parameter QCL-Info/TCI-State associated with the same TRP-specific index/ID value such as the same PCI value. The UE could also be indicated by the network the mapping relationship/association rule/correspondence between the RS resource indices (such as the SSB resource indices) and the RS indices in the higher layer parameter QCL-Info/TCI-State associated with the same TRP-specific index/ID value such as the same PCI value. One design example of the SSB (re-)indexing rule incorporating the PCI values for the serving and the non-serving (or neighboring) cells/TRPs is presented in TABLE 10 for the inter-cell system shown in FIG. 20.

TABLE 10

A design example of SSB (re-)indexing configuration/rule incorporating the PCI values for an inter-cell system

|  | All SSBs from serving cell cell-2 | | | | All SSBs from non-serving (or neighboring) cell cell-1 | | | | All SSBs from non-serving (or neighboring) cell cell-3 | | | |
|---|---|---|---|---|---|---|---|---|---|---|---|---|
| SSB resource indices | SSB #0 | SSB #1 | ... | SSB# L − 1 | SSB #0 | SSB #1 | ... | SSB# K − 1 | SSB #0 | SSB# 1 | ... | SSB#M − 1 |
| SSB indices in QCL-Info/TCI-State after applying SSB (re-)indexing | #0 | #1 | ... | #L − 1 | #L | #L + 1 | ... | #L + K − 1 | #L + K | #L + K + 1 | ... | #L + K + M − 1 |
| PCI values | PCI #A | | | | PCI #B | | | | PCI #C | | | |

In yet another example, the UE could be first higher layer configured by the network a list of TRP-specific index/ID values such as PCI values, TRP ID values, CORESET-PoolIndex values or other TRP-specific higher layer signaling index values. The UE could then be indicated by the network the starting RS indices in the higher layer parameter QCL-Info/TCI-State for all the configured TRP-specific index/ID values. For the example shown in TABLE 10, the starting RS indices in the QCL-Info/TCI-State for PCI #A, PCI #B and PCI #C are #0, #L and #L+K, respectively. The UE could also be indicated by the network the number of RSs (such as SSBs) associated with each configured TRP-specific index/ID value such as a PCI value that can be configured as QCL source RSs.

For the example shown in TABLE 10, the number of SSBs associated with PCI #A, PCI #B and PCI #C that can be configured as QCL source RSs are #L, #K and #M, respectively. Based on the above indications/configurations, the UE could know the mapping relationship/association rule/correspondence between the TRP-specific index/ID values and the RS indices in the higher layer parameter QCL-Info/TCI-State. The RS resource indices such as the SSB resource indices associated with a TRP-specific index/ID value such as a PCI value could be mapped to the RS indices in QCL-Info/TCI-State associated with the same TRP-specific index/ID value such as the same PCI value. The UE could also be indicated by the network the mapping relationship/association rule/correspondence between the RS resource indices (such as the SSB resource indices) and the RS indices in the higher layer parameter QCL-Info/TCI-State associated with the same TRP-specific index/ID value such as the same PCI value.

In yet another example, for an inter-cell system comprising of a single non-serving (or neighboring) cell/TRP, the UE could be indicated by the network the starting RS index in the higher layer parameter QCL-Info/TCI-State and/or the ending RS index in the higher layer parameter QCL-Info/TCI-State for the serving cell/TRP, and/or the starting RS index in the higher layer parameter QCL-Info/TCI-State and/or the ending RS index in the higher layer parameter QCL-Info/TCI-State for the non-serving (or neighboring) cell/TRP. For the inter-cell system depicted in FIG. 17B, the starting RS index in the higher layer parameter QCL-Info/TCI-State for the serving cell is #0, the ending RS index in the higher layer parameter QCL-Info/TCI-State for the serving cell is #N−1, the starting RS index in the higher layer parameter QCL-Info/TCI-State for the non-serving (or neighboring) cell is #N, and the ending RS index in the higher layer parameter QCL-Info/TCI-State for the non-serving (or neighboring) cell is #M+N−1.

The UE could also be indicated by the network the number of RSs (such as SSBs) associated with the serving cell/TRP or/and the non-serving (or neighboring) cell/TRP (e.g., the fourth set of SSBs) that can be configured as QCL source RSs. Based on the above indications/configurations, the UE could know the mapping relationship/association rule/correspondence between the serving/non-serving (or neighboring) cells and the RS indices in the higher layer parameter QCL-Info/TCI-State. The RS resource indices such as the SSB resource indices associated with the serving cell/TRP (or the non-serving (or neighboring) cell/TRP) could be mapped to the RS indices in QCL-Info/TCI-State associated with the serving cell/TRP (or the non-serving (or neighboring) cell/TRP). The UE could also be indicated by the network the mapping relationship/association rule/correspondence between the RS resource indices (such as the SSB resource indices) associated with the serving/non-serving (or neighboring) cells/TRPs and the RS indices in the higher layer parameter QCL-Info/TCI-State.

In yet another example, the UE could be first higher layer configured by the network a list of TRP-specific index/ID values such as PCI values, TRP ID values, CORESET-PoolIndex values or other TRP-specific higher layer signaling index values for the serving cell/TRP and $N\_nsc \geq 1$ non-serving (or neighboring) cells/TRPs. For example, the first entry in the list could correspond to the serving cell/TRP, the second entry in the list could correspond to a first non-serving (or neighboring) cell/TRP, the third entry in the list could correspond to a second non-serving (or neighboring) cell/TRP and so on. All the local RS resource indices (such as the local SSB resource indices) from both the serving cell/TRP and the N_nsc non-serving (or neighboring) cells/TRPs are coded/indexed in a consecutive manner, resulting in a set of global RS resource indices (or a set of global SSB resource indices) for both the serving cell/TRP and the N_nsc non-serving (or neighboring) cells/TRPs.

That is, the bit-width for the global RS resource indices (or the global SSB resource indices) could be determined with respect to all the RS(s) (or all the SSB(s)) from both the serving cell/TRP and the non-serving (or neighboring) cell (s)/TRP(s) in the inter-cell system that can be configured as QCL source RS(s). For instance, denote the total number of (active) SSBs from the serving cell/TRP, the first non-serving (or neighboring) cell/TRP, the second non-serving (or neighboring) cell/TRP, . . . , and the (N_nsc)-th non-serving (or neighboring) cell/TRP as N {0}, N {1}, N {2}, . . . , and N {N_nsc}, respectively. In the higher layer parameter QCL-Info/TCI-State, the RS indices (i.e., the global RS resource indices) for the SSBs from the serving cell/TRP could be configured as #0, #1, . . . , #N {0}−1, which could be the same as their local RS resource indices. Furthermore, the RS indices in the QCL-Info/TCI-State (i.e., the global RS resource indices) for the SSBs from the first non-serving (or neighboring) cell TRP could be configured as #N{0}, #N{0}+1, . . . , #N{0}+N{1}-1, the RS indices in the QCL-Info/TCI-State (i.e., the global RS resource indices) for the SSBs from the second non-serving (or neighboring) cell TRP could be configured as #N{1}+N{0}, #N{1}+N{0}+1, . . . #N{2}+N{1}+N{0}−1, and so on, and the RS indices in the QCL-Info/TCI-State (i.e., the global RS resource indices) for the SSBs from the (N_nsc)-th non-serving (or neighboring) cell/TRP could be configured as #N{N_nsc−1}+N{N_nsc−2}+ . . . +N{1}+N{0}, . . . , N{N_nsc}+N{N_nsc−1}+N{N_nsc−2}+ . . . +N{1}+N{0}−1.

Similar RS (re-)indexing configurations/rules could be applied to other RRC parameters/configurations such as CSI-ResourceConfig, PUCCH-SpatialRelationInfo and etc., and other types of RS than SSB such as CSI-RS.

The UE could be higher layer configured by the network (e.g., via higher layer RRC signaling) a set of R>1 RS (such as SSB) (re-)indexing rules/configurations. Each RS (re-)indexing configuration/rule could be for a different serving cell and/or one or more different non-serving (or neighboring) cells. The set of RSs (re-)indexing rules/configurations can be updated, e.g., via higher layer RRC signaling, by adding or removing one or more RS (re-)indexing rules/configurations to or from the set of RS (re-)indexing rules/configurations. In TABLE 11, an illustrative example of a set of two SSB (re-)indexing rules/configurations designed for the inter-cell systems depicted in TABLE 6 and TABLE 7 is given.

Furthermore, in one example, the UE could receive from the network a MAC CE command activating one or more RS (re-)indexing configurations/rules from the list of R>1 RS (re-)indexing rules/configurations higher layer configured to the UE.

In another example, the UE could receive from the network a bitmap of length R>1. Each entry/bit in the bitmap corresponds to a RS (re-)indexing configuration/rule in the list of R>1 RS (re-)indexing rules/configurations. If an entry/bit in the bitmap is set to "1," the corresponding/ associated RS (re-)indexing configuration/rule is activated.

In another example, one or more TCI states in the TCI state pool indicating the serving cell RSs such as the serving cell SSBs could form a TCI state group. A TCI state group ID could be indicated/incorporated in a TCI state (e.g., in the higher layer parameter TCI-State/QCL-Info).

In yet another example, one or more TCI states in the TCI state pool indicating the non-serving (or neighboring) cell RSs such as the non-serving (or neighboring) cell SSBs associated with/linked to the same TRP-specific index/ID

TABLE 11

An illustrative example of two SSB (re-)indexing configurations/rules for an inter-cell system

| | SSB (re-)indexing configuration/rule 0 | | | | | | | | | |
|---|---|---|---|---|---|---|---|---|---|---|
| | All SSBs from serving cell cell-2 | | | | All SSBs from non-serving (or neighboring) cell cell-1 | | | All SSBs from non-serving, (or neighboring) cell cell-3 | | |
| SSB resource indices | SSB #0 | SSB #1 | ... | SSB# L − 1 | SSB #0 | SSB #1 | ... | SSB# K − 1 | SSB #0 | SSB# 1 | ... | SSB#M − 1 |
| SSB indices in QCL-Info/TCI-State after applying SSB (re-)indexing | #0 | #1 | ... | #L − 1 | #L | #L + 1 | ... | #L + K − 1 | #L + K | #L + K + 1 | ... | #L + K + M − 1 |

| | SSB (re-)indexing configuration/rule 1 | | | | | | | | | |
|---|---|---|---|---|---|---|---|---|---|---|
| | All SSBs from serving cell cell-3 | | | | All SSBs from non-serving (or neighboring) cell cell-2 | | | All SSBs from non-serving, (or neighboring) cell cell-4 | | |
| SSB resource indices | SSB #0 | SSB #1 | ... | SSB# M − 1 | SSB #0 | SSB #1 | ... | SSB# L − 1 | SSB' #0 | SSB'# 1 | ... | SSB'# N − 1 |
| SSB indices in QCL-Info/TCI-State after applying SSB (re-)indexing | #0 | #1 | ... | #M − 1 | #M | #M + 1 | ... | #M + L − 1 | #M + L | #M + L + 1 | ... | #M + L + N − 1 |

Figure 22:
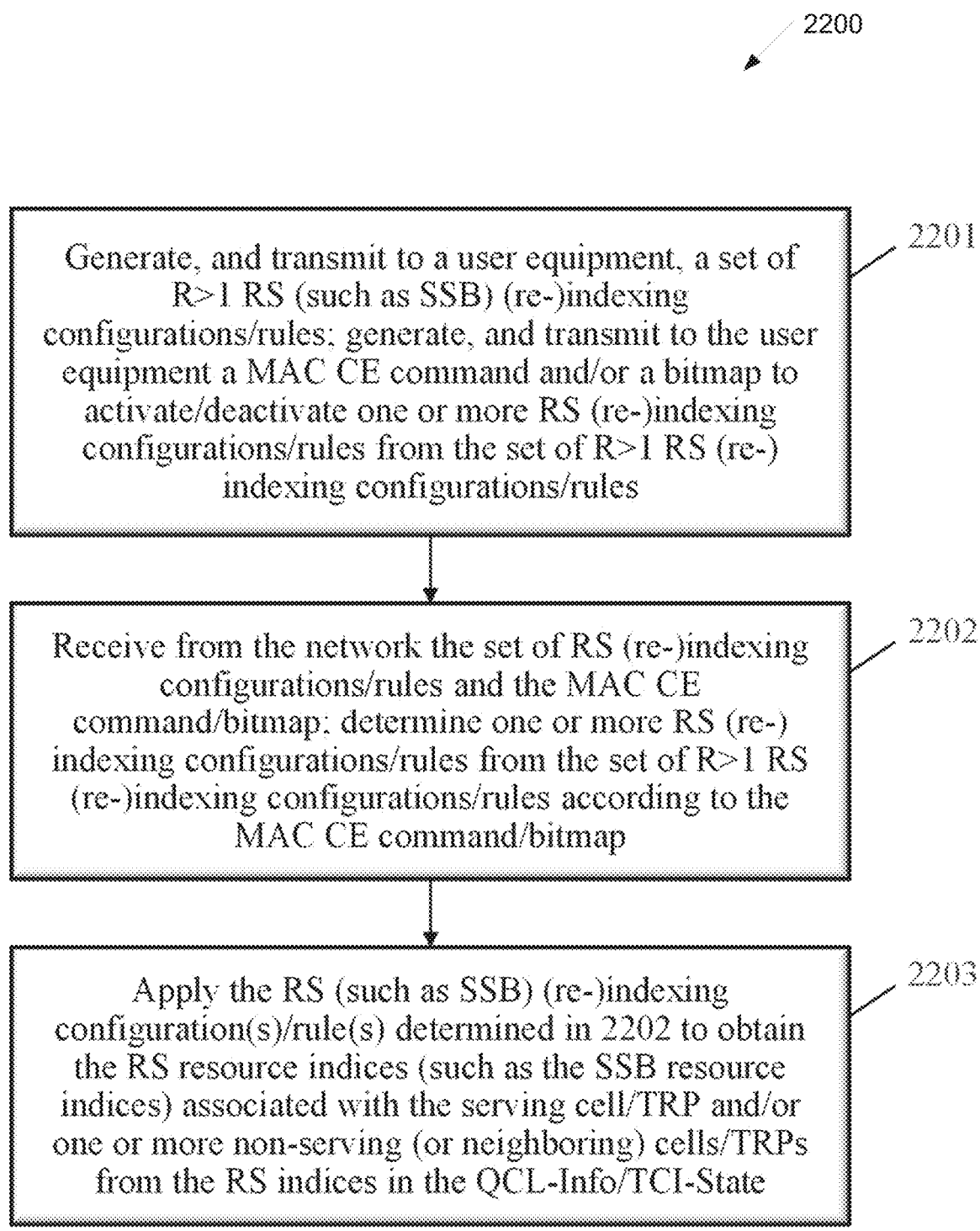
FIG. 22 illustrates a flowchart of a method of UE for receiving the set of RSs according to embodiments of the present disclosure.

FIG. 22 illustrates a flowchart of a method 2200 of UE for receiving the set of RSs according to embodiments of the present disclosure. The method 2200 as may be performed by a UE (e.g., 111-116 as illustrated in FIG. 1). An embodiment of the method 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions.

As illustrated in FIG. 22, a flowchart illustrates the above described procedures of UE receiving from the network the set of RS (such as SSB) (re-)indexing configurations/rules and the MAC CE activation command/bitmap is presented. The UE could be higher layer configured by the network (e.g., via higher layer RRC signaling) a pool of TCI states.

In one example, one or more TCI states in the TCI state pool indicating the non-serving (or neighboring) cell RSs such as the non-serving (or neighboring) cell SSBs could form a TCI state group. A TCI state group ID could be indicated/incorporated in a TCI state (e.g., in the higher layer parameter TCI-State/QCL-Info).

value such as PCI value, TRP ID value, CORESETPoolIndex value or other TRP-specific higher layer signaling index values could form a TCI state group. A TCI state group ID could be indicated/incorporated in a TCI state (e.g., in the higher layer parameter TCI-State/QCL-Info).

In one embodiment, means of using a one-bit flag and/or a multi-bit indicator in TCI state/QCL information to indicate serving or non-serving (or neighboring) cell information are provided.

For an inter-cell system comprising of a serving cell/TRP and a single non-serving (or neighboring) cell/TRP, a one-bit flag indicator could be indicated in the higher layer parameter TCI-State/QCL-Info to differentiate between the serving cell RS(s) and the non-serving (or neighboring) cell RS(s). For instance, consider an inter-cell system comprising of TRP-1 as the serving cell TRP and TRP-2 as the non-serving (or neighboring) cell TRP. If the UE is indicated by the network a TCI state with the 1-bit flag indicator set to "0" (or "OFF" or "FALSE") or not configured/present, the UE would expect that the QCL source RS indicated in the higher layer parameter QCL-Info/TCI-State is transmitted from/ associated with/configured for the serving cell TRP-1. Otherwise, if the UE is indicated by the network a TCI state with the 1-bit flag indicator set to "1" (or "ON" or "TRUE"), the UE would expect that the QCL source RS indicated in the higher layer parameter QCL-Info/TCI-State is transmitted from/associated with/configured for the non-serving (or neighboring) cell TRP-2 in the inter-cell system. A snippet of the higher layer parameter QCL-Info incorporating the one-bit flag indicator (nsc-flag) is shown in TABLE 12.

TABLE 12

Higher layer parameter QCL-Info including/indicating a one-bit flag

```
QCL-Info ::= SEQUENCE {
    cell ServCellIndex OPTIONAL, -- Need R
    bwp-Id BWP-Id OPTIONAL,
    nsc-flag ENUMERATED {true} OPTIONAL, -- Need R
    referenceSignal CHOICE {
        csi-rs NZP-CSI-RS-ResourceId,
        ssb SSB-Index
    },
    qcl-Type ENUMERATED {typeA, typeB, typeC, typeD},
    ...
}
```

The UE could be higher layer configured by the network (e.g., via higher layer RRC signaling) a pool of TCI states. One or more TCI states in the TCI state pool indicating the same one-bit flag indicator value ("1"/"ON"/"TRUE" or "0"/"OFF"/"FALSE") could form a TCI state group. A TCI state group ID could be indicated/incorporated in a TCI state (e.g., in the higher layer parameter TCI-State/QCL-Info).

If more than one (N_nsc>1) non-serving (or neighboring) cells/TRPs are configured in the inter-cell system, a multi-bit (e.g., n_b bits) indicator could be incorporated/indicated in the higher layer parameter QCL-Info/TCI-State to indicate the serving cell RSs and/or the non-serving (or neighboring) cell RSs from the N_nsc non-serving (or neighboring) cells as the QCL source RSs. The number of bits n_b required for representing the multi-bit indicator could be ceil (log 2(N_nsc+1)), where ceil(x) rounds x up to the next largest integer. In this case, the n_b-bit indicator could correspond to 2^(n_b) states, and one of the states (e.g., the first state) could correspond to the serving cell/TRP, and the rest of the states could correspond to the non-serving (or neighboring) cells/TRPs. For example, if n_b=2, the corresponding four states are "00," "01," "10," and "11."

The first state "00" could correspond to the serving cell, and the rest of the three states could correspond to the non-serving (or neighboring) cells. If, e.g., "00" is indicated in the higher layer parameter QCL-Info/TCI-State, the UE would expect that the QCL source RS indicated in the corresponding TCI state is transmitted from/associated with/configured for the serving cell/TRP. Alternatively, the number of bits n_b required for representing the multi-bit indicator could be ceil(log 2(N_nsc)). In this case, the multi-bit indicator only indicates/identifies the RSs from the N_nsc non-serving (or neighboring) cells/TRPs in the higher layer parameter QCL-Info/TCI-State if/when the RSs are configured as the QCL source RSs; if the multi-bit indicator is not present/configured in the higher layer parameter QCL-Info/TCI-State, the UE would expect that the QCL source RS(s) indicated in the corresponding TCI state(s) is from/associated with/configured for the serving cell/TRP.

Under this setting, all of the 2^(n_b) states would only correspond to the N_nsc non-serving (or neighboring) cells. The UE could be configured by the network through higher layer RRC signaling the association rule(s)/mapping relationship(s) between the states of the multi-bit indicator and the serving/non-serving (or neighboring) cells/TRPs. For example, the UE could be first higher layer configured by the network (e.g., via higher layer RRC signaling) a list/set/pool of TRP-specific index/ID values such as PCI values, TRP ID values, CORESETPoolIndex values or other TRP-specific higher layer signaling index values. The higher layer configured list/set/pool of TRP-specific index/ID values could contain the TRP-specific index/ID values for both the serving cell/TRP and the non-serving (or neighboring) cells/TRPs in the inter-cell system or the TRP-specific index/ID values for only the non-serving (or neighboring) cells/TRPs.

The first state or the state of the multi-bit indicator having the smallest value could correspond to the first entry in the higher layer configured list/set/pool of TRP-specific index/ID values, the second state or the state of the multi-bit indicator having the second smallest value could correspond to the second entry in the higher layer configured list/set/pool of TRP-specific index/ID values, and so on, and the last state or the state of the multi-bit indicator having the largest value could correspond to the last entry in the higher layer configured list/set/pool of TRP-specific index/ID values.

Alternatively, the UE could know the association rule(s)/mapping relationship(s) between the states of the multi-bit indicator and the serving/non-serving (or neighboring) cells/TRPs in an implicit manner. For instance, the first state or the state of the multi-bit indicator having the smallest value could correspond to the serving/non-serving (or neighboring) cell/TRP with the lowest PCI, the second state or the state of the multi-bit indicator having the second smallest value could correspond to the serving/non-serving (or neighboring) cell/TRP with the second lowest PCI, and so on, and the last state or the state of the multi-bit indicator having the largest value could correspond to the serving/non-serving (or neighboring) cell/TRP with the highest PCI.

As shown in TABLE 13, one example characterizing the above described mapping relationship between the states of the multi-bit indicator and the serving/non-serving (or neighboring) cells/TRPs is presented. In this example, the PCIs for the serving cell and three (N_nsc=3) non-serving (or neighboring) cells are #20, #3, #19 and #40, and are mapped to "10," "00," "01," and "11," respectively. Note that other implicit association rule(s)/mapping relationship(s) than that shown in TABLE 13 are also possible.

TABLE 13

States of multi-bit indicator

| States of multi-bit indicator | PCIs of serving/non-serving (or neighboring) cells/TRPs |
|---|---|
| 00 | Non-serving (or neighboring) cell/TRP with PCI #3 |
| 01 | Non-serving (or neighboring) cell/TRP with PCI #19 |
| 10 | Serving cell/TRP with PCI #20 |
| 11 | Non-serving (or neighboring) cell/TRP with PCI #40 |

The UE could be higher layer configured by the network (e.g., via higher layer RRC signaling) a pool of TCI states.

In one example, one or more TCI states in the TCI state pool indicating the same multi-bit indicator value or the same state of the multi-bit indicator could form a TCI state group. A TCI state group ID could be indicated/incorporated in a TCI state (e.g., in the higher layer parameter TCI-State/QCL-Info).

In another example, one or more TCI states in the TCI state pool indicating the multi-bit indicator values or the states of the multi-bit indicator associated with the TRP-specific index/ID values such as PCI values, TRP ID values, CORESETPoolIndex values or other TRP-specific higher layer signaling index values different from that of the serving cell/TRP could form a TCI state group. A TCI state group ID could be indicated/incorporated in a TCI state (e.g., in the higher layer parameter TCI-State/QCL-Info).

In one embodiment, means of using (reserved) ServCellIndex value(s) to indicate/identify non-serving (or neighboring) cell RS(s) in TCI state/QCL information are provided.

One or more serving cell indices/IDs (SCIs) (corresponding to one or more values of ServCellIndex in the higher layer parameter QCL-Info) could be reserved to indicate/identify one or more non-serving (or neighboring) cell RSs in the higher layer parameter QCL-Info/TCI-State. The UE could be indicated by the network the exact SCIs or the exact values of the higher layer parameter ServCellIndex reserved for indicating/identifying one or more non-serving (or neighboring) cell RSs. For example, a 3-bit ServCellIndex field could be configured in the higher layer parameter QCL-Info to indicate 8 candidate SCIs, denoted by SCI #0, SCI #1, SCI #2, SCI #3, SCI #4, SCI #5, SCI #6 and SCI #7. Furthermore, in this example, SCI #5, SCI #6 and SCI #7 are reserved for indicating/identifying one or more non-serving (or neighboring) cell RSs as the QCL source RSs. Consider an inter-cell multi-TRP system comprising of a serving cell/TRP and a single non-serving (or neighboring) cell/TRP. If any value of SCI #5, SCI #6 and SCI #7 is configured as the ServCellIndex in the higher layer parameter QCL-Info, the UE would expect that the QCL source RS(s) indicated in the corresponding TCI state is from/associated with/configured for the non-serving (or neighboring) cell/TRP.

If more than one (N_nsc>1) non-serving (or neighboring) cells/TRPs are configured in the inter-cell system, the UE could be indicated by the network one or more mapping relationships/association rules between the SCI(s) reserved for identifying/indicating the non-serving (or neighboring) cell RS(s) in the higher layer parameter QCL-Info and the non-serving (or neighboring) cells or/and the non-serving (or neighboring) cell RS(s); this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

For the indication of the SCI(s) reserved for identifying/indicating the non-serving (or neighboring) cell RS(s) in the higher layer parameter QCL-Info: (1) in one example, the UE could be indicated by the network, e.g., via higher layer RRC signaling and/or dynamic DCI signaling, the exact value(s) of SCI or ServCellIndex reserved for identifying/indicating the non-serving (or neighboring) cell RS(s) in the higher layer parameter QCL-Info; and (2) In another example, the UE could be first higher layer configured by the network (e.g., via higher layer RRC signaling) a list/set/pool of SCIs (SCI/ServCellIndex values) reserved for identifying/indicating the non-serving (or neighboring) cell RS(s) in the higher layer parameter QCL-Info. The UE could then receive from the network a MAC CE command activating one or more SCIs (SCI/ServCellIndex values) from the higher layer configured list/set/pool of SCIs.

In yet another example, the UE could receive from the network a bitmap with each entry/bit in the bitmap corresponding to a SCI (SCI/ServCellIndex value). If an entry/bit in the bitmap is set to "1," the corresponding/associated SCI/ServCellIndex value is activated for identifying/indicating the non-serving (or neighboring) cell RS(s) in the higher layer parameter QCL-Info.

For the association between the SCI(s) (or SCI/ServCellIndex value(s)) reserved for identifying/indicating the non-serving (or neighboring) cell RS(s) in the higher layer parameter QCL-Info and the non-serving (or neighboring) cells or/and non-serving (or neighboring) cell RSs, in one example, for all TCI states (e.g., all TCI states higher layer configured in a TCI state pool), the same SCI/ServCellIndex value reserved for identifying/indicating the non-serving (or neighboring) cell RS(s) in the higher layer parameter QCL-Info is associated with a single non-serving (or neighboring) cell/TRP, and therefore, all the non-serving (or neighboring) cell RS(s) associated with/configured for the non-serving (or neighboring) cell/TRP. For all TCI states higher layer configured in the TCI state pool, the UE could be explicitly indicated by the network how the reserved SCI(s) (or SCI/ServCellIndex value(s)) are associated with the non-serving (or neighboring) cells/TRPs. For instance, for all TCI states higher layer configured in the TCI state pool, the UE could be first higher layer configured by the network (e.g., via higher layer RRC signaling) a list/set/pool of TRP-specific index/ID values such as PCI values, TRP ID values, CORESETPoolIndex values or other TRP-specific higher layer signaling index values for the non-serving (or neighboring) cells/TRPs; the first reserved SCI/ServCellIndex value or the lowest reserved SCI/ServCellIndex value could correspond to the first entry in the higher layer configured list/set/pool of TRP-specific index/ID values, the second reserved SCI/ServCellIndex value or the second lowest reserved SCI/ServCellIndex value could correspond to the second entry in the higher layer configured list/set/pool of TRP-specific index/ID values, and so on, and the last reserved SCI/ServCellIndex value or the highest reserved SCI/ServCellIndex value could correspond to the last entry in the higher layer configured list/set/pool of TRP-specific index/ID values.

For the association between the SCI(s) (or SCI/ServCellIndex value(s)) reserved for identifying/indicating the non-serving (or neighboring) cell RS(s) in the higher layer parameter QCL-Info and the non-serving (or neighboring) cells or/and non-serving (or neighboring) cell RSs, in another example, for all TCI states (e.g., all TCI states higher layer configured in a TCI state pool), the same SCI/ServCellIndex value reserved for identifying/indicating the non-serving (or neighboring) cell RS(s) in the higher layer parameter QCL-Info is associated with a single non-serving (or neighboring) cell/TRP, and therefore, all the non-serving (or neighboring) cell RS(s) associated with/configured for the non-serving (or neighboring) cell/TRP. For all TCI states higher layer configured in the TCI state pool, the first reserved SCI/ServCellIndex value or the lowest reserved SCI/ServCellIndex value could correspond to the non-serving (or neighboring) cell/TRP associated with the lowest TRP-specific index/ID value such as the lowest PCI value, the second reserved SCI/ServCellIndex value or the second lowest reserved SCI/ServCellIndex value could correspond to the non-serving (or neighboring) cell/TRP associated with the second lowest TRP-specific index/ID value such as the second lowest PCI value, and so on, and the last reserved SCI/ServCellIndex value or the highest reserved SCI/ServCellIndex value could correspond to the non-serving (or neighboring) cell/TRP associated with the highest TRP-specific index/ID value such as the highest PCI value.

For the association between the SCI(s) (or SCI/ServCellIndex value(s)) reserved for identifying/indicating the non-serving (or neighboring) cell RS(s) in the higher layer parameter QCL-Info and the non-serving (or neighboring) cells or/and non-serving (or neighboring) cell RSs, in yet another example, for a subset of all TCI states (e.g., a subset of all TCI states higher layer configured in a TCI state pool), the same SCI/ServCellIndex value reserved for identifying/indicating the non-serving (or neighboring) cell RS(s) in the higher layer parameter QCL-Info is associated with a single non-serving (or neighboring) cell/TRP, and therefore, all the non-serving (or neighboring) cell RS(s) associated with/configured for the non-serving (or neighboring) cell/TRP. For a given subset (indicated to the UE by the network) of all TCI states higher layer configured in the TCI state pool, the UE could be explicitly indicated by the network how the reserved SCI(s) (or SCI/ServCellIndex value(s)) are associated with the non-serving (or neighboring) cells/TRPs. For instance, for a given subset (indicated to the UE by the network) of all TCI states higher layer configured in the TCI state pool, the UE could be first higher layer configured by the network (e.g., via higher layer RRC signaling) a list/set/pool of TRP-specific index/ID values such as PCI values, TRP ID values, CORESETPoolIndex values or other TRP-specific higher layer signaling index values for the non-serving (or neighboring) cells/TRPs; the first reserved SCI/ServCellIndex value or the lowest reserved SCI/ServCellIndex value could correspond to the first entry in the higher layer configured list/set/pool of TRP-specific index/ID values, the second reserved SCI/ServCellIndex value or the second lowest reserved SCI/ServCellIndex value could correspond to the second entry in the higher layer configured list/set/pool of TRP-specific index/ID values, and so on, and the last reserved SCI/ServCellIndex value or the highest reserved SCI/ServCellIndex value could correspond to the last entry in the higher layer configured list/set/pool of TRP-specific index/ID values. For all TCI states (e.g., all TCI states higher layer configured in a TCI state pool), the same SCI/ServCellIndex value reserved for identifying/indicating the non-serving (or neighboring) cell RS(s) in the higher layer parameter QCL-Info could correspond to more than one non-serving (or neighboring) cells/TRPs.

For the association between the SCI(s) (or SCI/ServCellIndex value(s)) reserved for identifying/indicating the non-serving (or neighboring) cell RS(s) in the higher layer parameter QCL-Info and the non-serving (or neighboring) cells or/and non-serving (or neighboring) cell RSs, in yet another example, for a subset of all TCI states (e.g., a subset of all TCI states higher layer configured in a TCI state pool), the same SCI/ServCellIndex value reserved for identifying/indicating the non-serving (or neighboring) cell RS(s) in the higher layer parameter QCL-Info is associated with a single non-serving (or neighboring) cell/TRP, and therefore, all the non-serving (or neighboring) cell RS(s) associated with/configured for the non-serving (or neighboring) cell/TRP. For a given subset (indicated to the UE by the network) of all TCI states higher layer configured in the TCI state pool, the first reserved SCI/ServCellIndex value or the lowest reserved SCI/ServCellIndex value could correspond to the non-serving (or neighboring) cell/TRP associated with the lowest TRP-specific index/ID value such as the lowest PCI value, the second reserved SCI/ServCellIndex value or the second lowest reserved SCI/ServCellIndex value could correspond to the non-serving (or neighboring) cell/TRP associated with the second lowest TRP-specific index/ID value such as the second lowest PCI value, and so on, and the last reserved SCI/ServCellIndex value or the highest reserved SCI/ServCellIndex value could correspond to the non-serving (or neighboring) cell/TRP associated with the highest TRP-specific index/ID value such as the highest PCI value. For all TCI states (e.g., all TCI states higher layer configured in a TCI state pool), the same SCI/ServCellIndex value reserved for identifying/indicating the non-serving (or neighboring) cell RS(s) in the higher layer parameter QCL-Info could correspond to more than one non-serving (or neighboring) cells/TRPs.

Consider an inter-cell multi-TRP system comprising of two non-serving (or neighboring) cell TRPs, denoted by TRP-2 and TRP-3, and three SCI/ServCellIndex values SCI #5, SCI #6 and SCI #7 reserved for identifying/indicating one or more non-serving (or neighboring) cell RSs in the higher layer parameter QCL-Info/TCI-State. Furthermore, SCI #5 could be used to indicate that the QCL source RS(s) indicated in the higher layer parameter QCL-Info/TCI-State is from the non-serving (or neighboring) cell TRP-2, while SCI #6 could be used to indicate that the QCL source RS(s) indicated in the higher layer parameter QCL-Info/TCI-State is from the non-serving (or neighboring) cell TRP-3. That is, if SCI #5 is configured as ServCellIndex in the higher layer parameter QCL-Info, the UE would expect that the QCL source RS indicated in the corresponding TCI state is from/associated with the non-serving (or neighboring) cell TRP-2. If SCI #6 is configured as ServCellIndex in the higher layer parameter QCL-Info, the UE would expect that the QCL source RS indicated in the corresponding TCI state is from/associated with the non-serving (or neighboring) cell TRP-3.

TABLE 14

Association between the same SCI/ServCellIndex value and non-serving (or neighboring) cells/TRPs

| TCI state IDs | PCI of a non-serving (or neighboring) cell (RS from the non-serving or neighboring cell) | RS index/ID in QCL-Info/TCI-State |
|---|---|---|
| SCI #m (reserved for indicating non-serving (or neighboring) cell RSs in QCL-Info/TCI-State) | | |
| 0000 | #PCI0_m (#RS0_0) | #RS_ID0_m |
| 0001 | #PCI0_m (#RS1_0) | #RS_ID1_m |
| 0010 | #PCI0_m (#RS2_0) | #RS_ID2_m |
| 0011 | #PCI1_m (#RS0_1) | #RS_ID3_m |
| 0100 | #PCI1_m (#RS1_1) | #RS_ID4_m |
| 0101 | #PCI1_m (#RS2_1) | #RS_ID5_m |
| ... | ... | ... |
| SCI #n (reserved for indicating non-serving (or neighboring) cell RSs in QCL-Info/TCI-State) | | |
| 0000 | #PCI0_n (#RS3_0) | #RS_ID0_n |
| 0001 | #PCI0_n (#RS4_0) | #RS_ID1_n |
| 0010 | #PCI0_n (#RS5_0) | #RS_ID2_n |
| 0011 | #PCI1_n (#RS3_1) | #RS_ID3_n |
| 0100 | #PCI1_n (#RS4_1) | #RS_ID4_n |
| 0101 | #PCI1_n (#RS5_1) | #RS_ID5_n |
| ... | ... | ... |

Consider an inter-cell multi-TRP system comprising of two non-serving (or neighboring) cell TRPs, denoted by TRP-2 and TRP-3, and three SCI/ServCellIndex values SCI #5, SCI #6 and SCI #7 reserved for identifying/indicating one or more non-serving (or neighboring) cell RSs in the higher layer parameter QCL-Info/TCI-State. Furthermore, a total of 64 TCI states are higher layer configured in the TCI state pool. For a given reserved SCI/ServCellIndex value in the higher layer parameter QCL-Info, e.g., SCI #5, the 64 candidate TCI states could be divided into two sets/groups (or two subsets of all TCI states), and each set/group of TCI states (or each subset of all TCI states) could indicate one or more non-serving (or neighboring) cell RSs from one non-serving (or neighboring) cell (either TRP-2 or TRP-3 in this example) as the QCL source RSs. For instance, for SCI #5, the TCI states with TCI state IDs #0-#31 could indicate SSBs #0-#31 from TRP-2 as the QCL source RSs, and the TCI states with TCI state IDs #32-#63 could indicate SSBs #0-#31 from TRP-3 as the QCL source RSs. That is, if SCI #5 is configured as ServCellIndex in the higher layer parameter QCL-Info in the TCI state with TCI state ID #10, the UE would expect that SSB #10 from the non-serving (or neighboring) cell TRP-2 is indicated as the QCL source RS. If SCI #5 is configured as ServCellIndex in the higher layer parameter QCL-Info in the TCI state with TCI state ID #32, the UE would expect that SSB #0 from the non-serving (or neighboring) cell TRP-3 is indicated as the QCL source RS. For a given reserved SCI/ServCellIndex value in the higher layer parameter QCL-Info, if the total number of RSs from all the non-serving (or neighboring) cells/TRPs is beyond the total number of TCI states in the TCI state pool, additional reserved SCIs could be configured in the higher layer parameter QCL-Info/TCI-State to identify/indicate the non-serving (or neighboring) cell RS(s).

In TABLE 14, an example showing the association between the same SCI/ServCellIndex value configured in the higher layer parameter QCL-Info/TCI-State and more than one non-serving (or neighboring) cells/TRPs is presented. In this example, for a given SCI/ServCellIndex value reserved for identifying/indicating the non-serving (or neighboring) cell RS(s) in the higher layer parameter QCL-Info/TCI-State, different TCI states with different TCI state IDs (and therefore, different RS indices/IDs in the QCL-Info/TCI-State) could correspond to different non-serving (or neighboring) cell PCIs, and therefore, their corresponding RSs. For instance, for the reserved SCI #m shown in TABLE 14, TCI state with TCI state ID "0000" and #RS_ID0_m (RS index/ID in the TCI state with TCI state ID "0000") corresponds to #RS0_0 from #PCI0_m; furthermore, TCI state with TCI state ID "0011" and #RS_ID3_m (RS index/ID in the TCI state with TCI state ID "0011") corresponds to #RS0_1 from #PCI1_m. For the reserved SCI #n shown in TABLE 14, TCI state with TCI state ID "0000" and #RS_ID0_n (RS index/ID in the TCI state with TCI state ID "0000") corresponds to #RS3_0 from #PCI0_n; furthermore, TCI state with TCI state ID "0011" and #RS_ID3_n (RS index/ID in the TCI state with TCI state ID "0011") corresponds to #RS3_1 from #PCI1_n.

The UE could be higher layer configured by the network (e.g., via higher layer RRC signaling) a pool of TCI states. In one example, one or more TCI states in the TCI state pool indicating the same SCI/ServCellIndex value could form a TCI state group. A TCI state group ID could be indicated/incorporated in a TCI state (e.g., in the higher layer parameter TCI-State/QCL-Info). In another example, one or more TCI states in the TCI state pool indicating the SCI/ServCellIndex values associated with/linked to the same TRP-specific index/ID value such as PCI value, TRP ID value, CORESETPoolIndex value or other TRP-specific higher layer signaling index values could form a TCI state group. A TCI state group ID could be indicated/incorporated in a TCI state (e.g., in the higher layer parameter TCI-State/QCL-Info).

In one embodiment, combinations of different methods to indicate non-serving (or neighboring) cell RS(s) in TCI state/QCL information are provided.

The UE could be indicated by the network whether/how the non-serving (or neighboring) cell RS(s) would be indicated in the corresponding TCI state as the QCL source RS(s); this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, the UE could be indicated by the network, e.g., via higher layer RRC signaling or/and dynamic DCI signaling, how the non-serving (or neighboring) cell RS(s) would be indicated in the TCI state as the QCL source RS(s), e.g., via the explicit non-serving (or neighboring) cell RS indication in TCI state/QCL information or/and via the implicit non-serving (or neighboring) cell RS (re-)indexing in TCI state/QCL information or/and etc.

In another example, the UE could be first higher layer configured by the network a list of candidate methods for indicating the non-serving (or neighboring) cell RS(s) in the TCI state(s) (e.g., explicit non-serving (or neighboring) cell RS indication in TCI state and implicit non-serving (or neighboring) cell RS (re-)indexing in TCI state). The UE could then receive from the network a MAC CE command activating at least one method from the higher layer configured list of candidate methods for indicating the non-serving (or neighboring) cell RS(s) in the TCI state(s). In yet another example, the UE could receive from the network a bitmap with each entry/bit in the bitmap corresponding to a candidate method for indicating the non-serving (or neighboring) cell RS(s) in the TCI state(s). If an entry/bit in the bitmap is set to "1," the corresponding method for indicating the non-serving (or neighboring) cell RS(s) in the TCI state(s) is activated.

The determination of how the non-serving (or neighboring) cell RS(s) may be indicated in the corresponding TCI state as the QCL source RS(s) could be based on one or more triggering conditions. The triggering condition(s) could be based on UE's capability or/and preference reporting/signaling. An algorithm flowchart illustrating how the network would determine between the explicit non-serving (or neighboring) cell RS indication in TCI state/QCL information and implicit non-serving (or neighboring) cell RS (re-)indexing in TCI state/QCL information is illustrated in FIG. 23.

Figure 23:
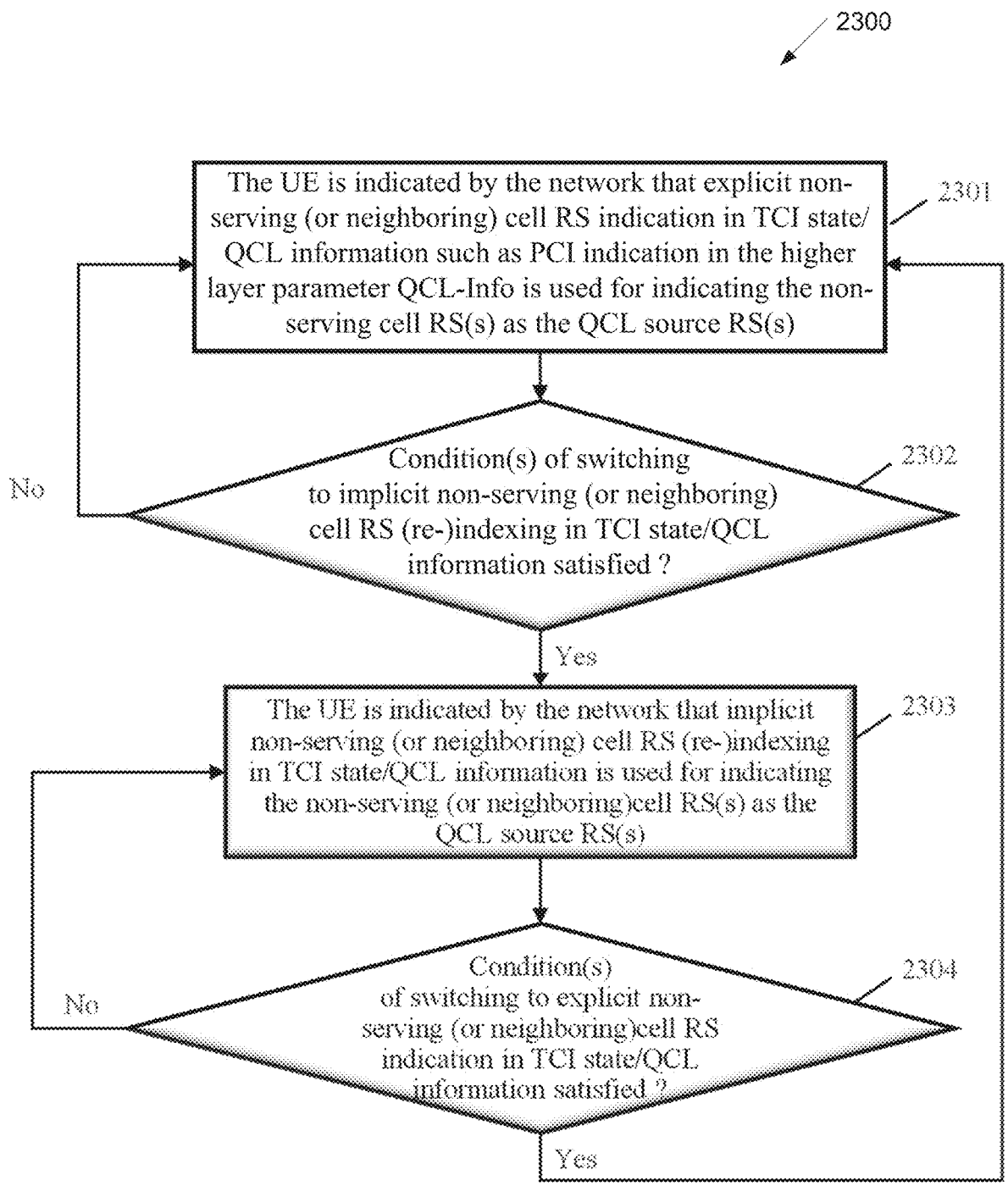
FIG. 23 illustrates a flowchart of a method of network for determining between the explicit non-serving (or neighboring) cell RS indication in TCI state/QCL information and implicit non-serving (or neighboring) cell RS (re-)indexing in TCI state/QCL information according to embodiments of the present disclosure.

FIG. 23 illustrates a flowchart of a method 2300 of network for determining between the explicit non-serving (or neighboring) cell RS indication in TCI state/QCL information and implicit non-serving (or neighboring) cell RS (re-)indexing in TCI state/QCL information according to embodiments of the present disclosure. The method 2300 as may be performed by a UE (e.g., 111-116 as illustrated in FIG. 1). An embodiment of the method 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions.

As illustrated in FIG. 23, in step 2301, the UE is indicated by the network that the explicit non-serving (or neighboring) cell RS indication in TCI state/QCL information is used for indicating one or more RSs from one or more non-serving (or neighboring) cells/TRPs in the inter-cell system as the QCL source RSs. As discussed before, the explicit non-serving (or neighboring) cell RS indication in TCI state/QCL information could be realized via indicating the TRP-specific index/ID value such as PCI value, TRP ID value, CORESETPoolIndex value and/or other TRP-specific higher layer signaling index values in the higher layer parameter QCL-Info/TCI-State.

In step 2302, one or more conditions of switching from the explicit non-serving (or neighboring) cell RS indication in TCI state/QCL information to the implicit non-serving (or neighboring) cell RS (re-)indexing in TCI state/QCL information are checked. The condition(s) could include but is not limited to: PCI/TRP ID collision is observed between the serving cell/TRP and one or more non-serving (or neighboring) cells/TRPs, the signaling overhead of the explicit non-serving (or neighboring) cell RS indication in TCI state/QCL information is larger than a threshold and etc. The condition(s) could be based on UE's capability and/or preference signaling as well. For instance, the UE could indicate to the network that the UE prefers the implicit non-serving (or neighboring) cell RS (re-)indexing over the explicit non-serving (or neighboring) cell RS indication in TCI state/QCL information.

In step 2303, the UE is indicated by the network that the implicit non-serving (or neighboring) cell RS (re-)indexing in TCI state/QCL information is used for indicating one or more RSs from one or more non-serving (or neighboring) cells/TRPs in the inter-cell system as the QCL source RSs.

In step 2304, one or more conditions of switching from the implicit non-serving (or neighboring) cell RS (re-)indexing in TCI state/QCL information to the explicit non-serving (or neighboring) cell RS indication in TCI state/QCL information are checked. The condition(s) could include but is not limited to: PCI/TRP ID collision is no longer observed between the serving cell/TRP and one or more non-serving (or neighboring) cells/TRPs, the signaling overhead of the implicit non-serving (or neighboring) cell RS (re-)indexing in TCI state/QCL information is larger than a threshold and etc. The condition(s) could be based on UE's capability and/or preference signaling as well. For instance, the UE could indicate to the network that the UE prefers the explicit non-serving (or neighboring) cell RS indication over the implicit non-serving (or neighboring) cell RS (re-)indexing in TCI state/QCL information.

If the condition(s) in step 2302 is satisfied/achieved, the algorithm proceeds to step 2303; otherwise, the algorithm goes back to step 2301. If the condition(s) in step 2304 is satisfied/achieved, the algorithm goes to 2301; otherwise, the algorithm goes back to step 2303. Furthermore, the network could transmit to the UE one or more switching commands to switch between the explicit non-serving (or neighboring) cell RS indication in TCI state/QCL information and the implicit non-serving (or neighboring) cell RS (re-)indexing in TCI state/QCL information; the switching command could be a flag indicator. Similar triggering condition(s) and switching command(s)/procedure(s) to those shown in FIG. 23 can be defined/specified for other non-serving (or neighboring) cell RS indication (in TCI state/QCL information) methods.

Various methods of indicating the non-serving (or neighboring) cell RS(s) in the TCI state(s), such as the explicit non-serving (or neighboring) cell RS indication in TCI state/QCL information, implicit non-serving (or neighboring) cell RS (re-)indexing in TCI state/QCL information, reserving SCI/ServCellIndex values for identifying/indicating non-serving (or neighboring) cell RS(s) in TCI state/QCL information, incorporating/indicating one-bit flag/multi-bit indicator in the higher layer parameter TCI-State/QCL-Info and etc., could be combined, or jointly used to indicate the non-serving (or neighboring) cell RS(s) in TCI state/QCL information. For instance, explicit PCI value indication in the higher layer parameter TCI-State/QCL-Info could be applied to a certain range of PCIs (e.g., 0-511); while for the rest of the PCIs (e.g., 512-1008), the implicit non-serving (or neighboring) cell SSB (re-)indexing strategy could be used.

As aforementioned above, the UE could be indicated by the network, e.g., via higher layer RRC signaling or/and dynamic DCI signaling, how the non-serving (or neighboring) cell RS(s) would be indicated in the TCI state(s) as the QCL source RS(s), e.g., via the explicit non-serving (or neighboring) cell RS indication in TCI state/QCL information or via the implicit non-serving (or neighboring) cell RS (re-)indexing in TCI state/QCL information or via both. Alternatively, the UE could autonomously determine how the non-serving (or neighboring) cell RS(s) may be indicated in the TCI state(s) as the QCL source RS(s). In this case, the UE may indicate to the network their preference/determination of the non-serving (or neighboring) cell RS(s) indication (in TCI state/QCL information) method(s).

In one embodiment, means of associating non-serving (or neighboring) cell RS configuration information with TCI state are provided.

The UE could be higher layer configured by the network (e.g., via higher layer RRC signaling) necessary non-serving (or neighboring) cell RS configuration information (such as non-serving (or neighboring) cell SSB time-domain position information) for the inter-cell operation. The configured non-serving (or neighboring) cell RS configuration information could be associated with one or more TCI states indicating one or more non-serving (or neighboring) cell RSs such as SSBs as the QCL source RSs. The non-serving (or neighboring) cell RS (or SSB) configuration information could include one or more of the following: SSB frequency, SSB periodicity, SSB burst pattern, SSB time-domain position in a SSB burst, SSB transmit power, SSB subcarrier spacing (SCS), and PCI information for one or more non-serving (or neighboring) cells/TRPs in the inter-cell system. Certain non-serving (or neighboring) cell SSB configuration information could be configured in the existing higher layer RRC parameters such as MeasObjectNR for RRM and/or SSB-Configuration-r16/SSB-InfoNcell-r16 for positioning. Snippets of MeasObjectNR, SSB-InfoNcell-r16 and SSB-Configuration-r16 are given in TABLES 15, 16, and 17.

Four design options of providing the UE necessary non-serving (or neighboring) cell SSB configuration information for the inter-cell operation is presented below. In one example of Option-1, the UE is configured by the network MeasObjectNR and other necessary additional non-serving (or neighboring) cell SSB configuration information/parameters to those in MeasObjectNR for the inter-cell operation.

In one example of Option-2, the UE is configured by the network SSB-Configuration-r16/SSB-InfoNcell-r16 and other necessary additional non-serving (or neighboring) cell SSB configuration information/parameters to those in SSB-Configuration-r16/SSB-InfoNcell-r16 for the inter-cell operation.

In one example of Option-3, the UE is configured by the network MeasObjectNR and SSB-Configuration-r16/SSB-InfoNcell-r16 and other necessary additional non-serving (or neighboring) cell SSB configuration information/parameters to those in MeasObjectNR and SSB-Configuration-r16/SSB-InfoNcell-r16 for the inter-cell operation.

In one example of Option-4, the UE is configured by the network one or more new RRC parameters (e.g., two RRC parameters denoted by SSB-Configuration-InterCell and SSB-InfoNcell-InterCell) containing all necessary non-serving (or neighboring) cell RS (SSB) configuration information/parameters for the inter-cell operation.

TABLE 15

Higher layer parameter MeasObjectNR

```
MeasObjectNR :: = SEQUENCE {
    ssbFrequency ARFCN-ValueNR OPTIONAL, -- Cond SSBorAssociatedSSB
    ssbSubcarrierSpacing SubcarrierSpacing OPTIONAL, -- Cond SSBorAssociatedSSB
    smtc1 SSB-MTC OPTIONAL, -- Cond SSBorAssociatedSSB
    smtc2 SSB-MTC2 OPTIONAL, -- Cond IntraFreqConnected
    refFreqCSI-RS ARFCN-ValueNR OPTIONAL, -- Cond CSI-RS
    referenceSignalConfig ReferenceSignalConfig,
    absThreshSS-BlocksConsolidation ThresholdNR OPTIONAL, -- Need R
    absThreshCSI-RS-Consolidation ThresholdNR OPTIONAL, -- Need R
    nrofSS-BlocksToAverage INTEGER (2..maxNrofSS-BlocksToAverage) OPTIONAL, --
Need R
    nrofCSI-RS-ResourcesToAverage INTEGER (2..maxNrofCSI-RS-ResourcesToAverage)
OPTIONAL -- Need R
    quantityConfigIndex INTEGER (1..maxNrofQuantityConfig),
    offsetMO Q-OffsetRangeList,
    cellsToRemoveList PCI-List OPTIONAL, -- Need N
    cellsToAddModList CellsToAddModList OPTIONAL, -- Need N
    ...
}
```

TABLE 16

Higher layer parameter SSB-InfoNcell-r16

```
SSB-InfoNcell-r16 ::= SEQUENCE {
    physicalCellId-r16 PhysCellId,
    ssb-IndexNcell-r16 SSB-Index OPTIONAL, -- Need S
    ssb-Configuration-r16 SSB-Configuration-r16 OPTIONAL -- Need S
}
```

TABLE 17

Higher layer parameter SSB-Configuration-r16

```
SSB-Configuration-r16 ::= SEQUENCE {
    ssb-Freq-r16 ARFCN-ValueNR,
    halfFrameIndex-r16 ENUMERATED {zero, one},
    ssbSubcarrierSpacing-r16 SubcarrierSpacing,
    ssb-Periodicity-r16 ENUMERATED { ms5, ms10, ms20, ms40, ms80,
ms160, spare2, spare1 } OPTIONAL, -- Need S
    sfn0-Offset-r16 SEQUENCE {
        sfn-Offset-r16 INTEGER (0..1023),
        integerSubframeOffset-r16 INTEGER (0..9) OPTIONAL -- Need R
    } OPTIONAL, -- Need R
    sfn-SSB-Offset-r16 INTEGER (0..15),
    ss-PBCH-BlockPower-r16 INTEGER (-60..50) OPTIONAL -- Cond
Pathloss
}
```

For Option-1, Option-2 and Option-3 as aforementioned above, the UE could be higher layer configured/indicated by the network whether MeasObjectNR and/or SSB-Configuration-r16/SSB-InfoNcell-r16 are configured for the purpose of inter-cell operation or RRM/positioning. For instance, a one-bit flag indicator could be incorporated/indicated in the higher layer parameters MeasObjectNR and/or SSB-Configuration-r16/SSB-InfoNcell-r16. If the flag indicator is set to "i" or "on" or "true," the corresponding RRC parameter MeasObjectNR or SSB-Configuration-r16/SSB-InfoNcell-r16 is configured for the inter-cell operation. Otherwise, if the flag indicator is set to "0" or "off" or "false" or not present, the corresponding RRC parameter MeasObjectNR or SSB-Configuration-r16/SSB-InfoNcell-r16 is configured for RRM (MeasObjectNR) or positioning (SSB-Configuration-r16/SSB-InfoNcell-r16).

The TRP-specific index/ID value such as PCI value, TRP ID value, CORES ETPoolIndex value or other TRP-specific higher layer signaling index values for the serving cell/TRP and/or one or more non-serving (or neighboring) cells/TRPs in the inter-cell system could be indicated/incorporated in MeasObjectNR (in Option-1/Option-3) and/or SSB-Configuration-r16/SSB-InfoNcell-r16 (in Option-2/Option-3) and/or SSB-Configuration-InterCell/SSB-InfoNcell-Inter-Cell (e.g., in Option-4) designed for the inter-cell operation.

For the higher layer parameter MeasObjectNR in Option-1/Option-3, a list of candidate neighboring (or non-serving) cells' PCIs (pci-List) could be configured in smtc2. For the inter-cell operation, one or more PCIs could be selected/determined/activated from the list of all candidate PCIs (pci-List) as the non-serving (or neighboring) cell(s)/TRP(s) configured for TCI state/beam indication or/and beam measurement/reporting or/and uplink RS/channel configurations and etc.

In one example, an indicator/field could be configured in MeasObjectNR to indicate the non-serving (or neighboring) cell(s)/TRP(s) for the inter-cell operation. For example, the indicator could be one or more TRP-specific index/ID values such as PCI values, TRP ID values, CORESETPoolIndex values, or other TRP-specific higher layer signaling index values. For another example, the indicator could be one or more indices or index values pointing to one or more entries/positions in the list of all candidate PCIs (pci-List). The PCIs indicated by the corresponding entries/positions in the list of all candidate PCIs (pci-List) are configured as the non-serving (or neighboring) cells/TRPs for the inter-cell operation.

In another example, the UE could receive from the network a MAC CE command activating one or more PCIs from the list of all candidate PCIs (pci-List). The activated PCI(s) is configured as the non-serving (or neighboring) cell(s)/TRP(s) for the inter-cell operation such as TCI state/beam indication, beam measurement/reporting and uplink RS/channel configurations in an inter-cell system.

In yet another example, the UE could receive from the network a bitmap with each entry/bit in the bitmap corresponding to/associated with a PCI in the list of all candidate PCIs (pci-List). If an entry/bit in the bitmap is set to "1," the corresponding PCI in the list of all candidate PCIs (pci-List) is activated/configured as a non-serving (or neighboring) cell/TRP for the inter-cell operation such as TCI state/beam indication, beam measurement/reporting and uplink RS/channel configurations in an inter-cell system.

For the higher layer parameter SSB-Configuration-r16/SSB-InfoNcell-r16 in Option-2/Option-3, a list of candidate neighboring (or non-serving) cells' PCIs could be first configured therein. For the inter-cell operation, one or more PCIs could be selected/determined/activated from the list of all candidate PCIs as the non-serving (or neighboring) cell(s)/TRP(s) configured for TCI state/beam indication or/and beam measurement/reporting or/and uplink RS/channel configurations.

In one example, an indicator/field could be configured in SSB-Configuration-r16/SSB-InfoNcell-r16 to indicate the non-serving (or neighboring) cell(s)/TRP(s) for the inter-cell operation. For example, the indicator could be one or more TRP-specific index/ID values such as PCI values, TRP ID values, CORESETPoolIndex values, or other TRP-specific higher layer signaling index values. For another example, the indicator could be one or more indices or index values pointing to one or more entries/positions in the list of all candidate PCIs configured in SSB-Configuration-r16/SSB-InfoNcell-r16. The PCIs indicated by the corresponding entries/positions in the list of all candidate PCIs configured in SSB-Configuration-r16/SSB-InfoNcell-r16 are configured as the non-serving (or neighboring) cells/TRPs for the inter-cell operation.

In another example, the UE could receive from the network a MAC CE command activating one or more PCIs from the list of all candidate PCIs configured in SSB-Configuration-r16/SSB-InfoNcell-r16. The activated PCI(s) is configured as the non-serving (or neighboring) cell(s)/TRP(s) for the inter-cell operation such as TCI state/beam indication, beam measurement/reporting and uplink RS/channel configurations in an inter-cell system.

In yet another example, the UE could receive from the network a bitmap with each entry/bit in the bitmap corresponding to/associated with a PCI in the list of all candidate PCIs configured in SSB-Configuration-r16/SSB-InfoNcell-r16. If an entry/bit in the bitmap is set to "1," the corresponding PCI in the list of all candidate PCIs configured in SSB-Configuration-r16/SSB-InfoNcell-r16 is activated/configured as a non-serving (or neighboring) cell/TRP for the inter-cell operation such as TCI state/beam indication, beam measurement/reporting and uplink RS/channel configurations in an inter-cell system.

For the higher layer parameter(s) custom designed for the inter-cell operation (e.g., two RRC parameters denoted by SSB-Configuration-InterCell and SSB-InfoNcell-InterCell) in Option-4, one or more of the following parameters could be configured therein, which are SSB frequency, SSB periodicity, SSB burst pattern, SSB time-domain position in a SSB burst, SSB transmit power, SSB subcarrier spacing (SCS) and PCI information for one or more non-serving (or neighboring) cells/TRPs in the inter-cell system. For the configuration of the PCI information, a list of candidate neighboring (or non-serving) cells' PCIs could be first configured in SSB-Configuration-InterCell/SSB-InfoNcell-InterCell. For the inter-cell operation, one or more PCIs could be selected/determined/activated from the list of all candidate PCIs as the non-serving (or neighboring) cell(s)/TRP(s) configured for TCI state/beam indication or/and beam measurement/reporting or/and uplink RS/channel configurations.

In one example, an indicator/field could be configured in SSB-Configuration-InterCell/SSB-InfoNcell-InterCell to indicate the non-serving (or neighboring) cell(s)/TRP(s) for the inter-cell operation. For example, the indicator could be one or more TRP-specific index/ID values such as PCI values, TRP ID values, CORESETPoolIndex values, or other TRP-specific higher layer signaling index values. For another example, the indicator could be one or more indices or index values pointing to one or more entries/positions in the list of all candidate PCIs configured in SSB-Configuration-InterCell/SSB-InfoNcell-InterCell. The PCIs indicated by the corresponding entries/positions in the list of all candidate PCIs configured in SSB-Configuration-InterCell/SSB-InfoNcell-InterCell are configured as the non-serving (or neighboring) cells/TRPs for the inter-cell operation.

In another example, the UE could receive from the network a MAC CE command activating one or more PCIs from the list of all candidate PCIs configured in SSB-Configuration-InterCell/SSB-InfoNcell-InterCell. The activated PCI(s) is configured as the non-serving (or neighboring) cell(s)/TRP(s) for the inter-cell operation such as TCI state/beam indication, beam measurement/reporting and uplink RS/channel configurations in an inter-cell system.

In yet another example, the UE could receive from the network a bitmap with each entry/bit in the bitmap corresponding to/associated with a PCI in the list of all candidate PCIs configured in SSB-Configuration-InterCell/SSB-InfoNcell-InterCell. If an entry/bit in the bitmap is set to "1," the corresponding PCI in the list of all candidate PCIs configured in SSB-Configuration-InterCell/SSB-InfoNcell-InterCell is activated/configured as a non-serving (or neighboring) cell/TRP for the inter-cell operation such as TCI state/beam indication, beam measurement/reporting and uplink RS/channel configurations in an inter-cell system.

In TABLE 18, a design example of the higher layer parameter SSB-InfoNcell-InterCell customized for the inter-cell operation in Option-4 is provided, which includes SSB frequency, SSB periodicity, SSB burst pattern, SSB time-domain position in a SSB burst, SSB transmit power, SSB subcarrier spacing (SCS) and etc. for a given non-serving (or neighboring) cell PCI characterized by the higher layer parameter physicalCellId-nsc.

TABLE 18

Higher layer parameter SSB-InfoNcell-InterCell including/indicating PCI

```
SSB-InfoNcell-InterCell ::= SEQUENCE {
    physicalCellId-nsc PhysCellId,
    ssb-Freq ARFCN-ValueNR,
    halfFrameIndex ENUMERATED {zero, one}, OPTIONAL,
    ssbSubcarrierSpacing SubcarrierSpacing, OPTIONAL,
    ssb-Periodicity ENUMERATED {ms5, ms10, ms20, ms40, ms80, ms160, spare2,
        spare1} OPTIONAL, -- Need S
    ssb-duration ENUMERATED {sf1, sf2, sf3, sf4, sf5} OPTIONAL, -- Need S
    ss-PBCH-BlockPower INTEGER {-60..50} OPTIONAL, -- Cond Pathloss
    ssb-PositionsInBurst CHOICE {
        shortBitmap BIT STRING (SIZE (4)),
```

TABLE 18-continued

Higher layer parameter SSB-InfoNcell-InterCell including/indicating PCI

```
    mediumBitmap BIT STRING (SIZE (8)),
    longBitmap BIT STRING (SIZE (64))
    }, OPTIONAL,
    ...
}
```

If certain non-serving (or neighboring) cell RS (SSB) configuration(s)/parameter(s) such as SSB frequency is not configured/present in SSB-Configuration-InterCell/SSB-InfoNcell-InterCell, the UE is expected to assume that such RS (SSB) configuration(s)/parameter(s) is the same as that for the serving cell/TRP, which could be indicated in serving cell RS (SSB) configuration(s).

The non-serving (or neighboring) cell RS (SSB) configuration information configured for the inter-cell operation (e.g., the non-serving (or neighboring) cell SSB frequency, periodicity, time-domain position in a SSB burst, SCS and etc. configured via Option-1 or/and Option-2 or/and Option-3 or/and Option-4) could be associated with a TCI state indicating at least a non-serving (or neighboring) cell RS as the QCL source RS. There are various means to associate the non-serving (or neighboring) cell RS (SSB) configuration information with a TCI state indicating at least a non-serving (or neighboring) cell RS as the QCL source RS.

In one example, for the explicit non-serving (or neighboring) cell RS indication in TCI state/QCL information, wherein the TRP-specific index/ID value such as the PCI value, TRP ID value, CORESETPoolIndex value or other TRP-specific higher layer signaling index values is indicated in the higher layer parameter QCL-Info/TCI-State.

A TCI state indicating a non-serving (or neighboring) cell RS as the QCL source RS is associated with the non-serving (or neighboring) cell RS (SSB) configuration information configured in MeasObjectNR (Option-1/Option-3) if the same TRP-specific index/ID value such as the same PCI value is indicated in both the TCI state and the MeasObjectNR.

A TCI state indicating a non-serving (or neighboring) cell RS as the QCL source RS is associated with the non-serving (or neighboring) cell RS (SSB) configuration information configured in SSB-Configuration-r16/SSB-InfoNcell-r16 (Option-2/Option-3) if the same TRP-specific index/ID value such as the same PCI value is indicated in both the TCI state and the SSB-Configuration-r16/SSB-InfoNcell-r16.

A TCI state indicating a non-serving (or neighboring) cell RS as the QCL source RS is associated with the non-serving (or neighboring) cell RS (SSB) configuration information configured in SSB-Configuration-InterCell/SSB-InfoNcell-InterCell (Option-4) if the same TRP-specific index/ID value such as the same PCI value is indicated in both the TCI state and the SSB-Configuration-InterCell/SSB-InfoNcell-InterCell.

In another example, for the implicit non-serving (or neighboring) cell RS (re-)indexing in TCI state/QCL information, if the inter-cell system contains a single non-serving (or neighboring) cell/TRP, the UE could associate a TCI state indicating a non-serving (or neighboring) cell RS as the QCL source RS with the non-serving (or neighboring) cell RS (SSB) configuration information configured in MeasObjectNR (Option-1/Option-3) as long as the UE could identify the non-serving (or neighboring) cell RS from the indicated TCI state following the non-serving (or neighboring) cell RS (re-)indexing configuration/rule in TCI state/QCL information. If the inter-cell system contains more than one non-serving (or neighboring) cells/TRPs, the UE could first identify the non-serving (or neighboring) cell RS from the indicated TCI state following the non-serving (or neighboring) cell RS (re-)indexing configuration/rule in TCI state/QCL information. The UE could then identify the TRP-specific index/ID value such as the PCI value associated with the non-serving (or neighboring) cell RS following the mapping relationship/association rule (e.g., higher layer configured/indicated to the UE) between the TRP-specific index/ID value such as the PCI value with the non-serving (or neighboring) cell RS(s) (e.g., the mapping relationship/association rule shown in TABLE 10). The UE could associate the TCI state indicating the non-serving (or neighboring) cell RS as the QCL source RS with the non-serving (or neighboring) cell RS (SSB) configuration information configured in MeasObjectNR (Option-1/Option-3) if the TRP-specific index/ID value such as the PCI value associated with the non-serving (or neighboring) cell RS and the TRP-specific index/ID value such as the PCI value indicated in the MeasObjectNR are the same.

In another example, for the implicit non-serving (or neighboring) cell RS (re-)indexing in TCI state/QCL information, if the inter-cell system contains a single non-serving (or neighboring) cell/TRP, the UE could associate a TCI state indicating a non-serving (or neighboring) cell RS as the QCL source RS with the non-serving (or neighboring) cell RS (SSB) configuration information configured in SSB-Configuration-r16/SSB-InfoNcell-r16 (Option-2/Option-3) as long as the UE could identify the non-serving (or neighboring) cell RS from the indicated TCI state following the non-serving (or neighboring) cell RS (re-)indexing configuration/rule in TCI state/QCL information. If the inter-cell system contains more than one non-serving (or neighboring) cells/TRPs, the UE could first identify the non-serving (or neighboring) cell RS from the indicated TCI state following the non-serving (or neighboring) cell RS (re-)indexing configuration/rule in TCI state/QCL information. The UE could then identify the TRP-specific index/ID value such as the PCI value associated with the non-serving (or neighboring) cell RS following the mapping relationship/association rule (e.g., higher layer configured/indicated to the UE) between the TRP-specific index/ID value such as the PCI value with the non-serving (or neighboring) cell RS(s) (e.g., the mapping relationship/association rule shown in TABLE 10). The UE could associate the TCI state indicating the non-serving (or neighboring) cell RS as the QCL source RS with the non-serving (or neighboring) cell RS (SSB) configuration information configured in SSB-Configuration-r16/SSB-InfoNcell-r16 (Option-2/Option-3) if the TRP-specific index/ID value such as the PCI value associated with the non-serving (or neighboring) cell RS and the TRP-specific index/ID value such as the PCI value indicated in the SSB-Configuration-r16/SSB-InfoNcell-r16 are the same.

In another example, for the implicit non-serving (or neighboring) cell RS (re-)indexing in TCI state/QCL information, if the inter-cell system contains a single non-serving (or neighboring) cell/TRP, the UE could associate a TCI state indicating a non-serving (or neighboring) cell RS as the QCL source RS with the non-serving (or neighboring) cell RS (SSB) configuration information configured in SSB-Configuration-InterCell/SSB-InfoNcell-InterCell (Option-4) as long as the UE could identify the non-serving (or neighboring) cell RS from the indicated TCI state following the non-serving (or neighboring) cell RS (re-)indexing configuration/rule in TCI state/QCL information. If the inter-cell system contains more than one non-serving (or neighboring) cells/TRPs, the UE could first identify the non-serving (or neighboring) cell RS from the indicated TCI state following the non-serving (or neighboring) cell RS (re-)indexing configuration/rule in TCI state/QCL information. The UE could then identify the TRP-specific index/ID value such as the PCI value associated with the non-serving (or neighboring) cell RS following the mapping relationship/association rule (e.g., higher layer configured/indicated to the UE) between the TRP-specific index/ID value such as the PCI value with the non-serving (or neighboring) cell RS(s) (e.g., the mapping relationship/association rule shown in TABLE 10). The UE could associate the TCI state indicating the non-serving (or neighboring) cell RS as the QCL source RS with the non-serving (or neighboring) cell RS (SSB) configuration information configured in SSB-Configuration-InterCell/SSB-InfoNcell-InterCell (Option-4) if the TRP-specific index/ID value such as the PCI value associated with the non-serving (or neighboring) cell RS and the TRP-specific index/ID value such as the PCI value indicated in the SSB-Configuration-InterCell/SSB-InfoNcell-InterCell are the same.

In yet another example, for the one-bit flag/multi-bit indicator in TCI state/QCL information, if the inter-cell system contains a single non-serving (or neighboring) cell/TRP, the UE could associate a TCI state indicating a non-serving (or neighboring) cell RS as the QCL source RS with the non-serving (or neighboring) cell RS (SSB) configuration information configured in MeasObjectNR (Option-1/Option-3) as long as the UE could identify the non-serving (or neighboring) cell RS from the indicated TCI state following the one-bit flag indicator in TCI state/QCL information (e.g., "1"/"ON"/"true" for the non-serving (or neighboring) cell/TRP while "0"/"OFF"/"false" for the serving cell/TRP). If the inter-cell system contains more than one non-serving (or neighboring) cells/TRPs, the UE could first identify the non-serving (or neighboring) cell RS from the indicated TCI state according to the multi-bit indicator in TCI state/QCL information. The UE could then identify the TRP-specific index/ID value such as the PCI value associated with the non-serving (or neighboring) cell RS, and therefore, the corresponding state of the multi-bit indicator following the mapping relationship/association rule (e.g., higher layer configured/indicated to the UE) between the TRP-specific index/ID value such as the PCI value with the state(s) of the multi-bit indicator (e.g., the mapping relationship/association rule shown in TABLE 13). The UE could associate the TCI state indicating the non-serving (or neighboring) cell RS as the QCL source RS with the non-serving (or neighboring) cell RS (SSB) configuration information configured in MeasObjectNR (Option-1/Option-3) if the TRP-specific index/ID value such as the PCI value associated with the non-serving (or neighboring) cell RS and the TRP-specific index/ID value such as the PCI value indicated in the MeasObjectNR are the same.

In yet another example, for the one-bit flag/multi-bit indicator in TCI state/QCL information, if the inter-cell system contains a single non-serving (or neighboring) cell/TRP, the UE could associate a TCI state indicating a non-serving (or neighboring) cell RS as the QCL source RS with the non-serving (or neighboring) cell RS (SSB) configuration information configured in SSB-Configuration-r16/SSB-InfoNcell-r16 (Option-2/Option-3) as long as the UE could identify the non-serving (or neighboring) cell RS from the indicated TCI state following the one-bit flag indicator in TCI state/QCL information (e.g., "1"/"ON"/"true" for the non-serving (or neighboring) cell/TRP while "0"/"OFF"/"false" for the serving cell/TRP). If the inter-cell system contains more than one non-serving (or neighboring) cells/TRPs, the UE could first identify the non-serving (or neighboring) cell RS from the indicated TCI state according to the multi-bit indicator in TCI state/QCL information. The UE could then identify the TRP-specific index/ID value such as the PCI value associated with the non-serving (or neighboring) cell RS, and therefore, the corresponding state of the multi-bit indicator following the mapping relationship/association rule (e.g., higher layer configured/indicated to the UE) between the TRP-specific index/ID value such as the PCI value with the state(s) of the multi-bit indicator (e.g., the mapping relationship/association rule shown in TABLE 13). The UE could associate the TCI state indicating the non-serving (or neighboring) cell RS as the QCL source RS with the non-serving (or neighboring) cell RS (SSB) configuration information configured in SSB-Configuration-r16/SSB-InfoNcell-r16 (Option-2/Option-3) if the TRP-specific index/ID value such as the PCI value associated with the non-serving (or neighboring) cell RS and the TRP-specific index/ID value such as the PCI value indicated in the SSB-Configuration-r16/SSB-InfoNcell-r16 are the same.

In yet another example, for the one-bit flag/multi-bit indicator in TCI state/QCL information, if the inter-cell system contains a single non-serving (or neighboring) cell/TRP, the UE could associate a TCI state indicating a non-serving (or neighboring) cell RS as the QCL source RS with the non-serving (or neighboring) cell RS (SSB) configuration information configured in SSB-Configuration-InterCell/SSB-InfoNcell-InterCell (Option-4) as long as the UE could identify the non-serving (or neighboring) cell RS from the indicated TCI state following the one-bit flag indicator in TCI state/QCL information (e.g., "1"/"ON"/"true" for the non-serving (or neighboring) cell/TRP while "0"/"OFF"/"false" for the serving cell/TRP). If the inter-cell system contains more than one non-serving (or neighboring) cells/TRPs, the UE could first identify the non-serving (or neighboring) cell RS from the indicated TCI state according to the multi-bit indicator in TCI state/QCL information. The UE could then identify the TRP-specific index/ID value such as the PCI value associated with the non-serving (or neighboring) cell RS, and therefore, the corresponding state of the multi-bit indicator following the mapping relationship/association rule (e.g., higher layer configured/indicated to the UE) between the TRP-specific index/ID value such as the PCI value with the state(s) of the multi-bit indicator (e.g., the mapping relationship/association rule shown in TABLE 13). The UE could associate the TCI state indicating the non-serving (or neighboring) cell RS as the QCL source RS with the non-serving (or neighboring) cell RS (SSB) configuration information configured in SSB-Configuration-InterCell/SSB-InfoNcell-InterCell (Option-4) if the TRP-specific index/ID value such as the PCI value associated with the non-serving (or neighboring) cell RS and the TRP-specific index/ID value such as the PCI value indicated in the SSB-Configuration-InterCell/SSB-InfoNcell-InterCell are the same.

In yet another example, for using one or more reserved SCI/ServCellIndex values to identify/indicate the non-serving (or neighboring) cell RS(s) in TCI state/QCL information, if the inter-cell system contains a single non-serving (or neighboring) cell/TRP, the UE could associate a TCI state indicating a non-serving (or neighboring) cell RS as the QCL source RS with the non-serving (or neighboring) cell RS (SSB) configuration information configured in MeasObjectNR (Option-1/Option-3) as long as the UE could identify the non-serving (or neighboring) cell RS from the indicated TCI state according to the SCI/ServCellIndex value in TCI state/QCL information (e.g., whether the SCI/ServCellIndex value is reserved for identifying/indicating non-serving (or neighboring) cell RS(s)). If the inter-cell system contains more than one non-serving (or neighboring) cells/TRPs, the UE could first identify the non-serving (or neighboring) cell RS from the indicated TCI state according to the SCI/ServCellIndex value in TCI state/QCL information. For the given SCI/ServCellIndex value in the higher layer parameter QCL-Info/TCI-State, the UE could then identify the TRP-specific index/ID value such as the PCI value associated with the non-serving (or neighboring) cell RS following the mapping relationship/association rule (e.g., higher layer configured/indicated to the UE) between the TRP-specific index/ID value such as the PCI value with the non-serving (or neighboring) cell RS(s) and/or the TCI state(s) indicating the non-serving (or neighboring) cell RS(s) (e.g., the mapping relationship/association rule shown in TABLE 14). The UE could associate the TCI state indicating the non-serving (or neighboring) cell RS as the QCL source RS with the non-serving (or neighboring) cell RS (SSB) configuration information configured in MeasObjectNR (Option-1/Option-3) if the TRP-specific index/ID value such as the PCI value associated with the non-serving (or neighboring) cell RS and the TRP-specific index/ID value such as the PCI value indicated in the MeasObjectNR are the same.

In yet another example, for using one or more reserved SCI/ServCellIndex values to identify/indicate the non-serving (or neighboring) cell RS(s) in TCI state/QCL information, if the inter-cell system contains a single non-serving (or neighboring) cell/TRP, the UE could associate a TCI state indicating a non-serving (or neighboring) cell RS as the QCL source RS with the non-serving (or neighboring) cell RS (SSB) configuration information configured in SSB-Configuration-r16/SSB-InfoNcell-r16 (Option-2/Option-3) as long as the UE could identify the non-serving (or neighboring) cell RS from the indicated TCI state according to the SCI/ServCellIndex value in TCI state/QCL information (e.g., whether the SCI/ServCellIndex value is reserved for identifying/indicating non-serving (or neighboring) cell RS(s)). If the inter-cell system contains more than one non-serving (or neighboring) cells/TRPs, the UE could first identify the non-serving (or neighboring) cell RS from the indicated TCI state according to the SCI/ServCellIndex value in TCI state/QCL information. For the given SCI/ServCellIndex value in the higher layer parameter QCL-Info/TCI-State, the UE could then identify the TRP-specific index/ID value such as the PCI value associated with the non-serving (or neighboring) cell RS following the mapping relationship/association rule (e.g., higher layer configured/indicated to the UE) between the TRP-specific index/ID value such as the PCI value with the non-serving (or neighboring) cell RS(s) and/or the TCI state(s) indicating the non-serving (or neighboring) cell RS(s) (e.g., the mapping relationship/association rule shown in TABLE 14). The UE could associate the TCI state indicating the non-serving (or neighboring) cell RS as the QCL source RS with the non-serving (or neighboring) cell RS (SSB) configuration information configured in SSB-Configuration-r16/SSB-InfoNcell-r16 (Option-2/Option-3) if the TRP-specific index/ID value such as the PCI value associated with the non-serving (or neighboring) cell RS and the TRP-specific index/ID value such as the PCI value indicated in the SSB-Configuration-r16/SSB-InfoNcell-r16 are the same.

In yet another example, for using one or more reserved SCI/ServCellIndex values to identify/indicate the non-serving (or neighboring) cell RS(s) in TCI state/QCL information, if the inter-cell system contains a single non-serving (or neighboring) cell/TRP, the UE could associate a TCI state indicating a non-serving (or neighboring) cell RS as the QCL source RS with the non-serving (or neighboring) cell RS (SSB) configuration information configured in SSB-Configuration-InterCell/SSB-InfoNcell-InterCell (Option-4) as long as the UE could identify the non-serving (or neighboring) cell RS from the indicated TCI state according to the SCI/ServCellIndex value in TCI state/QCL information (e.g., whether the SCI/ServCellIndex value is reserved for identifying/indicating non-serving (or neighboring) cell RS(s)). If the inter-cell system contains more than one non-serving (or neighboring) cells/TRPs, the UE could first identify the non-serving (or neighboring) cell RS from the indicated TCI state according to the SCI/ServCellIndex value in TCI state/QCL information. For the given SCI/ServCellIndex value in the higher layer parameter QCL-Info/TCI-State, the UE could then identify the TRP-specific index/ID value such as the PCI value associated with the non-serving (or neighboring) cell RS following the mapping relationship/association rule (e.g., higher layer configured/indicated to the UE) between the TRP-specific index/ID value such as the PCI value with the non-serving (or neighboring) cell RS(s) and/or the TCI state(s) indicating the non-serving (or neighboring) cell RS(s) (e.g., the mapping relationship/association rule shown in TABLE 14). The UE could associate the TCI state indicating the non-serving (or neighboring) cell RS as the QCL source RS with the non-serving (or neighboring) cell RS (SSB) configuration information configured in SSB-Configuration-InterCell/SSB-InfoNcell-InterCell (Option-4) if the TRP-specific index/ID value such as the PCI value associated with the non-serving (or neighboring) cell RS and the TRP-specific index/ID value such as the PCI value indicated in the SSB-Configuration-InterCell/SSB-InfoNcell-InterCell are the same.

The association between the non-serving (or neighboring) cell RS (SSB) configuration information with a TCI state indicating at least a non-serving (or neighboring) cell RS as the QCL source RS could also be via other identifiers/indicators than the TRP-specific index/ID value such as the PCI value.

In one example, for a MeasObjectNR indicating the non-serving (or neighboring) cell RS (SSB) configuration information for the inter-cell operation (Option-1/Option-3), corresponding MeasObjectId could be included/indicated in one or more TCI states indicating the non-serving (or neighboring) cell RS(s) as the QCL source RS(s). An example of including/indicating the MeasObjectId in the higher layer parameter QCL-Info/TCI-State is provided in TABLE 19. The UE could associate the TCI state indicating the non-serving (or neighboring) cell RS as the QCL source RS with the non-serving (or neighboring) cell RS (SSB) configuration information configured in MeasObjectNR (Option-1/Option-3) if the MeasObjectId value configured/indicated in both the TCI state and the MeasObjectNR are the same.

TABLE 19

Higher layer parameter QCL-Info/TCI-State
including/indicating MeasObjectId

TCI-State ::= SEQUENCE {
  tci-StateId TCI-StateId,
  MeasObjectId INTEGER (1..maxNrofObjectId)
  qcl-Type1 QCL-Info,
  qcl-Type2 QCL-Info OPTIONAL, -- Need R
  ...
}

In another example, a new identifier/indicator, e.g., denoted by SSBConfigId, could be included/indicated in one or more TCI states indicating the non-serving (or neighboring) cell RS(s) as the QCL source RS(s) and the SSB-Configuration-r16/SSB-InfoNcell-r16 indicating the non-serving (or neighboring) cell RS (SSB) configuration information for the inter-cell operation (Option-2/Option-3). The UE could associate the TCI state indicating the non-serving (or neighboring) cell RS as the QCL source RS with the non-serving (or neighboring) cell RS (SSB) configuration information configured in SSB-Configuration-r16/SSB-InfoNcell-r16 (Option-2/Option-3) if the SSBConfigId value configured/indicated in both the TCI state and the SSB-Configuration-r16/SSB-InfoNcell-r16 are the same.

In yet another example, a new identifier/indicator, e.g., denoted by SSBConfigInterCellId, could be included/indicated in one or more TCI states indicating the non-serving (or neighboring) cell RS(s) as the QCL source RS(s) and the SSB-Configuration-InterCell/SSB-InfoNcell-InterCell indicating the non-serving (or neighboring) cell RS (SSB) configuration information for the inter-cell operation (Option-4). The UE could associate the TCI state indicating the non-serving (or neighboring) cell RS as the QCL source RS with the non-serving (or neighboring) cell RS (SSB) configuration information configured in SSB-Configuration-InterCell/SSB-InfoNcell-InterCell (Option-4) if the SSB-ConfigInterCellId value configured/indicated in both the TCI state and the SSB-Configuration-InterCell/SSB-InfoNcell-InterCell are the same.

In yet another example, a TCI state ID (e.g., the higher layer parameter tci-StateId) could be included/indicated in MeasObjectNR indicating the non-serving (or neighboring) cell RS (SSB) configuration information for the inter-cell operation (Option-1/Option-3). The UE could associate the TCI state indicating the non-serving (or neighboring) cell RS as the QCL source RS with the non-serving (or neighboring) cell RS (SSB) configuration information configured in MeasObjectNR (Option-1/Option-3) if the TCI state ID value configured/indicated in both the TCI state and the MeasObjectNR are the same.

In yet another example, a TCI state ID (e.g., the higher layer parameter tci-StateId) could be included/indicated in SSB-Configuration-r16/SSB-InfoNcell-r16 indicating the non-serving (or neighboring) cell RS (SSB) configuration information for the inter-cell operation (Option-2/Option-3). The UE could associate the TCI state indicating the non-serving (or neighboring) cell RS as the QCL source RS with the non-serving (or neighboring) cell RS (SSB) configuration information configured in SSB-Configuration-r16/SSB-InfoNcell-r16 (Option-2/Option-3) if the TCI state ID value configured/indicated in both the TCI state and the SSB-Configuration-r16/SSB-InfoNcell-r16 are the same.

In yet another example, a TCI state ID (e.g., the higher layer parameter tci-StateId) could be included/indicated in SSB-Configuration-InterCell/SSB-InfoNcell-InterCell indicating the non-serving (or neighboring) cell RS (SSB) configuration information for the inter-cell operation (Option-4). The UE could associate the TCI state indicating the non-serving (or neighboring) cell RS as the QCL source RS with the non-serving (or neighboring) cell RS (SSB) configuration information configured in SSB-Configuration-InterCell/SSB-InfoNcell-InterCell (Option-4) if the TCI state ID value configured/indicated in both the TCI state and the SSB-Configuration-InterCell/SSB-InfoNcell-InterCell are the same.

In one embodiment, TCI state/beam indication for inter-cell operation is provided.

One or more non-serving (or neighboring) cell RSs (e.g., SSBs) could be indicated in one or more TCI states as the QCL source RSs for the reception of the PDCCH(s) and/or PDSCH(s) (PDCCH DMRS(s) and/or PDSCH DMRS(s)). For example, the non-serving (or neighboring) cell SSB(s) could be indicated as the QCL source RS(s) for the reception of the PDCCH(s) and/or PDSCH(s) (PDCCH DMRS(s) and/or PDSCH DMRS(s)) from one or more non-serving (or neighboring) cells/TRPs in the inter-cell system. For another example, the non-serving (or neighboring) cell SSB(s) could be indicated as the QCL source RS(s) for one or more CSI-RSs such as TRSs from either the serving cell/TRP or one or more non-serving (or neighboring) cells/TRPs in the inter-cell system. Yet for another example, one or more CSI-RSs such as TRSs from either the serving cell/TRP or one or more non-serving (or neighboring) cells/TRPs in the inter-cell system could be indicated as the QCL source RSs for the reception of the PDCCH(s) and/or PDSCH(s) (PDCCH DMRS(s) and/or PDSCH DMRS(s)) from one or more non-serving (or neighboring) cells/TRPs in the inter-cell system.

Figure 24:
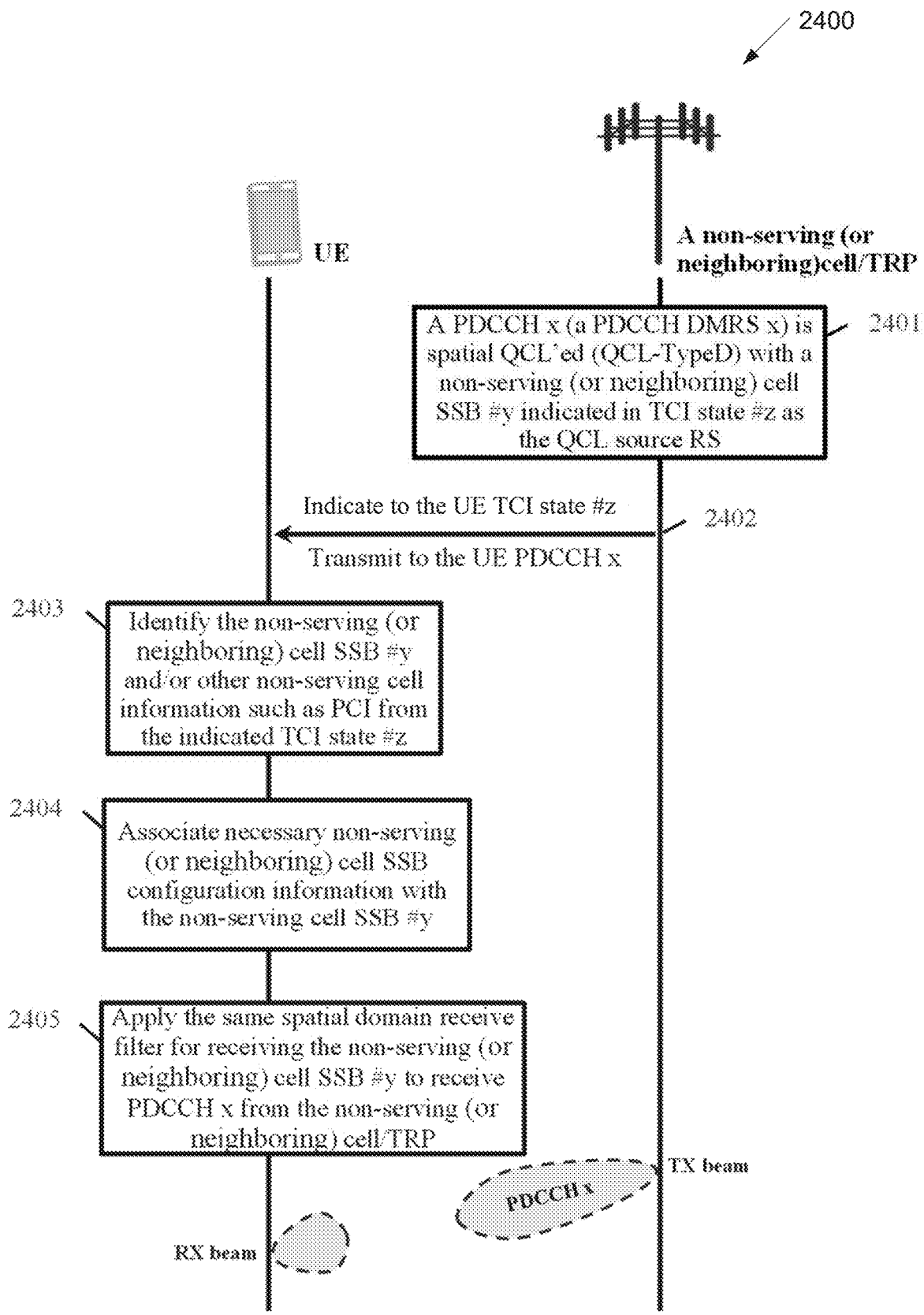
FIG. 24 illustrates an example signaling procedure of indicating a non-serving (or neighboring) cell SSB according to embodiments of the present disclosure.

FIG. 24 illustrates an example signaling procedure 2400 of indicating a non-serving (or neighboring) cell SSB according to embodiments of the present disclosure. The signaling procedure 2400 as may be performed by a UE (e.g., 111-116 as illustrated in FIG. 1) and TRP. The TRP may be implemented in a base station (e.g., 101-103 as illustrated in FIG. 1) or implemented as a stand-alone system. An embodiment of the signaling procedure 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions.

As illustrated in FIG. 24, an example showing the signaling procedure of indicating a non-serving (or neighboring) cell SSB as the QCL source RS for the reception of a PDCCH (or PDCCH DMRS) from a non-serving (or neighboring) cell/TRP is depicted. In step 2401, the network configures the QCL source RS for a PDCCH x (or PDCCH DMRS x) transmitted from/associated with/configured for a non-serving (or neighboring) cell/TRP as a SSB transmitted from/associated with/configured for the non-serving (or neighboring) cell/TRP (denoted by SSB #y). The non-serving (or neighboring) cell SSB #y may be indicated in TCI state #z. In step 2402, the network, or the serving/non-serving (or neighboring) cell/TRP, indicates to the UE TCI state #z indicating the non-serving (or neighboring) cell SSB #y as the QCL source RS for PDCCH x; the indication of the TCI state #z could be via MAC CE by activating TCI state #z from a higher layer RRC configured pool of TCI states. The network, or the non-serving (or neighboring) cell/TRP, also transmits to the UE PDCCH x. In step 2403, the UE identifies the QCL source RS indicated in TCI state #z as the non-serving (or neighboring) cell SSB #y. In step 2404, the UE associates the non-serving (or neighboring) cell SSB #y with necessary higher layer configured non-serving (or neighboring) cell SSB configuration information such as SSB periodicity, SSB frequency, SSB SCS, SSB time-domain position in a SSB burst, SSB transmit power and etc. In step 2405, the UE applies the same spatial domain receive filter for receiving the non-serving (or neighboring) cell SSB #y to receive PDCCH x transmitted from the non-serving (or neighboring) cell/TRP.

Figure 25:
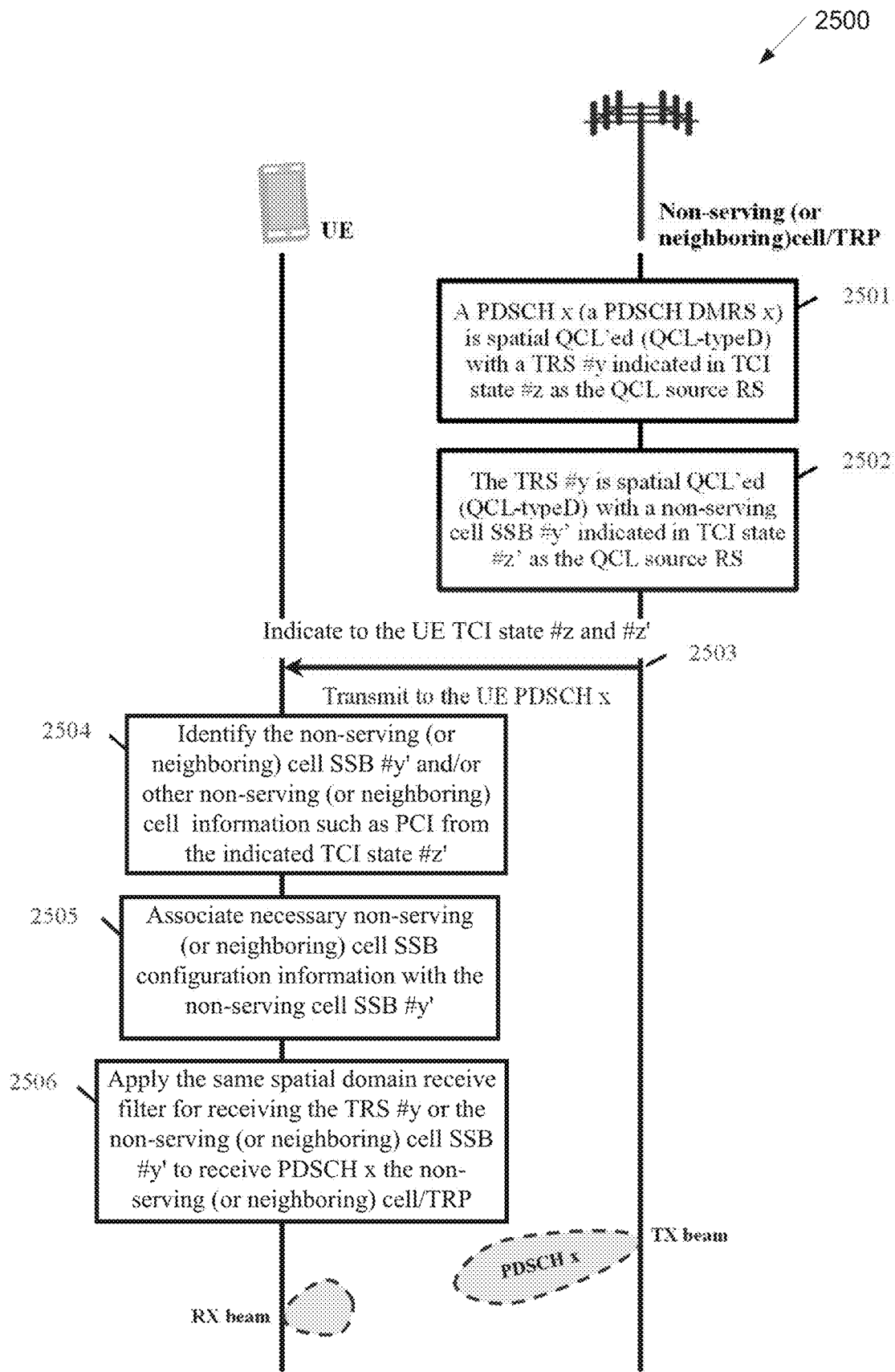
FIG. 25 illustrates another example signaling procedure of indicating a non-serving (or neighboring) cell SSB according to embodiments of the present disclosure.

FIG. 25 illustrates another example signaling procedure 2500 of indicating a non-serving (or neighboring) cell SSB according to embodiments of the present disclosure. The method 2500 as may be performed by a UE (e.g., 111-116 as illustrated in FIG. 1) and TRP. The TRP may be implemented in a base station (e.g., 101-103 as illustrated in FIG. 1) or implemented as a stand-alone system. An embodiment of the signaling procedure 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions.

As illustrated in FIG. 25, an example showing the signaling procedure of indicating a non-serving (or neighboring) cell SSB as the QCL source RS for a TRS transmitted from/associated with/configured for either the serving cell/TRP or a non-serving (or neighboring) cell/TRP in the inter-cell system, and indicating the TRS as the QCL source RS for the reception of a PDSCH (or PDSCH DMRS) from a non-serving (or neighboring) cell/TRP is depicted. In step 2501, the network configures the QCL source RS for a PDSCH x (or PDSCH DMRS x) transmitted from/associated with/configured for a non-serving (or neighboring) cell/TRP as a TRS transmitted from/associated with/configured for either the serving cell/TRP or a non-serving (or neighboring) cell/TRP (denoted by TRS #y). The TRS #y may be indicated in TCI state #z. In step 2502, the network configures the QCL source RS for the TRS #y as a SSB transmitted from/associated with/configured for the non-serving (or neighboring) cell/TRP (denoted by SSB #y'). The SSB #y' may be indicated in TCI state #z'.

In step 2503, the network, or the serving/non-serving (or neighboring) cell/TRP, indicates to the UE TCI state #z indicating the TRS #y as the QCL source RS for PDSCH x; the TCI state #z could be indicated to the UE via DCI signaling. The network, or the serving/non-serving (or neighboring) cell/TRP, indicates to the UE TCI state #z' indicating the non-serving (or neighboring) cell SSB #y' as the QCL source RS for the TRS #y. The network, or the non-serving (or neighboring) cell/TRP, also transmits to the UE PDSCH x. In step 2504, the UE identifies the QCL source RS indicated in TCI state #z' as the non-serving (or neighboring) cell SSB #y'. In step 2505, the UE associates the non-serving (or neighboring) cell SSB #y' with necessary higher layer configured non-serving (or neighboring) cell SSB configuration information such as SSB periodicity, SSB frequency, SSB SCS, SSB time-domain position in a SSB burst, SSB transmit power and etc. In step 2506, the UE applies the same spatial domain receive filter for receiving the TRS #y or the non-serving (or neighboring) cell SSB #y' to receive PDSCH x transmitted from the non-serving (or neighboring) cell/TRP.

In one embodiment, measurement/reporting enhancements for inter-cell operation are provided.

For inter-cell beam measurement/reporting, the UE could be indicated by the network to measure one or more non-serving (or neighboring) cell RSs (such as SSBs) and report to the network the corresponding measurement results such as L1 beam metrics (L1-RSRPs/L1-SINRs). The RS(s) configured for the inter-cell beam measurement could be (non-serving (or neighboring) cell) SSB(s), CSI-RS(s) for CSI acquisition, CSI-RS(s) for beam management, CSI-RS(s) for RRM/mobility and etc.

The serving cell SSB(s) could be configured as QCL-TypeC/D source RS(s) for the serving/non-serving (or neighboring) cell CSI-RS(s) for tracking, QCL-TypeA/D source RS(s) for the serving/non-serving (or neighboring) cell CSI-RS(s) for CSI acquisition, and QCL-TypeC/D source RS(s) for the serving/non-serving (or neighboring) cell CSI-RS(s) for beam management.

The non-serving (or neighboring) cell SSB(s) could be configured as QCL-TypeC/D source RS(s) for the serving/non-serving (or neighboring) cell CSI-RS(s) for tracking, QCL-TypeA/D source RS(s) for the serving/non-serving (or neighboring) cell CSI-RS(s) for CSI acquisition, and QCL-TypeC/D source RS(s) for the serving/non-serving (or neighboring) cell CSI-RS(s) for beam management.

The serving cell CSI-RS(s) for tracking could be configured as QCL-TypeA/B/D source RS(s) for the serving/non-serving (or neighboring) cell CSI-RS(s) for CSI acquisition, and QCL-TypeA/D source RS(s) for the serving/non-serving (or neighboring) cell CSI-RS(s) for beam management.

The non-serving (or neighboring) cell CSI-RS(s) for tracking could be configured as QCL-TypeA/B/D source RS(s) for the serving/non-serving (or neighboring) cell CSI-RS(s) for CSI acquisition, and QCL-TypeA/D source RS(s) for the serving/non-serving (or neighboring) cell CSI-RS(s) for beam management.

The serving cell CSI-RS(s) for beam management could be configured as QCL-TypeD source RS(s) for the serving/non-serving (or neighboring) cell CSI-RS(s) for tracking, and QCL-TypeD source RS(s) for the serving/non-serving (or neighboring) cell CSI-RS(s) for CSI acquisition.

The non-serving (or neighboring) cell CSI-RS(s) for beam management could be configured as QCL-TypeD source RS(s) for the serving/non-serving (or neighboring) cell CSI-RS(s) for tracking, and QCL-TypeD source RS(s) for the serving/non-serving (or neighboring) cell CSI-RS(s) for CSI acquisition.

In one embodiment, a non-serving (or neighboring) cell RS(s) indication and activation for beam measurement via RRC or/and MAC CE or/and bitmap is provided.

In one embodiment, the UE could be first higher layer configured by the network (e.g., via higher layer RRC signaling) a list/set/pool of non-serving (or neighboring) cell RSs (e.g., SSBs) from/associated with/configured for one or more non-serving (or neighboring) cells/TRPs in an inter-cell system. The UE could then receive from the network a MAC CE command and/or a bitmap activating one or more non-serving (or neighboring) cell RSs (e.g., SSBs) from the higher layer configured list/set/pool of non-serving (or neighboring) cell RSs (e.g., SSBs) to perform beam measurement and reporting for the inter-cell operation.

In one example, the UE could be first higher layer configured by the network (e.g., via higher layer RRC signaling) a list/set/pool of non-serving (or neighboring) cell SSB indices.

In such example, the non-serving (or neighboring) cell SSB indices, and therefore, the corresponding bit-width, in the list/set/pool of non-serving (or neighboring) cell SSB indices could be determined across all SSBs from/associated with/configured for all non-serving (or neighboring) cells/TRPs in the inter-cell system. For instance, consider N_nsc non-serving (or neighboring) cells/TRPs in the inter-cell system each associated with N_ssb SSBs. The non-serving (or neighboring) cell SSB indices in the list/set/pool of non-serving (or neighboring) cell SSB indices could be configured as #0, #1, . . . , #(N_ssb×N_nsc−1), and the corresponding bit-width is ceil (log 2(N_ssb×N_nsc)), where ceil(k) returns the smallest integer that is greater than or equal to k. The SSB indices (in the higher layer configured list/set/pool of non-serving (or neighboring) cell SSB indices) associated with the n-th non-serving (or neighboring) cell/TRP or the non-serving (or neighboring) cell/TRP #n in the inter-cell system could be configured as #N_ssb×(n−1), #N_ssb×(n−1)+1, . . . , #N_ssb×n−1.

In such example, alternatively, the non-serving (or neighboring) cell SSB indices, and therefore, the corresponding bit-width(s), in the list/pool/set of non-serving (or neighboring) cell SSB indices, could be separately determined with respect to the SSBs from/associated with/configured for their associated non-serving (or neighboring) cell(s)/TRP(s) in the inter-cell system. For instance, consider N_nsc non-serving (or neighboring) cells/TRPs in the inter-cell system each associated with N_ssb SSBs. The SSB indices (in the higher layer configured list/set/pool of non-serving (or neighboring) cell SSB indices) associated with the n-th non-serving (or neighboring) cell/TRP or the non-serving (or neighboring) cell/TRP #n in the inter-cell system could be configured as #0, #1, . . . #N_ssb−1.

In addition, the UE could also be higher layer configured by the network (e.g., via higher layer RRC signaling) a list of TRP-specific index/ID values such as PCI values, TRP ID values, CORESETPoolIndex values or other TRP-specific higher layer signaling index values for the non-serving (or neighboring) cells/TRPs in the inter-cell system. The entries in the list/set/pool of non-serving (or neighboring) cell SSB indices and the entries in the list of TRP-specific index/ID values such as PCI values could have one-to-one correspondence. For instance, the first entry in the list/set/pool of non-serving (or neighboring) cell SSB indices could correspond to the first entry in the list of TRP-specific index/ID values such as PCI values, the second entry in the list/set/pool of non-serving (or neighboring) cell SSB indices could correspond to the second entry in the list of TRP-specific index/ID values such as PCI values, and so on, and the last entry in the list/set/pool of non-serving (or neighboring) cell SSB indices could correspond to the last entry in the list of TRP-specific index/ID values such as PCI values. The UE could then receive from the network a MAC CE command activating one or more non-serving (or neighboring) cell SSBs from the higher layer configured list/set/pool of non-serving (or neighboring) cell SSB indices, and therefore, activating one or more TRP-specific index/ID values such as PCI values from the higher layer configured list of TRP-specific index/ID values such as PCI values. Alternatively, the UE could receive from the network a bitmap with each entry/bit corresponding to a non-serving (or neighboring) cell SSB index in the list/set/pool of non-serving (or neighboring) cell SSB indices (or a TRP-specific index/ID value in the list of TRP-specific index/ID values). If an entry/bit in the bitmap is set to "1," the corresponding non-serving (or neighboring) cell SSB index, and therefore, the corresponding TRP-specific index/ID value such as PCI value is activated.

In another example, the UE could be first higher layer configured by the network (e.g., via higher layer RRC signaling) more than one (N_nsc>1) lists/sets/pools of non-serving (or neighboring) cell SSB indices. Each list/set/pool of non-serving (or neighboring) cell SSB indices could correspond to a non-serving (or neighboring) cell/TRP in the inter-cell system.

In such example, the non-serving (or neighboring) cell SSB indices across all N_nsc lists/sets/pools of non-serving (or neighboring) cell SSB indices, and therefore, the corresponding bit-width, could be determined across/with respect to all SSBs from/associated with/configured for all N_nsc non-serving (or neighboring) cells/TRPs in the inter-cell system. For instance, consider N_nsc non-serving (or neighboring) cells/TRPs in the inter-cell system each associated with N_ssb SSBs. The non-serving (or neighboring) cell SSB indices across all N_nsc>1 lists/sets/pools of non-serving (or neighboring) cell SSB indices could be configured as #0, #1, . . . , #(N_ssb×N_nsc−1), and the corresponding bit-width is ceil (log 2(N_ssb×N_nsc)), where ceil(k) returns the smallest integer that is greater than or equal to k. The SSB indices (in the n-th higher layer configured list/set/pool of non-serving (or neighboring) cell SSB indices) associated with the n-th non-serving (or neighboring) cell/TRP or the non-serving (or neighboring) cell/TRP #n in the inter-cell system could be configured as #N_ssb×(n−1), #N_ssb×(n−1)+1, . . . , #N_ssb×n−1.

In such example, alternatively, the non-serving (or neighboring) cell SSB indices within each list/set/pool of non-serving (or neighboring) cell SSB indices, and therefore, the corresponding bit-width, could be separately determined across/with respect to the SSBs from/associated with/configured for their associated non-serving (or neighboring) cell/TRP in the inter-cell system. For instance, consider N_nsc non-serving (or neighboring) cells/TRPs in the inter-cell system each associated with N_ssb SSBs. The SSB indices (in the n-th higher layer configured list/set/pool of non-serving (or neighboring) cell SSB indices) associated with the n-th non-serving (or neighboring) cell/TRP or the non-serving (or neighboring) cell/TRP #n in the inter-cell system could be configured as #0, #1, . . . , #N_ssb−1.

In addition, the UE could also be higher layer configured by the network (e.g., via higher layer RRC signaling) a list of N_nsc>1 TRP-specific index/ID values such as PCI values, TRP ID values, CORESETPoolIndex values or other TRP-specific higher layer signaling index values for the non-serving (or neighboring) cells/TRPs in the inter-cell system. Each higher layer configured list/set/pool of non-serving (or neighboring) cell SSB indices could correspond to an entry in the list of TRP-specific index/ID values such as PCI values. For instance, the first list/set/pool of non-serving (or neighboring) cell SSB indices could correspond to the first entry in the list of TRP-specific index/ID values such as PCI values, the second list/set/pool of non-serving (or neighboring) cell SSB indices could correspond to the second entry in the list of TRP-specific index/ID values such as PCI values, and so on, and the last list/set/pool of non-serving (or neighboring) cell SSB indices could correspond to the last entry in the list of TRP-specific index/ID values such as PCI values.

The UE could then receive from the network N_nsc>1 MAC CE commands with each MAC CE command activating one or more non-serving (or neighboring) cell SSBs from a higher layer configured list/set/pool of non-serving (or neighboring) cell SSB indices, and therefore, activating the associated TRP-specific index/ID value such as PCI value from the higher layer configured list of TRP-specific index/ID values such as PCI values. Alternatively, the UE could receive from the network N_nsc>1 bitmaps with each bitmap corresponding to a list/set/pool of non-serving (or neighboring) cell SSB indices. Each entry/bit in a bitmap corresponds to a non-serving (or neighboring) cell SSB index in the corresponding list/set/pool of non-serving (or neighboring) cell SSB indices (or a TRP-specific index/ID value in the list of TRP-specific index/ID values). If an entry/bit in a bitmap is set to "1," the corresponding non-serving (or neighboring) cell SSB index in the associated list/set/pool of non-serving (or neighboring) cell SSB indices, and therefore, the corresponding TRP-specific index/ID value such as PCI value is activated.

In one embodiment, means of indicating non-serving (or neighboring) cell RS information in CSI resource/reporting setting are provided.

In one embodiment, the non-serving (or neighboring) cell RS information could be included/indicated in CSI resource configuration/setting related higher layer parameter(s) and/or CSI reporting configuration/setting related higher layer parameter(s) to perform beam measurement and reporting for the inter-cell operation.

Figure 26:
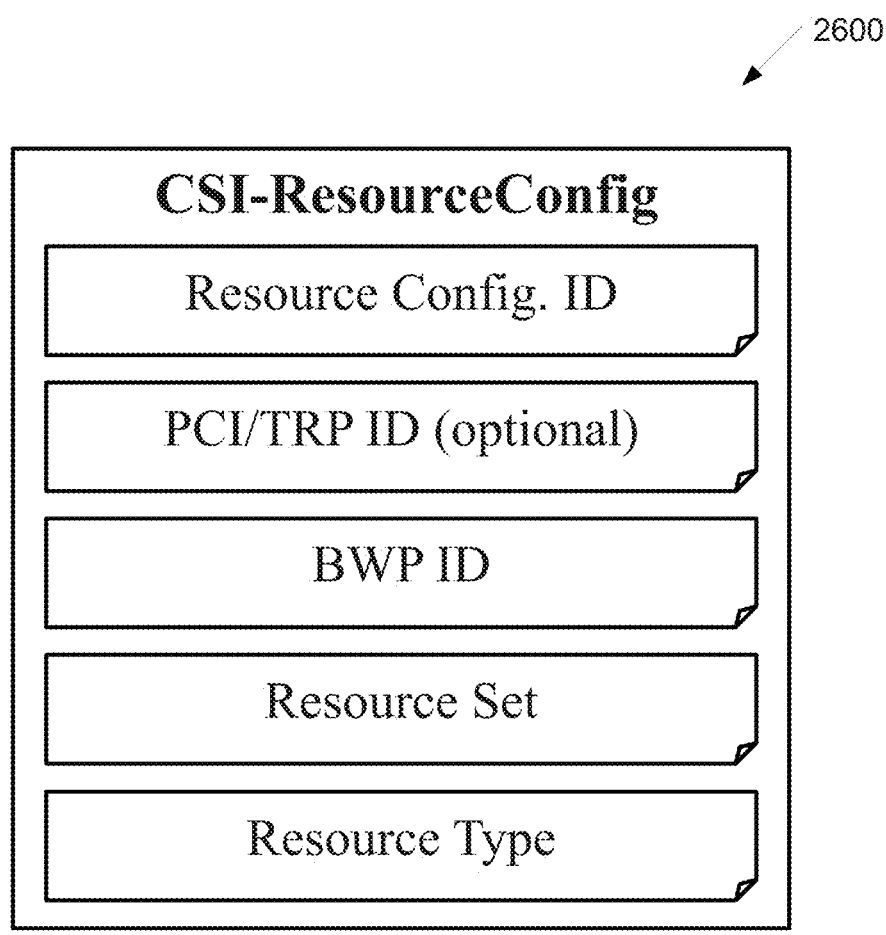
FIG. 26 illustrates an example CSI resource configuration according to embodiments of the present disclosure.

FIG. 26 illustrates an example CSI resource configuration 2600 according to embodiments of the present disclosure. An embodiment of the CSI resource configuration 2600 shown in FIG. 26 is for illustration only.

The higher layer parameter CSI-ResourceConfig is illustrated in FIG. 26.

TABLE 20 shows an example of including/indicating the (non-serving (or neighboring) cell) PCI/TRP ID value in CSI resource setting.

(i.e., a new field/parameter physicalCellId is included/configured in the higher layer parameter CSI-ResourceConfig to indicate non-serving (or neighboring) cell RS(s) for measurement). If the PCI/TRP ID value (e.g., physicalCellId) is not configured/present in the higher layer parameter CSI-ResourceConfig, the UE could expect that the indicated RS(s) in the higher layer parameter CSI-ResourceConfig is transmitted from/associated with/configured for the serving cell/TRP.

In another example-4.2.2, a one-bit flag indicator could be included/indicated in the higher layer parameter CSI-ResourceConfig. For an inter-cell system comprising of a single non-serving (or neighboring) cell/TRP, if the UE is indicated by the network a CSI resource setting (via the higher layer parameter CSI-ResourceConfig) with the 1-bit flag indicator set to "0" (or "OFF" or "FALSE") or not configured/present, the UE would expect that the RS(s) such as the SSB(s)/CSI-RS(s) indicated in the higher layer parameter CSI-ResourceConfig is transmitted from/associated with/configured for the serving cell/TRP. Otherwise, if the UE is indicated by the network a CSI resource setting (via the higher layer parameter CSI-ResourceConfig) with the 1-bit flag indicator set to "1" (or "ON" or "TRUE"), the UE would expect that the RS(s) such as the SSB(s)/CSI-RS(s) indicated in the higher layer parameter CSI-ResourceConfig is transmitted from/associated with/configured for the non-serving (or neighboring) cell/TRP in the inter-cell system.

TABLE 20

An example of including/indicating the (non-serving (or neighboring) cell) PCI/TRP ID value in CSI resource setting

```
CSI-ResourceConfig ::= SEQUENCE {
   csi-ResourceConfigId CSI-ResourceConfigId,
   physicalCellId PhyCellId, OPTIONAL, -- Need S
csi-RS-ResourceSetList CHOICE {
nzp-CSI-RS-SSB SEQUENCE {
nzp-CSI-RS-ResourceSetList SEQUENCE (SIZE (1..maxNrofNZP-CSI-RS-
ResourceSetsPerConfig)) OF NZP-CSI-RS-ResourceSetId
 OPTIONAL, -- Need R
csi-SSB-ResourceSetList SEQUENCE (SIZE (1..maxNrofCSI-SSB-ResourceSetsPerConfig))
OF CSI-SSB-ResourceSetId OPTIONAL -- Need R
},
csi-IM-ResourceSetList SEQUENCE (SIZE (1..maxNrofCSI-IM-ResourceSetsPerConfig)) OF
CSI-IM-ResourceSetId
},
bwp-Id BWP-Id,
resourceType ENUMERATED { aperiodic, semiPersistent, periodic },
...
}
```

In one example-4.2.1, the TRP-specific index/ID value such as PCI value, TRP ID value, CORES ETPoolIndex value or other TRP-specific higher layer signaling index values could be included/indicated in the higher layer parameter CSI-ResourceConfig. In TABLE 20, an example of including/indicating the (non-serving (or neighboring) cell) PCI/TRP ID value in CSI-ResourceConfig is presented, and a snippet of the corresponding IE is given in TABLE 21

A snippet of the higher layer parameter CSI-ResourceConfig incorporating the one-bit flag indicator (nsc-flag) is shown in TABLE 21. If the one-bit flag indicator (e.g., nsc-flag) is not configured/present in the higher layer parameter CSI-ResourceConfig, the UE could expect that the indicated RS(s) in the higher layer parameter CSI-ResourceConfig is transmitted from/associated with/configured for the serving cell/TRP.

TABLE 21

One-bit flag indicator (nsc-flag) in CSI resource setting

```
CSI-ResourceConfig ::= SEQUENCE {
   csi-ResourceConfigId CSI-ResourceConfigId,
   nsc-flag ENUMERATED {true} OPTIONAL, -- Need R
csi-RS-ResourceSetList CHOICE {
nzp-CSI-RS-SSB SEQUENCE {
```

TABLE 21-continued

One-bit flag indicator (nsc-flag) in CSI resource setting nzp-CSI-RS-ResourceSetList SEQUENCE (SIZE (1..maxNrofNZP-CSI-RS-ResourceSetsPerConfig)) OF NZP-CSI-RS-ResourceSetId
 OPTIONAL, -- Need R
csi-SSB-ResourceSetList SEQUENCE (SIZE (1..maxNrofCSI-SSB-ResourceSetsPerConfig))
OF CSI-SSB-ResourceSetId OPTIONAL -- Need R
},
csi-IM-ResourceSetList SEQUENCE (SIZE (1..maxNrofCSI-IM-ResourceSetsPerConfig)) OF
CSI-IM-ResourceSetId
},
bwp-Id BWP-Id,
resourceType ENUMERATED { aperiodic, semiPersistent, periodic },
...
}

In yet another example-4.2.3, for an inter-cell system comprising of more than one (N_nsc>1) non-serving (or neighboring) cells/TRPs, a multi-bit (e.g., n_b bits) indicator could be incorporated/indicated in the higher layer parameter CSI-ResourceConfig to indicate to the UE the serving cell RSs and/or the non-serving (or neighboring) cell RSs from the N_nsc non-serving (or neighboring) cells for beam measurement. The number of bits n_b required for representing the multi-bit indicator could be ceil (log 2(N_nsc+ 1)), where ceil(x) rounds x up to the next largest integer. In this case, the n_b-bit indicator could correspond to 2^(n_b) states, and one of the states (e.g., the first state) could correspond to the serving cell/TRP, and the rest of the states could correspond to the non-serving (or neighboring) cells/TRPs.

For example, if n_b=2, the corresponding four states are "00," "01," "10," and "11." The first state "00" could correspond to the serving cell, and the rest of the three states could correspond to the non-serving (or neighboring) cells. If, e.g., "00" is indicated in the higher layer parameter CSI-ResourceConfig, the UE would expect that the RS(s) indicated in the corresponding CSI resource setting is transmitted from/associated with/configured for the serving cell/TRP. Alternatively, the number of bits n_b required for representing the multi-bit indicator could be ceil(log 2(N_nsc)).

In this case, the multi-bit indicator only indicates/identifies the RSs from the N_nsc non-serving (or neighboring) cells/TRPs in the higher layer parameter CSI-ResourceConfig; if the multi-bit indicator is not present/configured in the higher layer parameter CSI-ResourceConfig, the UE would expect that the RS(s) indicated in the corresponding CSI resource setting is from/associated with/configured for the serving cell/TRP. Under this setting, all of the 2^(n_b) states would only correspond to the N_nsc non-serving (or neighboring) cells. The UE could be configured by the network through higher layer RRC signaling the association rule(s)/mapping relationship(s) between the states of the multi-bit indicator and the serving/non-serving (or neighboring) cells/TRPs.

For example, the UE could be first higher layer configured by the network (e.g., via higher layer RRC signaling) a list/set/pool of TRP-specific index/ID values such as PCI values, TRP ID values, CORESETPoolIndex values or other TRP-specific higher layer signaling index values. The higher layer configured list/set/pool of TRP-specific index/ID values could contain the TRP-specific index/ID values for both the serving cell/TRP and the non-serving (or neighboring) cells/TRPs in the inter-cell system or the TRP-specific index/ID values for only the non-serving (or neighboring) cells/TRPs.

The first state or the state of the multi-bit indicator having the smallest value could correspond to the first entry in the higher layer configured list/set/pool of TRP-specific index/ID values, the second state or the state of the multi-bit indicator having the second smallest value could correspond to the second entry in the higher layer configured list/set/pool of TRP-specific index/ID values, and so on, and the last state or the state of the multi-bit indicator having the largest value could correspond to the last entry in the higher layer configured list/set/pool of TRP-specific index/ID values.

Alternatively, the UE could know the association rule(s)/mapping relationship(s) between the states of the multi-bit indicator and the serving/non-serving (or neighboring) cells/TRPs in an implicit manner. For instance, the state of the multi-bit indicator having the smallest value could correspond to the serving/non-serving (or neighboring) cell/TRP with the lowest PCI, the state of the multi-bit indicator having the second smallest value could correspond to the serving/non-serving (or neighboring) cell/TRP with the second lowest PCI, and so on, and the state of the multi-bit indicator having the largest value could correspond to the serving/non-serving (or neighboring) cell/TRP with the highest PCI.

One example characterizing the above described mapping relationship between the states of the multi-bit indicator and the serving/non-serving (or neighboring) cells/TRPs is presented in TABLE 13 in this disclosure. If the multi-bit indicator is not configured/present in the higher layer parameter CSI-ResourceConfig, the UE could expect that the indicated RS(s) in the higher layer parameter CSI-ResourceConfig is transmitted from/associated with/configured for the serving cell/TRP.

In yet another example-4.2.4, a second CSI-RS resource set could be included/indicated in the higher layer parameter CSI-ResourceConfig to identify/indicate the non-serving (or neighboring) cell RS(s) such as SSB(s)/CSI-RS(s) transmitted from/associated with/configured for one or more non-serving (or neighboring) cells/TRPs in the inter-cell system. One example of incorporating a second CSI-RS resource set for indicating the non-serving (or neighboring) cell RS(s) in the higher layer parameterCSI-ResourceConfig is given in TABLE 22 (e.g., via csi-RS-ResourceSetList-nsc). Another example of incorporating a second CSI-RS resource set for indicating the non-serving (or neighboring) cell RS(s) in the higher layer parameter CSI-ResourceConfig is given in TABLE 23 (e.g., via nzp-CSI-RS-SSB-nsc and/or csi-IM-ResourceSetList-nsc).

Yet another example of incorporating a second CSI-RS resource set for indicating the non-serving (or neighboring) cell RS(s) in the higher layer parameter CSI-ResourceConfig is given in TABLE 24 (e.g., via nzp-CSI-RS-ResourceSetList-nsc and/or csi-SSB-ResourceSetList-nsc and/or csi-IM-ResourceSetList-nsc).

TABLE 22

An example of incorporating/indicating a second CSI-RS resource set in CSI resource setting

```
CSI-ResourceConfig ::= SEQUENCE {
  csi-ResourceConfigId CSI-ResourceConfigId,
csi-RS-ResourceSetList CHOICE {
nzp-CSI-RS-SSB SEQUENCE {
nzp-CSI-RS-ResourceSetList SEQUENCE (SIZE (1..maxNrofNZP-CSI-RS-
ResourceSetsPerConfig)) OF NZP-CSI-RS-ResourceSetId
 OPTIONAL, -- Need R
csi-SSB-ResourceSetList SEQUENCE (SIZE (1..maxNrofCSI-SSB-ResourceSetsPerConfig))
OF CSI-SSB-ResourceSetId OPTIONAL -- Need R
},
csi-IM-ResourceSetList SEQUENCE (SIZE (1..maxNrofCSI-IM-ResourceSetsPerConfig)) OF
CSI-IM-ResourceSetId
},
    csi-RS-ResourceSetList-nsc CHOICE {
nzp-CSI-RS-SSB SEQUENCE {
nzp-CSI-RS-ResourceSetList SEQUENCE (SIZE (1..maxNrofNZP-CSI-RS-
ResourceSetsPerConfig)) OF NZP-CSI-RS-ResourceSetId
 OPTIONAL, -- Need R
csi-SSB-ResourceSetList SEQUENCE (SIZE (1..maxNrofCSI-SSB-ResourceSetsPerConfig))
OF CSI-SSB-ResourceSetId OPTIONAL -- Need R
},
csi-IM-ResourceSetList SEQUENCE (SIZE (1..maxNrofCSI-IM-ResourceSetsPerConfig)) OF
CSI-IM-ResourceSetId
},
bwp-Id BWP-Id,
resourceType ENUMERATED { aperiodic, semiPersistent, periodic },
...
}
```

TABLE 23

Another example of incorporating/indicating a second CSI-RS resource set in CSI resource setting

```
CSI-ResourceConfig ::= SEQUENCE {
  csi-ResourceConfigId CSI-ResourceConfigId,
csi-RS-ResourceSetList CHOICE {
nzp-CSI-RS-SSB SEQUENCE {
nzp-CSI-RS-ResourceSetList SEQUENCE (SIZE (1..maxNrofNZP-CSI-RS-
ResourceSetsPerConfig)) OF NZP-CSI-RS-ResourceSetId
 OPTIONAL, -- Need R
csi-SSB-ResourceSetList SEQUENCE (SIZE (1..maxNrofCSI-SSB-ResourceSetsPerConfig))
OF CSI-SSB-ResourceSetId OPTIONAL -- Need R
},
nzp-CSI-RS-SSB-nsc SEQUENCE {
nzp-CSI-RS-ResourceSetList SEQUENCE (SIZE (1..maxNrofNZP-CSI-RS-
ResourceSetsPerConfig)) OF NZP-CSI-RS-ResourceSetId
 OPTIONAL, -- Need R
csi-SSB-ResourceSetList SEQUENCE (SIZE (1..maxNrofCSI-SSB-ResourceSetsPerConfig))
OF CSI-SSB-ResourceSetId OPTIONAL -- Need R
},
csi-IM-ResourceSetList SEQUENCE (SIZE (1..maxNrofCSI-IM-ResourceSetsPerConfig)) OF
CSI-IM-ResourceSetId
csi-IM-ResourceSetList-nsc SEQUENCE (SIZE (1..maxNrofCSI-IM-
ResourceSetsPerConfig)) OF CSI-IM-ResourceSetId
},
bwp-Id BWP-Id,
resourceType ENUMERATED { aperiodic, semiPersistent, periodic },
...
}
```

TABLE 24

Yet another example of incorporating/indicating a second CSI-RS resource set in CSI resource setting

```
CSI-ResourceConfig ::= SEQUENCE {
  csi-ResourceConfigId CSI-ResourceConfigId,
```

TABLE 24-continued

Yet another example of incorporating/indicating a second CSI-RS resource set in CSI resource setting

```
csi-RS-ResourceSetList CHOICE {
nzp-CSI-RS-SSB SEQUENCE {
nzp-CSI-RS-ResourceSetList SEQUENCE (SIZE (1..maxNrofNZP-CSI-RS-
ResourceSetsPerConfig)) OF NZP-CSI-RS-ResourceSetId
 OPTIONAL, -- Need R
nzp-CSI-RS-ResourceSetList-nsc SEQUENCE (SIZE (1..maxNrofNZP-CSI-RS-
ResourceSetsPerConfig)) OF NZP-CSI-RS-ResourceSetId
 OPTIONAL, -- Need R
csi-SSB-ResourceSetList SEQUENCE (SIZE (1..maxNrofCSI-SSB-ResourceSetsPerConfig))
OF CSI-SSB-ResourceSetId OPTIONAL -- Need R
csi-SSB-ResourceSetList-nsc SEQUENCE (SIZE (1..maxNrofCSI-SSB-
ResourceSetsPerConfig)) OF CSI-SSB-ResourceSetId OPTIONAL -- Need R
 },
csi-IM-ResourceSetList SEQUENCE (SIZE (1..maxNrofCSI-IM-ResourceSetsPerConfig)) OF
CSI-IM-ResourceSetId
csi-IM-ResourceSetList-nsc SEQUENCE (SIZE (1..maxNrofCSI-IM-
ResourceSetsPerConfig)) OF CSI-IM-ResourceSetId
 },
bwp-Id BWP-Id,
resourceType ENUMERATED { aperiodic, semiPersistent, periodic },
...
}
```

The UE could be first higher layer configured by the network, e.g., via higher layer RRC signaling, a list of CSI resource settings (i.e., a list of higher layer parameters CSI-ResourceConfig's), each corresponding to/associated with a distinct PCI corresponding to either the serving cell/TRP or a non-serving (or neighboring) cell/TRP. The detailed association methods between a CSI resource setting and a PCI could follow those specified in example-4.2.1, example-4.2.2, example-4.2.3 and example-4.2.4. The UE could then receive from the network one or more MAC CE activation commands and/or bitmaps and/or DCIs to activate/indicate one or more CSI resource settings from the higher layer RRC configured list of CSI resource settings for one or more PCIs.

For the higher layer parameter CSI-SSB-ResourceSet, in one example-4.2.5, the TRP-specific index/ID value such as PCI value, TRP ID value, CORESETPoolIndex value or other TRP-specific higher layer signaling index values could be included/indicated in the higher layer parameter CSI-SSB-ResourceSet. In TABLE 25, an example of including/indicating the (non-serving (or neighboring) cell) PCI value in CSI-SSB-ResourceSet is presented (i.e., a new field/parameter physicalCellId is included/configured in the higher layer parameter CSI-SSB-ResourceSet to indicate non-serving (or neighboring) cell SSB(s) for measurement). If the PCI/TRP ID value (e.g., physicalCellId) is not configured/present in the higher layer parameter CSI-SSB-ResourceSet, the UE could expect that the indicated RS(s) in the higher layer parameter CSI-SSB-ResourceSet is transmitted from/associated with/configured for the serving cell/TRP.

TABLE 25

An example of including/indicating the (non-serving (or neighboring) cell) PCI value in higher layer parameter CSI-SSB-ResourceSet

```
CSI-SSB-ResourceSet ::= SEQUENCE {
  csi-SSB-ResourceSetId CSI-SSB-ResourceSetId,
  physicalCellId PhyCellId, OPTIONAL, -- Need S
```

TABLE 25-continued

An example of including/indicating the (non-serving (or neighboring) cell) PCI value in higher layer parameter CSI-SSB-ResourceSet

```
  csi-SSB-ResourceList SEQUENCE (SIZE(1..maxNrofCSI-SSB-
  ResourcePerSet)) OF SSB-Index,
  ...
}
```

For the higher layer parameter CSI-SSB-ResourceSet, in another example-4.2.6, a one-bit flag indicator could be included/indicated in the higher layer parameter CSI-SSB-ResourceSet. For an inter-cell system comprising of a single non-serving (or neighboring) cell/TRP, if the UE is indicated by the network a SSB resource set (via the higher layer parameter CSI-SSB-ResourceSet) with the 1-bit flag indicator set to "0" (or "OFF" or "FALSE") or not configured/present, the UE would expect that the SSB(s) indicated in the higher layer parameter CSI-SSB-ResourceSet is transmitted from/associated with/configured for the serving cell/TRP. Otherwise, if the UE is indicated by the network a SSB resource set (via the higher layer parameter CSI-SSB-ResourceSet) with the 1-bit flag indicator set to "1" (or "ON" or "TRUE"), the UE would expect that the SSB(s) indicated in the higher layer parameter CSI-SSB-ResourceSet is transmitted from/associated with/configured for the non-serving (or neighboring) cell/TRP in the inter-cell system.

A snippet of the higher layer parameter CSI-SSB-ResourceSet incorporating the one-bit flag indicator (nsc-flag) is shown in TABLE 26. If the one-bit flag indicator (e.g., nsc-flag) is not configured/present in the higher layer parameter CSI-SSB-ResourceSet, the UE could expect that the indicated RS(s) in the higher layer parameter CSI-SSB-ResourceSet is transmitted from/associated with/configured for the serving cell/TRP.

TABLE 26

Higher layer parameter CSI-SSB-ResourceSet
including/indicating a one-bit flag

CSI-SSB-ResourceSet ::= SEQUENCE {
   csi-SSB-ResourceSetId CSI-SSB-ResourceSetId,
   nsc-flag ENUMERATED {true} OPTIONAL, -- Need R
   csi-SSB-ResourceList SEQUENCE (SIZE(1..maxNrofCSI-SSB-
   ResourcePerSet)) OF SSB-Index,
   ...
}

For the higher layer parameter CSI-SSB-ResourceSet, in yet another example-4.2.7, for an inter-cell system comprising of more than one (N_nsc>1) non-serving (or neighboring) cells/TRPs, a multi-bit (e.g., n_b bits) indicator could be incorporated/indicated in the higher layer parameter CSI-SSB-ResourceSet to indicate to the UE the serving cell SSBs and/or the non-serving (or neighboring) cell SSBs from the N_nsc non-serving (or neighboring) cells for beam measurement. The number of bits n_b required for representing the multi-bit indicator could be ceil (log 2(N_nsc+1)), where ceil(x) rounds x up to the next largest integer. In this case, the n_b-bit indicator could correspond to $2^{(n\_b)}$ states, and one of the states (e.g., the first state) could correspond to the serving cell/TRP, and the rest of the states could correspond to the non-serving (or neighboring) cells/TRPs.

For example, if n_b=2, the corresponding four states are "00," "01," "10," and "11." The first state "00" could correspond to the serving cell, and the rest of the three states could correspond to the non-serving (or neighboring) cells. If, e.g., "00" is indicated in the higher layer parameter CSI-SSB-ResourceSet, the UE would expect that the SSB(s) indicated in the corresponding SSB resource set is transmitted from/associated with the serving cell/TRP. Alternatively, the number of bits n_b required for representing the multi-bit indicator could be ceil(log 2(N_nsc)).

In this case, the multi-bit indicator only indicates/identifies the SSBs from the N_nsc non-serving (or neighboring) cells/TRPs in the higher layer parameter CSI-SSB-ResourceSet; if the multi-bit indicator is not present/configured in the higher layer parameter CSI-SSB-ResourceSet, the UE would expect that the RS(s) indicated in the corresponding SSB resource set is from/associated with/configured for the serving cell/TRP. Under this setting, all of the $2^{(n\_b)}$ states would only correspond to the N_nsc non-serving (or neighboring) cells.

The UE could be configured by the network through higher layer RRC signaling the association rule(s)/mapping relationship(s) between the states of the multi-bit indicator and the serving/non-serving (or neighboring) cells/TRPs. For example, the UE could be first higher layer configured by the network (e.g., via higher layer RRC signaling) a list/set/pool of TRP-specific index/ID values such as PCI values, TRP ID values, CORESETPoolIndex values or other TRP-specific higher layer signaling index values. The higher layer configured list/set/pool of TRP-specific index/ID values could contain the TRP-specific index/ID values for both the serving cell/TRP and the non-serving (or neighboring) cells/TRPs in the inter-cell system or the TRP-specific index/ID values for only the non-serving (or neighboring) cells/TRPs.

The first state or the state of the multi-bit indicator having the smallest value could correspond to the first entry in the higher layer configured list/set/pool of TRP-specific index/ID values, the second state or the state of the multi-bit indicator having the second smallest value could correspond to the second entry in the higher layer configured list/set/pool of TRP-specific index/ID values, and so on, and the last state or the state of the multi-bit indicator having the largest value could correspond to the last entry in the higher layer configured list/set/pool of TRP-specific index/ID values. Alternatively, the UE could know the association rule(s)/mapping relationship(s) between the states of the multi-bit indicator and the serving/non-serving (or neighboring) cells/TRPs in an implicit manner.

For instance, the state of the multi-bit indicator having the smallest value could correspond to the serving/non-serving (or neighboring) cell/TRP with the lowest PCI, the state of the multi-bit indicator having the second smallest value could correspond to the serving/non-serving (or neighboring) cell/TRP with the second lowest PCI, and so on, and the state of the multi-bit indicator having the largest value could correspond to the serving/non-serving (or neighboring) cell/TRP with the highest PCI. One example characterizing the above described mapping relationship between the states of the multi-bit indicator and the serving/non-serving (or neighboring) cells/TRPs is presented in TABLE 13 in this disclosure. If the multi-bit indicator is not configured/present in the higher layer parameter CSI-SSB-ResourceSet, the UE could expect that the indicated RS(s) in the higher layer parameter CSI-SSB-ResourceSet is transmitted from/associated with/configured for the serving cell/TRP.

TABLE 27

Higher layer parameter CSI-SSB-ResourceSet
including/indicating a second list of SSBs
for non-serving (or neighboring) cell(s)/TRP(s)

CSI-SSB-ResourceSet ::= SEQUENCE {
   csi-SSB-ResourceSetId CSI-SSB-ResourceSetId,
   csi-SSB-ResourceList SEQUENCE (SIZE(1..maxNrofCSI-SSB-
   ResourcePerSet)) OF SSB-Index,
   csi-SSB-ResourceList-nsc SEQUENCE (SIZE(1..maxNrofCSI-
   SSB-ResourcePerSet)) OF SSB-Index,
   ...
}

For the higher layer parameter CSI-SSB-ResourceSet, in yet another example-4.2.8, a second list of SSBs could be included/indicated in the higher layer parameter CSI-SSB-ResourceSet to identify/indicate the non-serving (or neighboring) cell SSB(s) transmitted from/associated with/configured for one or more non-serving (or neighboring) cells/TRPs in the inter-cell system. One example of incorporating a second list of SSBs for indicating the non-serving (or neighboring) cell SSB(s) in the higher layer parameter CSI-SSB-ResourceSet is given in TABLE 27 (e.g., via csi-SSB-ResourceList-nsc).

For the higher layer parameter CSI-SSB-ResourceSet, in yet another example-4.2.9, in the higher layer parameter CSI-SSB-ResourceSet, the indicated SSB resources, e.g., via csi-SSB-ResourceList, could be transmitted from/associated with/configured for the serving cell/TRP and/or one or more non-serving (or neighboring) cells/TRPs in the inter-cell system. The SSB indices in the higher layer parameter CSI-SSB-ResourceSet (i.e., csi-SSB-ResourceList), and therefore, the corresponding bit-width, could be determined across the SSBs from/associated with/configured for both the serving cell/TRP and the non-serving (or neighboring) cell(s)/TRP(s) in the inter-cell system.

Furthermore, the UE could expect that the SSB indices (indicated in csi-SSB-ResourceList) in the higher layer parameter CSI-SSB-ResourceSet associated with the serving cell/TRP and the non-serving (or neighboring) cell(s)/

TRP(s) in the inter-cell system may be different. For instance, for an inter-cell system comprising of a serving cell/TRP and N_nsc non-serving (or neighboring) cells/TRPs with each cell/TRP associated with N_ssb SSBs, the SSB indices in the higher layer parameter CSI-SSB-ResourceSet (i.e., csi-SSB-ResourceList) could be configured as #0, #1, . . . , #N_ssb×(N_nsc+1)−1.

The UE could be indicated by the network the mapping relationship(s)/association rule(s) between the actual SSB resource indices from/associated with/configured for the serving/non-serving (or neighboring) cells/TRPs in the inter-cell system and the SSB indices (in csi-SSB-ResourceList) in the higher layer parameter CSI-SSB-ResourceSet (the SSB (re-)indexing configuration/rule). Various design examples of the SSB (re-)indexing configurations/rules for an inter-cell system comprising of either a single non-serving (or neighboring) cell/TRP or more than one non-serving (or neighboring) cells/TRPs could be referred to those discussed in the aforementioned FIGURES and TABLES in this disclosure for TCI state/QCL information enhancements.

Figure 27:
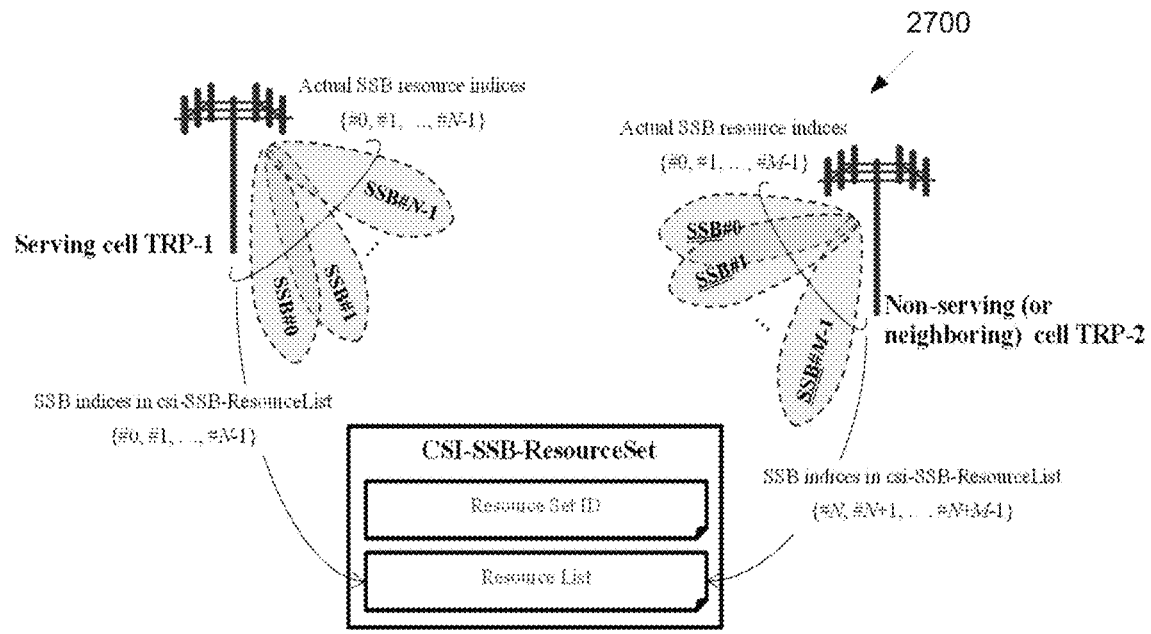
FIG. 27 illustrates an example the SSB (re-)indexing configuration/rule according to embodiments of the present disclosure.

FIG. 27 illustrates an example SSB (re-)indexing configuration/rule 2700 according to embodiments of the present disclosure. An embodiment of the SSB (re-)indexing configuration/rule 2700 shown in FIG. 27 is for illustration only.

As illustrated in FIG. 27, a conceptual example of applying the SSB (re-)indexing configuration/rule in the higher layer parameter CSI-SSB-ResourceSet for an inter-cell system comprising of a serving cell TRP-1 and a non-serving (or neighboring) cell TRP-2 is presented. Furthermore, the total numbers of SSBs from/associated with the serving cell TRP-1 and the non-serving (or neighboring) cell TRP-2 are N and M, and their actual SSB resource indices are {#0, #1, . . . , #N−1} and {#0, #1, . . . , #M−1}, respectively. As shown in FIG. 27, the SSB indices (indicated in csi-SSB-ResourceList) in the higher layer parameter CSI-SSB-ResourceSet are configured as {#0, #1, . . . , #N−1, #N, #N+1, . . . , #N+M−1}, which accounts for all the SSBs from/associated with/configured for the serving cell TRP-1 (associated with a total of N SSBs) and the non-serving (or neighboring) cell TRP-2 (associated with a total of M SSBs) in the inter-cell system. In this example, the corresponding SSB (re-)indexing configuration/rule that characterizes the mapping relationship/association rule between the actual SSB resource indices from/associated with/configured for the serving/non-serving (or neighboring) cells/TRPs in the inter-cell system and the SSB indices (in csi-SSB-ResourceList) in the higher layer parameter CSI-SSB-ResourceSet is: the SSBs from/associated with/configured for the serving cell TRP-1 with the SSB resource indices {#0, #1, . . . , #N−1} correspond to the SSB indices {#0, #1, . . . , #N−1} (configured in csi-SSB-ResourceList) in the higher layer parameter CSI-SSB-ResourceSet, and the SSBs from/associated with/configured for the non-serving (or neighboring) cell TRP-2 with the SSB resource indices {#0, #1, . . . , #M−1} correspond to the SSB indices {#N, #N+1, . . . , #N+M−1} (configured in csi-SSB-ResourceList) in the higher layer parameter CSI-SSB-ResourceSet.

The UE could be first higher layer configured by the network, e.g., via higher layer RRC signaling, a list of SSB resource sets (i.e., a list of higher layer parameters CSI-SSB-ResourceSet's), each corresponding to/associated with a distinct PCI corresponding to either the serving cell/TRP or a non-serving (or neighboring) cell/TRP. The detailed association methods between a SSB resource set and a PCI could follow those specified in example-4.2.5, example-4.2.6, example-4.2.7, example-4.2.8 and example-4.2.9. The UE could then receive from the network one or more MAC CE activation commands and/or bitmaps and/or DCIs to activate/indicate one or more SSB resource sets from the higher layer RRC configured list of SSB resource sets for one or more PCIs.

For the higher layer parameter NZP-CSI-RS-ResourceSet, in one example-4.2.10, the TRP-specific index/ID value such as PCI value, TRP ID value, CORESETPoolIndex value or other TRP-specific higher layer signaling index values could be included/indicated in the higher layer parameter NZP-CSI-RS-ResourceSet. In TABLE 28, an example of including/indicating the (non-serving (or neighboring) cell) PCI value in NZP-CSI-RS-ResourceSet is presented (i.e., a new field/parameter physicalCellId is included/configured in the higher layer parameter NZP-CSI-RS-ResourceSet to indicate non-serving (or neighboring) cell CSI-RS(s) for measurement). If the PCI/TRP ID value (e.g., physicalCellId) is not configured/present in the higher layer parameter NZP-CSI-RS-ResourceSet, the UE could expect that the indicated RS(s) in the higher layer parameter NZP-CSI-RS-ResourceSet is transmitted from/associated with/configured for the serving cell/TRP.

TABLE 28

An example of including/indicating the
(non-serving (or neighboring) cell) PCI value in
higher layer parameter NZP-CSI-RS-ResourceSet NZP-CSI-RS-ResourceSet ::= SEQUENCE {
  nzp-CSI-ResourceSetId NZP-CSI-RS-ResourceSetId,
  physicalCellId PhyCellId, OPTIONAL, -- Need S
  nzp-CSI-RS-Resources SEQUENCE (SIZE (1..maxNrofNZP-CSI-RS-ResourcesPerSet)) OF NZP-CSI-RS-ResourceId,
  repetition ENUMERATED { on, off } OPTIONAL, -- Need S
  aperiodicTriggeringOffset INTEGER(0..6) OPTIONAL, -- Need S
  trs-Info ENUMERATED {true} OPTIONAL, -- Need R
  ...,
  [[
  aperiodicTriggeringOffset-r16 INTEGER(0..31) OPTIONAL -- Need S
  ]]
}

For the higher layer parameter NZP-CSI-RS-ResourceSet, in another example-4.2.11, a one-bit flag indicator could be included/indicated in the higher layer parameter NZP-CSI-RS-ResourceSet. For an inter-cell system comprising of a single non-serving (or neighboring) cell/TRP, if the UE is indicated by the network a NZP CSI-RS resource set (via the higher layer parameter NZP-CSI-RS-ResourceSet) with the 1-bit flag indicator set to "0" (or "OFF" or "FALSE") or not configured/present, the UE would expect that the NZP CSI-RS(s) indicated in the higher layer parameter NZP-CSI-RS-ResourceSet is transmitted from/associated with/configured for the serving cell/TRP. Otherwise, if the UE is indicated by the network a NZP CSI-RS resource set (via the higher layer parameter NZP-CSI-RS-ResourceSet) with the 1-bit flag indicator set to "1" (or "ON" or "TRUE"), the UE would expect that the NZP CSI-RS(s) indicated in the higher layer parameter NZP-CSI-RS-ResourceSet is transmitted from/associated with/configured for the non-serving (or neighboring) cell/TRP in the inter-cell system.

A snippet of the higher layer parameter NZP-CSI-RS-ResourceSet incorporating the one-bit flag indicator (nsc-flag) is shown in TABLE 29. If the one-bit flag indicator (e.g., nsc-flag) is not configured/present in the higher layer parameter NZP-CSI-RS-ResourceSet, the UE could expect that the indicated RS(s) in the higher layer parameter NZP-CSI-RS-ResourceSet is transmitted from/associated with/configured for the serving cell/TRP.

TABLE 29

Higher layer parameter NZP-CSI-RS-ResourceSet
including/indicating a one-bit flag NZP-CSI-RS-ResourceSet ::= SEQUENCE {
  nzp-CSI-ResourceSetId NZP-CSI-RS-ResourceSetId,
  nsc-flag ENUMERATED {true} OPTIONAL, -- Need R
  nzp-CSI-RS-Resources SEQUENCE (SIZE (1..maxNrofNZP-CSI-RS-ResourcesPerSet)) OF NZP-CSI-RS-ResourceId,
  repetition ENUMERATED { on, off } OPTIONAL, -- Need S
  aperiodicTriggeringOffset INTEGER(0..6) OPTIONAL, -- Need S
  trs-Info ENUMERATED {true} OPTIONAL, -- Need R
  ...,
  [[
  aperiodicTriggeringOffset-r16 INTEGER(0..31) OPTIONAL -- Need S
  ]]
}

For the higher layer parameter NZP-CSI-RS-ResourceSet, in yet another example-4.2.12, for an inter-cell system comprising of more than one (N_nsc>1) non-serving (or neighboring) cells/TRPs, a multi-bit (e.g., n_b bits) indicator could be incorporated in the higher layer parameter NZP-CSI-RS-ResourceSet to indicate to the UE the serving cell CSI-RSs and/or the non-serving (or neighboring) cell CSI-RSs from the N_nsc non-serving (or neighboring) cells for beam measurement. The number of bits n_b required for representing the multi-bit indicator could be ceil (log 2(N_nsc+1)), where ceil(x) rounds x up to the next largest integer. In this case, the n_b-bit indicator could correspond to $2^{\wedge}(n\_b)$ states, and one of the states (e.g., the first state) could correspond to the serving cell/TRP, and the rest of the states could correspond to the non-serving (or neighboring) cells/TRPs.

For example, if n_b=2, the corresponding four states are "00," "01," "10," and "11." The first state "00" could correspond to the serving cell, and the rest of the three states could correspond to the non-serving (or neighboring) cells. If, e.g., "00" is indicated in the higher layer parameter NZP-CSI-RS-ResourceSet, the UE would expect that the NZP CSI-RS(s) indicated in the corresponding NZP CSI-RS resource set is transmitted from/associated with/configured for the serving cell/TRP. Alternatively, the number of bits n_b required for representing the multi-bit indicator could be ceil(log 2(N_nsc)).

In this case, the multi-bit indicator only indicates/identifies the NZP CSI-RSs from the N_nsc non-serving (or neighboring) cells/TRPs in the higher layer parameter NZP-CSI-RS-ResourceSet; if the multi-bit indicator is not present/configured in the higher layer parameter NZP-CSI-RS-ResourceSet, the UE would expect that the NZP CSI-RS(s) indicated in the corresponding NZP CSI-RS resource set is from/associated with/configured for the serving cell/TRP. Under this setting, all of the $2^{\wedge}(n\_b)$ states would only correspond to the N_nsc non-serving (or neighboring) cells. The UE could be configured by the network through higher layer RRC signaling the association rule(s)/mapping relationship(s) between the states of the multi-bit indicator and the serving/non-serving (or neighboring) cells/TRPs.

For example, the UE could be first higher layer configured by the network (e.g., via higher layer RRC signaling) a list/set/pool of TRP-specific index/ID values such as PCI values, TRP ID values, CORESETPoolIndex values or other TRP-specific higher layer signaling index values. The higher layer configured list/set/pool of TRP-specific index/ID values could contain the TRP-specific index/ID values for both the serving cell/TRP and the non-serving (or neighboring) cells/TRPs in the inter-cell system or the TRP-specific index/ID values for only the non-serving (or neighboring) cells/TRPs. The first state or the state of the multi-bit indicator having the smallest value could correspond to the first entry in the higher layer configured list/set/pool of TRP-specific index/ID values, the second state or the state of the multi-bit indicator having the second smallest value could correspond to the second entry in the higher layer configured list/set/pool of TRP-specific index/ID values, and so on, and the last state or the state of the multi-bit indicator having the largest value could correspond to the last entry in the higher layer configured list/set/pool of TRP-specific index/ID values.

Alternatively, the UE could know the association rule(s)/mapping relationship(s) between the states of the multi-bit indicator and the serving/non-serving (or neighboring) cells/TRPs in an implicit manner. For instance, the state of the multi-bit indicator having the smallest value could correspond to the serving/non-serving (or neighboring) cell/TRP with the lowest PCI, the state of the multi-bit indicator having the second smallest value could correspond to the serving/non-serving (or neighboring) cell/TRP with the second lowest PCI, and so on, and the state of the multi-bit indicator having the largest value could correspond to the serving/non-serving (or neighboring) cell/TRP with the highest PCI. One example characterizing the above described mapping relationship between the states of the multi-bit indicator and the serving/non-serving (or neighboring) cells/TRPs is presented in TABLE 13 in this disclosure. If the multi-bit indicator is not configured/present in the higher layer parameter NZP-CSI-RS-ResourceSet, the UE could expect that the indicated RS(s) in the higher layer parameter NZP-CSI-RS-ResourceSet is transmitted from/associated with/configured for the serving cell/TRP.

TABLE 30

An example of incorporating/indicating a
second list of NZP CSI-RSs for non-serving
(or neighboring) cell(s)/TRP(s)

NZP-CSI-RS-ResourceSet ::= SEQUENCE {
  nzp-CSI-ResourceSetId NZP-CSI-RS-ResourceSetId,
  nzp-CSI-RS-Resources SEQUENCE (SIZE (1..maxNrofNZP-CSI-RS-ResourcesPerSet)) OF NZP-CSI-RS-ResourceId,
  repetition ENUMERATED { on, off } OPTIONAL, -- Need S
  aperiodicTriggeringOffset INTEGER(0..6) OPTIONAL, -- Need S
  trs-Info ENUMERATED {true} OPTIONAL, -- Need R
  ...,
  [[
  aperiodicTriggeringOffset-r16 INTEGER(0..31) OPTIONAL -- Need S
  ]]
  nzp-CSI-RS-Resources-nsc SEQUENCE (SIZE (1..maxNrofNZP-CSI-RS-ResourcesPerSet)) OF NZP-CSI-RS-ResourceId,
  repetition-nsc ENUMERATED { on, off } OPTIONAL, -- Need S
  aperiodicTriggeringOffset-nsc INTEGER(0..6) OPTIONAL, -- Need S
  trs-Info-nsc ENUMERATED {true} OPTIONAL, -- Need R
  ...,
  [[
  aperiodicTriggeringOffset-r16-nsc INTEGER(0..31) OPTIONAL -- Need S
  ]]
}

For the higher layer parameter NZP-CSI-RS-ResourceSet, in yet another example-4.2.13, a second list of NZP CSI-RSs and their corresponding configuration parameters could be included/indicated in the higher layer parameter NZP-CSI-RS-ResourceSet to identify/indicate the non-serving (or neighboring) cell NZP CSI-RS(s) transmitted from/associated with/configured for one or more non-serving (or neighboring) cells/TRPs in the inter-cell system. One example of incorporating/indicating a second list of NZP CSI-RSs for indicating the non-serving (or neighboring) cell NZP CSI-RS(s) in the higher layer parameter NZP-CSI-RS-ResourceSet is given in TABLE 30 (e.g., via nzp-CSI-RS-Resources-nsc). Furthermore, as shown in TABLE 30, the NZP CSI-RS configuration parameters repetition-nsc, aperiodicTriggeringOffset-nsc, trs-Info-nsc and etc. corresponding to the second list of NZP CSI-RS resources configured for indicating the non-serving (or neighboring) cell NZP CSI-RS(s) are also included/indicated in the higher layer parameter NZP-CSI-RS-ResourceSet.

For the higher layer parameter NZP-CSI-RS-ResourceSet, in yet another example-4.2.14, in the higher layer parameter NZP-CSI-RS-ResourceSet, the indicated NZP CSI-RS resources, e.g., via nzp-CSI-RS-Resources, could be transmitted from/associated with/configured for the serving cell/TRP and/or one or more non-serving (or neighboring) cells/TRPs in the inter-cell system. The NZP CSI-RS indices in the higher layer parameter NZP-CSI-RS-ResourceSet (i.e., nzp-CSI-RS-Resources), and therefore, the corresponding bit-width, could be determined across the NZP CSI-RSs from/associated with/configured for both the serving cell/TRP and the non-serving (or neighboring) cell(s)/TRP(s) in the inter-cell system.

Furthermore, the UE could expect that the NZP CSI-RS indices (indicated in nzp-CSI-RS-Resources) in the higher layer parameter NZP-CSI-RS-ResourceSet associated with the serving cell/TRP and the non-serving (or neighboring) cell(s)/TRP(s) in the inter-cell system may be different. For instance, for an inter-cell system comprising of a serving cell/TRP and N_nsc non-serving (or neighboring) cells/TRPs with each cell/TRP associated with N_csi NZP CSI-RSs, the NZP CSI-RS indices in the higher layer parameter NZP-CSI-RS-ResourceSet (i.e., nzp-CSI-RS-Resources) could be configured as #0, #1, . . . , #N_csi×(N_nsc+1)−1.

The UE could be indicated by the network the mapping relationship(s)/association rule(s) between the actual NZP CSI-RS resource indices from/associated with/configured for the serving/non-serving (or neighboring) cells/TRPs in the inter-cell system and the NZP CSI-RS indices (in nzp-CSI-RS-Resources) in the higher layer parameter NZP-CSI-RS-ResourceSet (CSI-RS (re-)indexing configuration/rule). Various design examples of the CSI-RS (re-)indexing configurations/rules for an inter-cell system comprising of either a single non-serving (or neighboring) cell/TRP or more than one non-serving (or neighboring) cells/TRPs could be referred to those discussed in the aforementioned FIGURES and TABLES in this disclosure for TCI state/QCL information enhancements.

Figure 28:
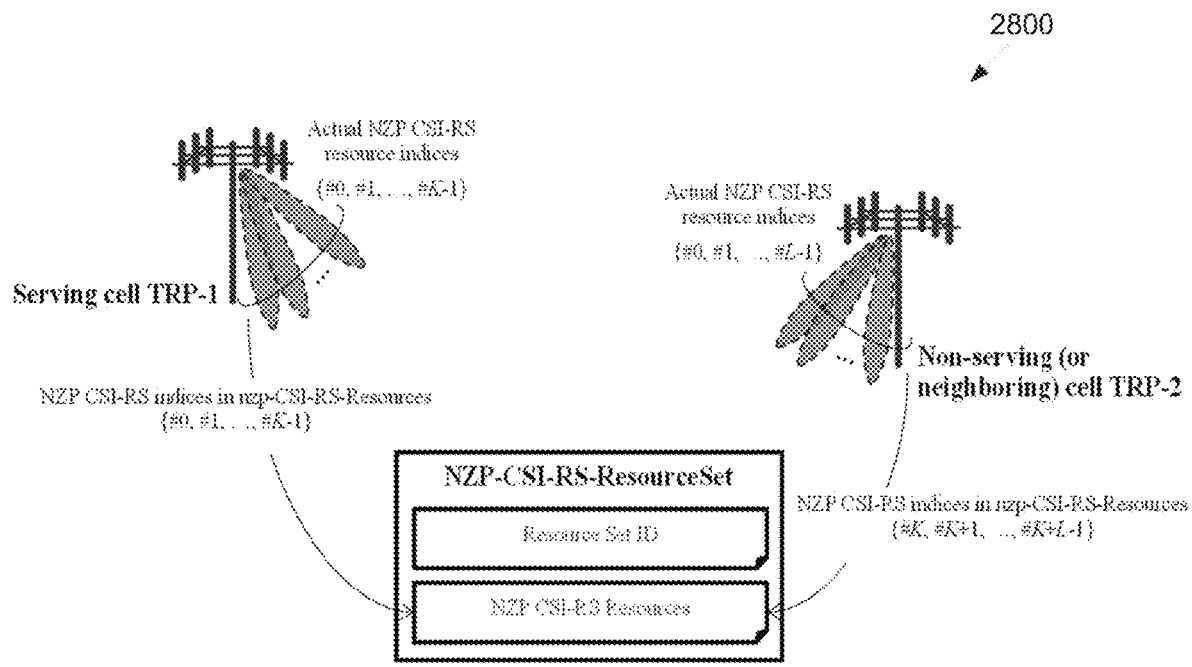
FIG. 28 illustrates an example CSI-RS (re-)indexing configuration/rule according to embodiments of the present disclosure.

FIG. 28 illustrates an example CSI-RS (re-)indexing configuration/rule 2800 according to embodiments of the present disclosure. An embodiment of the CSI-RS (re-)indexing configuration/rule 2800 shown in FIG. 28 is for illustration only.

As illustrated in FIG. 28, a conceptual example of applying the CSI-RS (re-)indexing configuration/rule in the higher layer parameter NZP-CSI-RS-ResourceSet for an inter-cell system comprising of a serving cell TRP-1 and a non-serving (or neighboring) cell TRP-2 is presented. Furthermore, the total numbers of NZP CSI-RSs from/associated with/configured for the serving cell TRP-1 and the non-serving (or neighboring) cell TRP-2 are K and L, and their actual NZP CSI-RS resource indices are {#0, #1, . . . , #K−1} and {#0, #1, . . . , #L−1}, respectively.

As shown in FIG. 28, the NZP CSI-RS indices (indicated in nzp-CSI-RS-Resources) in the higher layer parameter NZP-CSI-RS-ResourceSet are configured as {#0, #1, . . . , #K−1, #K, #K+1, . . . , #K+L−1}, which accounts for all the NZP CSI-RSs from/associated with/configured for the serving cell TRP-1 (associated with a total of K NZP CSI-RSs) and the non-serving (or neighboring) cell TRP-2 (associated with a total of L NZP CSI-RSs) in the inter-cell system. In this example, the corresponding CSI-RS (re-)indexing configuration/rule that characterizes the mapping relationship/association rule between the actual NZP CSI-RS resource indices from/associated with/configured for the serving/non-serving (or neighboring) cells/TRPs in the inter-cell system and the NZP CSI-RS indices (in nzp-CSI-RS-Resources) in the higher layer parameter NZP-CSI-RS-ResourceSet is: the NZP CSI-RSs from/associated with/configured for the serving cell TRP-1 with the NZP CSI-RS resource indices {#0, #1, . . . , #K−1} correspond to the NZP CSI-RS indices {#0, #1, . . . , #K−1} (configured in nzp-CSI-RS-Resources) in the higher layer parameter NZP-CSI-RS-ResourceSet, and the NZP CSI-RSs from/associated with/configured for the non-serving (or neighboring) cell TRP-2 with the NZP CSI-RS resource indices {#0, #1, . . . , #L−1} correspond to the NZP CSI-RS indices {#K, #K+1, . . . , #K+L−1} (configured in nzp-CSI-RS-Resources) in the higher layer parameter NZP-CSI-RS-ResourceSet.

The UE could be first higher layer configured by the network, e.g., via higher layer RRC signaling, a list of NZP CSI-RS resource sets (i.e., a list of higher layer parameters NZP-CSI-RS-ResourceSet's), each corresponding to/associated with a distinct PCI corresponding to either the serving cell/TRP or a non-serving (or neighboring) cell/TRP. The detailed association methods between a NZP CSI-RS resource set and a PCI could follow those specified in example-4.2.10, example-4.2.11, example-4.2.12, example-4.2.13 and example-4.2.14. The UE could then receive from the network one or more MAC CE activation commands and/or bitmaps and/or DCIs to activate/indicate one or more NZP CSI-RS resource sets from the higher layer RRC configured list of NZP CSI-RS resource sets for one or more PCIs.

For the higher layer parameter CSI-IM-ResourceSet, in one example-4.2.15, the TRP-specific index/ID value such as PCI value, TRP ID value, CORESETPoolIndex value or other TRP-specific higher layer signaling index values could be included/indicated in the higher layer parameter CSI-IM-ResourceSet. In TABLE 31, an example of including/indicating the (non-serving (or neighboring) cell) PCI value in CSI-IM-ResourceSet is presented (i.e., a new field/parameter physicalCellId is included/configured in the higher layer parameter CSI-IM-ResourceSet to indicate non-serving (or neighboring) cell RS(s) for interference measurement). If the PCI/TRP ID value (e.g., physicalCellId) is not configured/present in the higher layer parameter CSI-IM-ResourceSet, the UE could expect that the indicated RS(s) in the higher layer parameter CSI-IM-ResourceSet is transmitted from/associated with/configured for the serving cell/TRP.

TABLE 31

An example of including/indicating the (non-serving (or neighboring) cell) PCI value in higher layer parameter CSI-IM-ResourceSet CSI-IM-ResourceSet ::= SEQUENCE {
   csi-IM-ResourceSetId CSI-IM-ResourceSetId,
   physicalCellId PhyCellId, OPTIONAL, -- Need S

TABLE 31-continued

An example of including/indicating the (non-serving (or neighboring) cell) PCI value in higher layer parameter CSI-IM-ResourceSet

```
csi-IM-Resources SEQUENCE (SIZE(1..maxNrofCSI-IM-
ResourcesPerSet)) OF CSI-IM-ResourceId,
  ...
}
```

In another example-4.2.16, a one-bit flag indicator could be included/indicated in the higher layer parameter CSI-IM-ResourceSet. For an inter-cell system comprising of a single non-serving (or neighboring) cell/TRP, if the UE is indicated by the network a CSI-IM RS resource set (via the higher layer parameter CSI-IM-ResourceSet) with the 1-bit flag indicator set to "0" (or "OFF" or "FALSE") or not configured/present, the UE would expect that the CSI-IM RS(s) indicated in the higher layer parameter CSI-IM-ResourceSet is transmitted from/associated with/configured for the serving cell/TRP. Otherwise, if the UE is indicated by the network a CSI-IM RS resource set (via the higher layer parameter CSI-IM-ResourceSet) with the 1-bit flag indicator set to "1" (or "ON" or "TRUE"), the UE would expect that the CSI-IM RS(s) indicated in the higher layer parameter CSI-IM-ResourceSet is transmitted from/associated with/configured for the non-serving (or neighboring) cell/TRP in the inter-cell system.

A snippet of the higher layer parameter CSI-IM-ResourceSet incorporating the one-bit flag indicator (nsc-flag) is shown in TABLE 32. If the one-bit flag indicator (e.g., nsc-flag) is not configured/present in the higher layer parameter CSI-IM-ResourceSet, the UE could expect that the indicated RS(s) in the higher layer parameter CSI-IM-ResourceSet is transmitted from/associated with/configured for the serving cell/TRP.

TABLE 32

Higher layer parameter CSI-IM-ResourceSet including/indicating a one-bit flag

```
CSI-IM-ResourceSet ::= SEQUENCE {
  csi-IM-ResourceSetId CSI-IM-ResourceSetId,
  nsc-flag ENUMERATED {true} OPTIONAL, -- Need R
  csi-IM-Resources SEQUENCE (SIZE(1..maxNrofCSI-IM-
  ResourcesPerSet)) OF CSI-IM-ResourceId,
  ...
}
```

In yet another example-4.2.17, for an inter-cell system comprising of more than one (N_nsc>1) non-serving (or neighboring) cells/TRPs, a multi-bit (e.g., n_b bits) indicator could be incorporated/indicated in the higher layer parameter CSI-IM-ResourceSet to indicate to the UE the serving cell CSI-IM RSs and/or the non-serving (or neighboring) cell CSI-IM RSs from the N_nsc non-serving (or neighboring) cells for interference measurement. The number of bits n_b required for representing the multi-bit indicator could be ceil (log 2(N_nsc+1)), where ceil(x) rounds x up to the next largest integer. In this case, the n_b-bit indicator could correspond to $2^{(n\_b)}$ states, and one of the states (e.g., the first state) could correspond to the serving cell/TRP, and the rest of the states could correspond to the non-serving (or neighboring) cells/TRPs.

For example, if n_b=2, the corresponding four states are "00," "01," "10," and "11." The first state "00" could correspond to the serving cell, and the rest of the three states could correspond to the non-serving (or neighboring) cells. If, e.g., "00" is indicated in the higher layer parameter CSI-IM-ResourceSet, the UE would expect that the CSI-IM RS(s) indicated in the corresponding CSI-IM RS resource set is transmitted from/associated with/configured for the serving cell/TRP. Alternatively, the number of bits n_b required for representing the multi-bit indicator could be ceil(log 2(N_nsc)). In this case, the multi-bit indicator only indicates/identifies the CSI-IM RSs from the N_nsc non-serving (or neighboring) cells/TRPs in the higher layer parameter CSI-IM-ResourceSet; if the multi-bit indicator is not present/configured in the higher layer parameter CSI-IM-ResourceSet, the UE would expect that the CSI-IM RS(s) indicated in the corresponding CSI-IM RS resource set is from/associated with/configured for the serving cell/TRP.

Under this setting, all of the $2^{(n\_b)}$ states would only correspond to the N_nsc non-serving (or neighboring) cells. The UE could be configured by the network through higher layer RRC signaling the association rule(s)/mapping relationship(s) between the states of the multi-bit indicator and the serving/non-serving (or neighboring) cells/TRPs. For example, the UE could be first higher layer configured by the network (e.g., via higher layer RRC signaling) a list/set/pool of TRP-specific index/ID values such as PCI values, TRP ID values, CORESETPoolIndex values or other TRP-specific higher layer signaling index values. The higher layer configured list/set/pool of TRP-specific index/ID values could contain the TRP-specific index/ID values for both the serving cell/TRP and the non-serving (or neighboring) cells/TRPs in the inter-cell system or the TRP-specific index/ID values for only the non-serving (or neighboring) cells/TRPs.

The first state or the state of the multi-bit indicator having the smallest value could correspond to the first entry in the higher layer configured list/set/pool of TRP-specific index/ID values, the second state or the state of the multi-bit indicator having the second smallest value could correspond to the second entry in the higher layer configured list/set/pool of TRP-specific index/ID values, and so on, and the last state or the state of the multi-bit indicator having the largest value could correspond to the last entry in the higher layer configured list/set/pool of TRP-specific index/ID values.

Alternatively, the UE could know the association rule(s)/mapping relationship(s) between the states of the multi-bit indicator and the serving/non-serving (or neighboring) cells/TRPs in an implicit manner. For instance, the state of the multi-bit indicator having the smallest value could correspond to the serving/non-serving (or neighboring) cell/TRP with the lowest PCI, the state of the multi-bit indicator having the second smallest value could correspond to the serving/non-serving (or neighboring) cell/TRP with the second lowest PCI, and so on, and the state of the multi-bit indicator having the largest value could correspond to the serving/non-serving (or neighboring) cell/TRP with the highest PCI. One example characterizing the above described mapping relationship between the states of the multi-bit indicator and the serving/non-serving (or neighboring) cells/TRPs is presented in TABLE 13 in this disclosure. If the multi-bit indicator is not configured/present in the higher layer parameter CSI-IM-ResourceSet, the UE could expect that the indicated RS(s) in the higher layer parameter CSI-IM-ResourceSet is transmitted from/associated with/configured for the serving cell/TRP.

TABLE 33

Higher layer parameter CSI-IM-ResourceSet including/
indicating a second list of CSI-IM RSs for
non-serving (or neighboring) cell(s)/TRP(s)

CSI-IM-ResourceSet ::= SEQUENCE {
  csi-IM-ResourceSetId CSI-IM-ResourceSetId,
  csi-IM-Resources SEQUENCE (SIZE(1..maxNrofCSI-IM-
ResourcesPerSet)) OF CSI-IM-ResourceId,
  csi-IM-Resources-nsc SEQUENCE (SIZE(1..maxNrofCSI-IM-
ResourcesPerSet)) OF CSI-IM-ResourceId,
  ...
}

In yet another example-4.2.18, a second list of CSI-IM RSs could be included/indicated in the higher layer parameter CSI-IM-ResourceSet to identify/indicate the non-serving (or neighboring) cell CSI-IM RS(s) transmitted from/associated with one or more non-serving (or neighboring) cells/TRPs in the inter-cell system. One example of incorporating a second list of CSI-IM RSs for indicating the non-serving (or neighboring) cell CSI-IM RS(s) in the higher layer parameter CSI-IM-ResourceSet is given in TABLE 33 (e.g., via csi-IM-Resources-nsc).

In yet another example-4.2.19, in the higher layer parameter CSI-IM-ResourceSet, the indicated CSI-IM RS resources, e.g., via csi-IM-Resources, could be transmitted from/associated with/configured for the serving cell/TRP and/or one or more non-serving (or neighboring) cells/TRPs in the inter-cell system. The CSI-IM RS indices in the higher layer parameter CSI-IM-ResourceSet (i.e., csi-IM-Resources), and therefore, the corresponding bit-width, could be determined across the CSI-IM RSs from/associated with/configured for both the serving cell/TRP and the non-serving (or neighboring) cell(s)/TRP(s) in the inter-cell system.

Furthermore, the UE could expect that the CSI-IM RS indices (indicated in csi-IM-Resources) in the higher layer parameter CSI-IM-ResourceSet associated with the serving cell/TRP and the non-serving (or neighboring) cell(s)/TRP(s) in the inter-cell system may be different. For instance, for an inter-cell system comprising of a serving cell/TRP and N_nsc non-serving (or neighboring) cells/TRPs with each cell/TRP associated with N_im CSI-IM RSs, the CSI-IM RS indices in the higher layer parameter CSI-IM-ResourceSet (i.e., csi-IM-Resources) could be configured as #0, #1, . . . , #N_im×(N_nsc+1)−1.

The UE could be indicated by the network the mapping relationship(s)/association rule(s) between the actual CSI-IM RS resource indices from/associated with the serving/non-serving (or neighboring) cells/TRPs in the inter-cell system and the CSI-IM RS indices (in csi-IM-Resources) in the higher layer parameter CSI-IM-ResourceSet (CSI-IM RS (re-)indexing configuration/rule). Various design examples of the CSI-IM RS (re-)indexing configurations/rules for an inter-cell system comprising of either a single non-serving (or neighboring) cell/TRP or more than one non-serving (or neighboring) cells/TRPs could be referred to those discussed in the aforementioned FIGURES and TABLEs in this disclosure for TCI state/QCL information enhancements.

The UE could be first higher layer configured by the network, e.g., via higher layer RRC signaling, a list of CSI IM resource sets (i.e., a list of higher layer parameters CSI-IM-ResourceSet's), each corresponding to/associated with a distinct PCI corresponding to either the serving cell/TRP or a non-serving (or neighboring) cell/TRP. The detailed association methods between a CSI IM resource set and a PCI could follow those specified in example-4.2.15, example-4.2.16, example-4.2.17, example-4.2.18 and example-4.2.19. The UE could then receive from the network one or more MAC CE activation commands and/or bitmaps and/or DCIs to activate/indicate one or more CSI IM resource sets from the higher layer RRC configured list of CSI IM resource sets for one or more PCIs.

FIG. 29 illustrates an example CSI reporting configuration 2900 according to embodiments of the present disclosure. An embodiment of the CSI reporting configuration 2900 shown in FIG. 29 is for illustration only.

TABLE 34

An example of including/indicating the (non-serving (or neighboring) cell) PCI/TRP ID value in CSI reporting setting CSI-ReportConfig ::= SEQUENCE {
  reportConfigId CSI-ReportConfigId,
  carrier ServCellIndex OPTIONAL, -- Need S
    physicalCellId PhyCellId, OPTIONAL, -- Need S
  resourcesForChannelMeasurement CSI-ResourceConfigId,
    csi-IM-ResourcesForInterference CSI-ResourceConfigId
OPTIONAL, -- Need R
    nzp-CSI-RS-ResourcesForInterference CSI-ResourceConfigId
OPTIONAL, -- Need R
  ...
}

For the higher layer parameter CSI-ReportConfig, in one example-4.2.20, the TRP-specific index/ID value such as PCI value, TRP ID value, CORESETPoolIndex value or other TRP-specific higher layer signaling index values could be included/indicated in the higher layer parameter CSI-ReportConfig. In FIG. 29, an example of including/indicating the (non-serving (or neighboring) cell) PCI/TRP ID value in CSI-ReportConfig is presented, and a snippet of the corresponding IE is given in TABLE 34 (i.e., a new field/parameter physicalCellId is included/configured in the higher layer parameter CSI-ReportConfig to indicate non-serving (or neighboring) cell RS(s) for reporting). If the PCI/TRP ID value (e.g., physicalCellId) is not configured/present in the higher layer parameter CSI-ReportConfig, the UE could expect that the CSI reporting parameters/configurations indicated in the higher layer parameter CSI-ReportConfig is associated with/configured for the serving cell/TRP.

For the higher layer parameter CSI-ReportConfig, in another example-4.2.21, a one-bit flag indicator could be included/indicated in the higher layer parameter CSI-ReportConfig. For an inter-cell system comprising of a single non-serving (or neighboring) cell/TRP, if the UE is indicated by the network a CSI reporting setting (via the higher layer parameter CSI-ReportConfig) with the 1-bit flag indicator set to "0" (or "OFF" or "FALSE") or not configured/present, the UE would expect that the CSI reporting parameters/configurations indicated in the higher layer parameter CSI-ReportConfig is associated with/configured for the serving cell/TRP.

Otherwise, if the UE is indicated by the network a CSI reporting setting (via the higher layer parameter CSI-ReportConfig) with the 1-bit flag indicator set to "1" (or "ON" or "TRUE"), the UE would expect that the CSI reporting parameters/configurations indicated in the higher layer parameter CSI-ReportConfig is associated with/configured for the non-serving (or neighboring) cell/TRP in the inter-cell system. A snippet of the higher layer parameter CSI-ReportConfig incorporating the one-bit flag indicator (nsc-flag) is shown in TABLE 35. If the one-bit flag indicator (e.g., nsc-flag) is not configured/present in the higher layer parameter CSI-ReportConfig, the UE could expect that the CSI reporting parameters/configurations indicated in the higher layer parameter CSI-ReportConfig is associated with/configured for the serving cell/TRP.

TABLE 35

Higher layer parameter CSI-ReportConfig including/indicating a one-bit flag

CSI-ReportConfig ::= SEQUENCE {
  reportConfigId CSI-ReportConfigId,
  carrier ServCellIndex OPTIONAL, -- Need S
    nsc-flag ENUMERATED {true} OPTIONAL, -- Need R
  resourcesForChannelMeasurement CSI-ResourceConfigId,
    csi-IM-ResourcesForInterference CSI-ResourceConfigId
  OPTIONAL, -- Need R
    nzp-CSI-RS-ResourcesForInterference CSI-ResourceConfigId
  OPTIONAL, -- Need R
  ...
}

For the higher layer parameter CSI-ReportConfig, in yet another example-4.2.22, for an inter-cell system comprising of more than one (N_nsc>1) non-serving (or neighboring) cells/TRPs, a multi-bit (e.g., n_b bits) indicator could be incorporated/indicated in the higher layer parameter CSI-ReportConfig to indicate to the UE the CSI reporting parameters/configurations for the N_nsc non-serving (or neighboring) cells for beam reporting. The number of bits n_b required for representing the multi-bit indicator could be ceil (log 2(N_nsc+1)), where ceil(x) rounds x up to the next largest integer. In this case, the n_b-bit indicator could correspond to $2^{(n\_b)}$ states, and one of the states (e.g., the first state) could correspond to the serving cell/TRP, and the rest of the states could correspond to the non-serving (or neighboring) cells/TRPs.

For example, if n_b=2, the corresponding four states are "00," "01," "10," and "11." The first state "00" could correspond to the serving cell, and the rest of the three states could correspond to the non-serving (or neighboring) cells. If, e.g., "00" is indicated in the higher layer parameter CSI-ReportConfig, the UE would expect that the CSI reporting parameters/configurations indicated in the corresponding CSI reporting setting are for the serving cell/TRP. Alternatively, the number of bits n_b required for representing the multi-bit indicator could be ceil(log 2(N_nsc)). In this case, the multi-bit indicator only indicates/identifies the CSI reporting parameters/configurations for the N_nsc non-serving (or neighboring) cells/TRPs in the higher layer parameter CSI-ReportConfig; if the multi-bit indicator is not present/configured in the higher layer parameter CSI-ReportConfig, the UE would expect that the CSI reporting parameters/configurations indicated in the corresponding CSI reporting setting are for the serving cell/TRP.

Under this setting, all of the $2^{(n\_b)}$ states would only correspond to the N_nsc non-serving (or neighboring) cells. The UE could be configured by the network through higher layer RRC signaling the association rule(s)/mapping relationship(s) between the states of the multi-bit indicator and the serving/non-serving (or neighboring) cells/TRPs. For example, the UE could be first higher layer configured by the network (e.g., via higher layer RRC signaling) a list/set/pool of TRP-specific index/ID values such as PCI values, TRP ID values, CORESETPoolIndex values or other TRP-specific higher layer signaling index values. The higher layer configured list/set/pool of TRP-specific index/ID values could contain the TRP-specific index/ID values for both the serving cell/TRP and the non-serving (or neighboring) cells/ TRPs in the inter-cell system or the TRP-specific index/ID values for only the non-serving (or neighboring) cells/TRPs.

The first state or the state of the multi-bit indicator having the smallest value could correspond to the first entry in the higher layer configured list/set/pool of TRP-specific index/ID values, the second state or the state of the multi-bit indicator having the second smallest value could correspond to the second entry in the higher layer configured list/set/pool of TRP-specific index/ID values, and so on, and the last state or the state of the multi-bit indicator having the largest value could correspond to the last entry in the higher layer configured list/set/pool of TRP-specific index/ID values.

Alternatively, the UE could know the association rule(s)/mapping relationship(s) between the states of the multi-bit indicator and the serving/non-serving (or neighboring) cells/TRPs in an implicit manner. For instance, the state of the multi-bit indicator having the smallest value could correspond to the serving/non-serving (or neighboring) cell/TRP with the lowest PCI, the state of the multi-bit indicator having the second smallest value could correspond to the serving/non-serving (or neighboring) cell/TRP with the second lowest PCI, and so on, and the state of the multi-bit indicator having the largest value could correspond to the serving/non-serving (or neighboring) cell/TRP with the highest PCI. One example characterizing the above described mapping relationship between the states of the multi-bit indicator and the serving/non-serving (or neighboring) cells/TRPs is presented in TABLE 13 in this disclosure. If the multi-bit indicator is not configured/present in the higher layer parameter CSI-ReportConfig, the UE could expect that the CSI reporting parameters/configurations indicated in the higher layer parameter CSI-ReportConfig is associated with/configured for the serving cell/TRP.

For the higher layer parameter CSI-ReportConfig, in yet another example-4.2.23, one or more serving cell indices/IDs (SCIs) (corresponding to one or more values of ServCellIndex in the higher layer parameter CSI-ReportConfig) could be reserved to indicate/identify one or more non-serving (or neighboring) cells/TRPs in the inter-cell system, and therefore, the corresponding non-serving (or neighboring) cell CSI reporting parameters/configurations. The UE could be indicated by the network the exact SCIs or the exact values of the higher layer parameter ServCellIndex reserved for indicating/identifying one or more non-serving (or neighboring) cells/TRPs. For example, a 3-bit ServCellIndex field could be configured in the higher layer parameter CSI-ReportConfig to indicate 8 candidate SCIs, denoted by SCI #0, SCI #1, SCI #2, SCI #3, SCI #4, SCI #5, SCI #6 and SCI #7.

Furthermore, in this example, SCI #5, SCI #6 and SCI #7 are reserved for indicating/identifying one or more non-serving (or neighboring) cells/TRPs. Consider an inter-cell multi-TRP system comprising of a serving cell/TRP and a single non-serving (or neighboring) cell/TRP. If any value of SCI #5, SCI #6 and SCI #7 is configured as the ServCellIndex in the higher layer parameter CSI-ReportConfig, the UE would expect that the CSI reporting parameters/configurations indicated in the corresponding CSI reporting setting is for the non-serving (or neighboring) cell/TRP.

If more than one (N_nsc>1) non-serving (or neighboring) cells/TRPs are configured in the inter-cell system, the UE could be indicated by the network one or more mapping relationships/association rules between the SCI(s) reserved for identifying/indicating the non-serving (or neighboring) cell CSI reporting setting(s)/configuration(s) in the higher layer parameter CSI-ReportConfig and the non-serving (or neighboring) cells/TRPs; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

For the indication of the SCI(s) reserved for identifying/indicating the non-serving (or neighboring) cell CSI reporting parameter(s)/configuration(s) in the higher layer parameter CSI-ReportConfig: (1) in one example, the UE could be indicated by the network, e.g., via higher layer RRC signaling and/or dynamic DCI signaling, the exact value(s) of SCI or ServCellIndex reserved for identifying/indicating the non-serving (or neighboring) cells/TRPs in the inter-cell system, and therefore, the corresponding non-serving (or neighboring) cell CSI reporting parameter(s)/configurations, in the higher layer parameter CSI-ReportConfig; (2) in another example, the UE could be first higher layer configured by the network (e.g., via higher layer RRC signaling) a list/set/pool of SCIs (SCI/ServCellIndex values) reserved for identifying/indicating the non-serving (or neighboring) cell CSI reporting parameter(s)/configuration(s) in the higher layer parameter CSI-ReportConfig. The UE could then receive from the network a MAC CE command activating one or more SCIs (SCI/ServCellIndex values) from the higher layer configured list/set/pool of SCIs; (3) in yet another example, the UE could receive from the network a bitmap with each entry/bit in the bitmap corresponding to a SCI (SCI/ServCellIndex value). If an entry/bit in the bitmap is set to "1," the corresponding/associated SCI/ServCellIndex value is activated for identifying/indicating the non-serving (or neighboring) cell CSI reporting parameter(s)/configuration(s) in the higher layer parameter CSI-ReportConfig.

For the association between the SCI(s) (or SCI/ServCellIndex value(s)) reserved for identifying/indicating the non-serving (or neighboring) cell CSI reporting parameter(s)/configuration(s) in the higher layer parameter CSI-ReportConfig and the non-serving (or neighboring) cells/TRPs in the inter-cell system, in one example, for all configured CSI reporting settings, i.e., CSI-ReportConfig's, the same SCI/ServCellIndex value reserved for identifying/indicating the non-serving (or neighboring) cell CSI reporting parameter(s)/configuration(s) in the higher layer parameter CSI-ReportConfig is associated with/configured for a single non-serving (or neighboring) cell/TRP. For all higher layer configured CSI reporting settings (CSI-ReportConfig's), the UE could be explicitly indicated by the network how the reserved SCI(s) (or SCI/ServCellIndex value(s)) are associated with/configured for the non-serving (or neighboring) cells/TRPs. For instance, for all higher layer configured CSI reporting settings (CSI-ReportConfig's), the UE could be first higher layer configured by the network (e.g., via higher layer RRC signaling) a list/set/pool of TRP-specific index/ID values such as PCI values, TRP ID values, CORESETPoolIndex values or other TRP-specific higher layer signaling index values for the non-serving (or neighboring) cells/TRPs; the first reserved SCI/ServCellIndex value or the lowest reserved SCI/ServCellIndex value could correspond to the first entry in the higher layer configured list/set/pool of TRP-specific index/ID values, the second reserved SCI/ServCellIndex value or the second lowest reserved SCI/ServCellIndex value could correspond to the second entry in the higher layer configured list/set/pool of TRP-specific index/ID values, and so on, and the last reserved SCI/ServCellIndex value or the highest reserved SCI/ServCellIndex value could correspond to the last entry in the higher layer configured list/set/pool of TRP-specific index/ID values.

For the association between the SCI(s) (or SCI/ServCellIndex value(s)) reserved for identifying/indicating the non-serving (or neighboring) cell CSI reporting parameter(s)/configuration(s) in the higher layer parameter CSI-ReportConfig and the non-serving (or neighboring) cells/TRPs in the inter-cell system, in another example, for all configured CSI reporting settings (CSI-ReportConfig's), the same SCI/ServCellIndex value reserved for identifying/indicating the non-serving (or neighboring) cell CSI reporting parameter(s)/configuration(s) in the higher layer parameter CSI-ReportConfig is associated with/configured for a single non-serving (or neighboring) cell/TRP. For all higher layer configured CSI reporting settings (CSI-ReportConfig's), the first reserved SCI/ServCellIndex value or the lowest reserved SCI/ServCellIndex value could correspond to the non-serving (or neighboring) cell/TRP associated with the lowest TRP-specific index/ID value such as the lowest PCI value, the second reserved SCI/ServCellIndex value or the second lowest reserved SCI/ServCellIndex value could correspond to the non-serving (or neighboring) cell/TRP associated with the second lowest TRP-specific index/ID value such as the second lowest PCI value, and so on, and the last reserved SCI/ServCellIndex value or the highest reserved SCI/ServCellIndex value could correspond to the non-serving (or neighboring) cell/TRP associated with the highest TRP-specific index/ID value such as the highest PCI value.

For the association between the SCI(s) (or SCI/ServCellIndex value(s)) reserved for identifying/indicating the non-serving (or neighboring) cell CSI reporting parameter(s)/configuration(s) in the higher layer parameter CSI-ReportConfig and the non-serving (or neighboring) cells/TRPs in the inter-cell system, in yet another example, for a subset of all higher layer configured CSI reporting settings (CSI-ReportConfig's), the same SCI/ServCellIndex value reserved for identifying/indicating the non-serving (or neighboring) cell CSI reporting parameter(s)/configuration(s) in the higher layer parameter CSI-ReportConfig is associated with/configured for a single non-serving (or neighboring) cell/TRP. For a given subset (indicated to the UE by the network) of all higher layer configured CSI reporting settings (CSI-ReportConfig's), the UE could be explicitly indicated by the network how the reserved SCI(s) (or SCI/ServCellIndex value(s)) are associated with the non-serving (or neighboring) cells/TRPs. For instance, for a given subset (indicated to the UE by the network) of all higher layer configured CSI reporting settings (CSI-ReportConfig's), the UE could be first higher layer configured by the network (e.g., via higher layer RRC signaling) a list/set/pool of TRP-specific index/ID values such as PCI values, TRP ID values, CORESETPoolIndex values or other TRP-specific higher layer signaling index values for the non-serving (or neighboring) cells/TRPs; the first reserved SCI/ServCellIndex value or the lowest reserved SCI/ServCellIndex value could correspond to the first entry in the higher layer configured list/set/pool of TRP-specific index/ID values, the second reserved SCI/ServCellIndex value or the second lowest reserved SCI/ServCellIndex value could correspond to the second entry in the higher layer configured list/set/pool of TRP-specific index/ID values, and so on, and the last reserved SCI/ServCellIndex value or the highest reserved SCI/ServCellIndex value could correspond to the last entry in the higher layer configured list/set/pool of TRP-specific index/ID values. For all higher layer configured CSI reporting settings (CSI-ReportConfig's), the same SCI/ServCellIndex value reserved for identifying/indicating the non-serving (or neighboring) cell CSI reporting parameter(s)/configuration(s) in the higher layer parameter CSI-ReportConfig could correspond to more than one non-serving (or neighboring) cells/TRPs.

For the association between the SCI(s) (or SCI/ServCellIndex value(s)) reserved for identifying/indicating the non-serving (or neighboring) cell CSI reporting parameter(s)/configuration(s) in the higher layer parameter CSI-ReportConfig and the non-serving (or neighboring) cells/TRPs in the inter-cell system, in yet another example, for a subset of all higher layer configured CSI reporting settings (CSI-ReportConfig's), the same SCI/ServCellIndex value reserved for identifying/indicating the non-serving (or neighboring) cell CSI reporting parameter(s)/configuration(s) in the higher layer parameter CSI-ReportConfig is associated with/configured for a single non-serving (or neighboring) cell/TRP. For a given subset (indicated to the UE by the network) of all higher layer configured CSI reporting settings (CSI-ReportConfig's), the first reserved SCI/ServCellIndex value or the lowest reserved SCI/ServCellIndex value could correspond to the non-serving (or neighboring) cell/TRP associated with the lowest TRP-specific index/ID value such as the lowest PCI value, the second reserved SCI/ServCellIndex value or the second lowest reserved SCI/ServCellIndex value could correspond to the non-serving (or neighboring) cell/TRP associated with the second lowest TRP-specific index/ID value such as the second lowest PCI value, and so on, and the last reserved SCI/ServCellIndex value or the highest reserved SCI/ServCellIndex value could correspond to the non-serving (or neighboring) cell/TRP associated with the highest TRP-specific index/ID value such as the highest PCI value. For all higher layer configured CSI reporting settings (CSI-ReportConfig's), the same SCI/ServCellIndex value reserved for identifying/indicating the non-serving (or neighboring) cell CSI reporting parameter(s)/configuration(s) in the higher layer parameter CSI-ReportConfig could correspond to more than one non-serving (or neighboring) cells/TRPs.

The UE could be first higher layer configured by the network, e.g., via higher layer RRC signaling, a list of CSI reporting settings (i.e., a list of higher layer parameters CSI-ReportConfig's), each corresponding to/associated with a distinct PCI corresponding to either the serving cell/TRP or a non-serving (or neighboring) cell/TRP. The detailed association methods between a CSI reporting setting and a PCI could follow those specified in example-4.2.20, example-4.2.21, example-4.2.22 and example-4.2.23. The UE could then receive from the network one or more MAC CE activation commands and/or bitmaps and/or DCIs to activate/indicate one or more CSI reporting settings from the higher layer RRC configured list of CSI reporting settings for one or more PCIs.

In one embodiment, means of associating non-serving (or neighboring) cell RS configuration information with CSI resource/reporting setting(s) are provided.

The UE could be higher layer configured by the network (e.g., via higher layer RRC signaling) necessary non-serving (or neighboring) cell RS configuration information (such as non-serving (or neighboring) cell SSB time-domain position information) for the inter-cell operation. The configured non-serving (or neighboring) cell RS configuration information could be associated with one or more CSI resource/reporting settings indicating non-serving (or neighboring) cell RS and/or CSI resource/reporting configuration information. The non-serving (or neighboring) cell RS (or SSB) configuration information could include one or more of the following: SSB frequency, SSB periodicity, SSB burst pattern, SSB time-domain position in a SSB burst, SSB transmit power, SSB subcarrier spacing (SCS), and PCI information for one or more non-serving (or neighboring) cell(s)/TRP(s) in the inter-cell system. Certain non-serving (or neighboring) cell SSB configuration information could be configured in the existing higher layer RRC parameters such as MeasObjectNR for RRM and/or SSB-Configuration-r16/SSB-InfoNcell-r16 for positioning.

Four design options of providing the UE necessary non-serving (or neighboring) cell SSB configuration information for the inter-cell operation (e.g., beam measurement and reporting) have been discussed before in this disclosure, which are: (1) Option-1: the UE is configured by the network MeasObjectNR and other necessary additional non-serving (or neighboring) cell SSB configuration information/parameters to those in MeasObjectNR for the inter-cell operation; (2) Option-2: the UE is configured by the network SSB-Configuration-r16/SSB-InfoNcell-r16 and other necessary additional non-serving (or neighboring) cell SSB configuration information/parameters to those in SSB-Configuration-r16/SSB-InfoNcell-r16 for the inter-cell operation; (3) Option-3: the UE is configured by the network MeasObjectNR and SSB-Configuration-r16/SSB-InfoNcell-r16 and other necessary additional non-serving (or neighboring) cell SSB configuration information/parameters to those in MeasObjectNR and SSB-Configuration-r16/SSB-InfoNcell-r16 for the inter-cell operation; and (4) Option-4: the UE is configured by the network one or more new RRC parameters (e.g., two RRC parameters denoted by SSB-Configuration-InterCell and SSB-InfoNcell-InterCell) containing all necessary non-serving (or neighboring) cell RS (SSB) configuration information/parameters for the inter-cell operation.

The non-serving (or neighboring) cell RS (SSB) configuration information configured for the inter-cell operation (e.g., the non-serving (or neighboring) cell SSB frequency, periodicity, time-domain position in a SSB burst, SCS and etc. configured via Option-1 or/and Option-2 or/and Option-3 or/and Option-4) could be associated with one or more CSI resource/reporting setting related higher layer parameters indicating the non-serving (or neighboring) cell RS and/or CSI resource/reporting parameters/configurations for beam measurement and reporting. There are various means to associate the non-serving (or neighboring) cell RS (SSB) configuration information with the CSI resource/reporting setting(s) indicating the non-serving (or neighboring) cell RS and/or CSI resource/reporting parameters/configurations.

In one example, for the explicit non-serving (or neighboring) cell RS indication in CSI resource/reporting settings, wherein the TRP-specific index/ID value such as the PCI value, TRP ID value, CORESETPoolIndex value or other TRP-specific higher layer signaling index values is indicated in the higher layer parameters CSI-ResourceConfig/CSI-SSB-ResourceSet/NZP-CSI-RS-ResourceSet/CSI-IM-ResourceSet/CSI-ReportConfig, the CSI resource/reporting setting indicating the non-serving (or neighboring) cell RS and/or CSI resource/reporting parameters/configurations is associated with the non-serving (or neighboring) cell RS (SSB) configuration information configured in MeasObjectNR (option-1/option-3) if the same TRP-specific index/ID value such as the same PCI value is indicated in both the CSI resource/reporting setting indicating the non-serving (or neighboring) cell RS and/or CSI resource/reporting parameters/configurations (e.g., in CSI-ResourceConfig/CSI-SSB- ResourceSet/NZP-CSI-RS-ResourceSet/CSI-IM-Resource-Set/CSI-ReportConfig) and the MeasObjectNR.

In one example, for the explicit non-serving (or neighboring) cell RS indication in CSI resource/reporting settings, wherein the TRP-specific index/ID value such as the PCI value, TRP ID value, CORESETPoolIndex value or other TRP-specific higher layer signaling index values is indicated in the higher layer parameters CSI-ResourceConfig/CSI-SSB-ResourceSet/NZP-CSI-RS-ResourceSet/CSI-IM-ResourceSet/CSI-ReportConfig, the CSI resource/reporting setting indicating the non-serving (or neighboring) cell RS and/or CSI resource/reporting parameters/configurations is associated with the non-serving (or neighboring) cell RS (SSB) configuration information configured in SSB-Configuration-r16/SSB-InfoNcell-r16 (Option-2/Option-3) if the same TRP-specific index/ID value such as the same PCI value is indicated in both the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) and the SSB-Configuration-r16/SSB-InfoNcell-r16.

In one example, for the explicit non-serving (or neighboring) cell RS indication in CSI resource/reporting settings, wherein the TRP-specific index/ID value such as the PCI value, TRP ID value, CORESETPoolIndex value or other TRP-specific higher layer signaling index values is indicated in the higher layer parameters CSI-ResourceConfig/CSI-SSB-ResourceSet/NZP-CSI-RS-ResourceSet/CSI-IM-ResourceSet/CSI-ReportConfig, the CSI resource/reporting setting indicating the non-serving (or neighboring) cell RS and/or CSI resource/reporting parameters/configurations is associated with the non-serving (or neighboring) cell RS (SSB) configuration information configured in SSB-Configuration-InterCell/SSB-InfoNcell-InterCell (Option-4) if the same TRP-specific index/ID value such as the same PCI value is indicated in both the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) and the SSB-Configuration-InterCell/SSB-InfoNcell-InterCell.

In another example, for the implicit non-serving (or neighboring) cell RS (re-)indexing in CSI resource/reporting settings indicating the non-serving (or neighboring) cell RS and/or CSI resource/reporting parameters/configurations, if the inter-cell system contains a single non-serving (or neighboring) cell/TRP, the UE could associate the CSI resource/reporting setting indicating the non-serving (or neighboring) cell RS and/or CSI resource/reporting parameters/configurations with the non-serving (or neighboring) cell RS (SSB) configuration information configured in MeasObjectNR (Option-1/Option-3) as long as the UE could identify the non-serving (or neighboring) cell RS and/or CSI resource/reporting parameters/configurations from the indicated CSI resource/reporting setting(s) following the non-serving (or neighboring) cell RS (re-)indexing configuration/rule in the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig). If the inter-cell system contains more than one non-serving (or neighboring) cells/TRPs, the UE could first identify the non-serving (or neighboring) cell RS and/or CSI resource/reporting parameters/configurations from the indicated CSI resource/reporting setting(s) following the non-serving (or neighboring) cell RS (re-)indexing configuration/rule in the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig). The UE could then identify the TRP-specific index/ID value such as the PCI value associated with the non-serving (or neighboring) cell RS and/or CSI resource/reporting parameters/configurations. The UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in MeasObjectNR (Option-1/Option-3) if the TRP-specific index/ID value such as the PCI value associated with/linked to the non-serving (or neighboring) cell RS and/or CSI resource/reporting parameters/configurations and the TRP-specific index/ID value such as the PCI value indicated in the MeasObjectNR are the same.

In such example, for the implicit non-serving (or neighboring) cell RS (re-)indexing in CSI resource/reporting settings indicating the non-serving (or neighboring) cell RS and/or CSI resource/reporting parameters/configurations, if the inter-cell system contains a single non-serving (or neighboring) cell/TRP, the UE could associate the CSI resource/reporting setting indicating the non-serving (or neighboring) cell RS and/or CSI resource/reporting parameters/configurations with the non-serving (or neighboring) cell RS (SSB) configuration information configured in SSB-Configuration-r16/SSB-InfoNcell-r16 (Option-2/Option-3) as long as the UE could identify the non-serving (or neighboring) cell RS and/or CSI resource/reporting parameters/configurations from the indicated CSI resource/reporting setting(s) following the non-serving (or neighboring) cell RS (re-)indexing configuration/rule in the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig). If the inter-cell system contains more than one non-serving (or neighboring) cells/TRPs, the UE could first identify the non-serving (or neighboring) cell RS and/or CSI resource/reporting parameters/configurations from the indicated CSI resource/reporting setting(s) following the non-serving (or neighboring) cell RS (re-)indexing configuration/rule in the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig). The UE could then identify the TRP-specific index/ID value such as the PCI value associated with the non-serving (or neighboring) cell RS and/or CSI resource/reporting parameters/configurations. The UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in SSB-Configuration-r16/SSB-InfoNcell-r16 (Option-2/Option-3) if the TRP-specific index/ID value such as the PCI value associated with/linked to the non-serving (or neighboring) cell RS and/or CSI resource/reporting parameters/configurations and the TRP-specific index/ID value such as the PCI value indicated in the SSB-Configuration-r16/SSB-InfoNcell-r16 are the same.

In such example, for the implicit non-serving (or neighboring) cell RS (re-)indexing in CSI resource/reporting settings indicating the non-serving (or neighboring) cell RS and/or CSI resource/reporting parameters/configurations, if the inter-cell system contains a single non-serving (or neighboring) cell/TRP, the UE could associate the CSI resource/reporting setting indicating the non-serving (or neighboring) cell RS and/or CSI resource/reporting parameters/configurations with the non-serving (or neighboring) cell RS (SSB) configuration information configured in SSB-Configuration-InterCell/SSB-InfoNcell-InterCell (Option-4) as long as the UE could identify the non-serving (or neighboring) cell RS and/or CSI resource/reporting parameters/configurations from the indicated CSI resource/reporting setting(s) following the non-serving (or neighboring) cell RS (re-)indexing configuration/rule in the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig). If the inter-cell system contains more than one non-serving (or neighboring) cells/TRPs, the UE could first identify the non-serving (or neighboring) cell RS and/or CSI resource/reporting parameters/configurations from the indicated CSI resource/reporting setting(s) following the non-serving (or neighboring) cell RS (re-)indexing configuration/rule in the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig). The UE could then identify the TRP-specific index/ID value such as the PCI value associated with the non-serving (or neighboring) cell RS and/or CSI resource/reporting parameters/configurations. The UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in SSB-Configuration-InterCell/SSB-InfoNcell-InterCell (Option-4) if the TRP-specific index/ID value such as the PCI value associated with/linked to the non-serving (or neighboring) cell RS and/or CSI resource/reporting parameters/configurations and the TRP-specific index/ID value such as the PCI value indicated in the SSB-Configuration-InterCell/SSB-InfoNcell-InterCell are the same.

In yet another example, for the one-bit flag/multi-bit indicator in CSI resource/reporting settings indicating the non-serving (or neighboring) cell RS and/or CSI resource/reporting parameters/configurations, if the inter-cell system contains a single non-serving (or neighboring) cell/TRP, the UE could associate the CSI resource/reporting setting indicating the non-serving (or neighboring) cell RS and/or CSI resource/reporting parameters/configurations with the non-serving (or neighboring) cell RS (SSB) configuration information configured in MeasObjectNR (Option-1/Option-3) as long as the UE could identify the non-serving (or neighboring) cell RS and/or CSI resource/reporting parameters/configurations from the indicated CSI resource/reporting setting(s) following the one-bit flag indicator in the CSI resource/reporting setting (e.g., in CSI-ResourceConfig/CSI-SSB-ResourceSet/NZP-CSI-RS-ResourceSet/CSI-IM-ResourceSet/CSI-ReportConfig) indicating the non-serving (or neighboring) cell RS and/or CSI resource/reporting parameters/configurations (e.g., "1"/"ON"/"true" for the non-serving (or neighboring) cell/TRP while "0"/"OFF"/"false" for the serving cell/TRP). If the inter-cell system contains more than one non-serving (or neighboring) cells/TRPs, the UE could first identify the non-serving (or neighboring) cell RS and/or CSI resource/reporting parameters/configurations from the indicated CSI resource/reporting setting(s) according to the multi-bit indicator in the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig). The UE could then identify the TRP-specific index/ID value such as the PCI value associated with the non-serving (or neighboring) cell RS and/or CSI resource/reporting parameters/configurations, and therefore, the corresponding state of the multi-bit indicator. The UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in MeasObjectNR (Option-1/Option-3) if the TRP-specific index/ID value such as the PCI value associated with/linked to the non-serving (or neighboring) cell RS and/or CSI resource/reporting parameters/configurations and the TRP-specific index/ID value such as the PCI value indicated in the MeasObjectNR are the same.

In such example, for the one-bit flag/multi-bit indicator in CSI resource/reporting settings indicating the non-serving (or neighboring) cell RS and/or CSI resource/reporting parameters/configurations, if the inter-cell system contains a single non-serving (or neighboring) cell/TRP, the UE could associate the CSI resource/reporting setting indicating the non-serving (or neighboring) cell RS and/or CSI resource/reporting parameters/configurations with the non-serving (or neighboring) cell RS (SSB) configuration information configured in SSB-Configuration-r16/SSB-InfoNcell-r16 (Option-2/Option-3) as long as the UE could identify the non-serving (or neighboring) cell RS and/or CSI resource/reporting parameters/configurations from the indicated CSI resource/reporting setting(s) following the one-bit flag indicator in the CSI resource/reporting setting (e.g., in CSI-ResourceConfig/CSI-SSB-ResourceSet/NZP-CSI-RS-ResourceSet/CSI-IM-ResourceSet/CSI-ReportConfig) indicating the non-serving (or neighboring) cell RS and/or CSI resource/reporting parameters/configurations (e.g., "1"/"ON"/"true" for the non-serving (or neighboring) cell/TRP while "0"/"OFF"/"false" for the serving cell/TRP). If the inter-cell system contains more than one non-serving (or neighboring) cells/TRPs, the UE could first identify the non-serving (or neighboring) cell RS and/or CSI resource/reporting parameters/configurations from the indicated CSI resource/reporting setting(s) according to the multi-bit indicator in the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig). The UE could then identify the TRP-specific index/ID value such as the PCI value associated with the non-serving (or neighboring) cell RS and/or CSI resource/reporting parameters/configurations, and therefore, the corresponding state of the multi-bit indicator. The UE could associate the CSI resource/reporting setting indicating the non-serving (or neighboring)

cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in SSB-Configuration-r16/SSB-InfoNcell-r16 (Option-2/Option-3) if the TRP-specific index/ID value such as the PCI value associated with/linked to the non-serving (or neighboring) cell RS and/or CSI resource/reporting parameters/configurations and the TRP-specific index/ID value such as the PCI value indicated in the SSB-Configuration-r16/SSB-InfoNcell-r16 are the same.

In such example, for the one-bit flag/multi-bit indicator in CSI resource/reporting settings indicating the non-serving (or neighboring) cell RS and/or CSI resource/reporting parameters/configurations, if the inter-cell system contains a single non-serving (or neighboring) cell/TRP, the UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in SSB-Configuration-InterCell/SSB-InfoNcell-InterCell (Option-4) as long as the UE could identify the non-serving (or neighboring) cell RS and/or CSI resource/reporting parameters/configurations from the indicated CSI resource/reporting setting(s) following the one-bit flag indicator in the CSI resource/reporting setting (e.g., in CSI-ResourceConfig/CSI-SSB-ResourceSet/NZP-CSI-RS-ResourceSet/CSI-IM-ResourceSet/CSI-ReportConfig) indicating the non-serving (or neighboring) cell RS and/or CSI resource/reporting parameters/configurations (e.g., "1"/"ON"/"true" for the non-serving (or neighboring) cell/TRP while "0"/"OFF"/"false" for the serving cell/TRP). If the inter-cell system contains more than one non-serving (or neighboring) cells/TRPs, the UE could first identify the non-serving (or neighboring) cell RS and/or CSI resource/reporting parameters/configurations from the indicated CSI resource/reporting setting(s) according to the multi-bit indicator in the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig). The UE could then identify the TRP-specific index/ID value such as the PCI value associated with the non-serving (or neighboring) cell RS and/or CSI resource/reporting parameters/configurations, and therefore, the corresponding state of the multi-bit indicator. The UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in SSB-Configuration-InterCell/SSB-InfoNcell-InterCell (Option-4) if the TRP-specific index/ID value such as the PCI value associated with/linked to the non-serving (or neighboring) cell RS and/or CSI resource/reporting parameters/configurations and the TRP-specific index/ID value such as the PCI value indicated in the SSB-Configuration-InterCell/SSB-InfoNcell-InterCell are the same.

In yet another example, for using one or more reserved SCI/ServCellIndex values to identify/indicate the non-serving (or neighboring) cell RS(s) and/or CSI resource/reporting parameters/configurations in CSI resource/reporting settings, if the inter-cell system contains a single non-serving (or neighboring) cell/TRP, the UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in MeasObjectNR (Option-1/Option-3) as long as the UE could identify the non-serving (or neighboring) cell RS and/or CSI resource/reporting parameters/configurations from the indicated CSI resource/reporting setting(s) according to the SCI/ServCellIndex value in the CSIresource/reporting setting (e.g., in CSI-ResourceConfig/CSI-SSB-ResourceSet/NZP-CSI-RS-ResourceSet/CSI-IM-ResourceSet/CSI-ReportConfig) indicating the non-serving (or neighboring) cell RS and/or CSI resource/reporting parameters/configurations (e.g., whether the SCI/ServCellIndex value is reserved for identifying/indicating non-serving (or neighboring) cell RS(s)). If the inter-cell system contains more than one non-serving (or neighboring) cells/TRPs, the UE could first identify the non-serving (or neighboring) cell RS and/or CSI resource/reporting parameters/configurations from the indicated CSI resource/reporting setting(s) according to the SCI/ServCellIndex value in the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig). For the given SCI/ServCellIndex value in the higher layer parameters CSI-ResourceConfig/CSI-SSB-ResourceSet/NZP-CSI-RS-ResourceSet/CSI-IM-ResourceSet/CSI-ReportConfig, the UE could then identify the TRP-specific index/ID value such as the PCI value associated with the non-serving (or neighboring) cell RS and/or CSI resource/reporting parameters/configurations. The UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in MeasObjectNR (Option-1/Option-3) if the TRP-specific index/ID value such as the PCI value associated with/linked to the non-serving (or neighboring) cell RS and/or CSI resource/reporting parameters/configurations and the TRP-specific index/ID value such as the PCI value indicated in the MeasObjectNR are the same.

In such example, for using one or more reserved SCI/ServCellIndex values to identify/indicate the non-serving (or neighboring) cell RS(s) and/or CSI resource/reporting parameters/configurations in CSI resource/reporting settings, if the inter-cell system contains a single non-serving (or neighboring) cell/TRP, the UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in SSB-Configuration-r16/SSB-InfoNcell-r16 (Option-2/Option-3) as long as the UE could identify the non-serving (or neighboring) cell RS and/or CSI resource/reporting parameters/configurations from the indicated CSI resource/reporting setting(s) (e.g., in CSI-ResourceConfig/CSI-SSB-ResourceSet/NZP-CSI-RS-ResourceSet/CSI-IM-ResourceSet/CSI-ReportConfig) according to the SCI/Serv- CellIndex value in the CSI resource/reporting setting indicating the non-serving (or neighboring) cell RS and/or CSI resource/reporting parameters/configurations (e.g., whether the SCI/ServCellIndex value is reserved for identifying/indicating non-serving (or neighboring) cell RS(s)). If the inter-cell system contains more than one non-serving (or neighboring) cells/TRPs, the UE could first identify the non-serving (or neighboring) cell RS and/or CSI resource/reporting parameters/configurations from the indicated CSI resource/reporting setting(s) according to the SCI/ServCellIndex value in the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig). For the given SCI/ServCellIndex value in the higher layer parameters CSI-ResourceConfig/CSI-SSB-ResourceSet/NZP-CSI-RS-ResourceSet/CSI-IM-ResourceSet/CSI-ReportConfig, the UE could then identify the TRP-specific index/ID value such as the PCI value associated with the non-serving (or neighboring) cell RS and/or CSI resource/reporting parameters/configurations. The UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in SSB-Configuration-r16/SSB-InfoNcell-r16 (Option-2/Option-3) if the TRP-specific index/ID value such as the PCI value associated with/linked to the non-serving (or neighboring) cell RS and/or CSI resource/reporting parameters/configurations and the TRP-specific index/ID value such as the PCI value indicated in the SSB-Configuration-r16/SSB-InfoNcell-r16 are the same.

In such example, for using one or more reserved SCI/ServCellIndex values to identify/indicate the non-serving (or neighboring) cell RS(s) and/or CSI resource/reporting parameters/configurations in CSI resource/reporting settings, if the inter-cell system contains a single non-serving (or neighboring) cell/TRP, the UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in SSB-Configuration-InterCell/SSB-InfoNcell-InterCell (Option-4) as long as the UE could identify the non-serving (or neighboring) cell RS and/or CSI resource/reporting parameters/configurations from the indicated CSI resource/reporting setting(s) according to the SCI/ServCellIndex value in the CSI resource/reporting setting (e.g., in CSI-ResourceConfig/CSI-SSB-ResourceSet/NZP-CSI-RS-ResourceSet/CSI-IM-ResourceSet/CSI-ReportConfig) indicating the non-serving (or neighboring) cell RS and/or CSI resource/reporting parameters/configurations (e.g., whether the SCI/ServCellIndex value is reserved for identifying/indicating non-serving (or neighboring) cell RS(s)). If the inter-cell system contains more than one non-serving (or neighboring) cells/TRPs, the UE could first identify the non-serving (or neighboring) cell RS and/or CSI resource/reporting parameters/configurations from the indicated CSI resource/reporting setting(s) according to the SCI/ServCellIndex value in the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig). For the given SCI/ServCellIndex value in the higher layer parameters CSI-ResourceConfig/CSI-SSB-ResourceSet/NZP-CSI-RS-ResourceSet/CSI-IM-ResourceSet/CSI-ReportConfig, the UE could then identify the TRP-specific index/ID value such as the PCI value associated with the non-serving (or neighboring) cell RS and/or CSI resource/reporting parameters/configurations. The UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in SSB-Configuration-InterCell/SSB-InfoNcell-InterCell (Option-4) if the TRP-specific index/ID value such as the PCI value associated with/linked to the non-serving (or neighboring) cell RS and/or CSI resource/reporting parameters/configurations and the TRP-specific index/ID value such as the PCI value indicated in the SSB-Configuration-InterCell/SSB-InfoNcell-InterCell are the same.

The association between the non-serving (or neighboring) cell RS (SSB) configuration information with the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) could also be via other identifiers/indicators than the TRP-specific index/ID value such as the PCI value.

In one example, for a MeasObjectNR indicating the non-serving (or neighboring) cell RS (SSB) configuration information for the inter-cell operation (Option-1/Option-3), corresponding MeasObjectId could be included/indicated in one or more CSI resource/reporting settings indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig). An example of including/indicating the MeasObjectId in the higher layer parameter CSI-ResourceConfig is provided in TABLE 36.

The UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in MeasObjectNR (Option-1/Option-3) if the MeasObjectId value configured in both the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) and the MeasObjectNR are the same.

TABLE 36

An example of including/indicating the MeasObjectId in the higher layer parameter CSI-ResourceConfig

```
CSI-ResourceConfig ::= SEQUENCE {
  csi-ResourceConfigId CSI-ResourceConfigId,
  MeasObjectId INTEGER (1..maxNrofObjectId)
  csi-RS-ResourceSetList CHOICE {
```

TABLE 36-continued

An example of including/indicating the MeasObjectId in the higher layer parameter CSI-ResourceConfig nzp-CSI-RS-SSB SEQUENCE {
nzp-CSI-RS-ResourceSetList SEQUENCE (SIZE (1..maxNrofNZP-CSI-RS-ResourceSetsPerConfig)) OF NZP-CSI-RS-ResourceSetId
  OPTIONAL, -- Need R
csi-SSB-ResourceSetList SEQUENCE (SIZE (1..maxNrofCSI-SSB-ResourceSetsPerConfig)) OF CSI-SSB-ResourceSetId OPTIONAL -- Need R
},
csi-IM-ResourceSetList SEQUENCE (SIZE (1..maxNrofCSI-IM-ResourceSetsPerConfig)) OF CSI-IM-ResourceSetId
},
bwp-Id BWP-Id,
resourceType ENUMERATED { aperiodic, semiPersistent, periodic },
...
}

In another example, a new identifier/indicator, e.g., denoted by SSBConfigId, could be included/indicated in one or more CSI resource/reporting settings indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) and the SSB-Configuration-r16/SSB-InfoNcell-r16 indicating the non-serving (or neighboring) cell RS (SSB) configuration information for the inter-cell operation (Option-2/Option-3). The UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in SSB-Configuration-r16/SSB-InfoNcell-r16 (Option-2/Option-3) if the SSBConfigId value configured in both the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) and the SSB-Configuration-r16/SSB-InfoNcell-r16 are the same.

In yet another example, a new identifier/indicator, e.g., denoted by SSBConfigInterCellId, could be included/indicated in one or more CSI resource/reporting settings indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) and the SSB-Configuration-InterCell/SSB-InfoNcell-InterCell indicating the non-serving (or neighboring) cell RS (SSB) configuration information for the inter-cell operation (Option-4). The UE could associate the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) with the non-serving (or neighboring) cell RS (SSB) configuration information configured in SSB-Configuration-InterCell/SSB-InfoNcell-InterCell (Option-4) if the SSB-ConfigInterCellId value configured in both the CSI resource/reporting setting indicating the non-serving (or neighboring) cell RS and/or CSI resource/reporting parameters/configurations (e.g., in CSI-ResourceConfig/CSI-SSB-ResourceSet/NZP-CSI-RS-ResourceSet/CSI-IM-ResourceSet/CSI-ReportConfig) and the SSB-Configuration-InterCell/SSB-InfoNcell-InterCell are the same.

In yet another example, a CSI resource setting ID (e.g., the higher layer parameter csi-ResourceConfigId in CSI-ResourceConfig) could be included/indicated in MeasObjectNR indicating the non-serving (or neighboring) cell RS (SSB) configuration information for the inter-cell operation (Option-1/Option-3). The UE could associate the CSI resource setting (CSI-ResourceConfig) with the non-serving (or neighboring) cell RS (SSB) configuration information configured in MeasObjectNR (Option-1/Option-3) if the CSI resource setting ID value configured in both the CSI resource setting (CSI-ResourceConfig) and the MeasObjectNR are the same.

In yet another example, a CSI resource setting ID (e.g., the higher layer parameter csi-ResourceConfigId in CSI-ResourceConfig) could be included/indicated in SSB-Configuration-r16/SSB-InfoNcell-r16 indicating the non-serving (or neighboring) cell RS (SSB) configuration information for the inter-cell operation (Option-2/Option-3). The UE could associate the CSI resource setting (CSI-ResourceConfig) with the non-serving (or neighboring) cell RS (SSB) configuration information configured in SSB-Configuration-r16/SSB-InfoNcell-r16 (Option-2/Option-3) if the CSI resource setting ID value configured in both the CSI resource setting (CSI-ResourceConfig) and the SSB-Configuration-r16/SSB-InfoNcell-r16 are the same.

In yet another example, a CSI resource setting ID (e.g., the higher layer parameter csi-ResourceConfigId in CSI-ResourceConfig) could be included/indicated in SSB-Configuration-InterCell/SSB-InfoNcell-InterCell indicating the non-serving (or neighboring) cell RS (SSB) configuration information for the inter-cell operation (Option-4). The UE could associate the CSI resource setting (CSI-ResourceConfig) with the non-serving (or neighboring) cell RS (SSB) configuration information configured in SSB-Configuration-InterCell/SSB-InfoNcell-InterCell (Option-4) if the CSI resource setting ID value configured in both the CSI resource setting (CSI-ResourceConfig) and the SSB-Configuration-InterCell/SSB-InfoNcell-InterCell are the same.

In yet another example, a CSI-RS resource set ID (e.g., the higher layer parameter csi-SSB-ResourceSetId/nzp-CSI-ResourceSetId/csi-IM-ResourceSetId) could be included/indicated in MeasObjectNR indicating the non-serving (or neighboring) cell RS (SSB) configuration information for the inter-cell operation (Option-1/Option-3). The UE could associate the CSI-RS resource set (CSI-SSB-ResourceSet/NZP-CSI-RS-ResourceSet/CSI-IM-ResourceSet) with the non-serving (or neighboring) cell RS (SSB) configuration information configured in MeasObjectNR (Option-1/Option-3) if the CSI-RS resource set ID value (csi-SSB-ResourceSetId/nzp-CSI-ResourceSetId/csi-IM-ResourceSetId value) configured in both the CSI-RS resource set (CSI-SSB-ResourceSet/NZP-CSI-RS-ResourceSet/CSI-IM-ResourceSet) and the MeasObjectNR are the same.

In yet another example, a CSI-RS resource set ID (e.g., the higher layer parameter csi-SSB-ResourceSetId/nzp-CSI-ResourceSetId/csi-IM-ResourceSetId) could be included/indicated in SSB-Configuration-r16/SSB-InfoNcell-r16 indicating the non-serving (or neighboring) cell RS (SSB) configuration information for the inter-cell operation (Option-2/Option-3). The UE could associate the CSI-RS resource set (CSI-SSB-ResourceSet/NZP-CSI-RS-ResourceSet/CSI-IM-ResourceSet) with the non-serving (or neighboring) cell RS (SSB) configuration information configured in SSB-Configuration-r16/SSB-InfoNcell-r16 (Option-2/Option-3) if the CSI-RS resource set ID value (csi-SSB-ResourceSetId/nzp-CSI-ResourceSetId/csi-IM-ResourceSetId value) configured in both the CSI-RS resource set (CSI-SSB-ResourceSet/NZP-CSI-RS-ResourceSet/CSI-IM-ResourceSet) and the SSB-Configuration-r16/SSB-InfoNcell-r16 are the same.

In yet another example, a CSI-RS resource set ID (e.g., the higher layer parameter csi-SSB-ResourceSetId/nzp-CSI-ResourceSetId/csi-IM-ResourceSetId) could be included/indicated in SSB-Configuration-InterCell/SSB-InfoNcell-InterCell indicating the non-serving (or neighboring) cell RS (SSB) configuration information for the inter-cell operation (Option-4). The UE could associate the CSI-RS resource set (CSI-SSB-ResourceSet/NZP-CSI-RS-ResourceSet/CSI-IM-ResourceSet) with the non-serving (or neighboring) cell RS (SSB) configuration information configured in SSB-Configuration-InterCell/SSB-InfoNcell-InterCell (Option-4) if the CSI-RS resource set ID value (csi-SSB-ResourceSetId/nzp-CSI-ResourceSetId/csi-IM-ResourceSetId value) configured in both the CSI-RS resource set (CSI-SSB-ResourceSet/NZP-CSI-RS-ResourceSet/CSI-IM-ResourceSet) and the SSB-Configuration-InterCell/SSB-InfoNcell-InterCell are the same.

In yet another example, a CSI reporting setting ID (e.g., the higher layer parameter reportConfigId in CSI-ReportConfig) could be included/indicated in MeasObjectNR indicating the non-serving (or neighboring) cell RS (SSB) configuration information for the inter-cell operation (Option-1/Option-3). The UE could associate the CSI reporting setting (CSI-ReportConfig) with the non-serving (or neighboring) cell RS (SSB) configuration information configured in MeasObjectNR (Option-1/Option-3) if the CSI reporting setting ID value configured in both the CSI reporting setting (CSI-ReportConfig) and the MeasObjectNR are the same.

In yet another example, a CSI reporting setting ID (e.g., the higher layer parameter reportConfigId in CSI-ReportConfig) could be included/indicated in SSB-Configuration-r16/SSB-InfoNcell-r16 indicating the non-serving (or neighboring) cell RS (SSB) configuration information for the inter-cell operation (Option-2/Option-3). The UE could associate the CSI reporting setting (CSI-ReportConfig) with the non-serving (or neighboring) cell RS (SSB) configuration information configured in SSB-Configuration-r16/SSB-InfoNcell-r16 (Option-2/Option-3) if the CSI reporting setting ID value configured in both the CSI reporting setting (CSI-ReportConfig) and the SSB-Configuration-r16/SSB-InfoNcell-r16 are the same.

In yet another example, a CSI reporting setting ID (e.g., the higher layer parameter reportConfigId in CSI-ReportConfig) could be included/indicated in SSB-Configuration-InterCell/SSB-InfoNcell-InterCell indicating the non-serving (or neighboring) cell RS (SSB) configuration information for the inter-cell operation (Option-4). The UE could associate the CSI reporting setting (CSI-ReportConfig) with the non-serving (or neighboring) cell RS (SSB) configuration information configured in SSB-Configuration-InterCell/SSB-InfoNcell-InterCell (Option-4) if the CSI reporting setting ID value configured in both the CSI reporting setting (CSI-ReportConfig) and the SSB-Configuration-InterCell/SSB-InfoNcell-InterCell are the same.

In one embodiment, uplink RS/channel enhancements for inter-cell operation are provided. To support inter-cell operation, enhancements on one or more uplink RSs/channels such as SRS, PUCCH, PUSCH and etc. associated with/configured for one or more non-serving (or neighboring) cells/TRPs in the inter-cell system are needed.

In one embodiment, indicating non-serving (or neighboring) cell RS information in uplink RS/channel parameters/configurations is provided.

The non-serving (or neighboring) cell RS information could be included/indicated in uplink RS/channel (such as SRS, PUCCH, PUSCH and etc.) configuration related higher layer parameters such as SRS-SpatialRelationInfo, PUSCH-PathlossReferenceRS-r16, PUSCH-PathlossReferenceRS, PUCCH-PathlossReferenceRS-r16, PUCCH-PathlossReferenceRS, PUCCH-SpatialRelationInfo.

FIG. 30 illustrates an example SRS spatial relation information 3000 according to embodiments of the present disclosure. An embodiment of the SRS spatial relation information 3000 shown in FIG. 30 is for illustration only.

TABLE 37

An example of including/indicating the (non-serving (or neighboring) cell) PCI/TRP ID value in SRS-SpatialRelationInfo

```
SRS-SpatialRelationInfo ::= SEQUENCE {
    servingCellId ServCellIndex OPTIONAL, -- Need S
    physicalCellId PhyCellId, OPTIONAL, -- Need S
    referenceSignal CHOICE {
    ssb-Index SSB-Index,
    csi-RS-Index NZP-CSI-RS-ResourceId,
    srs SEQUENCE {
    resourceId SRS-ResourceId,
    uplinkBWP BWP-Id
    }
    }
}
```

For the higher layer parameters SRS-SpatialRelationInfo/PUCCH-SpatialRelationInfo, in one example, the TRP-specific index/ID value such as PCI value, TRP ID value, CORESETPoolIndex value or other TRP-specific higher layer signaling index values could be included/indicated in the higher layer parameters SRS-SpatialRelationInfo/PUCCH-SpatialRelationInfo. In FIG. 30, an example of including/indicating the (non-serving (or neighboring) cell) PCI/TRP ID value in SRS-SpatialRelationInfo is presented, and a snippet of the corresponding IE is given in TABLE 37 (i.e., a new field/parameter physicalCellId is included/configured in the higher layer parameter SRS-SpatialRelationInfo to indicate the non-serving (or neighboring) cell RS(s) as the reference RS(s) for configuring the spatial domain transmission filter for the transmission of the SRS(s)). If the PCI/TRP ID value (e.g., physicalCellId) is not configured/present in the higher layer parameters SRS-SpatialRelationInfo/PUCCH-SpatialRelationInfo, the UE could expect that the indicated RS(s) in the higher layer parameters SRS-SpatialRelationInfo/PUCCH-SpatialRelationInfo is transmitted from/associated with/configured for the serving cell/TRP.

For the higher layer parameters SRS-SpatialRelationInfo/PUCCH-SpatialRelationInfo, in another example, a one-bit flag indicator could be included/indicated in the higher layer parameters SRS-SpatialRelationInfo/PUCCH-SpatialRelationInfo. For an inter-cell system comprising of a single non-serving (or neighboring) cell/TRP, if the UE is indicated by the network a SRS/PUCCH spatial relation setting (via the higher layer parameters SRS-SpatialRelationInfo/PUCCH-SpatialRelationInfo) with the 1-bit flag indicator set to "0" (or "OFF" or "FALSE") or not configured/present, the UE would expect that the RS(s) such as the SSB(s)/CSI-RS(s) indicated in the higher layer parameters SRS-SpatialRelationInfo/PUCCH-SpatialRelationInfo is transmitted from/associated with/configured for the serving cell/TRP. Otherwise, if the UE is indicated by the network a SRS/PUCCH spatial relation setting (via the higher layer parameters SRS-SpatialRelationInfo/PUCCH-SpatialRelation- Info) with the 1-bit flag indicator set to "1" (or "ON" or "TRUE"), the UE would expect that the RS(s) such as the SSB(s)/CSI-RS(s) indicated in the higher layer parameters SRS-SpatialRelationInfo/PUCCH-SpatialRelationInfo is transmitted from/associated with/configured for the non-serving (or neighboring) cell/TRP in the inter-cell system. A snippet of the higher layer parameter SRS-SpatialRelationInfo incorporating/indicating the one-bit flag indicator (nsc-flag) is shown in TABLE 38. If the one-bit flag indicator (e.g., nsc-flag) is not configured/present in the higher layer parameters SRS-SpatialRelationInfo/PUCCH-SpatialRelationInfo, the UE could expect that the indicated RS(s) in the higher layer parameters SRS-SpatialRelationInfo/PUCCH-SpatialRelationInfo is transmitted from/associated with/configured for the serving cell/TRP.

TABLE 38

Higher layer parameter SRS-SpatialRelationInfo indicating/including a one-bit flag SRS-SpatialRelationInfo ::= SEQUENCE {
  servingCellId ServCellIndex OPTIONAL, -- Need S
  nsc-flag ENUMERATED {true} OPTIONAL, -- Need R
  referenceSignal CHOICE {
  ssb-Index SSB-Index,
  csi-RS-Index NZP-CSI-RS-ResourceId,
  srs SEQUENCE {
  resourceId SRS-ResourceId,
  uplinkBWP BWP-Id
  }
  }
}

For the higher layer parameters SRS-SpatialRelationInfo/PUCCH-SpatialRelationInfo, in yet another example, for an inter-cell system comprising of more than one (N_nsc>1) non-serving (or neighboring) cells/TRPs, a multi-bit (e.g., n_b bits) indicator could be incorporated/indicated in the higher layer parameters SRS-SpatialRelationInfo/PUCCH-SpatialRelationInfo to indicate to the UE the serving cell RSs and/or the non-serving (or neighboring) cell RSs from the N_nsc non-serving (or neighboring) cells configured as the reference RSs for setting the spatial domain transmission filters for the transmission of the SRSs/PUCCHs. The number of bits n_b required for representing the multi-bit indicator could be ceil (log 2(N_nsc+1)), where ceil(x) rounds x up to the next largest integer. In this case, the n_b-bit indicator could correspond to $2^{(n\_b)}$ states, and one of the states (e.g., the first state) could correspond to the serving cell/TRP, and the rest of the states could correspond to the non-serving (or neighboring) cells/TRPs. For example, if n_b=2, the corresponding four states are "00," "01," "10," and "11." The first state "00" could correspond to the serving cell, and the rest of the three states could correspond to the non-serving (or neighboring) cells. If, e.g., "00" is indicated in the higher layer parameters SRS-SpatialRelationInfo/PUCCH-SpatialRelationInfo, the UE would expect that the RS(s) indicated in the corresponding SRS/PUCCH spatial relation setting is transmitted from/associated with/configured for the serving cell/TRP. Alternatively, the number of bits n_b required for representing the multi-bit indicator could be ceil(log 2(N_nsc)). In this case, the multi-bit indicator only indicates/identifies the RSs from the N_nsc non-serving (or neighboring) cells/TRPs in the higher layer parameters SRS-SpatialRelationInfo/PUCCH-SpatialRelationInfo; if the multi-bit indicator is not present/configured in the higher layer parameters SRS-SpatialRelationInfo/PUCCH-SpatialRelationInfo, the UE would expect that the RS(s) indicated in the corresponding SRS/PUCCH spatial relation setting is from/associated with/configured for the serving cell/TRP. Under this setting, all of the $2^{(n\_b)}$ states would only correspond to the N_nsc non-serving (or neighboring) cells. The UE could be configured by the network through higher layer RRC signaling the association rule(s)/mapping relationship(s) between the states of the multi-bit indicator and the serving/non-serving (or neighboring) cells/TRPs. For example, the UE could be first higher layer configured by the network (e.g., via higher layer RRC signaling) a list/set/pool of TRP-specific index/ID values such as PCI values, TRP ID values, CORESET-PoolIndex values or other TRP-specific higher layer signaling index values. The higher layer configured list/set/pool of TRP-specific index/ID values could contain the TRP-specific index/ID values for both the serving cell/TRP and the non-serving (or neighboring) cells/TRPs in the inter-cell system or the TRP-specific index/ID values for only the non-serving (or neighboring) cells/TRPs. The first state or the state of the multi-bit indicator having the smallest value could correspond to the first entry in the higher layer configured list/set/pool of TRP-specific index/ID values, the second state or the state of the multi-bit indicator having the second smallest value could correspond to the second entry in the higher layer configured list/set/pool of TRP-specific index/ID values, and so on, and the last state or the state of the multi-bit indicator having the largest value could correspond to the last entry in the higher layer configured list/set/pool of TRP-specific index/ID values. Alternatively, the UE could know the association rule(s)/mapping relationship(s) between the states of the multi-bit indicator and the serving/non-serving (or neighboring) cells/TRPs in an implicit manner. For instance, the state of the multi-bit indicator having the smallest value could correspond to the serving/non-serving (or neighboring) cell/TRP with the lowest PCI, the state of the multi-bit indicator having the second smallest value could correspond to the serving/non-serving (or neighboring) cell/TRP with the second lowest PCI, and so on, and the state of the multi-bit indicator having the largest value could correspond to the serving/non-serving (or neighboring) cell/TRP with the highest PCI. One example characterizing the above described mapping relationship between the states of the multi-bit indicator and the serving/non-serving (or neighboring) cells/TRPs is presented in TABLE 13 in this disclosure. If the multi-bit indicator is not configured/present in the higher layer parameters SRS-SpatialRelationInfo/PUCCH-SpatialRelationInfo, the UE could expect that the indicated RS(s) in the higher layer parameters SRS-SpatialRelationInfo/PUCCH-SpatialRelationInfo is transmitted from/associated with/configured for the serving cell/TRP.

For the higher layer parameters SRS-SpatialRelationInfo/PUCCH-SpatialRelationInfo, in yet another example, a second field of reference signal could be included/indicated in the higher layer parameters SRS-SpatialRelationInfo/PUCCH-SpatialRelationInfo to identify/indicate the non-serving (or neighboring) cell RS(s) such as SSB(s)/CSI-RS(s) transmitted from/associated with/configured for one or more non-serving (or neighboring) cells/TRPs in the inter-cell system. One example of incorporating/indicating a second reference signal field for indicating the non-serving (or neighboring) cell RS(s) in the higher layer parameter SRS-SpatialRelationInfo is given in TABLE 39 (e.g., via referenceSignal-nsc). Other design examples such as incorporating a second field to indicate the non-serving (or neighboring) cell SSB/CSI-RS index (e.g., including/indicating ssb-Index-nsc/csi-RS-Index-nsc in SRS-SpatialRelationInfo shown in TABLE 40) are also possible.

TABLE 39

Higher layer parameter SRS-SpatialRelationInfo
including/indicating a second RS field for
non-serving (or neighboring) cell(s)/TRP(s)

SRS-SpatialRelationInfo ::= SEQUENCE {
  servingCellId ServCellIndex OPTIONAL, -- Need S
  referenceSignal CHOICE {
  ssb-Index SSB-Index,
  csi-RS-Index NZP-CSI-RS-ResourceId,
  srs SEQUENCE {
  resourceId SRS-ResourceId,
  uplinkBWP BWP-Id
  }
  }
  referenceSignal-nsc CHOICE {
  ssb-Index SSB-Index,
  csi-RS-Index NZP-CSI-RS-ResourceId,
  srs SEQUENCE {
  resourceId SRS-ResourceId,
  uplinkBWP BWP-Id
  }
  }
}

TABLE 40

An example of including/indicating ssb-Index-nsc/
csi-RS-Index-nsc in higher layer
parameter SRS-SpatialRelationInfo SRS-SpatialRelationInfo ::= SEQUENCE {
  servingCellId ServCellIndex OPTIONAL, -- Need S
  referenceSignal CHOICE {
  ssb-Index SSB-Index,
  csi-RS-Index NZP-CSI-RS-ResourceId,
  ssb-Index-nsc SSB-Index,
  csi-RS-Index-nsc NZP-CSI-RS-ResourceId,
  srs SEQUENCE {
  resourceId SRS-ResourceId,
  uplinkBWP BWP-Id
  }
  }
}

For the higher layer parameters SRS-SpatialRelationInfo/PUCCH-SpatialRelationInfo, in yet another example, in the higher layer parameters SRS-SpatialRelationInfo/PUCCH-SpatialRelationInfo, the indicated SSB/CSI-RS resource(s), e.g., via ssb-Index/csi-RS-Index, could be transmitted from/associated with/configured for the serving cell/TRP and/or one or more non-serving (or neighboring) cells/TRPs in the inter-cell system. The SSB/CSI-RS indices in the higher layer parameters SRS-SpatialRelationInfo/PUCCH-SpatialRelationInfo (i.e., ssb-Index/csi-RS-Index), and therefore, the corresponding bit-width, could be determined across the SSBs/CSI-RSs from/associated with/configured for both the serving cell/TRP and the non-serving (or neighboring) cell(s)/TRP(s) in the inter-cell system. Furthermore, the UE could expect that the SSB/CSI-RS indices (indicated in ssb-Index/csi-RS-Index) in the higher layer parameters SRS-SpatialRelationInfo/PUCCH-SpatialRelationInfo associated with/configured for the serving cell/TRP and the non-serving (or neighboring) cell(s)/TRP(s) in the inter-cell system may be different. For instance, for an inter-cell system comprising of a serving cell/TRP and N_nsc non-serving (or neighboring) cells/TRPs with each cell/TRP associated with N_rs SSBs/CSI-RSs, the SSB/CSI-RS indices in the higher layer parameters SRS-SpatialRelationInfo/PUCCH-SpatialRelationInfo (i.e., ssb-Index/csi-RS-Index) could be configured as #0, #1, . . . , #N_rs×(N_nsc+1)−1. The UE could be indicated by the network the mapping relationship(s)/association rule(s) between the actual SSB/CSI-RS resource indices from/associated with/configured for the serving/non-serving (or neighboring) cells/TRPs in the inter-cell system and the SSB/CSI-RS indices (in ssb-Index/csi-RS-Index) in the higher layer parameters SRS-SpatialRelationInfo/PUCCH-SpatialRelationInfo (SSB/CSI-RS (re-)indexing configuration/rule). Various design examples of the SSB/CSI-RS (re-)indexing configurations/rules for an inter-cell system comprising of either a single non-serving (or neighboring) cell/TRP or more than one non-serving (or neighboring) cells/TRPs could be referred to those discussed in aforementioned FIGURES and TABLES in this disclosure for TCI state/QCL information enhancements.

For the higher layer parameters SRS-SpatialRelationInfo/PUCCH-SpatialRelationInfo, in yet another example, one or more serving cell indices/IDs (SCIs) (corresponding to one or more values of ServCellIndex in the higher layer parameters SRS-SpatialRelationInfo/PUCCH-SpatialRelationInfo) could be reserved to indicate/identify one or more non-serving (or neighboring) cells/TRPs in the inter-cell system, and therefore, the corresponding non-serving (or neighboring) cell RS(s). The UE could be indicated by the network the exact SCIs or the exact values of the higher layer parameter ServCellIndex reserved for indicating/identifying one or more non-serving (or neighboring) cells/TRPs. For example, a 3-bit ServCellIndex field could be configured in the higher layer parameters SpatialRelationInfo/PUCCH-SpatialRelationInfo to indicate 8 candidate SCIs, denoted by SCI #0, SCI #1, SCI #2, SCI #3, SCI #4, SCI #5, SCI #6 and SCI #7. Furthermore, in this example, SCI #5, SCI #6 and SCI #7 are reserved for indicating/identifying one or more non-serving (or neighboring) cells/TRPs. Consider an inter-cell multi-TRP system comprising of a serving cell/TRP and a single non-serving (or neighboring) cell/TRP. If any value of SCI #5, SCI #6 and SCI #7 is configured as the ServCellIndex in the higher layer parameters SRS-SpatialRelationInfo/PUCCH-SpatialRelationInfo, the UE would expect that the RS(s) indicated in the corresponding SRS/PUCCH spatial relation setting is for the non-serving (or neighboring) cell/TRP.

If more than one (N_nsc>1) non-serving (or neighboring) cells/TRPs are configured in the inter-cell system, the UE could be indicated by the network one or more mapping relationships/association rules between the SCI(s) reserved for identifying/indicating the non-serving (or neighboring) cell RS(s) in the higher layer parameters SRS-SpatialRelationInfo/PUCCH-SpatialRelationInfo and the non-serving (or neighboring) cells/TRPs; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

For the indication of the SCI(s) reserved for identifying/indicating the non-serving (or neighboring) cell RS(s) in the higher layer parameters SRS-SpatialRelationInfo/PUCCH-SpatialRelationInfo, in one example, the UE could be indicated by the network, e.g., via higher layer RRC signaling and/or dynamic DCI signaling, the exact value(s) of SCI or ServCellIndex reserved for identifying/indicating the non-serving (or neighboring) cells/TRPs in the inter-cell system, and therefore, the corresponding non-serving (or neighboring) cell RS(s), in the higher layer parameters SRS-SpatialRelationInfo/PUCCH-SpatialRelationInfo.

For the indication of the SCI(s) reserved for identifying/indicating the non-serving (or neighboring) cell RS(s) in the higher layer parameters SRS-SpatialRelationInfo/PUCCH-SpatialRelationInfo, in another example, the UE could be first higher layer configured by the network (e.g., via higher layer RRC signaling) a list/set/pool of SCIs (SCI/ServCellIndex values) reserved for identifying/indicating the non-serving (or neighboring) cell RS(s) in the higher layer parameters SRS-SpatialRelationInfo/PUCCH-SpatialRelationInfo. The UE could then receive from the network a MAC CE command activating one or more SCIs (SCI/ServCellIndex values) from the higher layer configured list/set/pool of SCIs.

For the indication of the SCI(s) reserved for identifying/indicating the non-serving (or neighboring) cell RS(s) in the higher layer parameters SRS-SpatialRelationInfo/PUCCH-SpatialRelationInfo, in yet another example, the UE could receive from the network a bitmap with each entry/bit in the bitmap corresponding to a SCI (SCI/ServCellIndex value). If an entry/bit in the bitmap is set to "1," the corresponding/associated SCI/ServCellIndex value is activated for identifying/indicating the non-serving (or neighboring) cell RS(s) in the higher layer parameters SRS-SpatialRelationInfo/PUCCH-SpatialRelationInfo.

For the association between the SCI(s) (or SCI/ServCellIndex value(s)) reserved for identifying/indicating the non-serving (or neighboring) cell RS(s) in the higher layer parameters SRS-SpatialRelationInfo/PUCCH-SpatialRelationInfo and the non-serving (or neighboring) cells/TRPs in the inter-cell system, in one example, for all configured SRS/PUCCH spatial relation settings, i.e., SRS-SpatialRelationInfo's/PUCCH-SpatialRelationInfo's, the same SCI/ServCellIndex value reserved for identifying/indicating the non-serving (or neighboring) cell RS(s) in the higher layer parameters SRS-SpatialRelationInfo/PUCCH-SpatialRelationInfo is associated with a single non-serving (or neighboring) cell/TRP. For all higher layer configured SRS/PUCCH spatial relation settings (SRS-SpatialRelationInfo's/PUCCH-SpatialRelationInfo's), the UE could be explicitly indicated by the network how the reserved SCI(s) (or SCI/ServCellIndex value(s)) are associated with/configured for the non-serving (or neighboring) cells/TRPs. For instance, for all higher layer configured SRS/PUCCH spatial relation settings (SRS-SpatialRelationInfo's/PUCCH-SpatialRelationInfo's), the UE could be first higher layer configured by the network (e.g., via higher layer RRC signaling) a list/set/pool of TRP-specific index/ID values such as PCI values, TRP ID values, CORESETPoolIndex values or other TRP-specific higher layer signaling index values for the non-serving (or neighboring) cells/TRPs; the first reserved SCI/ServCellIndex value or the lowest reserved SCI/ServCellIndex value could correspond to the first entry in the higher layer configured list/set/pool of TRP-specific index/ID values, the second reserved SCI/ServCellIndex value or the second lowest reserved SCI/ServCellIndex value could correspond to the second entry in the higher layer configured list/set/pool of TRP-specific index/ID values, and so on, and the last reserved SCI/ServCellIndex value or the highest reserved SCI/ServCellIndex value could correspond to the last entry in the higher layer configured list/set/pool of TRP-specific index/ID values.

For the association between the SCI(s) (or SCI/ServCellIndex value(s)) reserved for identifying/indicating the non-serving (or neighboring) cell RS(s) in the higher layer parameters SRS-SpatialRelationInfo/PUCCH-SpatialRelationInfo and the non-serving (or neighboring) cells/TRPs in the inter-cell system, in another example, for all configured SRS/PUCCH spatial relation settings (SRS-SpatialRelationInfo's/PUCCH-SpatialRelationInfo's), the same SCI/ServCellIndex value reserved for identifying/indicating the non-serving (or neighboring) cell RS(s) in the higher layer parameters SRS-SpatialRelationInfo/PUCCH-SpatialRelationInfo is associated with/configured for a single non-serving (or neighboring) cell/TRP. For all higher layer configured SRS/PUCCH spatial relation settings (SRS-SpatialRelationInfo's/PUCCH-SpatialRelationInfo's), the first reserved SCI/ServCellIndex value or the lowest reserved SCI/ServCellIndex value could correspond to the non-serving (or neighboring) cell/TRP associated with the lowest TRP-specific index/ID value such as the lowest PCI value, the second reserved SCI/ServCellIndex value or the second lowest reserved SCI/ServCellIndex value could correspond to the non-serving (or neighboring) cell/TRP associated with the second lowest TRP-specific index/ID value such as the second lowest PCI value, and so on, and the last reserved SCI/ServCellIndex value or the highest reserved SCI/ServCellIndex value could correspond to the non-serving (or neighboring) cell/TRP associated with the highest TRP-specific index/ID value such as the highest PCI value.

For the association between the SCI(s) (or SCI/ServCellIndex value(s)) reserved for identifying/indicating the non-serving (or neighboring) cell RS(s) in the higher layer parameters SRS-SpatialRelationInfo/PUCCH-SpatialRelationInfo and the non-serving (or neighboring) cells/TRPs in the inter-cell system, in yet another example, for a subset of all higher layer configured SRS/PUCCH spatial relation settings (SRS-SpatialRelationInfo's/PUCCH-SpatialRelationInfo's), the same SCI/ServCellIndex value reserved for identifying/indicating the non-serving (or neighboring) cell RS(s) in the higher layer parameters SRS-SpatialRelationInfo/PUCCH-SpatialRelationInfo is associated with a single non-serving (or neighboring) cell/TRP. For a given subset (indicated to the UE by the network) of all higher layer configured SRS/PUCCH spatial relation settings (SRS-SpatialRelationInfo's/PUCCH-SpatialRelationInfo's), the UE could be explicitly indicated by the network how the reserved SCI(s) (or SCI/ServCellIndex value(s)) are associated with/configured for the non-serving (or neighboring) cells/TRPs. For instance, for a given subset (indicated to the UE by the network) of all higher layer configured SRS/PUCCH spatial relation settings (SRS-SpatialRelationInfo's/PUCCH-SpatialRelationInfo's), the UE could be first higher layer configured by the network (e.g., via higher layer RRC signaling) a list/set/pool of TRP-specific index/ID values such as PCI values, TRP ID values, CORESETPoolIndex values or other TRP-specific higher layer signaling index values for the non-serving (or neighboring) cells/TRPs; the first reserved SCI/ServCellIndex value or the lowest reserved SCI/ServCellIndex value could correspond to the first entry in the higher layer configured list/set/pool of TRP-specific index/ID values, the second reserved SCI/ServCellIndex value or the second lowest reserved SCI/ServCellIndex value could correspond to the second entry in the higher layer configured list/set/pool of TRP-specific index/ID values, and so on, and the last reserved SCI/ServCellIndex value or the highest reserved SCI/ServCellIndex value could correspond to the last entry in the higher layer configured list/set/pool of TRP-specific index/ID values. For all higher layer configured SRS/PUCCH spatial relation settings (SRS-SpatialRelationInfo's/PUCCH-SpatialRelationInfo's), the same SCI/ServCellIndex value reserved for identifying/indicating the non-serving (or neighboring) cell RS(s) in the higher layer parameters SRS-SpatialRelationInfo/PUCCH-SpatialRelationInfo could correspond to more than one non-serving (or neighboring) cells/TRPs.

For the association between the SCI(s) (or SCI/ServCellIndex value(s)) reserved for identifying/indicating the non-serving (or neighboring) cell RS(s) in the higher layer parameters SRS-SpatialRelationInfo/PUCCH-SpatialRelationInfo and the non-serving (or neighboring) cells/TRPs in the inter-cell system, in yet another example, for a subset of all higher layer configured SRS/PUCCH spatial relation settings (SRS-SpatialRelationInfo's/PUCCH-SpatialRelationInfo's), the same SCI/ServCellIndex value reserved for identifying/indicating the non-serving (or neighboring) cell RS(s) in the higher layer parameters SRS-SpatialRelationInfo/PUCCH-SpatialRelationInfo is associated with/configured for a single non-serving (or neighboring) cell/TRP. For a given subset (indicated to the UE by the network) of all higher layer configured SRS/PUCCH spatial relation settings (SRS-SpatialRelationInfo's/PUCCH-SpatialRelationInfo's), the first reserved SCI/ServCellIndex value or the lowest reserved SCI/ServCellIndex value could correspond to the non-serving (or neighboring) cell/TRP associated with the lowest TRP-specific index/ID value such as the lowest PCI value, the second reserved SCI/ServCellIndex value or the second lowest reserved SCI/ServCellIndex value could correspond to the non-serving (or neighboring) cell/TRP associated with the second lowest TRP-specific index/ID value such as the second lowest PCI value, and so on, and the last reserved SCI/ServCellIndex value or the highest reserved SCI/ServCellIndex value could correspond to the non-serving (or neighboring) cell/TRP associated with the highest TRP-specific index/ID value such as the highest PCI value. For all higher layer configured SRS/PUCCH spatial relation settings (SRS-SpatialRelationInfo's/PUCCH-SpatialRelationInfo's), the same SCI/ServCellIndex value reserved for identifying/indicating the non-serving (or neighboring) cell RS(s) in the higher layer parameters SRS-SpatialRelationInfo/PUCCH-SpatialRelationInfo could correspond to more than one non-serving (or neighboring) cells/TRPs.

FIG. 31 illustrates an example PUSCH pathloss reference RS 3100 according to embodiments of the present disclosure. An embodiment of the PUSCH pathloss reference RS 3100 shown in FIG. 31 is for illustration only.

TABLE 41

An example of including/indicating the (non-serving (or neighboring) cell) PCI/TRP ID value in higher layer parameter PUSCH-PathlossReferenceRS PUSCH-PathlossReferenceRS ::= SEQUENCE {
  pusch-PathlossReferenceRS-Id PUSCH-PathlossReferenceRS-Id,
  physicalCellId PhyCellId, OPTIONAL, -- Need S
  referenceSignal CHOICE {
    ssb-Index SSB-Index,
    csi-RS-Index NZP-CSI-RS-ResourceId
  }
}

For the higher layer parameters PUSCH-PathlossReferecenceRS/PUSCH-PathlossReferenceRS-r16/PUCCH-PathlossReferenceRS/PUCCH-PathlossReferenceRS-r16, in one example, the TRP-specific index/ID value such as PCI value, TRP ID value, CORESETPoolIndex value or other TRP-specific higher layer signaling index values could be included/indicated in the higher layer parameters PUSCH-PathlossReferecenceRS/PUSCH-PathlossReferenceRS-r16/PUCCH-PathlossReferenceRS/PUCCH-PathlossReferenceRS-r16. In FIG. 31, an example of including/indicating the (non-serving (or neighboring) cell) PCI/TRP ID value in PUSCH-PathlossReferenceRS is presented, and a snippet of the corresponding IE is given in TABLE 41 (i.e., a new field/parameter physicalCellId is included/configured in the higher layer parameter PUSCH-PathlossReferenceRS to indicate the non-serving (or neighboring) cell RS(s) for the estimation of path-loss). If the PCI/TRP ID value (e.g., physicalCellId) is not configured/present in the higher layer parameters PUSCH-PathlossReferecenceRS/PUSCH-PathlossReferenceRS-r16/PUCCH-PathlossReferenceRS/PUCCH-PathlossReferenceRS-r16, the UE could expect that the indicated RS(s) in the higher layer parameters PUSCH-PathlossReferecenceRS/PUSCH-PathlossReferenceRS-r16/PUCCH-PathlossReferenceRS/PUCCH-PathlossReferenceRS-r16 is transmitted from/associated with/configured for the serving cell/TRP.

For the higher layer parameters PUSCH-PathlossReferecenceRS/PUSCH-PathlossReferenceRS-r16/PUCCH-PathlossReferenceRS/PUCCH-PathlossReferenceRS-r16, in another example, a one-bit flag indicator could be included/indicated in the higher layer parameters PUSCH-PathlossReferecenceRS/PUSCH-PathlossReferenceRS-r16/PUCCH-PathlossReferenceRS/PUCCH-PathlossReferenceRS-r16. For an inter-cell system comprising of a single non-serving (or neighboring) cell/TRP, if the UE is indicated by the network one or more path-loss RS resource settings (via the higher layer parameters PUSCH-PathlossReferecenceRS/PUSCH-PathlossReferenceRS-r16/PUCCH-PathlossReferenceRS/PUCCH-PathlossReferenceRS-r16) with the 1-bit flag indicator set to "0" (or "OFF" or "FALSE") or not configured/present, the UE would expect that the RS(s) such as the SSB(s)/CSI-RS(s) indicated in the higher layer parameters PUSCH-PathlossReferecenceRS/PUSCH-PathlossReferenceRS-r16/PUCCH-PathlossReferenceRS/PUCCH-PathlossReferenceRS-r16 is transmitted from/associated with/configured for the serving cell/TRP. Otherwise, if the UE is indicated by the network one or more path-loss RS resource settings (via the higher layer parameters PUSCH-PathlossReferecenceRS/PUSCH-PathlossReferenceRS-r16/PUCCH PathlossReferenceRS/PUCCH-PathlossReferenceRS-r16) with the 1-bit flag indicator set to "1" (or "ON" or "TRUE"), the UE would expect that the RS(s) such as the SSB(s)/CSI-RS(s) indicated in the higher layer parameters PUSCH-PathlossReferecenceRS/PUSCH-PathlossReferenceRS-r16/PUCCH-PathlossReferenceRS/PUCCH-PathlossReferenceRS-r16 is transmitted from/associated with/configured for the non-serving (or neighboring) cell/TRP in the inter-cell system. A snippet of the higher layer parameter PUSCH-PathlossReferenceRS incorporating/indicating the one-bit flag indicator (nsc-flag) is shown in TABLE 42. If the one-bit flag indicator (e.g., nsc-flag) is not configured/present in the higher layer parameters PUSCH-PathlossReferecenceRS/PUSCH-PathlossReferenceRS-r16/PUCCH-PathlossReferenceRS/PUCCH-PathlossReferenceRS-r16, the UE could expect that the indicated RS(s) in the higher layer parameters PUSCH-PathlossReferecenceRS/PUSCH-PathlossReferenceRS-r16/PUCCH-PathlossReferenceRS/PUCCH-PathlossReferenceRS-r16 is transmitted from/associated with/configured for the serving cell/TRP.

TABLE 42

Higher layer parameter PUSCH-PathlossReferenceRS including/indicating a one-bit flag

```
PUSCH-PathlossReferenceRS ::= SEQUENCE {
   pusch-PathlossReferenceRS-Id PUSCH-PathlossReferenceRS-Id,
   nsc-flag ENUMERATED {true}OPTIONAL, -- Need R
   referenceSignal CHOICE {
   ssb-Index SSB-Index,
   csi-RS-Index NZP-CSI-RS-ResourceId
   }
}
```

In yet another example, for an inter-cell system comprising of more than one (N_nsc>1) non-serving (or neighboring) cells/TRPs, a multi-bit (e.g., n_b bits) indicator could be incorporated/indicated in the higher layer parameters PUSCH-PathlossReferecenceRS/PUSCH-PathlossReferenceRS-r16/PUCCH-PathlossReferenceRS/PUCCH-PathlossReferenceRS-r16 to indicate to the UE the serving cell RSs and/or the non-serving (or neighboring) cell RSs from the N_nsc non-serving (or neighboring) cells for the purpose of path-loss estimation. The number of bits n_b required for representing the multi-bit indicator could be ceil (log 2(N_nsc+1)), where ceil(x) rounds x up to the next largest integer. In this case, the n_b-bit indicator could correspond to 2^(n_b) states, and one of the states (e.g., the first state) could correspond to the serving cell/TRP, and the rest of the states could correspond to the non-serving (or neighboring) cells/TRPs. For example, if n_b=2, the corresponding four states are "00," "01," "10," and "11."

The first state "00" could correspond to the serving cell, and the rest of the three states could correspond to the non-serving (or neighboring) cells. If, e.g., "00" is indicated in the higher layer parameters PUSCH-PathlossReferecenceRS/PUSCH-PathlossReferenceRS-r16/PUCCH-PathlossReferenceRS/PUCCH-PathlossReferenceRS-r16, the UE would expect that the RS(s) indicated in the corresponding path-loss RS resource setting(s) is transmitted from/associated with/configured for the serving cell/TRP. Alternatively, the number of bits n_b required for representing the multi-bit indicator could be ceil(log 2(N_nsc)).

In this case, the multi-bit indicator only indicates/identifies the RSs from the N_nsc non-serving (or neighboring) cells/TRPs in the higher layer parameters PUSCH-PathlossReferecenceRS/PUSCH-PathlossReferenceRS-r16/PUCCH-PathlossReferenceRS/PUCCH-PathlossReferenceRS-r16; if the multi-bit indicator is not present/configured in the higher layer parameters PUSCH-PathlossReferecenceRS/PUSCH-PathlossReferenceRS-r16/PUCCH-PathlossReferenceRS/PUCCH-PathlossReferenceRS-r16, the UE would expect that the RS(s) indicated in the corresponding path-loss RS resource setting(s) is from/associated with/configured for the serving cell/TRP. Under this setting, all of the 2^(n_b) states would only correspond to the N_nsc non-serving (or neighboring) cells.

The UE could be configured by the network through higher layer RRC signaling the association rule(s)/mapping relationship(s) between the states of the multi-bit indicator and the serving/non-serving (or neighboring) cells/TRPs. For example, the UE could be first higher layer configured by the network (e.g., via higher layer RRC signaling) a list/set/pool of TRP-specific index/ID values such as PCI values, TRP ID values, CORESETPoolIndex values or other TRP-specific higher layer signaling index values. The higher layer configured list/set/pool of TRP-specific index/ID values could contain the TRP-specific index/ID values for both the serving cell/TRP and the non-serving (or neighboring) cells/TRPs in the inter-cell system or the TRP-specific index/ID values for only the non-serving (or neighboring) cells/TRPs.

The first state or the state of the multi-bit indicator having the smallest value could correspond to the first entry in the higher layer configured list/set/pool of TRP-specific index/ID values, the second state or the state of the multi-bit indicator having the second smallest value could correspond to the second entry in the higher layer configured list/set/pool of TRP-specific index/ID values, and so on, and the last state or the state of the multi-bit indicator having the largest value could correspond to the last entry in the higher layer configured list/set/pool of TRP-specific index/ID values.

Alternatively, the UE could know the association rule(s)/mapping relationship(s) between the states of the multi-bit indicator and the serving/non-serving (or neighboring) cells/TRPs in an implicit manner. For instance, the state of the multi-bit indicator having the smallest value could correspond to the serving/non-serving (or neighboring) cell/TRP with the lowest PCI, the state of the multi-bit indicator having the second smallest value could correspond to the serving/non-serving (or neighboring) cell/TRP with the second lowest PCI, and so on, and the state of the multi-bit indicator having the largest value could correspond to the serving/non-serving (or neighboring) cell/TRP with the highest PCI. One example characterizing the above described mapping relationship between the states of the multi-bit indicator and the serving/non-serving (or neighboring) cells/TRPs is presented in TABLE 13 in this disclosure.

In yet another example, a second field of reference signal could be included/indicated in the higher layer parameters PUSCH-PathlossReferecenceRS/PUSCH-PathlossReferenceRS-r16/PUCCH-PathlossReferenceRS/PUCCH-PathlossReferenceRS-r16 to identify/indicate the non-serving (or neighboring) cell RS(s) such as SSB(s)/CSI-RS(s) transmitted from/associated with/configured for one or more non-serving (or neighboring) cells/TRPs in the inter-cell system. One example of incorporating a second reference signal field for indicating the non-serving (or neighboring) cell RS(s) in the higher layer parameter PUS CH-PathlossReferenceRS is given in TABLE 43 (e.g., via referenceSignal-nsc). Other design examples such as incorporating/indicating a second field to indicate the non-serving (or neighboring) cell SSB/CSI-RS index (e.g., including ssb-Index-nsc/csi-RS-Index-nsc in PUSCH-PathlossReferenceRS shown in TABLE 44) are also possible.

TABLE 43

An example of including/indicating a second reference signal field for indicating the non-serving (or neighboring) cell RS(s) in higher layer parameter PUSCH-PathlossReferenceRS

```
PUSCH-PathlossReferenceRS ::= SEQUENCE {
   pusch-PathlossReferenceRS-Id PUSCH-PathlossReferenceRS-Id,
   nsc-flag ENUMERATED {true} OPTIONAL, -- Need R
   referenceSignal CHOICE {
   ssb-Index SSB-Index,
   csi-RS-Index NZP-CSI-RS-ResourceId
   }
   ReferenceSignal-nsc CHOICE {
   ssb-Index SSB-Index,
   csi-RS-Index NZP-CSI-RS-ResourceId
   }
}
```

TABLE 44

An example of including/indicating ssb-Index-nsc/csi-RS-Index-nsc in higher layer parameter PUSCH-PathlossReferenceRS

```
PUSCH-PathlossReferenceRS ::= SEQUENCE {
   pusch-PathlossReferenceRS-Id PUSCH-PathlossReferenceRS-Id,
   nsc-flag ENUMERATED {true} OPTIONAL, -- Need R
   referenceSignal CHOICE {
   ssb-Index SSB-Index,
   csi-RS-Index NZP-CSI-RS-ResourceId
   ssb-Index-nsc SSB-Index,
   csi-RS-Index-nsc NZP-CSI-RS-ResourceId
     }
  }
```

In yet another example, in the higher layer parameters PUSCH-PathlossReferecenceRS/PUSCH-PathlossReferenceRS-r16/PUCCH-PathlossReferenceRS/PUCCH-PathlossReferenceRS-r16, the indicated SSB/CSI-RS resource(s), e.g., via ssb-Index/csi-RS-Index, could be transmitted from/associated with/configured for the serving cell/TRP and/or one or more non-serving (or neighboring) cells/TRPs in the inter-cell system. The SSB/CSI-RS indices in the higher layer parameters PUSCH-PathlossReferecenceRS/PUSCH-PathlossReferenceRS-r16/PUCCH-PathlossReferenceRS/PUCCH-PathlossReferenceRS-r16 (i.e., ssb-Index/csi-RS-Index), and therefore, the corresponding bit-width, could be determined across the SSBs/CSI-RSs from/associated with/configured for both the serving cell/TRP and the non-serving (or neighboring) cell(s)/TRP(s) in the inter-cell system.

Furthermore, the UE could expect that the SSB/CSI-RS indices (indicated in ssb-Index/csi-RS-Index) in the higher layer parameters PUSCH-PathlossReferecenceRS/PUSCH-PathlossReferenceRS-r16/PUCCH-PathlossReferenceRS/PUCCH-PathlossReferenceRS-r16 associated with/configured for the serving cell/TRP and the non-serving (or neighboring) cell(s)/TRP(s) in the inter-cell system may be different. For instance, for an inter-cell system comprising of a serving cell/TRP and N_nsc non-serving (or neighboring) cells/TRPs with each cell/TRP associated with N_rs SSBs/CSI-RSs, the SSB/CSI-RS indices in the higher layer parameters PUSCH-PathlossReferecenceRS/PUSCH-PathlossReferenceRS-r16/PUCCH-PathlossReferenceRS/PUCCH-PathlossReferenceRS-r16 (i.e., ssb-Index/csi-RS-Index) could be configured as #0, #1, . . . , #N_rs×(N_nsc+1)−1.

The UE could be indicated by the network the mapping relationship(s)/association rule(s) between the actual SSB/CSI-RS resource indices from/associated with/configured for the serving/non-serving (or neighboring) cells/TRPs in the inter-cell system and the SSB/CSI-RS indices (in ssb-Index/csi-RS-Index) in the higher layer parameters PUSCH-PathlossReferecenceRS/PUSCH-PathlossReferenceRS-r16/PUCCH-PathlossReferenceRS/PUCCH-PathlossReferenceRS-r16 (SSB/CSI-RS (re-)indexing configuration/rule). Various design examples of the SSB/CSI-RS (re-)indexing configurations/rules for an inter-cell system comprising of either a single non-serving (or neighboring) cell/TRP or more than one non-serving (or neighboring) cells/TRPs could be referred to those discussed in the aforementioned FIGURES and TABLES in this disclosure for TCI state/QCL information enhancements.

In one embodiment, means of associating non-serving (or neighboring) cell RS configuration information with uplink RS/channel parameters/configurations are provided.

The UE could be higher layer configured by the network (e.g., via higher layer RRC signaling) necessary non-serving (or neighboring) cell RS configuration information (such as non-serving (or neighboring) cell SSB time-domain position information) for the inter-cell operation. The configured non-serving (or neighboring) cell RS configuration information could be associated with one or more uplink RS/channel parameters/configurations indicating non-serving (or neighboring) cell RS as the reference RS for setting the spatial domain transmission filter for SRS/PUCCH and/or as the path-loss RS for PUCCH/PUSCH. The non-serving (or neighboring) cell RS (or SSB) configuration information could include one or more of the following: SSB frequency, SSB periodicity, SSB burst pattern, SSB time-domain position in a SSB burst, SSB transmit power, SSB subcarrier spacing (SCS), and PCI information for one or more non-serving (or neighboring) cell(s)/TRP(s) in the inter-cell system. Certain non-serving (or neighboring) cell SSB configuration information could be configured in the existing higher layer RRC parameters such as MeasObjectNR for RRM and/or SSB-Configuration-r16/SSB-InfoNcell-r16 for positioning.

Four design options of providing the UE necessary non-serving (or neighboring) cell SSB configuration information for the inter-cell operation (e.g., uplink RS/channel configuration) have been discussed before in this disclosure, which are: (1) Option-1: the UE is configured by the network MeasObjectNR and other necessary additional non-serving (or neighboring) cell SSB configuration information/parameters to those in MeasObjectNR for the inter-cell operation; (2) Option-2: the UE is configured by the network SSB-Configuration-r16/SSB-InfoNcell-r16 and other necessary additional non-serving (or neighboring) cell SSB configuration information/parameters to those in SSB-Configuration-r16/SSB-InfoNcell-r16 for the inter-cell operation; (3) Option-3: the UE is configured by the network MeasObjectNR and SSB-Configuration-r16/SSB-InfoNcell-r16 and other necessary additional non-serving (or neighboring) cell SSB configuration information/parameters to those in MeasObjectNR and SSB-Configuration-r16/SSB-InfoNcell-r16 for the inter-cell operation; and/or (4) Option-4: the UE is configured by the network one or more new RRC parameters (e.g., two RRC parameters denoted by SSB-Configuration-InterCell and SSB-InfoNcell-InterCell) containing all necessary non-serving (or neighboring) cell RS (SSB) configuration information/parameters for the inter-cell operation.

The non-serving (or neighboring) cell RS (SSB) configuration information configured for the inter-cell operation (e.g., the non-serving (or neighboring) cell SSB frequency, periodicity, time-domain position in a SSB burst, SCS and etc. configured via Option-1 or/and Option-2 or/and Option-3 or/and Option-4) could be associated with one or more uplink RS/channel parameters/configurations indicating the non-serving (or neighboring) cell RS as the reference RS for setting the spatial domain transmission filter for SRS/PUCCH and/or as the path-loss RS for PUCCH/PUSCH. There are various means to associate the non-serving (or neighboring) cell RS (SSB) configuration information with the uplink RS/channel parameter(s)/configuration(s) indicating the non-serving (or neighboring) cell RS as the reference RS for setting the spatial domain transmission filter for SRS/PUCCH and/or as the path-loss RS for PUCCH/PUSCH.

In one example, for the explicit non-serving (or neighboring) cell RS indication in one or more uplink RS/channel parameters/configurations, wherein the TRP-specific index/ID value such as the PCI value, TRP ID value, CORESET-PoolIndex value or other TRP-specific higher layer signaling index values is indicated in the higher layer parameters SRS-SpatialRelationInfo/PUCCH-SpatialRelationInfo/ PUSCH-PathlossReferecenceRS/PUSCH-PathlossReferenceRS-r16/PUCCH-PathlossReferenceRS/PUCCH-PathlossReferenceRS-r16, the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH is associated with the non-serving (or neighboring) cell RS (SSB) configuration information configured in MeasObjectNR (Option-1/Option-3) if the same TRP-specific index/ID value such as the same PCI value is indicated in both the uplink RS/channel parameter(s)/configuration(s) indicating the non-serving (or neighboring) cell RS as the reference RS for configuring the spatial domain transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) and the MeasObjectNR In such example, for the explicit non-serving (or neighboring) cell RS indication in one or more uplink RS/channel parameters/configurations, wherein the TRP-specific index/ID value such as the PCI value, TRP ID value, CORESET-PoolIndex value or other TRP-specific higher layer signaling index values is indicated in the higher layer parameters SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16, the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH is associated with the non-serving (or neighboring) cell RS (SSB) configuration information configured in SSB-Configuration-r16/SSB-InfoNcell-r16 (Option-2/Option-3) if the same TRP-specific index/ID value such as the same PCI value is indicated in both the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) and the SSB-Configuration-r16/SSB-InfoNcell-r16.

In such example, for the explicit non-serving (or neighboring) cell RS indication in one or more uplink RS/channel parameters/configurations, wherein the TRP-specific index/ID value such as the PCI value, TRP ID value, CORESET-PoolIndex value or other TRP-specific higher layer signaling index values is indicated in the higher layer parameters SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16, the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH is associated with the non-serving (or neighboring) cell RS (SSB) configuration information configured in SSB-Configuration-InterCell/SSB-InfoNcell-InterCell (Option-4) if the same TRP-specific index/ID value such as the same PCI value is indicated in both the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) and the SSB-Configuration-InterCell/SSB-InfoNcell-InterCell.

In another example, for the implicit non-serving (or neighboring) cell RS (re-)indexing in uplink RS/channel parameter(s)/configuration(s) indicating the non-serving (or neighboring) cell RS as the reference RS for setting the spatial transmission filter for SRS/PUCCH or as the path-loss RS for PUCCH/PUSCH, if the inter-cell system contains a single non-serving (or neighboring) cell/TRP, the UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH with the non-serving (or neighboring) cell RS (SSB) configuration information configured in MeasObjectNR (Option-1/Option-3) as long as the UE could identify the non-serving (or neighboring) cell RS from the indicated uplink RS/channel parameter(s)/configuration(s) following the non-serving (or neighboring) cell RS (re-)indexing configuration/rule in the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16). If the inter-cell system contains more than one non-serving (or neighboring) cells/TRPs, the UE could first identify the non-serving (or neighboring) cell RS from the indicated uplink RS/channel parameter(s)/configuration(s) following the non-serving (or neighboring) cell RS (re-)indexing configuration/rule in the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16). The UE could then identify the TRP-specific index/ID value such as the PCI value associated with the non-serving (or neighboring) cell RS. The UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in MeasObjectNR (Option-1/Option-3) if the TRP-specific index/ID value such as the PCI value associated with/linked to the non-serving (or neighboring) cell RS and the TRP-specific index/ID value such as the PCI value indicated in the MeasObjectNR are the same.

In such example, for the implicit non-serving (or neighboring) cell RS (re-)indexing in uplink RS/channel parameter(s)/configuration(s) indicating the non-serving (or neighboring) cell RS as the reference RS for setting the spatial transmission filter for SRS/PUCCH or as the path-loss RS for PUCCH/PUSCH, if the inter-cell system contains a single non-serving (or neighboring) cell/TRP, the UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH with the non-serving (or neighboring) cell RS (SSB) configuration information configured in SSB-Configuration-r16/SSB-InfoNcell-r16 (Option-2/Option-3) as long as the UE could identify the non-serving (or neighboring) cell RS from the indicated uplink RS/channel parameter(s)/configuration(s) following the non-serving (or neighboring) cell RS (re-)indexing configuration/rule in the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16). If the inter-cell system contains more than one non-serving (or neighboring) cells/TRPs, the UE could first identify the non-serving (or neighboring) cell RS from the indicated uplink RS/channel parameter(s)/configuration(s) following the non-serving (or neighboring) cell RS (re-)indexing configuration/rule in the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16). The UE could then identify the TRP-specific index/ID value such as the PCI value associated with the non-serving (or neighboring) cell RS. The UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in SSB-Configuration-InterCell/SSB-InfoNcell-InterCell (Option-4) if the TRP-specific index/ID value such as the PCI value associated with/linked to the non-serving (or neighboring) cell RS and the TRP-specific index/ID value such as the PCI value indicated in the SSB-Configuration-InterCell/SSB-InfoNcell-InterCell are the same.

In yet another example, for the one-bit flag/multi-bit indicator in uplink RS/channel parameter(s)/configuration(s) indicating the non-serving (or neighboring) cell RS as the reference RS for setting the spatial transmission filter for SRS/PUCCH or as the path-loss RS for PUCCH/PUSCH, if the inter-cell system contains a single non-serving (or neighboring) cell/TRP, the UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH with the non-serving (or neighboring) cell RS (SSB) configuration information configured in MeasObjectNR (Option-1/Option-3) as long as the UE could identify the non-serving (or neighboring) cell RS from the indicated uplink RS/channel parameter(s)/configuration(s) following the one-bit flag indicator in the uplink RS/channel parameter(s)/configuration(s) (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) indicating the non-serving (or neighboring) cell RS as the reference RS for setting the spatial transmission filter for SRS/PUCCH or as the path-loss RS for PUCCH/PUSCH (e.g., "1"/"ON"/"true" for the non-serving (or neighboring) cell/TRP while "0"/"OFF"/"false" for the serving cell/TRP). If the inter-cell system contains more than one non-serving (or neighboring) cells/TRPs, the UE could first identify the non-serving (or neighboring) cell RS from the indicated uplink RS/channel parameter(s)/configuration(s) according to the multi-bit indicator in the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelation-Info/PUCCH-SpatialRelationInfo/PUSCH-PathlossRefer-ecenceRS/PUSCH-PathlossReferenceRS-r16/PUCCH-PathlossReferenceRS/PUCCH-PathlossReferenceRS-r16). The UE could then identify the TRP-specific index/ID value such as the PCI value associated with the non-serving (or neighboring) cell RS, and therefore, the corresponding state of the multi-bit indicator. The UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in MeasObjectNR (Option-1/Option-3) if the TRP-specific index/ID value such as the PCI value associated with/linked to the non-serving (or neighboring) cell RS and the TRP-specific index/ID value such as the PCI value indicated in the MeasObjectNR are the same.

In such example, for the one-bit flag/multi-bit indicator in uplink RS/channel parameter(s)/configuration(s) indicating the non-serving (or neighboring) cell RS as the reference RS for setting the spatial transmission filter for SRS/PUCCH or as the path-loss RS for PUCCH/PUSCH, if the inter-cell system contains a single non-serving (or neighboring) cell/TRP, the UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH with the non-serving (or neighboring) cell RS (SSB) configuration information configured in SSB-Configuration-r16/SSB-InfoNcell-r16 (Option-2/Option-3) as long as the UE could identify the non-serving (or neighboring) cell RS from the indicated uplink RS/channel parameter(s)/configuration(s) following the one-bit flag indicator in the uplink RS/channel parameter(s)/configuration(s) (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) indicating the non-serving (or neighboring) cell RS as the reference RS for setting the spatial transmission filter for SRS/PUCCH or as the path-loss RS for PUCCH/PUSCH (e.g., "1"/"ON"/"true" for the non-serving (or neighboring) cell/TRP while "0"/"OFF"/"false" for the serving cell/TRP). If the inter-cell system contains more than one non-serving (or neighboring) cells/TRPs, the UE could first identify the non-serving (or neighboring) cell RS from the indicated uplink RS/channel parameter(s)/configuration(s) according to the multi-bit indicator in the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS-r16). The UE could then identify the TRP-specific index/ID value such as the PCI value associated with the non-serving (or neighboring) cell RS, and therefore, the corresponding state of the multi-bit indicator. The UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelation-Info/PUCCH-SpatialRelationInfo/PUSCH-PathlossRefer-ecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in SSB-Configuration-r16/SSB-InfoNcell-r16 (Option-2/Option-3) if the TRP-specific index/ID value such as the PCI value associated with the non-serving (or neighboring) cell RS and the TRP-specific index/ID value such as the PCI value indicated in the SSB-Configuration-r16/SSB-InfoNcell-r16 are the same.

In such example, for the one-bit flag/multi-bit indicator in uplink RS/channel parameter(s)/configuration(s) indicating the non-serving (or neighboring) cell RS as the reference RS for setting the spatial transmission filter for SRS/PUCCH or as the path-loss RS for PUCCH/PUSCH, if the inter-cell system contains a single non-serving (or neighboring) cell/TRP, the UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenc-eRS/PUSCH-PathlossReferenceRS-r16/PUCCH-Pathloss-ReferenceRS/PUCCH-PathlossReferenceRS-r16) with the non-serving (or neighboring) cell RS (SSB) configuration information configured in SSB-Configuration-InterCell/SSB-InfoNcell-InterCell (Option-4) as long as the UE could identify the non-serving (or neighboring) cell RS from the indicated uplink RS/channel parameter(s)/configuration(s) following the one-bit flag indicator in the uplink RS/channel parameter(s)/configuration(s) (e.g., in SRS-SpatialRelation-Info/PUCCH-SpatialRelationInfo/PUSCH-PathlossRefer-ecenceRS/PUSCH-PathlossReferenceRS-r16/PUCCH-PathlossReferenceRS/PUCCH-PathlossReferenceRS-r16) indicating the non-serving (or neighboring) cell RS as the reference RS for setting the spatial transmission filter for SRS/PUCCH or as the path-loss RS for PUCCH/PUSCH (e.g., "1"/"ON"/"true" for the non-serving (or neighboring) cell/TRP while "0"/"OFF"/"false" for the serving cell/TRP). If the inter-cell system contains more than one non-serving (or neighboring) cells/TRPs, the UE could first identify the non-serving (or neighboring) cell RS from the indicated uplink RS/channel parameter(s)/configuration(s) according to the multi-bit indicator in the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelation-Info/PUCCH-SpatialRelationInfo/PUSCH-PathlossRefer-ecenceRS/PUSCH-PathlossReferenceRS-r16/PUCCH-PathlossReferenceRS/PUCCH-PathlossReferenceRS-r16). The UE could then identify the TRP-specific index/ID value such as the PCI value associated with the non-serving (or neighboring) cell RS, and therefore, the corresponding state of the multi-bit indicator. The UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-Spatial-RelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in SSB-Configuration-InterCell/SSB-InfoNcell-InterCell (Option-4) if the TRP-specific index/ID value such as the PCI value associated with/linked to the non-serving (or neighboring) cell RS and the TRP-specific index/ID value such as the PCI value indicated in the SSB-Configuration-InterCell/SSB-InfoNcell-InterCell are the same.

In yet another example, for using one or more reserved SCI/ServCellIndex values to identify/indicate the non-serving (or neighboring) cell RS(s) in one or more uplink RS/channel parameter(s)/configuration(s), if the inter-cell system contains a single non-serving (or neighboring) cell/TRP, the UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in MeasObjectNR (Option-1/Option-3) as long as the UE could identify the non-serving (or neighboring) cell RS from the indicated uplink RS/channel parameter(s)/configuration(s) according to the SCI/ServCellIndex value in the uplink RS/channel parameter(s)/configuration(s) (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) indicating the non-serving (or neighboring) cell RS as the reference RS for setting the spatial transmission filter for SRS/PUCCH or as the path-loss RS for PUCCH/PUSCH (e.g., whether the SCI/ServCellIndex value is reserved for identifying/indicating non-serving (or neighboring) cell RS(s)). If the inter-cell system contains more than one non-serving (or neighboring) cells/TRPs, the UE could first identify the non-serving (or neighboring) cell RS from the indicated uplink RS/channel parameter(s)/configuration(s) according to the SCI/ServCellIndex value in the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16). For the given SCI/ServCellIndex value in the higher layer parameters SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16, the UE could then identify the TRP-specific index/ID value such as the PCI value associated with the non-serving (or neighboring) cell RS. The UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in MeasObjectNR (Option-1/Option-3) if the TRP-specific index/ID value such as the PCI value associated with the non-serving (or neighboring) cell RS and the TRP-specific index/ID value such as the PCI value indicated in the MeasObjectNR are the same.

In such example, for using one or more reserved SCI/ServCellIndex values to identify/indicate the non-serving (or neighboring) cell RS(s) in one or more uplink RS/channel parameter(s)/configuration(s), if the inter-cell system contains a single non-serving (or neighboring) cell/TRP, the UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in SSB-Configuration-r16/SSB-InfoNcell-r16 (Option-2/Option-3) as long as the UE could identify the non-serving (or neighboring) cell RS from the indicated uplink RS/channel parameter(s)/configuration(s) according to the SCI/ServCellIndex value in the uplink RS/channel parameter(s)/configuration(s) (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) indicating the non-serving (or neighboring) cell RS as the reference RS for setting the spatial transmission filter for SRS/PUCCH or as the path-loss RS for PUCCH/PUSCH (e.g., whether the SCI/ServCellIndex value is reserved for identifying/indicating non-serving (or neighboring) cell RS(s)). If the inter-cell system contains more than one non-serving (or neighboring) cells/TRPs, the UE could first identify the non-serving (or neighboring) cell RS from the indicated uplink RS/channel parameter(s)/configuration(s) according to the SCI/ServCellIndex value in the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16). For the given SCI/ServCellIndex value in the higher layer parameters SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16, the UE could then identify the TRP-specific index/ID value such as the PCI value associated with the non-serving (or neighboring) cell RS. The UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in SSB-Configuration-r16/SSB-InfoNcell-r16 (Option-2/Option-3) if the TRP-specific index/ID value such as the PCI value associated with/linked to the non-serving (or neighboring) cell RS and the TRP-specific index/ID value such as the PCI value indicated in the SSB-Configuration-r16/SSB-InfoNcell-r16 are the same.

In such example, for using one or more reserved SCI/ServCellIndex values to identify/indicate the non-serving (or neighboring) cell RS(s) in one or more uplink RS/channel parameter(s)/configuration(s), if the inter-cell system contains a single non-serving (or neighboring) cell/TRP, the UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in SSB-Configuration-InterCell/SSB-InfoNcell-InterCell (Option-4) as long as the UE could identify the non-serving (or neighboring) cell RS from the indicated uplink RS/channel parameter(s)/configuration(s) according to the SCI/ServCellIndex value in the uplink RS/channel parameter(s)/configuration(s) (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) indicating the non-serving (or neighboring) cell RS as the reference RS for setting the spatial transmission filter for SRS/PUCCH or as the path-loss RS for PUCCH/PUSCH (e.g., whether the SCI/ServCellIndex value is reserved for identifying/indicating non-serving (or neighboring) cell RS(s)). If the inter-cell system contains more than one non-serving (or neighboring) cells/TRPs, the UE could first identify the non-serving (or neighboring) cell RS from the indicated uplink RS/channel parameter(s)/configuration(s) according to the SCI/ServCellIndex value in the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16). For the given SCI/ServCellIndex value in the higher layer parameters SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16, the UE could then identify the TRP-specific index/ID value such as the PCI value associated with the non-serving (or neighboring) cell RS. The UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in SSB-Configuration-InterCell/SSB-InfoNcell-InterCell (Option-4) if the TRP-specific index/ID value such as the PCI value associated with/linked to the non-serving (or neighboring) cell RS and the TRP-specific index/ID value such as the PCI value indicated in the SSB-Configuration-InterCell/SSB-InfoNcell-InterCell are the same.

The association between the non-serving (or neighboring) cell RS (SSB) configuration information with the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) could also be via other identifiers/indicators than the TRP-specific index/ID value such as the PCI value.

In one example, for a MeasObjectNR indicating the non-serving (or neighboring) cell RS (SSB) configuration information for the inter-cell operation (Option-1/Option-3), corresponding MeasObjectId could be included/indicated in one or more uplink RS/channel parameters/configurations indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16). An example of including/indicating the MeasObjectId in the higher layer parameter PUSCH-PathlossReferenceRS is provided in TABLE 45. The UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in MeasObjectNR (Option-1/Option-3) if the MeasObjectId value configured in both the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) and the MeasObjectNR are the same.

TABLE 45

An example of including/indicating the MeasObjectId in higher layer parameter PUSCH-PathlossReferenceRS PUSCH-PathlossReferenceRS ::= SEQUENCE {
  pusch-PathlossReferenceRS-Id PUSCH-PathlossReferenceRS-Id,
  MeasObjectId INTEGER (1..maxNrofObjectId)
  referenceSignal CHOICE {
  ssb-Index SSB-Index,
  csi-RS-Index NZP-CSI-RS-ResourceId
  }
}

In another example, a new identifier/indicator, e.g., denoted by SSBConfigId, could be included/indicated in one or more uplink RS/channel parameters/configurations indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferecenceRS/PUSCH-PathlossReferenceRS-r16/PUCCH-PathlossReferenceRS/PUCCH-PathlossReferenceRS-r16) and the SSB-Configuration-r16/SSB-InfoNcell-r16 indicating the non-serving (or neighboring) cell RS (SSB) configuration information for the inter-cell operation (Option-2/Option-3). The UE could associate the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferenceeRS/PUSCH-PathlossReferenceRS-r16/PUCCH-PathlossReferenceRS/PUCCH-PathlossReferenceRS-r16) with the non-serving (or neighboring) cell RS (SSB) configuration information configured in SSB-Configuration-r16/SSB-InfoNcell-r16 (Option-2/Option-3) if the SSBConfigId value configured in both the uplink RS/channel parameter(s)/configuration(s) indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferenceeRS/PUSCH-PathlossReferenceRS-r16/PUCCH-PathlossReferenceRS/PUCCH-PathlossReferenceRS-r16) and the SSB-Configuration-r16/SSB-InfoNcell-r16 are the same.

In yet another example, a new identifier/indicator, e.g., denoted by SSBConfigInterCellId, could be included/indicated in one or more uplink RS/channel parameters/configurations indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferenceRS/PUSCH-PathlossReferenceRS-r16/PUCCH-PathlossReferenceRS/PUCCH-PathlossReferenceRS-r16) and the SSB-Configuration-InterCell/SSB-InfoNcell-InterCell indicating the non-serving (or neighboring) cell RS (SSB) configuration information for the inter-cell operation (Option-4). The UE could associate the uplink RS/channel parameters/configurations indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferenceeRS/PUSCH-PathlossReferenceRS-r16/PUCCH-PathlossReferenceRS-r16) with the non-serving (or neighboring) cell RS (SSB) configuration information configured in SSB-Configuration-InterCell/SSB-InfoNcell-InterCell (Option-4) if the SSBConfigInterCellId value configured in both the uplink RS/channel parameters/configurations indicating the non-serving (or neighboring) cell RS as the reference RS for setting the spatial transmission filter for SRS/PUCCH or as the path-loss RS for PUCCH/PUSCH (e.g., in SRS-SpatialRelationInfo/PUCCH-SpatialRelationInfo/PUSCH-PathlossReferenceeRS/PUSCH-PathlossReferenceRS-r16/PUCCH-PathlossReferenceRS/PUCCH-PathlossReferenceRS-r16) and the SSB-Configuration-InterCell/SSB-InfoNcell-InterCell are the same.

In yet another example, an SRS resource/resource set ID (e.g., the higher layer parameters srs-ResourceId in SRS-Resource and/or srs-ResourceSetId in SRS-ResourceSet) could be included/indicated in MeasObjectNR indicating the non-serving (or neighboring) cell RS (SSB) configuration information for the inter-cell operation (Option-1/Option-3). The UE could associate the SRS spatial relation setting (SRS-SpatialRelationInfo) with the non-serving (or neighboring) cell RS (SSB) configuration information configured in MeasObjectNR (Option-1/Option-3) if the SRS resource/resource set ID value configured in/linked to both the SRS spatial relation setting (SRS-SpatialRelationInfo) and the MeasObjectNR are the same.

In yet another example, an SRS resource/resource set ID (e.g., the higher layer parameters srs-ResourceId in SRS-Resource and/or srs-ResourceSetId in SRS-ResourceSet) could be included/indicated in SSB-Configuration-r16/SSB-InfoNcell-r16 indicating the non-serving (or neighboring) cell RS (SSB) configuration information for the inter-cell operation (Option-2/Option-3). The UE could associate the SRS spatial relation setting (SRS-SpatialRelationInfo) with the non-serving (or neighboring) cell RS (SSB) configuration information configured in SSB-Configuration-r16/SSB-InfoNcell-r16 (Option-2/Option-3) if the SRS resource/resource set ID value configured in/linked to both the SRS spatial relation setting (SRS-SpatialRelationInfo) and the SSB-Configuration-r16/SSB-InfoNcell-r16 are the same.

In yet another example, an SRS resource/resource set ID (e.g., the higher layer parameters srs-ResourceId in SRS-Resource and/or srs-ResourceSetId in SRS-ResourceSet) could be included/indicated in SSB-Configuration-InterCell/SSB-InfoNcell-InterCell indicating the non-serving (or neighboring) cell RS (SSB) configuration information for the inter-cell operation (Option-4). The UE could associate the SRS spatial relation setting (SRS-SpatialRelationInfo) with the non-serving (or neighboring) cell RS (SSB) configuration information configured in SSB-Configuration-InterCell/SSB-InfoNcell-InterCell (Option-4) if the SRS resource/resource set ID value configured in/linked to both the SRS spatial relation setting (SRS-SpatialRelationInfo) and the SSB-Configuration-InterCell/SSB-InfoNcell-InterCell are the same.

In yet another example, a PUCCH spatial relation information ID (e.g., the higher layer parameter pucch-SpatialRelationInfoId in PUCCH-SpatialRelationInfo) could be included/indicated in MeasObjectNR indicating the non-serving (or neighboring) cell RS (SSB) configuration information for the inter-cell operation (Option-1/Option-3). The UE could associate the PUCCH spatial relation setting (PUCCH-SpatialRelationInfo) with the non-serving (or neighboring) cell RS (SSB) configuration information configured in MeasObjectNR (Option-1/Option-3) if the PUCCH spatial relation information ID value configured in/linked to both the PUCCH spatial relation setting (PUCCH-SpatialRelationInfo) and the MeasObjectNR are the same.

In yet another example, a PUCCH spatial relation information ID (e.g., the higher layer parameter pucch-SpatialRelationInfoId in PUCCH-SpatialRelationInfo) could be included/indicated in SSB-Configuration-r16/SSB-InfoNcell-r16 indicating the non-serving (or neighboring) cell RS (SSB) configuration information for the inter-cell operation (Option-2/Option-3). The UE could associate the PUCCH spatial relation setting (PUCCH-SpatialRelationInfo) with the non-serving (or neighboring) cell RS (SSB) configuration information configured in SSB-Configuration-r16/SSB-InfoNcell-r16 (Option-2/Option-3) if the PUCCH spatial relation information ID value configured in/linked to both the PUCCH spatial relation setting (PUCCH-SpatialRelationInfo) and the SSB-Configuration-r16/SSB-InfoNcell-r16 are the same.

In yet another example, a PUCCH spatial relation information ID (e.g., the higher layer parameter pucch-SpatialRelationInfoId in PUCCH-SpatialRelationInfo) could be included/indicated in SSB-Configuration-InterCell/SSB-InfoNcell-InterCell indicating the non-serving (or neighboring) cell RS (SSB) configuration information for the inter-cell operation (Option-4). The UE could associate the PUCCH spatial relation setting (PUCCH-SpatialRelationInfo) with the non-serving (or neighboring) cell RS (SSB) configuration information configured in SSB-Configuration-InterCell/SSB-InfoNcell-InterCell (Option-4) if the PUCCH spatial relation information ID value configured in/linked to both the PUCCH spatial relation setting (PUCCH-SpatialRelationInfo) and the SSB-Configuration-InterCell/SSB-InfoNcell-InterCell are the same.

In yet another example, one or more path-loss RS IDs (e.g., the higher layer parameters pusch-PathlossReferenceRS-Id/pusch-PathlossReferenceRS-Id-r16/pucch-PathlossReferenceRS-Id/pucch-PathlossReferenceRS-Id-r16 in PUSCH-PathlossReferecenceRS/PUSCH-PathlossReferenceRS-r16/PUCCH-PathlossReferenceRS/PUCCH-PathlossReferenceRS-r16) could be included/indicated in MeasObjectNR indicating the non-serving (or neighboring) cell RS (SSB) configuration information for the inter-cell operation (Option-1/Option-3). The UE could associate one or more path-loss RS resource settings (via the higher layer parameters PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in MeasObjectNR (Option-1/Option-3) if the path-loss RS ID value(s) configured in/linked to both the path-loss RS resource setting(s) (via the higher layer parameters PUSCH-PathlossReferecenceRS/PUSCH-PathlossReferenceRS-r16/PUCCH-PathlossReferenceRS/PUCCH-PathlossReferenceRS-r16) and the MeasObjectNR are the same.

In yet another example, one or more path-loss RS IDs (e.g., the higher layer parameters pusch-PathlossReferenceRS-Id/pusch-PathlossReferenceRS-Id-r16/pucch-PathlossReferenceRS-Id/pucch-PathlossReferenceRS-Id-r16 in PUSCH-PathlossReferecenceRS/PUSCH-PathlossReferenceRS-r16/PUCCH-PathlossReferenceRS/PUCCH-PathlossReferenceRS-r16) could be included/indicated in SSB-Configuration-r16/SSB-InfoNcell-r16 indicating the non-serving (or neighboring) cell RS (SSB) configuration information for the inter-cell operation (Option-2/Option-3). The UE could associate one or more path-loss RS resource settings (via the higher layer parameters PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in SSB-Configuration-r16/SSB-InfoNcell-r16 (Option-2/Option-3) if the path-loss RS ID value(s) configured in/linked to both the path-loss RS resource setting(s) (via the higher layer parameters PUSCH-PathlossReferecenceRS/PUSCH-PathlossReferenceRS-r16/PUCCH-PathlossReferenceRS/PUCCH-PathlossReferenceRS-r16) and the SSB-Configuration-r16/SSB-InfoNcell-r16 are the same.

In yet another example, one or more path-loss RS IDs (e.g., the higher layer parameters pusch-PathlossReferenceRS-Id/pusch-PathlossReferenceRS-Id-r16/pucch-PathlossReferenceRS-Id/pucch-PathlossReferenceRS-Id-r16 in PUSCH-PathlossReferecenceRS/PUSCH-PathlossReferenceRS-r16/PUCCH-PathlossReferenceRS/PUCCH-PathlossReferenceRS-r16) could be included/indicated in SSB-Configuration-InterCell/SSB-InfoNcell-InterCell indicating the non-serving (or neighboring) cell RS (SSB) configuration information for the inter-cell operation (Option-4). The UE could associate one or more path-loss RS resource settings (via the higher layer parameters PUSCH-PathlossReferecenceRS/PUSCH-PathlossReferenceRS-r16/PUCCH-PathlossReferenceRS/PUCCH-PathlossReferenceRS-r16) with the non-serving (or neighboring) cell RS (SSB) configuration information configured in SSB-Configuration-InterCell/SSB-InfoNcell-InterCell (Option-4) if the path-loss RS ID value(s) configured in/linked to both the path-loss RS resource setting(s) (via the higher layer parameters PUSCH-PathlossReferecenceRS/PUSCH-PathlossReferenceRS-r16/PUCCH-PathlossReferenceRS/PUCCH-PathlossReferenceRS-r16) and the SSB-Configuration-InterCell/SSB-InfoNcell-InterCell are the same.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE) in a wireless communication system, the method comprising:
   receiving, from a base station, transmission configuration indicator (TCI) state information including quasi co-location (QCL) information, wherein the QCL information includes information on a reference signal (RS) and information on a QCL type;
   identifying the information on the RS indicates a synchronization signal block (SSB);
   identifying the information on the QCL type indicates a QCL typeD, wherein the QCL typeD relates to a spatial receive (RX) parameter; and
   receiving, from the base station, a channel state information (CSI)-RS based on the SSB, wherein the SSB is associated with a physical cell identifier (PCI) different from a PCI of a serving cell.

2. The method of claim 1, further comprising:
   receiving, from the base station, a demodulation reference signal (DM-RS) of a physical downlink shared channel (PDSCH) or a physical downlink control channel (PDCCH) based on QCL-typeD with the CSI-RS.

3. The method of claim 1, further comprising:
   receiving an uplink (UL) transmission parameter indicating the SSB associated with the PCI different from the PCI of the serving cell; and
   based on the UL transmission parameter, determining a spatial transmit (TX) filter for an UL RS or UL channel.

4. The method of claim 1, wherein the TCI state information includes an indicator for the PCI different from the PCI of the serving cell.

5. The method of claim 1, further comprising:
   receiving a higher layer parameter related to the SSB associated with the PCI different from the PCI of the serving cell,
   wherein the higher layer parameter includes at least one of:
     PCI information associated with the PCI different from the PCI of the serving cell;

a SSB periodicity;
a SSB time-domain position in SSB burst; or
a SSB transmit power.

6. The method of claim 5, further comprising:
in case of receiving the higher layer parameter, receiving a CSI resource configuration,
wherein the CSI resource configuration includes a list of PCI indexes of SSBs,
wherein the PCI index included in the list indicates the PCI different from the PCI of the serving cell, and
wherein in case that a value of a PCI index included in the list is zero, the PCI index indicates the PCI of the serving cell.

7. The method of claim 5, further comprising:
expecting additional information related to the SSB associated with the PCI different from the PCI of the serving cell based on information related to a SSB associated with the PCI of the serving cell.

8. A user equipment (UE) in a wireless communication system, the UE comprising:
a transceiver configured to receive, from a base station, transmission configuration indicator (TCI) state information including quasi co-location (QCL) information, wherein the QCL information includes information on a reference signal (RS) and information on a QCL type;
a processor operably coupled with the transceiver, the processor configured to:
identify the information on the RS indicates a synchronization signal block (SSB);
identify the information on the QCL type indicates a QCL typeD, wherein the QCL typeD relates to a spatial receive (RX) parameter; and
wherein the transceiver is further configured to receive, from the base station, a channel state information (CSI)-RS based on the SSB, wherein the SSB is associated with a physical cell identifier (PCI) different from a PCI of a serving cell.

9. The UE of claim 8, wherein the transceiver is further configured to receive, from the base station, a demodulation reference signal (DM-RS) of a physical downlink shared channel (PDSCH) or a physical downlink control channel (PDCCH) based on QCL-typeD with the CSI-RS.

10. The UE of claim 8, wherein:
the transceiver is further configured to receive an uplink (UL) transmission parameter indicating the SSB associated with the PCI different from the PCI of the serving cell; and
the processor is further configured to determine, based on the UL transmission parameter, a spatial transmit (TX) filter for an UL RS or UL channel.

11. The UE of claim 8, wherein the TCI state information includes an indicator for the PCI different from the PCI of the serving cell.

12. The UE of claim 8, wherein:
the transceiver is further configured to receive a higher layer parameter related to the SSB associated with the PCI different from the PCI of the serving cell, and
the higher layer parameter includes at least one of:
PCI information associated with the PCI different from the PCI of the serving cell;
a SSB periodicity;
a SSB time-domain position in SSB burst; or
a SSB transmit power.

13. The UE of claim 12, wherein:
the transceiver is further configured to receive, in case of receiving the higher layer parameter, a CSI resource configuration,
the CSI resource configuration includes a list of PCI indexes of SSBs,
the PCI index included in the list indicates the PCI different from the PCI of the serving cell, and
in case that a value of a PCI index included in the list is zero, the PCI index indicates the PCI of the serving cell.

14. The UE of claim 12, wherein the processor is further configured to identify to expect additional information related to the SSB associated with the PCI different from the PCI of the serving cell based on information related to a SSB associated with the PCI of the serving cell.

15. A base station (BS) in a wireless communication system, the BS comprising:
a processor; and
a transceiver operably coupled with the processor, the transceiver configured to:
transmit, to a user equipment (UE), transmission configuration indicator (TCI) state information including quasi co-location (QCL) information, wherein:
the QCL information includes information on a reference signal (RS) and information on a QCL type,
the information on the RS indicates a synchronization signal block (SSB),
the information of the QCL type indicates a QCL typeD, and
the QCL typeD relates to a spatial receive (RX) parameter; and
transmit, to the UE, a channel state information (CSI)-RS based on the SSB, wherein the SSB is associated with a physical cell identifier (PCI) different from a PCI of a serving cell.

16. The BS of claim 15, wherein the transceiver is further configured to transmit, to the UE, a demodulation reference signal (DM-RS) of a physical downlink shared channel (PDSCH) or a physical downlink control channel (PDCCH) based on QCL-typeD with the CSI-RS.

17. The BS of claim 15, wherein the transceiver is further configured to:
transmit an uplink (UL) transmission parameter indicating the SSB associated with the PCI different from the PCI of the serving cell; and
receive an UL RS or UL channel using a spatial transmit (TX) filter configured based on the UL transmission parameter.

18. The BS of claim 15, wherein:
the transceiver is further configured to transmit, to the UE, a higher layer parameter related to the SSB associated with the PCI different from the PCI of the serving cell, and
the higher layer parameter includes at least one of:
PCI information associated with the PCI different from the PCI of the serving cell;
a SSB periodicity;
a SSB time-domain position in SSB burst; or
a SSB transmit power.

19. The BS of claim 18, wherein:
the transceiver is further configured to, in case of transmitting the higher layer parameter, transmit CSI resource configuration,
the CSI resource configuration includes a list of PCI index of SSB,
the PCI index included in the list indicates PCI different from the PCI of the serving cell, and
in case that a value of the PCI index included in the list is zero, the PCI index indicates the PCI of the serving cell.

20. The BS of claim 18, wherein additional information related to the SSB associated with the PCI different from the PCI of the serving cell is determined based on information related to a SSB associated with the PCI of the serving cell.

\* \* \* \* \*